US009688342B2

(12) United States Patent
Takenaka et al.

(10) Patent No.: US 9,688,342 B2
(45) Date of Patent: Jun. 27, 2017

(54) MOBILE VEHICLE

(71) Applicant: HONDA MOTOR CO., LTD., Tokyo (JP)

(72) Inventors: Toru Takenaka, Wako (JP); Hiroshi Gomi, Wako (JP); Kazushi Akimoto, Wako (JP); Hiroyuki Makino, Wako (JP); Yoichi Nishimura, Wako (JP); Taihei Setoguchi, Wako (JP); Naoyuki Saito, Wako (JP); Kenji Muto, Wako (JP); Keisuke Koitabashi, Wako (JP); Shunichi Nakabayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 14/804,774

(22) Filed: Jul. 21, 2015

(65) Prior Publication Data
US 2015/0321723 A1    Nov. 12, 2015

Related U.S. Application Data

(62) Division of application No. 14/068,899, filed on Oct. 31, 2013, now Pat. No. 9,126,649.

(30) Foreign Application Priority Data

Nov. 1, 2012    (JP) .................................. 2012-242250

(51) Int. Cl.
B62K 21/00    (2006.01)

(52) U.S. Cl.
CPC .................................... B62K 21/00 (2013.01)

(58) Field of Classification Search
CPC ...................................................... B62K 21/00
See application file for complete search history.

(56) References Cited

U.S. PATENT DOCUMENTS 7,438,306 B2 * 10/2008 Mrdeza .................. B62K 21/04
280/274

FOREIGN PATENT DOCUMENTS

JP    04-224488    8/1992

* cited by examiner

Primary Examiner — Mussa A Shaawat
Assistant Examiner — Michael Kerrigan
(74) Attorney, Agent, or Firm — Rankin, Hill & Clark LLP

(57) ABSTRACT

In a mobile vehicle 1 having a vehicle body 2, a front wheel 3f, and a rear wheel 3r, the steering control wheel 3f can be steered by a steering actuator 8 about a steering axis Csf which is tilted backward. The steering actuator 8 is controlled by a control device 15. The height a, from a ground surface 110, of the intersection point Ef of the steering axis Csf of the steering control wheel 3f and a virtual straight line connecting the ground contact point of the steering control wheel 3f and the center of axle of the steering control wheel 3f in a basic posture state of the mobile vehicle 1 is set to satisfy a prescribed condition.

4 Claims, 42 Drawing Sheets

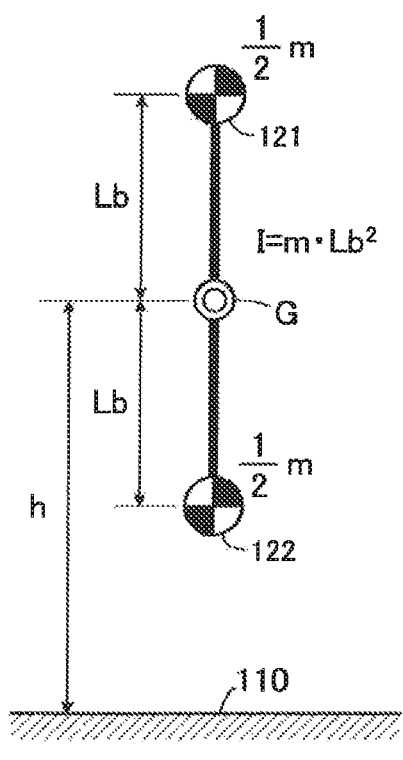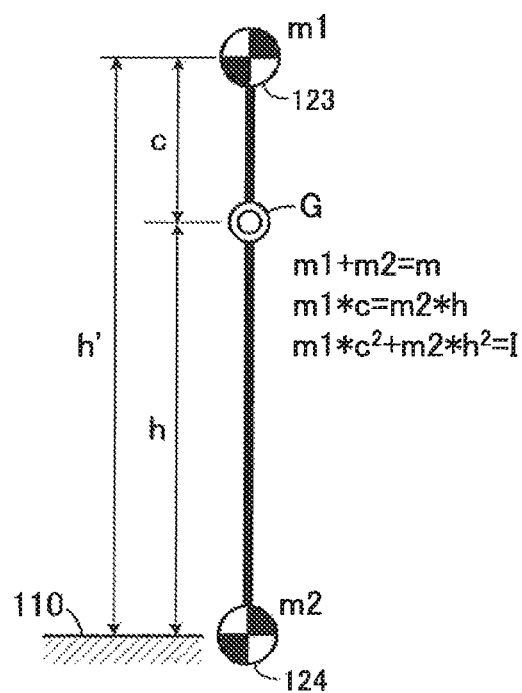
FIG.2A
FIG.2B $a \geq a\_p$
$Mp=(m1+m2)*g*p \leq 0$
$M2=-m2*g*q<0$
$Msum=Mp+M2<0$ $a\_sum<a<a\_p$
$Mp=(m1+m2)*g*p>0$
$M2=-m2*g*q<0$
$Msum=Mp+M2<0$ $a=a\_sum$
$Mp=(m1+m2)*g*p>0$
$M2=-m2*g*q<0$
$Msum=(Mp+M2)=0$ $a\_s<a<a\_sum$
$Mp=(m1+m2)*g*p>0$
$M2=-m2*g*q<0$
$Msum=Mp+M2>0$
$Msum<-M2$ $a = a\_s$
$Mp = (m1+m2)*g*p > 0$
$M2 = -m2*g*q < 0$
$Msum = Mp + M2 > 0$
$Msum = -M2$ $0 < a < a\_s$
$Mp = (m1+m2)*g*p > 0$
$M2 = -m2*g*q < 0$
$Msum = Mp + M2 > 0$
$Msum > -M2$ $a = 0$
$Mp = (m1+m2)*g*p > 0$
$M2 = -m2*g*q = 0$
$Msum = Mp + M2 > 0$ $a < 0$
$Mp = (m1+m2)*g*p > 0$
$M2 = -m2*g*q > 0$
$Msum = (Mp+M2) > 0$ $m1+m2=mb$
$m1*c=m2*hb$
$m1*c^2+m2*hb^2=I$ $m6=m2+m5$ $$x6=\frac{m2*x2+m5*x5}{m2+m5}$$

ESTIMATED TRAVELING
SPEED CALCULATING
SECTION 33

MOBILE VEHICLE

BACKGROUND OF THE INVENTION

1. Field of the Invention

The present invention relates to a mobile vehicle (mobile object) such as a two-wheeled vehicle having a front wheel and a rear wheel.

2. Description of the Related Art

In a mobile vehicle, for example a motorcycle, having a front wheel and a rear wheel arranged spaced apart from each other in the longitudinal direction of the vehicle body, the front wheel usually serves as a steering control wheel. In order to enhance the straight traveling property of the motorcycle, the steering axis of the front wheel (rotational axis of steering of the front wheel) is tilted backward (with a positive caster angle). Further, the axle of the front wheel is arranged on, or slightly behind, the steering axis.

As a result, a motorcycle of this type usually has a large positive trail. It should be noted that having a positive trail means that the point of intersection of the steering axis and the ground surface with which the wheels come into contact lies in front of the ground contact point of the steering control wheel.

Further, as a motorcycle of this type, a motorcycle which is configured such that the rear wheel is passively steered by a reaction force that the rear wheel receives from the road surface when the motorcycle makes a turn is also known, as seen, for example, in Japanese Patent Application Laid-Open No. 04-224488.

SUMMARY OF THE INVENTION

For two-wheeled vehicles such as motorcycles, it is desired to enhance the stability of the posture of the vehicle body particularly when the vehicle is stopped or traveling at a low speed.

In view of the foregoing, it is an object of the present invention to provide a mobile vehicle which is capable of enhancing the stability of the posture of the vehicle body by steering of a front wheel or a rear wheel.

First of all, the fundamental technical matters related to the present invention will be described with reference to FIGS. 1 to 10.

FIG. 1 is a schematic side view of a two-wheeled vehicle 1 (specifically, the two-wheeled vehicle 1 in the basic posture state as will be described later) which is a mobile vehicle having a vehicle body 2 and a front wheel 3f and a rear wheel 3r arranged spaced apart from each other in the longitudinal direction of the vehicle body 2. In FIG. 1, besides the side view of the two-wheeled vehicle 1, the rear wheel 3r as seen from the back of the two-wheeled vehicle 1 is illustrated on the left side of the two-wheeled vehicle 1, and the front wheel 3f as seen from the front of the two-wheeled vehicle 1 is illustrated on the right side of the two-wheeled vehicle 1.

The front wheel 3f is axially supported in a rotatable manner by a front-wheel support mechanism 4 provided at the front portion of the vehicle body 2. The front-wheel support mechanism 4 is made up, for example, of a front fork. The front wheel 3f is a steering control wheel which can be steered (turned) about a steering axis Csf which is tilted backward.

It should be noted that the steering axis Csf being tilted backward means that the steering axis Csf extends obliquely with respect to the longitudinal direction and up-and-down direction of the vehicle body 2 such that the steering axis Csf has its upper portion located rearward relative to its lower portion in the front-rear (longitudinal) direction of the vehicle body 2.

The rear wheel 3r is axially supported in a rotatable manner by a rear-wheel support mechanism 5 provided at the rear portion of the vehicle body 2. The rear-wheel support mechanism 5 is made up, for example, of a swing arm. This rear wheel 3r is a non-steering control wheel.

It is here assumed that a two-wheeled vehicle 1 which is in the state of standing still in the straight-ahead posture on a flat ground surface 110, as shown in the figure, is regarded as one rigid body. It should be noted that the state in which the two-wheeled vehicle 1 is standing still in the straight-ahead posture means the state in which the front wheel 3f and the rear wheel 3r are both stationary in the upright posture in contact with the ground surface 110 and in which the axle centerlines (centers of rotational axes) Cf and Cr of the front wheel 3f and the rear wheel 3r extend in parallel with each other in the direction orthogonal to the longitudinal direction of the vehicle body 2. Hereinafter, the state in which the two-wheeled vehicle 1 is standing still in the straight-ahead posture as described above will be referred to as the "basic posture state" of the two-wheeled vehicle 1.

In the state where the two-wheeled vehicle 1 in the basic posture state is regarded as one rigid body, the overall mass of the two-wheeled vehicle 1 (hereinafter, also simply referred to as "total mass") is denoted as m, the height of the overall center of gravity G of the two-wheeled vehicle 1 (hereinafter, also simply referred to as "center-of-gravity height") is denoted as h, and the overall inertia moment of the two-wheeled vehicle 1 (hereinafter, also simply referred to as "overall inertia") about the longitudinal axis Crol (hereinafter, referred to as "central roll axis Crol") which extends in the longitudinal direction of the vehicle body 2 while passing through the overall center of gravity G is denoted as I.

m: total mass
h: center-of-gravity height
I: overall inertia

Here, the length Lb defined by the following expression (1) will be called "overall radius of inertia". In the present specification, "*" is an arithmetic sign representing multiplication.

$$I = m*Lb*Lb \qquad (1)$$

Lb: overall radius of inertia

With the overall radius of inertia Lb thus defined, a system having the total mass of m, overall inertia of I, and center-of-gravity height of h (the system obtained by regarding the two-wheeled vehicle 1 as one rigid body; hereinafter, this system may also be referred to as "two-wheeled vehicle rigid body system") is represented by a model (hereinafter, referred to as "first model") shown in FIG. 2A.

The first model is a model which represents a two-wheeled vehicle rigid body system as a system (mass point system) configured with two mass points 121 and 122 each having an equal mass of m/2. In this first model, the two mass points 121 and 122 are arranged such that a height of their midpoint (height of the center of gravity of the mass points 121 and 122) from the ground surface 110 coincides with the center-of-gravity height h of the overall center of gravity G and that the distance from each mass point 121, 122 to the midpoint matches the overall radius of inertia Lb defined by the aforesaid expression (1).

The first model described above can be equivalently transformed to a model (hereinafter, referred to as "second model") shown in FIG. 2B.

The second model is a model which represents a two-wheeled vehicle rigid body system as a system (mass point system) configured with two mass points of a first mass point 123 and a second mass point 124. In this case, the second mass point 124 is located on the ground surface 110. That is, the height of the second mass point 124 from the ground surface 110 is "0".

In the second model, as shown below, the mass of the first mass point 123 is represented as m1, the mass of the second mass point 124 as m2, the height of the first mass point 123 from the ground surface 110 as h', and the difference c (=h'−h) between the height h' and the center-of-gravity height h of the overall center of gravity G as c (where c>0). In other words, the height h' of the first mass point 123 from the ground surface 110 is represented as (h+c).

m1: mass of the first mass point 123
m2: mass of the second mass point 124
h': height of the first mass point 123
c: difference between the height h' of the first mass point 123 and the center-of-gravity height h (where c>0)

The condition that the overall mass in the second model agrees with the overall mass (=total mass m) in the first model is expressed by the following expression (2).

$$m1+m2=m \tag{2}$$

The condition that the height of the center of gravity of the mass points 123 and 124 in the second model agrees with the height of the center of gravity (=center-of-gravity height h) of the mass points 121 and 122 in the first model is expressed by the following expression (3).

$$m1*c=m2*h \tag{3}$$

The condition that the inertia moment about the overall center of gravity (specifically, the inertia moment about the aforesaid central roll axis Crol) in the second model agrees with the inertia moment about the center of gravity of the mass points 121 and 122 (=overall inertia I) in the first model is expressed by the following expression (4).

$$m1*c*c+m2*h*h=I \tag{4}$$

From the above expressions (1) to (4), the following expressions (5a), (6a), and (7a) are obtained.

$$c=Lb*Lb/h \tag{5a}$$

$$m1=(h/(h+Lb*Lb/h))*m \tag{6a}$$

$$m2=((Lb*Lb/h)/(h+Lb*Lb/h))*m \tag{7a}$$

When the values of c, m1, and m2 are set as above, the second model becomes a model which has been equivalently transformed from the first model. Accordingly, the two-wheeled vehicle rigid body system can also be expressed by the second model, instead of the first model.

According to the above expression (1), Lb*Lb=I/m. Therefore, the expressions (5a), (6a), and (7a) can be rewritten to the following expressions (5b), (6b), and (7b), respectively. Therefore, the second model is, in other words, a model of a two-wheeled vehicle rigid body system which has a first mass point 123 whose height h' from the ground surface 110 is higher than the center-of-gravity height h of the two-wheeled vehicle 1 in the basic posture state, and a second mass point 124 on the ground surface 110 (mass point 124 whose height from the ground surface 110 is "0"), and in which the difference c (=h'−h) between the height h' of the first mass point 123 and the center-of-gravity height h and the masses m1 and m2 are set by the following expressions (5b), (6b), and (7b) in accordance with the total mass m, overall inertia I, and center-of-gravity height h of the two-wheeled vehicle 1.

$$c=I/(m*h) \tag{5b}$$

$$m1=(h/(h+I/(m*h)))*m \tag{6b}$$

$$m2=((I/(m*h))/(h+I/(m*h)))*m \tag{7b}$$

FIG. 3 shows an approximate dynamics model which approximately expresses the dynamics of the two-wheeled vehicle 1 in the aforesaid basic posture state and similar posture states (close to the basic posture state). This approximate dynamics model has been established by regarding the two-wheeled vehicle 1 as a two-wheeled vehicle rigid body system having the mass points 123 and 124 in the aforesaid second model.

It is here assumed a three-axis orthogonal coordinate system (XYZ coordinate system) in which a projected point obtained by projecting the overall center of gravity G of the two-wheeled vehicle 1 in the basic posture state onto the ground surface 110 in the perpendicular direction (up-and-down direction) is defined as the origin, the longitudinal direction of the vehicle body 2 of the two-wheeled vehicle 1 as the X-axis direction, the lateral direction (vehicle width direction) as the Y-axis direction, and the vertical direction as the Z-axis direction. In this case, the positive directions of the X, Y, and Z axes correspond to the forward, leftward, and upward directions, respectively.

Further, in terms of rotation or angle, the direction about the X axis is called the roll direction, the direction about the Y axis is called the pitch direction, and the direction about the Z axis is called the yaw direction. The positive directions of the roll, pitch, and yaw directions are each determined as the direction of rotation of a right-hand screw when the screw is turned so as to move in the positive direction of the corresponding one of the X, Y, and Z axes.

In the case where the two-wheeled vehicle 1 makes a small motion from the basic posture state, the rotation of each of the front wheel 3f and the rear wheel 3r about the corresponding axle centerline Cf, Cr is small. Therefore, in the following consideration, the gyroscopic effect by the rotations (small rotations) of the front wheel 3f and the rear wheel 3r about their axle centerlines Cf and Cr are considered to be ignorable.

Further, the caster angle of the front wheel 3f (the inclination angle (with respect to the up-and-down direction) of the steering axis Csf of the front wheel 3f in the basic posture state) is denoted as θcf. In this case, the caster angle θcf in the case where the steering axis Csf of the front wheel 3f is tilted backward as shown in FIG. 1 is defined to be positive.

Supplementally, in an actual two-wheeled vehicle 1, the center of gravity of the front wheel 3f is generally eccentric from the steering axis Csf and, therefore, the steering (turning about the steering axis Csf) of the front wheel 3f causes translational force (inertial force) in the Y-axis direction to be generated at the center of gravity of the front wheel 3f.

The magnitude of this translational force is obtained as a product of the amount of eccentricity of the center of gravity of the front wheel 3f from the steering axis Csf, the mass of the front wheel 3f, and the steering angular acceleration (rotational angular acceleration about the steering axis Csf). However, it is considered that the effect of this translational force is ignorable, because the mass of the front wheel 3f is sufficiently small compared to the total mass m.

Further, due to the fact that the caster angle θcf is not "0", when the front wheel 3f is steered about the steering axis Csf, a rotational motion component in the roll direction of the front wheel 3f is generated. This results in generation of an inertial force moment (specifically, moment in the direction about the X axis due to the inertial force) of the front wheel 3f.

The magnitude of this inertial force moment is obtained as a product of the inertia moment (inertia) of the front wheel 3f about an axis which passes through the center of gravity of the front wheel 3f and extends in parallel with the X axis, the sine value sin(θcf) of the caster angle θcf, and the steering angular acceleration of the front wheel 3f. However, the inertia moment of the front wheel 3f is sufficiently small compared to the overall inertia I. Therefore, it is considered that the effect of this inertial force moment is also ignorable.

It is now assumed that, in the basic posture state of the two-wheeled vehicle 1, the steering angle of the front wheel 3f (hereinafter, also simply referred to as "front-wheel steering angle") is changed instantaneously from "0" to δf (≠0). It is defined that the front-wheel steering angle is "0" in the basic posture state (non-steered state of the front wheel 3f). It is also defined that the positive rotational direction of the front-wheel steering angle (rotational angle) about the steering axis Csf corresponds to the direction of rotation that makes the front end of the front wheel 3f turn left with respect to the vehicle body 2 (so that the two-wheeled vehicle 1 turns to the left when traveling forward).

As shown in FIG. 4, the inclination angle in the roll direction (hereinafter, also referred to as "roll angle") of the vehicle body 2 immediately after the instantaneous change of the front-wheel steering angle from "0" to δf (≠0) is denoted as φb, and the movement amount in the Y-axis direction of the second mass point 124 is denoted as q.

According to the dynamic relationship, the moment generated about the X axis by the resultant force of a reaction force that the two-wheeled vehicle 1 receives from the ground surface 110 and an inertial force resulting from the motions of the mass points 123 and 124 is "0".

Here, the reaction force that the two-wheeled vehicle 1 receives from the ground surface 110 is composed of a reaction force in the vertical direction (vertical load) and a friction force in the horizontal direction. The friction force, however, does not generate a moment in the roll direction about the origin.

Further, when the front-wheel steering angle is changed, the ground contact point (point of application of the reaction force in the vertical direction) moves by a finite distance. Immediately after the instantaneous change of the front-wheel steering angle, however, the lapse time is infinitesimal. Therefore, a value obtained by time integration of the moment in the roll direction generated by the reaction force in the vertical direction is infinitesimal. That is, immediately after the instantaneous change of the front-wheel steering angle, the total angular momentum (in the roll direction) about the origin due to the motions of the mass points 123 and 124 is infinitesimal.

Incidentally, the height of the second mass point 124 is "0", and the motion of the second mass point 124 is limited to the transverse direction. Therefore, the angular momentum about the origin due to the motion of the second mass point 124 is "0".

On the basis of the above, the angular momentum about the origin due to the motion of the first mass point 123 becomes infinitesimal. That is, the first mass point 123 is instantaneously held still. As a result, the rotation in the roll direction (change in roll angle) of the vehicle body 2 is performed about the mass point 123. In other words, it can be considered that the position of the first mass point 123 is fixed at the instant when the steering angle of the front wheel 3f is changed from the basic posture state.

In this case, the movement amount q in the Y-axis direction (hereinafter, simply referred to as "lateral movement amount q") of the second mass point 124 is expressed by the following expression (8).

$$q=(c+h)*\phi b \quad (8)$$

In the expression (8), it is considered that the magnitude of φb is sufficiently small and that the following holds: $\sin(\phi b)\approx\phi b$.

The roll angle of the front wheel 3f is denoted as φf, and the roll angle of the rear wheel 3r is denoted as φr.

Since the caster angle θcf is not "0", the steering of the front wheel 3f causes a rotational motion component in the roll direction to be generated on the front wheel 3f. Therefore, the roll angle φf of the front wheel 3f is obtained approximately by the following expression (9). In the expression (9), the magnitude of δf is considered to be sufficiently small.

$$\phi f=-\sin(\theta cf)*\delta f+\phi b \quad (9)$$

Further, the roll angle φr of the rear wheel 3r is obtained by the following expression (10).

$$\phi r=\phi b \quad (10)$$

Further, as shown in FIG. 1, a distance in the longitudinal direction (in the X-axis direction) between the overall center of gravity G of the two-wheeled vehicle 1 and the ground contact point of the front wheel 3f in the basic posture state is denoted as Lf, and a distance in the longitudinal direction (in the X-axis direction) between the overall center of gravity G of the two-wheeled vehicle 1 and the ground contact point of the rear wheel 3r in the basic posture state is denoted as Lr. That is, Lf represents the longitudinal distance between the center of the axle of the front wheel 3f and the overall center of gravity G of the two-wheeled vehicle 1 in the basic posture state, and Lr represents the longitudinal distance between the center of the axle of the rear wheel 3r and the overall center of gravity G of the two-wheeled vehicle 1 in the basic posture state.

Further, in the basic posture state, the point of intersection of the steering axis Csf and a straight line connecting the center of the axle and the ground contact point of the front wheel 3f is denoted as Ef, and the height of the intersection point Ef (height from the ground surface 110) is denoted as a.

It should be noted that the height a of the intersection point Ef indicates the position in the Z-axis direction (Z coordinate) of the intersection point Ef. When the intersection point Ef lies above the ground surface 110, a>0; when the intersection point Ef lies below the ground surface 110, a<0. Furthermore, in the case where the caster angle θcf is positive, the height a being positive means a positive trail (t shown in FIG. 1); whereas the height a being negative means a negative trail t.

Further, as shown in FIG. 1, on a straight line connecting the center of the axle of the rear wheel 3r and its ground contact point in the basic posture state, a point whose height from the ground surface 110 coincides with the aforesaid height a is denoted as Er. The points Ef and Er are fixed to the vehicle body 2. The line segment connecting these points Ef and Er intersects the line segment connecting the mass points 123 and 124 (i.e. the line segment which is orthogonal to the X axis and which passes through the overall center of gravity G). This point of intersection is denoted as E, as shown in FIG. 1.

The movement amount in the Y-axis direction (lateral movement amount) of the point Ef at the time when the front wheel $3f$ is instantaneously steered from the basic posture state is denoted as ef, and the movement amount in the Y-axis direction (lateral movement amount) of the point Er at that time is denoted as er. These ef and er are expressed by the following expressions (11) and (12), respectively.

$$ef=-a*\phi f \qquad (11)$$

$$er=-a*\phi r \qquad (12)$$

In the expressions (11) and (12), it is considered that the magnitudes of φf and φr are sufficiently small and that the following hold: sin(φf)≈φf, sin(φr)≈φr.

The movement amount in the Y-axis direction (lateral movement amount) of the point E is denoted as e. As the point E is an internally dividing point between the points Ef and Er, the lateral movement amount e of the point E is expressed by the following expression (13).

$$e=(Lr/(Lf+Lr))*ef+(Lf/(Lf+Lr))*er \qquad (13)$$

On the other hand, as shown in FIG. 4, the inclination of the line segment connecting the point E and the second mass point 124 is equal to the roll angle φb of the vehicle body 2. The height of the point E is a. Therefore, the following expression (14) holds. In the expression (14), it is considered that the magnitude of φb is sufficiently small and that the following holds: sin(φb)≈φb.

$$q=e+a*\phi b \qquad (14)$$

From the above expressions (9) to (14), the following expression (15) is obtained.

$$q=Lr/(Lf+Lr)*a*\sin(\theta cf)*\delta f \qquad (15)$$

From the expressions (5a), (8), and (15), the following expression (16) is obtained.

$$\phi b=a*(Lr/((Lf+Lr)/(h+Lb*Lb/h)))*\sin(\theta cf)*\delta f \qquad (16)$$

As shown in FIG. 1 or 3, the radius of curvature of the transverse cross-sectional shape of the front wheel $3f$ at the position of the ground contact point of the front wheel $3f$ in the basic posture state is denoted as Rf. Similarly, the radius of curvature of the transverse cross-sectional shape of the rear wheel $3r$ at the position of the ground contact point of the rear wheel $3r$ in the basic posture state is denoted as Rr.

It should be noted that the above-described transverse cross-sectional shape of the front wheel $3f$ means the shape of the ground contact part as seen in a transverse cross section including the axle centerline Cf and the ground contact point of the front wheel $3f$ (this corresponds to the transverse cross-sectional shape of the ground contact part of the tire of the front wheel $3f$). The radius of curvature at the point of contact with the ground surface 110 in this transverse cross-sectional shape is the above-described Rf. The same applies to the rear wheel $3r$.

The point of application, on the ground surface 110, of the resultant force of the reaction force in the vertical direction which acts on the front wheel $3f$ from the ground surface 110 and the reaction force in the vertical direction which acts on the rear wheel $3r$ from the ground surface 110, i.e. the center of contact pressure, is denoted as COP, and the movement amount in the Y-axis direction (lateral movement amount) of the COP is denoted as p.

As shown in FIG. 5, the movement amount in the Y-axis direction of the ground contact point of the front wheel $3f$ is (-Rf*φf), and the movement amount in the Y-axis direction of the ground contact point of the rear wheel $3r$ is (-Rr*φr). The example shown in FIG. 5 is the case where φr>0 and φf<0.

The COP is, as shown in FIG. 5, the point of intersection between the Y axis and the line segment connecting the ground contact point of the front wheel $3f$ and the ground contact point of the rear wheel $3r$. Therefore, the lateral movement amount p of the COP is expressed by the following expression (17).

$$p=-(Lr/(Lf+Lr))*Rf*\phi f-(Lf/(Lf+Lr))*Rr*\phi r \qquad (17)$$

From the expressions (9), (10), and (17), the following expression (18) is obtained.

$$p=(Lr/(Lf+Lr))*Rf*\sin(\theta cf)*\delta f-((Lf/(Lf+Lr))*Rr+(Lr/(Lf+Lr))*Rf)*\phi b \qquad (18)$$

Supplementally, it can be interpreted that the part (Lr/(Lf+Lr))*Rf in the first term on the right side of the expression (18) corresponds to a virtual tire radius (tire radius as seen on the plane orthogonal to the X axis) at the position immediately beneath the overall center of gravity G corresponding to the roll angle resulting from the steering of the front wheel $3f$.

Further, it can be interpreted that the part ((Lf/(Lf+Lr))*Rr+(Lr/(Lf+Lr))*Rf) in the second term on the right side of the expression (18) corresponds to a virtual tire radius (tire radius as seen on the plane orthogonal to the X axis) at the position immediately beneath the overall center of gravity G corresponding to the roll angle of the vehicle body 2.

Consideration will now be given to balancing in moment about the origin (of the XYZ coordinate system) immediately after the steering angle of the front wheel $3f$ of the two-wheeled vehicle 1 in the basic posture state is changed stepwise from "0" to δf (≠0) at a given initial time t0.

The dynamic behavior at this time can be expressed by a model shown in FIG. 6.

This model includes, as virtual components, a body link 132 which is supported on a dolly 131 movable in the Y axis direction, and a mobile section 133 which is movably supported by the body link 132. The body link 132 and the mobile section 133 correspond to the vehicle body 2.

The Y axis is set above a floor 134 which supports the dolly 131. The floor 134 does not correspond to the actual ground surface 110 with which the two-wheeled vehicle 1 comes into contact. That is, the floor 134 is simply a virtual plane that supports the dolly 131 to enable the dolly 131 to move in a horizontal direction. The actual ground surface 110 exists at the level of the Y axis (the level where the Z coordinate (position coordinate in the Z-axis direction) becomes "0").

In the model shown in FIG. 6, all the components are set to have the inertia moment of "0". Of the components of this model, the components except the body link 132 and the mobile section 133 are set to have the mass of "0".

The body link 132 has a rail portion 132a which extends in the transverse direction and an erecting portion 132b which extends upward from the rail portion 132a. The model has a first mass point 123 having a mass m1 at the upper portion of the erecting portion 132b. Before the initial time t0, the Y coordinate of the position of the first mass point 123 is "0", and its Z coordinate is (h+c) (=h+Lb*Lb/h=h+I/(m*h)).

The body link 132 is connected via a link 136 to a member 135 which is fixedly secured to the floor 134. This constrains the movement in the Y-axis direction of the body link 132;

it cannot move in the Y-axis direction. Before the initial time t0, the rail portion 132a of the body link 132 extends in the Y-axis direction.

The mobile section 133 is supported by the rail portion 132a of the body link 132 so as to be movable along the rail portion 132a. The position in the Y-axis direction (Y coordinate) of this mobile section 133 is controlled by an actuator 137 which is interposed between the mobile section 133 and the erecting portion 132b of the body link 132.

Further, the mobile section 133 has a second mass point 124 having a mass m2. Before the initial time t0, the Z coordinate of the position of the mass point 124 is "0".

The dolly 131 supporting the body link 132 is freely movable in a horizontal direction on the floor 134. This dolly 131 has a wheel 131a at its upper end, and is in contact (point contact) with the body link 132 via the wheel 131a, thereby supporting the body link 132 from underneath. The point of contact between the wheel 131a of the dolly 131 and the body link 132 corresponds to the aforesaid COP. With the COP as the fulcrum, the body link 132 can be inclined in the direction about the X axis (roll direction).

The Z coordinate of the position of the COP is always "0". Further, the Y coordinate of the position of the COP is controlled by an actuator 138 which is interposed between the lower portion of the rail portion 132a of the body link 132 and the dolly 131. Supplementally, the inclination in the direction about the X axis (roll direction) of the line segment connecting the first mass point 123 and the second mass point 124 corresponds to the inclination in the direction about the X axis (roll direction) of the vehicle body 2.

Before the initial time t0, the Y coordinate of the position of the COP and the Y coordinate of the position of the second mass point 124 are both "0".

It is here assumed that, with a stepwise change (from "0" to δf) of the front-wheel steering angle at the initial time t0, the Y coordinate of the position of the COP has instantaneously become p by the actuator 138 and the Y coordinate of the position of the second mass point 124 has instantaneously become q by the actuator 137.

Before the initial time t0, the Y coordinate of the position of the first mass point 123 is "0". Further, instantaneously, the first mass point 123 can be regarded as a fixed point, as stated above. Therefore, immediately after the initial time t0, the moment in the roll direction which is generated about the origin due to the gravitational force acting on the first mass point 123 is "0".

Further, the moment M2 (hereinafter, also referred to as "gravitational moment M2") in the roll direction which is generated about the origin due to the gravitational force acting on the second mass point 124 is obtained by the following expression (19). It should be noted that g represents the gravitational acceleration constant (>0). Further, the gravitational moment M2 corresponds to a second gravitational moment in the present invention, as will be described later.

$$M2=-m2*g*q \qquad (19)$$

Further, the moment Mp (hereinafter, also referred to as "road surface reaction force moment Mp") in the roll direction which is generated about the origin due to the road surface reaction force in the vertical direction (vertical load) acting on the COP from the ground surface 110 is obtained by the following expression (20).

$$Mp=m*g*p \qquad (20)$$

According to the dynamic relationship, the sum of the above-described moments M2 and Mp coincides with the sign-reversed (or, opposite-polarity) total inertial force moment Ma in the roll direction generated about the origin due to the motions of the first mass point 123 and the second mass point 124. That is, the following expression (21) holds.

$$Ma+M2+Mp=0 \qquad (21)$$

Consideration will now be given to the inertial force moment Ma.

The motions of the first mass point 123 and the second mass point 124 are made up of the motion which is generated by the actuator 137 and the motion which is generated as the body link 132 inclines (rotates) in the roll direction about the COP.

The direction of the acceleration of the second mass point 124 generated by the actuator 137 corresponds to the direction of the straight line connecting the second mass point 124 and the origin. Thus, the inertial force moment in the roll direction generated about the origin due to the motion of the second mass point 124 by the actuator 137 is "0".

Here, the rotational angular velocity of the body link 132 which inclines in the roll direction about the COP is denoted as ω, and its differential value (i.e. rotational angular acceleration) is denoted as ωdot. The inertial force moment in the roll direction generated about the origin due to the motions of the mass points 123 and 124 resulting from this rotational motion is obtained as a sum, multiplied by −1, of the square of the distance between the first mass point 123 and the origin multiplied by the mass m1 and ωdot, and the square of the distance between the second mass point 124 and the origin multiplied by the mass m2 and ωdot.

The distance between the origin and the second mass point 124, however, is "0" before the initial time t0. Even after the initial time t0, it is considered that the distance between the origin and the second mass point 124 (=absolute value of q) is sufficiently small compared to the distance between the origin and the first mass point 123 (=h+c=h+Lb*Lb/h). Further, the mass m2 is generally smaller than the mass m1.

Therefore, the magnitude of the inertial force moment due to the motion of the second mass point 124 is sufficiently small compared to the magnitude of the inertial force moment due to the motion of the first mass point 123, so that the inertial force moment due to the motion of the second mass point 124 can be ignored. Accordingly, Ma becomes comparable to the inertial force moment generated due to the motion of the first mass point 123 accompanying the inclination of the vehicle body 2.

As a result, the total inertial force moment Ma in the roll direction generated about the origin is obtained by the following expression (22).

$$Ma=-m1*(h+Lb*Lb/h)*(h+Lb*Lb/h)*\omega dot \qquad (22)$$

From the expressions (21) and (22), the following expression (23) is obtained.

$$m1*(h+Lb*Lb/h)*(h+Lb*Lb/h)*\omega dot=Mp+M2 \qquad (23)$$

The expression (23) can be interpreted that it expresses the behavior of inclination of an inverted pendulum, having a mass m1 and a mass point height (h+Lb*Lb/h) and having the origin at the fulcrum, at the time when the moment (Mp+M2) is applied to the fulcrum of the inverted pendulum. Thus, hereinafter, the first mass point 123 may also be referred to as "inverted pendulum mass point 123".

Even if the body link 132 inclines in the roll direction about the COP, the position of the origin of the body link 132 hardly moves in the transverse direction. Therefore, the inclination of the inverted pendulum mass point 123 coincides with the inclination in the roll direction of the body link 132.

Further, the position of the fulcrum of the inverted pendulum mass point 123 corresponds to the origin of the aforesaid three-axis orthogonal coordinate system (the projected point obtained by projecting the overall center of gravity G in the basic posture state of the two-wheeled vehicle 1 onto the ground surface 110 in the perpendicular direction (up-and-down direction)).

Furthermore, since the first mass point (inverted pendulum mass point) 123 and the second mass point 124 are on the plane of symmetry of the vehicle body 2 (plane of symmetry when the vehicle body 2 is considered to be bilaterally symmetrical), the inclination in the roll direction of the line segment connecting the first mass point 123 and the second mass point 124 corresponds to the inclination in the roll direction of the vehicle body 2 of the two-wheeled vehicle 1.

Further, as can be seen from the expression (15), the movement amount q in the Y-axis direction of the second mass point 124 is determined uniquely from the steering angle δf. It should be noted that in an actual two-wheeled vehicle such as the two-wheeled vehicle 1A in an embodiment which will be described later, the movement amount q is determined from the steering angle δf by a nonlinear function.

On the basis of the foregoing, stabilizing the motional state of the inverted pendulum mass point 123 while stabilizing the steering angle δf becomes equivalent to stabilizing the inclination in the roll direction of the vehicle body 2 of the two-wheeled vehicle 1 while stabilizing the steering angle δf.

It can be appreciated from the above expression (23) that the rotational angular acceleration ωdot in the roll direction of the body link 132 (in other words, the rotational angular acceleration in the roll direction of the line segment connecting the origin and the inverted pendulum mass point 123, or in yet other words, the rotational angular acceleration in the roll direction of the inverted pendulum mass point 123 as seen from the origin) at the instant immediately after the initial time t0 is determined depending on: the aforesaid road surface reaction force moment Mp, which is generated about the origin due to the reaction force in the vertical direction acting on the two-wheeled vehicle 1 from the ground surface 110 via the COP, and the aforesaid gravitational moment M2, which is generated about the origin due to the gravitational force acting on the second mass point 124.

Accordingly, it is possible to use (Mp+M2) as a manipulation moment for controlling the motional state of the inverted pendulum mass point 123. Consequently, it is possible to use (Mp+M2) as a manipulation moment for controlling the posture (inclination angle in the roll direction) of the vehicle body 2 of the two-wheeled vehicle 1 to a desired or required posture. Therefore, hereinafter, (Mp+M2) is denoted as Msum, as in the following expression (24), and is called the "posture controlling manipulation moment".

$$Msum=Mp+M2 \quad (24)$$

This posture controlling manipulation moment Msum is expressed by the following expression (25) from the aforesaid expressions (1), (7), (15), (16), (18), (19), (20), and (24).

$$Msum=-(((Rg+I/(m*h))/(h+(I/(m*h)))*a-Rf)*(Lr/(Lf+Lr))*m*g*\sin(\theta cf)*\delta f \quad (25)$$

where $$Rg=(Lr/(Lf+Lr))*Rf+(Lf/(Lf+Lr))*Rr \quad (25a)$$

As can be seen from the aforesaid expression (18), Rg corresponds to the ratio of the amount of change in lateral movement amount p of the COP to the amount of change in roll angle of the vehicle body 2 (i.e. sensitivity of the change in lateral movement amount p of the COP to a small change in roll angle) in the case where the roll angle of the vehicle body 2 is changed by a small amount from the basic posture state.

On the other hand, the gravitational moment M2 is expressed by the following expression (26) from the aforesaid expressions (1), (7), (15), and (19).

$$M2=-((I/(m*h))/(h+I/(m*h)))*(Lr/(Lf+Lr))*a*m*g*\sin(\theta cf)*\delta f \quad (26)$$

Further, the road surface reaction force moment Mp is expressed by the following expression (27) from the aforesaid expressions (1), (16), (18), (20), and (25a).

$$Mp=-((Rg/(h+I/(m*h)))*a-Rf)*(Lr/(Lf+Lr))*m*g*\sin(\theta cf)*\delta f \quad (27)$$

Here, a_sum, k_sum, a_p, k_p, and k_m are defined as follows.

$$a\_sum=((h+I/(m*h))/(Rg+I/(m*h)))*Rf \quad (28)$$

$$k\_sum=-((Rg+I/(m*h))/(h+I/(m*h)))*(Lr/(Lf+Lr))*m*g*\sin(\theta cf) \quad (29)$$

$$k\_m=-((I/(m*h))/(h+I/(m*h)))*(Lr/(Lf+Lr))*m*g*\sin(\theta cf) \quad (30)$$

$$a\_p=((h+I/(m*h))/Rg)*Rf \quad (31)$$

$$k\_p=-((Rg/(h+I/(m*h)))*(Lr/(Lf+Lr))*m*g*\sin(\theta cf) \quad (32)$$

From the expressions (25), (28), and (29), the following expression (33) is obtained.

$$Msum=k\_sum*(a-a\_sum)*\delta f \quad (33)$$

Further, from the expressions (26) and (30), the following expression (34) is obtained.

$$M2=k\_m*a*\delta f \quad (34)$$

Further, from the expressions (27), (31), and (32), the following expression (35) is obtained.

$$Mp=k\_p*(a-a\_p)*\delta f \quad (35)$$

As can be seen from the expressions (33), (34), and (35), Msum, M2, and Mp are proportional to the steering angle δf.

It should be noted that, from the expressions (28) and (31), the following magnitude relationship holds between a_sum and a_p.

$$0<a\_sum<a\_p \quad (36)$$

FIG. 7 is a graph showing the relationships between the height a and Msum/δf, M2/δf, and Mp/δf (indicated by the expressions (33), (34), and (35)).

Consideration will now be given to the relation between the setting value of the height a and the stability of the two-wheeled vehicle 1 at a standstill, with reference to FIG. 7.

First, the case is assumed where the height a coincides with a_sum determined by the expression (28) (the case where a=a_sum).

FIG. 8C illustrates the positional relationship between the second mass point 124 and the COP in this case. In the illustrated example, it is assumed that δf>0. The same applies to FIGS. 8A, 8B, 8D, 9A, 9B, 9C, and 9D, which will be explained later.

In the case where a=a_sum, the posture controlling manipulation moment Msum obtained by the aforesaid expression (33) is always "0", irrespective of a change in front-wheel steering angle. Therefore, it is not possible to control, using Msum, the motional state of the inverted pendulum mass point 123 (or the posture (inclination angle in the roll direction) of the vehicle body 2 of the two-wheeled vehicle 1).

Next, the case is assumed where the height a is greater than a_sum and smaller than a_p, as shown by the following expression (37).

$$a\_sum < a < a\_p \quad (37)$$

FIG. 8B illustrates the positional relationship between the second mass point 124 and the COP in this case (δf>0 in the illustrated example). In this case, as shown in FIG. 7, Msum/δf takes a negative value. Therefore, when the steering angle δf is positive, Msum becomes negative; when the steering angle δf is negative, Msum becomes positive.

Accordingly, it is theoretically possible to control the posture (inclination angle in the roll direction) of the vehicle body 2 of the two-wheeled vehicle 1 by manipulating the front-wheel steering angle. According to the experiments and studies conducted by the present inventors, however, it has been found that the following disadvantages arise in this case.

In the case where a_sum<a<a_p, as shown in FIG. 7, M2/δf and Mp/δf differ in polarity from each other, and the absolute value of M2/δf is larger than the absolute value of Mp/δf.

Therefore, the posture controlling manipulation moment Msum obtained by manipulating the front-wheel steering angle depends primarily on M2. Further, Mp functions to disturb the control of the posture of the vehicle body 2 of the two-wheeled vehicle 1 by Msum generated in the same direction as M2 (making the absolute value of Msum decreased further than the absolute value of M2).

This means that, in order to generate the posture controlling manipulation moment Msum of the magnitude sufficient for controlling the posture of the vehicle body 2 of the two-wheeled vehicle 1, the front-wheel steering angle will have to be manipulated more largely compared to the case where the assumption is made that Mp would not disturb the control of the posture of the vehicle body 2 (i.e. the case where Mp=0, or Mp and M2 are in the same polarity).

That is, in the case where a_sum<a<a_p, when the posture (inclination angle in the roll direction) of the vehicle body 2 of the two-wheeled vehicle 1 deviates from a desired or required posture, in order to generate a restoring force for making the posture of the vehicle body 2 restored to the required posture (that can stabilize the inverted pendulum mass point 123), it is necessary to considerably increase the absolute value of the feedback gain for changing the front-wheel steering angle in response to the change in inclination angle in the roll direction of the vehicle body 2 of the two-wheeled vehicle 1.

Incidentally, in the case where the front-wheel steering angle is changed from the basic posture state of the two-wheeled vehicle 1 and, thus, the second mass point 124 is accelerated in the lateral direction of the two-wheeled vehicle 1, the inertial force generated by the second mass point 124 by the acceleration is balanced with the friction force which acts on the two-wheeled vehicle 1 from the ground surface 110.

The tires fitted to the front wheel 3f and the rear wheel 3r generally undergo shear deformation in the transverse direction due to the friction force received from the ground surface 110. This generally causes a delay in response of the behavior of the second mass point 124 to the change in front-wheel steering angle and, hence, a delay in response of the change of the gravitational moment M2 to the change in front-wheel steering angle.

Therefore, if the absolute value of the feedback gain for changing the front-wheel steering angle in response to the change in inclination angle of the vehicle body 2 of the two-wheeled vehicle 1 is set large, an oscillation phenomenon is likely to occur in the control system due to the delay in response of the change of the gravitational moment M2 and the delay in response of the inclination angle in the roll direction of the vehicle body 2 of the two-wheeled vehicle 1 to the change in front-wheel steering angle. This leads to degradation in robustness of the control of the posture of the vehicle body 2 by the manipulation of the front-wheel steering angle.

As such, when the posture controlling manipulation moment Msum becomes highly dependent on M2, an oscillation phenomenon becomes more likely to occur in the control system due to the effect of the delay in response of the change of M2 attributable to the shear deformation of the tires fitted to the front wheel 3f and the rear wheel 3r. That is, in the case where a_sum<a<a_p, the oscillation phenomenon is likely to occur in the control system due to the effect of the delay in response of the change of M2 caused by the shear deformation of the tires.

Further, in the case where a_sum<a<a_p, at the time when the absolute value of the steering angle δf is large, it is difficult to stabilize the control of the posture of the two-wheeled vehicle 1, for the following reasons.

When the absolute value of the steering angle δf is large, the radius of curvature of the ground contact part of the steering control wheel (front wheel 3f) as seen in a cross section including the ground contact point of the steering control wheel (front wheel 3f) and having a normal corresponding to the X-axis direction (longitudinal direction of the vehicle body 2) becomes greater than the radius of curvature in the case where the steering angle δf is "0". Accordingly, the substantial Rf becomes larger as the absolute value of the steering angle δf becomes larger. Further, Mp has dependency on Rf, as indicated by the aforesaid expression (27).

FIG. 10 illustrates differences in graphs of Mp/δf due to the differences in magnitude of Rf. A straight line α1 illustrates a graph of Mp/δf in the case where Rf takes a standard value (radius of curvature of the transverse cross-sectional shape of the front wheel 3f at the position of the ground contact point of the front wheel 3f in the basic posture state), and a straight line α2 illustrates a graph of Mp/δf in the case where Rf is larger than the standard value. Further, a_p1 and a_p2 denote the values of a_p (values of a when Mp/δf is "0") corresponding respectively to the straight lines α1 and α2.

As shown in FIG. 10, a_p2, i.e. the value of a_p when Rf is large, is larger than a_p1, i.e. the value of a_p when Rf is small. Further, the inclination of the straight line α2 when Rf is large is greater than the inclination of the straight line α1 when Rf is small.

Therefore, in the case where a takes a value satisfying a_sum<a<a_p, when Rf becomes larger, Mp/δf increases in the positive direction (that is, it changes toward a direction of opposite polarity to that of M2/δf). This causes Msum/δf to approach "0", leading to degradation of the restoring force for making the posture of the vehicle body 2 of the two-wheeled vehicle 1 restored to a desired or required posture, or the polarity of Msum/δf is reversed from negative to positive, making it difficult to stabilize the control of the posture of the vehicle body 2.

As such, in the case where a_sum<a<a_p, when the absolute value of the steering angle δf is large, it is difficult to stabilize the control of the motional state of the inverted pendulum mass point 123 (and, hence, the control of the posture of the vehicle body 2 of the two-wheeled vehicle 1) because the substantial Rf deviates from the Rf (standard value) in the basic posture state.

Next, the case is assumed where the height a is not smaller than a_p, as shown by the following expression (38).

$$a \geq a\_p \tag{38}$$

FIG. 8A illustrates the positional relationship between the second mass point 124 and the COP in this case (δf>0 in the illustrated example). In this case, as shown in FIG. 7, Msum/δf takes a negative value. Therefore, when the steering angle δf is positive, Msum becomes negative; when the steering angle δf is negative, Msum becomes positive, as in the case where a_sum<a<a_p (in the case of FIG. 8B).

Accordingly, it is theoretically possible to control the motional state of the inverted pendulum mass point 123 by manipulating the front-wheel steering angle. Consequently, it is possible to control the posture (inclination angle in the roll direction) of the vehicle body 2 of the two-wheeled vehicle 1 by the manipulation of the front-wheel steering angle.

Further, in this case, M2/δf and Mp/δf will not become opposite in polarity. That is, in the case where a=a_p, Mp/δf=0 and M2/δf<0. In the case where a>a_p, M2/δf and Mp/δf are in the same polarity. Therefore, it is possible to generate the posture controlling manipulation moment Msum by M2 alone, or by cooperation of M2 and Mp.

This makes it possible to set the absolute value of the feedback gain for the posture control of the vehicle body 2 to a value smaller than in the case where a_sum<a<a_p (in the case of FIG. 8B).

However, since the absolute value of M2/δf is larger than the absolute value of Mp/δf, as shown in FIG. 7, Msum is highly dependent on M2. Further, since the height a is large, the lateral acceleration (acceleration in the Y-axis direction) of the second mass point 124 tends to become large.

Therefore, the effect of the shear deformation of the tires fitted to the front wheel 3f and the rear wheel 3r becomes large, as in the case where a_sum<a<a_p (in the case of FIG. 8B). The response of the change of the gravitational moment M2 to the change of the front-wheel steering angle is likely to delay, and accordingly, an oscillation phenomenon is likely to occur in the control system.

Next, the value of a which makes the following expression (39) hold is denoted as a_s.

$$M\text{sum} = -M2 \tag{39}$$

The state where the above expression (39) holds corresponds to the state where M2 functions to disturb the control of the posture of the vehicle body 2 of the two-wheeled vehicle 1 by Msum (i.e. the direction of M2 becomes opposite to the direction of Msum) and where the absolute values of M2 and Msum are equal to each other.

From the expressions (25) and (27), the above a_s is expressed by the following expression (40).

$$a\_s = ((h + I/(m^*h))/(Rg + 2^*I/(m^*h)))^*Rf \tag{40}$$

From the fact that all the parameters on the right side of the expression (40) are positive and from the aforesaid expressions (28) and (40), the relationship in the following expression (41) is obtained.

$$0 < a\_s < a\_\text{sum} \tag{41}$$

Next, the case is assumed where the height a is larger than a_s and smaller than a_sum, as shown by the following expression (42).

$$a\_s < a < a\_\text{sum} \tag{42}$$

FIG. 8D illustrates the positional relationship between the second mass point 124 and the COP in this case (δf>0 in the illustrated example). In this case, Msum/δf (=Mp/δf+M2/δf) takes a positive value. In other words, Mp/δf>−M2/δf.

Therefore, when the steering angle δf is positive, the posture controlling manipulation moment Msum becomes positive; when the steering angle δf is negative, the posture controlling manipulation moment Msum becomes negative. Accordingly, it is theoretically possible to control the motional state of the inverted pendulum mass point 123 by manipulating the front-wheel steering angle. Consequently, it is possible to control the posture (inclination angle in the direction about the X axis) of the vehicle body 2 of the two-wheeled vehicle 1 by the manipulation of the front-wheel steering angle.

In the case where a_s<a<a_sum, however, although the absolute value of M2 becomes smaller than in the case where a>a_sum and the oscillation in the control of the posture of the vehicle body 2 resulting from the shear deformation of the tires of the front wheel 3f and the rear wheel 3r can be restricted, compared to the case where 0<a≤a_s which will be described later, oscillation is still likely to occur in the control of the posture of the vehicle body 2 due to the shear deformation of the tires of the front wheel 3f and the rear wheel 3r, for the following reasons.

In the case where a takes a value satisfying the expression (42), Msum/δf and M2/δf are opposite in polarity, as shown in FIG. 7. That is, M2 functions to disturb the control of the posture of the vehicle body 2 by Msum. In addition, as explained above, M2 is accompanied by lateral acceleration due to the movement of the second mass point 124, causing shear deformation of the tires of the front wheel 3f and the rear wheel 3r. Consequently, an oscillation phenomenon is likely to occur in the control system because of the delay in response resulting from the shear deformation.

Further, when a takes a value satisfying the expression (42), the absolute value of Msum/δf is smaller than the absolute value of M2/δf. That is, the absolute value of the posture controlling manipulation moment Msum becomes smaller than the absolute value of M2 which disturbs the posture control of the vehicle body 2 and causes an oscillation phenomenon in the control system. Therefore, when the absolute value of the feedback gain is set to a relatively small value so as to avoid the oscillation phenomenon in the control system, the magnitude of the posture controlling manipulation moment Msum is likely to become insufficient.

Next, the case is assumed where the height a is larger than "0" and not larger than a_s, as shown by the following expression (43).

$$0 < a \leq a\_s \tag{43}$$

FIG. 9A illustrates the positional relationship between the second mass point 124 and the COP in the case where a=a_s (δf>0 in the illustrated example). FIG. 9B illustrates the positional relationship between the second mass point 124 and the COP in the case where 0<a<a_s (δf>0 in the illustrated example).

In the case where 0<a≤a_s, Msum/δf becomes positive, as shown in FIG. 7. Therefore, Msum becomes positive when the steering angle δf is positive, while Msum becomes negative when the steering angle δf is negative.

Further, in this case, Msum/δf and M2/δf are opposite in polarity, as in the case where a_s<a<a_sum. That is, M2 functions to disturb the control of the posture of the vehicle body 2 by Msum.

However, when a takes a value satisfying the expression (43), the absolute value of Msum/δf becomes equal to or larger than the absolute value of M2/δf. In other words, Msum/δf>−M2/δf. That is, the absolute value of M2 which disturbs the posture control of the vehicle body 2 and causes the oscillation phenomenon in the control system is kept at or below the absolute value of the posture controlling manipulation moment Msum.

Accordingly, even if the absolute value of the feedback gain is set to a relatively large value in order to cause a sufficiently large posture controlling manipulation moment Msum to be generated for making the posture (inclination angle in the roll direction) of the vehicle body 2 restored to a required posture, oscillation is not likely to occur in the control system. That is, it is possible to enhance the stability of the control of the motional state of the inverted pendulum mass point 123 by the manipulation of the front-wheel steering angle (and, hence, the stability of the posture control of the vehicle body 2 of the two-wheeled vehicle 1).

Next, the case is assumed where the height a is "0" (in the case where a=0).

FIG. 9C illustrates the positional relationship between the second mass point 124 and the COP in this case (δf>0 in the illustrated example). In this case, as shown in FIG. 7, Msum/δf becomes positive. Thus, Msum becomes positive when the steering angle δf is positive, while Msum becomes negative when the steering angle δf is negative.

Further, in this case, M2 is always "0". Therefore, the posture controlling manipulation moment Msum caused by the manipulation of the front-wheel steering angle is generated by Mp alone. In this case, even if the front-wheel steering angle is manipulated from the basic posture state, the movement amount in the Y-axis direction of the second mass point 124 is "0", so that no friction force is generated to act on the two-wheeled vehicle 1 from the ground surface 110.

The tires of the front wheel 3f and the rear wheel 3r do not undergo shear deformation, and thus, an oscillation phenomenon in the control system due to the shear deformation of the tires is unlikely to occur. Accordingly, it is possible to further increase the absolute value of the aforesaid feedback gain, than in the case where the value of a satisfies the aforesaid expression (43), to thereby increase the restoring force for making the motional state of the inverted pendulum mass point 123 restored to the required state and also enhance the stability of the control of the motional state. Consequently, it is possible to increase the restoring force for making the posture of the vehicle body 2 restored to the required posture and also enhance the stability of the control of the posture.

Further, since the magnitude of Msum which can be generated per unit change amount of the front-wheel steering angle becomes larger than in the case where the value of a satisfies the aforesaid expression (43), it is possible to decrease the change amount of the front-wheel steering angle that is necessary for making the posture of the vehicle body 2 restored to the required posture.

Next, the case is assumed where the height a is negative (in the case where a<0).

FIG. 9D illustrates the positional relationship between the second mass point 124 and the COP in this case (δf>0 in the illustrated example). In this case, as shown in FIG. 7, Msum/δf becomes positive. Thus, the posture controlling manipulation moment Msum becomes positive when the steering angle δf is positive, while the posture controlling manipulation moment Msum becomes negative when the steering angle δf is negative.

Further, in this case, M2/δf and Mp/δf are in the same polarity. This enables M2 and Mp to cooperate to generate the posture controlling manipulation moment Msum. As a result, the magnitude of Msum that can be generated per unit change amount of the front-wheel steering angle becomes larger than in the case where a=0, and accordingly, it is possible to still further decrease the magnitude of the change amount of the front-wheel steering angle necessary for making the posture of the vehicle body 2 restored to the required posture.

It can be said from the foregoing that, in the case of attempting to control the posture (inclination angle in the roll direction) of the vehicle body 2 of the two-wheeled vehicle 1 to a required posture by steering of the front wheel 3f of the two-wheeled vehicle 1 (in the case of attempting to control the motional state of the inverted pendulum mass point 123 in the dynamics model of the two-wheeled vehicle 1), setting the arrangement position of the backwardly tilted steering axis Csf of the front wheel 3f (steering control wheel) such that the height a of the intersection point Ef of the steering axis Csf and the straight line connecting the center of the axle of the front wheel 3f (steering control wheel) and the ground contact point of the front wheel 3f becomes smaller than a_sum defined by the expression (28) is a prerequisite for stably controlling the motional state of the inverted pendulum mass point 123 (and, hence, the posture of the vehicle body 2).

In order to suppress the oscillation phenomenon in the control system due to the tire shear deformation, it is further preferable to set the arrangement position of the steering axis Csf such that the height a becomes not greater than a_s defined by the expression (40).

For still further decreasing the magnitude of the change amount of the front-wheel steering angle necessary for making the posture of the vehicle body 2 restored to the required posture, it is further preferable to set the arrangement position of the steering axis Csf such that the height a becomes "0" or takes a negative value.

The matters described above are related to the case of steering the front wheel 3f for controlling the posture of the vehicle body 2. These matters also apply to the case of steering a rear wheel for controlling the posture (inclination angle in the roll direction) of a vehicle body in a two-wheeled vehicle (mobile vehicle) having a steerable rear wheel.

Hereinafter, a description will be made for a two-wheeled vehicle having a steerable rear wheel. FIG. 11 schematically shows, as in FIG. 1, a side view of a two-wheeled vehicle 201 (in the basic posture state) which is a mobile vehicle having a vehicle body 202 and a front wheel 203f and a rear wheel 203r arranged spaced apart from each other in the longitudinal direction of the vehicle body 202, in which the rear wheel 203r is steerable, a view of the rear wheel 203r as seen from the back of the two-wheeled vehicle 201, and a view of the front wheel 203f as seen from the front of the two-wheeled vehicle 201.

It should be noted that the basic posture state of this two-wheeled vehicle 201 means a state similar to the basic posture state of the two-wheeled vehicle 1 in FIG. 1. That is, it means the state in which the front wheel 203f and the rear wheel 203r are both stationary in the upright posture in contact with the ground surface 110 and in which the axle centerlines (centers of rotational axes) Cf and Cr of the front wheel 203f and the rear wheel 203r extend in parallel with each other in the direction orthogonal to the longitudinal direction of the vehicle body 202 (the state in which the two-wheeled vehicle 201 is standing still in the straight-ahead posture).

The rear wheel 203r is axially supported in a rotatable manner by a rear-wheel support mechanism 205 provided at the rear portion of the vehicle body 202. The rear-wheel support mechanism 205 is made up of a mechanism, similar to the front fork or the like, which enables steering of the rear wheel 203r. This mechanism makes the rear wheel 203r a steering control wheel which can be turned (steered) about a steering axis Csr.

The steering axis Csr for the rear wheel 203r is tilted backward. That is, the steering axis Csr extends obliquely with respect to the longitudinal direction and up-and-down direction of the vehicle body 202 such that the steering axis Csr has its upper portion located rearward relative to its lower portion in the front-rear (longitudinal) direction of the vehicle body 202.

The front wheel 203f is axially supported in a rotatable manner by a front-wheel support mechanism 204, made up of a front fork or the like, provided at the front portion of the vehicle body 202, as in the two-wheeled vehicle 1 shown in FIG. 1. The front wheel 203f is a steering control wheel which can be turned (steered) about a steering axis Csf which is tilted backward.

In the two-wheeled vehicle 201 in FIG. 11 in which the rear wheel 203r is steerable, the steering axis Csf of the front wheel 203f does not necessarily have to be tilted backward. Further, the front wheel 203f does not necessarily have to be a steering control wheel.

In the two-wheeled vehicle 201 (hereinafter, also referred to as "rear-wheel steering two-wheeled vehicle 201") having the steerable rear wheel 203r as described above, as in the case of the two-wheeled vehicle 1 in FIG. 1 (hereinafter, also referred to as "front-wheel steering two-wheeled vehicle 1"), the rear-wheel steering two-wheeled vehicle 201 in the basic posture state can be regarded as a rigid body system (two-wheeled vehicle rigid body system) which is made up of two mass points of a first mass point 123 having a mass m1 and a second mass point 124 having a mass m2, as shown in FIG. 12.

The masses m1 and m2 of the mass points 123 and 124, and a difference c between the height of the mass point 123 and the center-of-gravity height h are defined by the aforesaid expressions (5a), (6a), and (7a), or by the expressions (5b), (6b), and (7b), as in the case of the front-wheel steering two-wheeled vehicle 1 in FIG. 1.

It should be noted that the XYZ coordinate system in FIG. 12 is set in a similar manner as in the case of the front-wheel steering two-wheeled vehicle 1.

Further, in this case, the dynamic behavior when, instead of steering of the front wheel 203f, the steering angle (rotational angle about the steering axis Csr) of the rear wheel 203r is changed stepwise from "0" from the basic posture state of the rear-wheel steering two-wheeled vehicle 201 (i.e. the dynamic behavior related to the moment generated about the origin in the direction about the X axis (roll direction) of the XYZ coordinate system) is similar to that in the front-wheel steering two-wheeled vehicle 1.

In more detail, the caster angle of the rear wheel 203r (the inclination angle (with respect to the up-and-down direction) of the steering axis Csr of the rear wheel 203r in the basic posture state) is denoted as $\theta cr$. In this case, the caster angle $\theta cr$ in the case where the steering axis Csr of the rear wheel 203r is tilted backward as shown in FIG. 12 is defined to be positive.

Further, the value of the steering angle of the rear wheel 203r (hereinafter, also simply referred to as "rear-wheel steering angle") after a stepwise change is denoted as $\delta r$. In this case, it is defined that the rear-wheel steering angle is "0" in the basic posture state (non-steered state of the rear wheel 203r). It is also defined that the positive rotational direction of the rear-wheel steering angle corresponds to the direction of rotation that makes the front end of the rear wheel 203r turn left with respect to the vehicle body 202 (so that the two-wheeled vehicle 201 turns to the right when traveling forward).

Further, in the basic posture state of the rear-wheel steering two-wheeled vehicle 201, as shown in FIG. 12, the height of an intersection point Er' of the steering axis Csr and a straight line connecting the center of the axle of the rear wheel 203r and its ground contact point (height from the ground surface 110) is denoted as a'.

It should be noted that the height a' of the intersection point Er' indicates the position in the Z-axis direction (Z coordinate). When the intersection point Er' lies above the ground surface 110, a'>0; whereas when the intersection point Er' lies below the ground surface 110, a'<0. Furthermore, in the case where the caster angle $\theta cr$ of the rear wheel 203r is positive (i.e. when the steering axis Csr is tilted backward), the height a' being positive means a positive trail (t' shown in FIG. 12); whereas the height a' being negative means a negative trail t'.

Further, in FIGS. 11 and 12, Ef' represents a point, on the straight line connecting the center of the axle of the front wheel 203f and its ground contact point, at which the height from the ground surface 110 agrees with the aforesaid height a' in the basic posture state, and E' represents a point of intersection of the line segment connecting the points Ef' and Er' and the line segment connecting the mass points 123 and 124 (supplementally, this line segment is orthogonal to the X axis and passes through the overall center of gravity G).

In the rear-wheel steering two-wheeled vehicle 201, when the parameters $\theta cf$, $\delta f$, and a in the above-described expressions related to the front-wheel steering two-wheeled vehicle 1 are replaced with the above-described $\theta cr$, $\delta r$, and a', respectively, and when the suffixes r and f in Lf, Lr, Rf, Rr, $\phi f$, $\phi r$, ef, and er are replaced with each other, then the expressions corresponding to the rear-wheel steering two-wheeled vehicle 201 are obtained.

For example, the values for the rear-wheel steering two-wheeled vehicle 201 corresponding to Msum, M2, Mp, a_sum, a_p, and a_s for the front-wheel steering two-wheeled vehicle 1 are denoted as Msum', M2', Mp', a_sum', a_p', and a_s', respectively. At this time, for the aforesaid expressions (25), (26), (27), (28), (31), and (40) related to Msum, M2, Mp, a_sum, a_p, and a_s, the following expressions (25)', (26)', (27)', (28)', (31)', and (40)' related to Msum', M2', Mp', a_sum', a_p', and a_s' are obtained respectively.

$$Msum' = -(((Rg + I/(m^*h))/(h + (I/(m^*h))) * a' - Rr) * (Lf/(Lf + Lr))) * m * g * \sin(\theta cr) * \delta r \qquad (25)'$$

where $$Rg=(Lr/(Lf+Lr))*Rf+(Lf/(Lf+Lr))*Rr \quad (25a)$$

$$M2'=-((I/(m*h))/(h+I/(m*h)))*(Lf/(Lf+Lr))*a'*m*g*\sin(\theta cr)*\delta r \quad (26)'$$

$$Mp'=-((Rg/(h+I/(m*h)))*a'-Rr)*(Lf/(Lf+Lr))*m*g*\sin(\theta cr)*\delta r \quad (27)'$$

$$a\_\text{sum}'=((h+I/(m*h))/(Rg+I/(m*h)))*Rr \quad (28)'$$

$$a\_p'=((h+I/(m*h))/Rg)*Rr \quad (31)'$$

$$a\_s'=((h+I/(m*h))/(Rg+2*I/(m*h)))*Rr \quad (40)'$$

It should be noted that m, I, h, Lf, Lr, Rf, Rr, and g in the above expressions have the same meanings as in the case of the front-wheel steering two-wheeled vehicle 1. Further, in the rear-wheel steering two-wheeled vehicle 201, ef, er, and e expressed by the aforesaid expressions (11), (12), and (13) indicate the movement amounts in the Y-axis direction of the points Ef', Er', and E', respectively, shown in FIG. 11 or 12.

On the basis of the above, the behavior in the case of steering the rear-wheel steering angle in the rear-wheel steering two-wheeled vehicle 201 becomes similar to the behavior in the case of steering the front-wheel steering angle in the front-wheel steering two-wheeled vehicle 1. Therefore, in the case of attempting to control the posture (inclination angle in the roll direction) of the vehicle body 202 of the two-wheeled vehicle 201 to a desired or required posture by steering of the rear wheel 203r of the rear-wheel steering two-wheeled vehicle 201, the relationship between the stability of the control and the value of a' becomes similar to the relationship between the stability of the control of the posture of the vehicle body 2 and the value of a in the front-wheel steering two-wheeled vehicle 1.

Accordingly, it can be said that, in the case of attempting to control the posture (inclination angle in the roll direction) of the vehicle body 202 of the rear-wheel steering two-wheeled vehicle 201 to a required posture by steering of the rear wheel 203r of the two-wheeled vehicle 201 (in the case of attempting to control the motional state of the inverted pendulum mass point 123 in the dynamics model of the two-wheeled vehicle 201), setting the arrangement position of the backwardly tilted steering axis Csr of the rear wheel 203r (steering control wheel) such that the height a' of the intersection point Er' of the steering axis Csr of the rear wheel 203r (steering control wheel) and the straight line connecting the center of the axle of the rear wheel 203r (steering control wheel) and the ground contact point of the rear wheel 203r becomes smaller than a_sum' defined by the expression (28)' is a prerequisite for stabilizing the motional state of the inverted pendulum mass point 123 (and, hence, stably controlling the posture of the vehicle body 202).

In order to suppress the oscillation phenomenon in the control system due to the tire shear deformation, it is further preferable to set the arrangement position of the steering axis Csr of the rear wheel 203r (steering control wheel) such that the height a' becomes not greater than a_s' defined by the expression (40)'.

For still further decreasing the magnitude of the change amount of the rear-wheel steering angle necessary for making the posture of the vehicle body 202 restored to the required posture, it is further preferable to set the arrangement position of the steering axis Csr of the rear wheel 203r (steering control wheel) such that the height a' becomes "0" or takes a negative value.

Supplementally, regarding the front-wheel steering two-wheeled vehicle 1, Msum in the aforesaid expression (25), M2 in the expression (26), and Mp in the expression (27) are each linear with respect to the steering angle δf of the front wheel 3f. Similarly, regarding the rear-wheel steering two-wheeled vehicle 201, Msum' in the aforesaid expression (25)', M2' in the expression (26)', and Mp' in the expression (27)' are each linear with respect to the steering angle δr of the rear wheel 203r.

Therefore, the posture controlling manipulation moment in the case of controlling the posture of the vehicle body of the two-wheeled vehicle by steering both of the front and rear wheels is obtained as a sum of Msum in the expression (25) and Msum' in the expression (25)'. Similarly, the gravitational moment (moment in the roll direction generated about the origin due to the gravitational force) in the case of steering both of the front and rear wheels is obtained as a sum of M2 in the expression (26) and M2' in the expression (26)'. Furthermore, the road surface reaction force moment (moment in the roll direction generated about the origin due to the reaction force in the vertical direction from the ground surface 110) in the case of steering both of the front and rear wheels is obtained as a sum of Mp in the expression (27) and Mp' in the expression (27)'.

Incidentally, it can be considered in the front-wheel steering two-wheeled vehicle 1 or the rear-wheel steering two-wheeled vehicle 201 that it is practically impossible that the center-of-gravity height h becomes equal to or lower than Rg defined by the aforesaid expression (25a).

Even assuming that the center-of-gravity height h is Rg or lower, in this case, the two-wheeled vehicle 1 or 201 becomes dynamically stable in the basic posture state, without the need of posture control by steering of the steering control wheel (front wheel 3f or rear wheel 203r). Therefore, in discussing the stability of the posture control of the vehicle 2 or 202 by way of steering, it is only necessary to consider the case where the value of the center-of-gravity height h is Rg or larger.

In this case, for example regarding the front-wheel steering two-wheeled vehicle 1, the value of ((h+I/(m*h))/(Rg+I/(m*h))) becomes larger than 1, so that the right side of the expression (28) becomes larger than Rf. That is, as long as h is larger than Rg, the value of a_sum determined by the expression (28) becomes always larger than Rf with respect to arbitrary h, I, and m.

On the other hand, regarding the front-wheel steering two-wheeled vehicle 1, when the height a is smaller than a_sum, Mp/δf becomes positive, Mp/δf>(-M2/δf), and Msum/δf becomes positive, as explained above.

From the above, when a is set to Rf or lower, as long as h is larger than Rg, Mp/δf becomes positive, Mp/δf>(-M2/δf), and Msum/δf becomes positive with respect to arbitrary h, I, and m.

That is, when a is set to Rf or lower, even in the case where the values of h, I, and m have not been calculated at the planning phase, or the values of h, I, and m have not been measured, or even in the case where the values of h, I, and m may vary because a given object may be mounted on or attached to the mobile vehicle, Mp/δf becomes always positive, Mp/δf becomes always greater than (-M2/δf), and Msum/δf becomes always positive, as long as h is larger than Rg. Accordingly, it is possible to cause the posture controlling manipulation moment Msum for making the posture (inclination angle in the roll direction) of the vehicle body 2 restored to a required posture to be generated in an appropriate direction, independently of the values of h, I, and m.

It cannot be determined whether the posture controlling manipulation moment Msum is sufficiently large, unless the values of h, I, and m are known. However, even if the values of h, I, and m are unknown, only checking whether a is Rf or lower makes it possible to determine whether the posture controlling manipulation moment Msum for making the posture restored to a required posture can be generated in an appropriate direction. It is therefore possible to use the height a equal to or lower than Rf, as a design guideline for a two-wheeled vehicle 1.

The above-described matters also apply to the rear-wheel steering two-wheeled vehicle 201. That is, when the height a' is set to Rr or lower, as long as h is larger than Rg, the following always hold: Mp'/δr is positive; Mp'/δr>(−M2'/δr); and Msum'/δr is positive. Accordingly, it is possible to cause the posture controlling manipulation moment Msum' for making the posture (inclination angle in the roll direction) of the vehicle body 202 restored to a required posture to be generated in an appropriate direction, independently of the values of h, I, and m.

In the above-described model for the front-wheel steering two-wheeled vehicle 1 shown in FIG. 1, the mass and the inertia moment (inertia) were concentrated on the vehicle body 2. In the model, the gravitational force which acts on a steering mobile section made up of the front wheel 3f and the front-wheel support mechanism 4, and the inertial force of the steering mobile section which is generated when the steering mobile section makes a motion relative to the vehicle body 2 in accordance with the steering of the front wheel 3f were both ignored.

Similarly, in the model for the rear-wheel steering two-wheeled vehicle 201 schematically shown in FIG. 11, the mass and the inertia moment (inertia) were concentrated on the vehicle body 202. In the model, the gravitational force which acts on a steering mobile section made up of the rear wheel 203r and the rear-wheel support mechanism 205, and the inertial force of the steering mobile section which is generated when the steering mobile section makes a motion relative to the vehicle body 202 in accordance with the steering of the rear wheel 203r were both ignored.

For an ordinary two-wheeled vehicle, steering control of the steering control wheel (front wheel 3f or rear wheel 203r) based on the model as described above ensures sufficient posture stabilizing control for the vehicle body 2 or 202.

When accessory equipment such as audio equipment is attached to the front-wheel support mechanism 4 (or rear-wheel support mechanism 205), however, the mass of the aforesaid steering mobile section may increase, the inertia moment of the steering mobile section about the steering axis Csf (or Csr) may increase, or the center of gravity of the steering mobile section may greatly deviate from the steering axis Csf (or Csr).

In such a case, posture control with higher accuracy will be possible when the two-wheeled vehicle is modeled by further taking into account the gravitational force which acts on the steering mobile section made up of the front wheel 3f and the front-wheel support mechanism 4 (or the steering mobile section made up of the rear wheel 203r and the rear-wheel support mechanism 205) as well as the inertial force of the steering mobile section which is generated when the steering mobile section makes a motion relative to the vehicle body 2 (or vehicle body 202).

A description will now be made, with reference to FIGS. 13 to 15, about dynamics models for a two-wheeled vehicle 1 having the mechanical structure similar to that of the front-wheel steering two-wheeled vehicle 1 shown in FIG. 1, for controlling the posture of the vehicle body 2 by taking into account the inertial force of the steering mobile section (hereinafter, referred to as "front-wheel steering mobile section") made up of the front wheel 3f and the front-wheel support mechanism 4, and the gravitational force acting on the front-wheel steering mobile section.

FIG. 13 shows a two-wheeled vehicle 1 having the mechanical structure similar to that of the front-wheel steering two-wheeled vehicle 1 shown in FIG. 1. The two-wheeled vehicle 1 in FIG. 13 is different from the two-wheeled vehicle 1 in FIG. 1 in the manner of arrangement of the mass and inertia moment which are set for modeling of the vehicle.

In the model of the two-wheeled vehicle 1 in FIG. 1, the mass of the front-wheel steering mobile section is included in the vehicle body 2, and no mass point is set for the front-wheel steering mobile section. In contrast, in the model of the two-wheeled vehicle 1 in FIG. 13, the mass of the front-wheel steering mobile section is separated from the vehicle body 2, and mass points are set respectively for the front-wheel steering mobile section and the vehicle body 2.

More specifically, in the model of the two-wheeled vehicle 1 in FIG. 13, it is set such that the front-wheel steering mobile section has a mass point 125 (hereinafter, referred to as "third mass point 125") having a mass m3. With a change in steering angle δf of the front wheel 3f, the third mass point 125 moves, together with the front-wheel steering mobile section, relative to the vehicle body 2.

Further, in the model of the two-wheeled vehicle 1 in FIG. 13, a mass point 126 having a mass mb, and an inertia moment Ib (inertia moment about a longitudinal axis Crol which extends in the longitudinal direction (X-axis direction) while passing through the mass point 126) are set for the vehicle body 2, as in the case of the two-wheeled vehicle 1 in FIG. 1.

In the model of the two-wheeled vehicle 1 in FIG. 13, however, the mass m3 of the front-wheel steering mobile section is not included in the vehicle body 2. Therefore, the mass mb of the mass point 126 and its position, and the inertia moment Ib are different from the total mass m of the two-wheeled vehicle 1 in FIG. 1, the position of the overall center of gravity G (position of the mass point having the mass m), and the inertia moment I, respectively.

Here, it is assumed that the arrangement of the mass and inertia moment of the two-wheeled vehicle 1 in FIG. 13 is equivalently transformed to a mass point system which is made up of three mass points of a first mass point 123 having a mass m1, a second mass point 124 having a mass m2, and a third mass point 125 having a mass m3, as shown in FIG. 14A.

The third mass point 125 is a mass point corresponding to the front-wheel steering mobile section of the two-wheeled vehicle 1 in FIG. 13. The height of the third mass point 125 is denoted as h3.

Of the two-wheeled vehicle 1 in FIG. 13, the portion excluding the front-wheel steering mobile section (i.e. the portion having the mass point 126 with the mass mb and the inertia moment Ib) is equivalently transformed to the first mass point 123 having the mass m1 and a height h' (=hb+c) and the second mass point 124 having the mass m2 and a height "0", in a manner similar to that in which the two-wheeled vehicle 1 in FIG. 1 was equivalently transformed to the second model shown in FIG. 2B.

In this case, the value of the difference c (=h'−hb) between h' and hb (=height of the mass point 126 shown in FIG. 13) and the values of m1 and m2 in FIG. 14A are determined by expressions which are obtained by replacing I, m, and h on the right sides of the expressions (5b), (6b), and (7b) with Ib, mb, and hb, respectively.

It should be noted that since the first mass point 123 and the second mass point 124 in the two-wheeled vehicle 1 in FIG. 13 are on the plane of symmetry of the vehicle body 2 of the two-wheeled vehicle 1 (plane of symmetry when the vehicle body 2 is considered to be bilaterally symmetrical), as in the case of the two-wheeled vehicle 1 in FIG. 1, the inclination in the roll direction of the line segment connecting the first mass point 123 and the second mass point 124 corresponds to the inclination in the roll direction of the vehicle body 2 of the two-wheeled vehicle 1 in FIG. 13.

Now, consideration is given to equivalent transformation of the mass arrangement in FIG. 14A to that in FIG. 14B. A second mass point 124 in FIG. 14B has its mass and position identical to those of the second mass point 124 in FIG. 14A.

Further, a fifth mass point 128 in FIG. 14B is on the ground surface 110. That is, the height of the fifth mass point 128 from the ground surface 110 is "0". A fourth mass point 127 has a height h4, which is kept constant.

First, it will be shown that a set of the first mass point 123 and the third mass point 125 in FIG. 14A can be equivalently transformed to a set of the fourth mass point 127 and the fifth mass point 128 in FIG. 14B.

This equivalent transformation can be performed to satisfy the following six conditions.

The first condition in the equivalent transformation is that the mass sum of the set of the first mass point 123 and the third mass point 125 agrees with the mass sum of the set of the fourth mass point 127 and the fifth mass point 128. This condition will be hereinafter referred to as "mass sum condition".

The second condition in the equivalent transformation is that the height of the center of gravity of the set of the first mass point 123 and the third mass point 125 agrees with the height of the center of gravity of the set of the fourth mass point 127 and the fifth mass point 128. This condition will be hereinafter referred to as "center-of-gravity height condition".

The third condition in the equivalent transformation is that the inertia moment about the origin of the set of the first mass point 123 and the third mass point 125 agrees with the inertia moment about the origin of the set of the fourth mass point 127 and the fifth mass point 128. This condition will be hereinafter referred to as "inertia moment condition".

The fourth condition in the equivalent transformation is that the angular momentum about the origin of the set of the first mass point 123 and the third mass point 125 agrees with the angular momentum about the origin of the set of the fourth mass point 127 and the fifth mass point 128. This condition will be hereinafter referred to as "angular momentum condition".

The fifth condition in the equivalent transformation is that in the basic posture state of the front-wheel steering two-wheeled vehicle 1 in FIG. 13, the fourth mass point 127 and the fifth mass point 128 are on the plane of symmetry of the vehicle body 2. That is, the fifth condition is a condition that, in the aforesaid basic posture state, the movement amount in the Y-axis direction (position in the transverse direction) of each of the fourth mass point 127 and the fifth mass point 128 is "0". This condition will be hereinafter referred to as "base-time movement amount condition".

The sixth condition in the equivalent transformation is that the moment (gravitational moment) which is generated about the origin in the direction about the X axis (roll direction) by the gravitational force acting on the set of the first mass point 123 and the third mass point 125 agrees with the moment (gravitational moment) which is generated about the origin in the direction about the X axis (roll direction) by the gravitational force acting on the set of the fourth mass point 127 and the fifth mass point 128. This condition will be hereinafter referred to as "gravitational moment condition".

The above-described six conditions of mass sum condition, center-of-gravity height condition, inertia moment condition, angular momentum condition, base-time movement amount condition, and gravitational moment condition will be collectively called the "dynamics conditions". It should be noted that even in the case where the discussion about the conditions is extended to a system having three or more mass points, the conditions will be similarly called the mass sum condition, center-of-gravity height condition, inertia moment condition, angular momentum condition, base-time movement amount condition, gravitational moment condition, and dynamics conditions.

Consideration is now given to determination of the relational expressions for determining a set of the movement amounts in the Y-axis direction (positions in the transverse direction) of the fourth mass point 127 and the fifth mass point 128 in accordance with a set of the movement amounts in the Y-axis direction (positions in the transverse direction) of the first mass point 123 and the third mass point 125, and also determination of the height h4 (constant value) of the fourth mass point 127, so as to satisfy the above-described dynamics conditions.

Here, xn (where n=1, 2, 3, 4, 5) is defined as the movement amount in the Y-axis direction of the nth mass point.

According to the mass sum condition, center-of-gravity height condition, and inertia moment condition, the following expressions (101), (102), and (103), respectively, hold.

$$m1+m3=m4+m5 \quad (101)$$

$$m1*h'+m3*h3=m4*h4 \quad (102)$$

$$m1*h'^{*}h'+m3*h3*h3=m4*h4*h4 \quad (103)$$

From the above expressions (102) and (103), h4 and m4 are obtained as follows.

$$h4=(m1*h'^{*}h'+m3*h3*h3)/(m1*h'+m3*h3) \quad (104)$$

$$m4=(m1*h'+m3*h3)*(m1*h'+m3*h3)/(m1*h'^{*}h'+m3*h3*h3) \quad (105)$$

From the expressions (101), (104), and (105), m5 is obtained as follows.

$$m5=m1*m3*(h'-h3)*(h'-h3)/(m1*h'^{*}h'+m3*h3*h3) \quad (106)$$

In the above-described manner, the structural parameters h4, m4, and m5 can be determined to satisfy the mass sum condition, center-of-gravity height condition, and inertia moment condition. Hereinbelow, unknown variables x4 and x5 will further be obtained.

In the state where the mass sum condition, center-of-gravity height condition, and inertia moment condition are satisfied, if the base-time movement amount condition and angular momentum condition are also satisfied, then the integrated value of the angular momentum about the origin of the set of the first mass point 123 and the third mass point 125 will agree with the integrated value of the angular momentum about the origin of the set of the fourth mass point 127 and the fifth mass point 128. Accordingly, the following expression (107) holds.

$$m1*h'^{*}x1+m3*h3*x3=m4*h4*x4 \quad (107)$$

From the expressions (102) and (107), x4 is obtained as follows.

$$x4=(m1*h'^*x1+m3*h3*x3)/(m1*h'+m3*h3) \quad (108)$$

On the other hand, according to the gravitational moment condition, the following expression (109) holds.

$$m1*x1+m3*x3=m4*x4+m5*x5 \quad (109)$$

From the expressions (108) and (109), x5 is obtained as follows.

$$x5=(m1*x1+m3*x3-m4*x4)/m5 \quad (110)$$

Incidentally, x3 is determined uniquely from the roll angle φb of the vehicle body 2 and the steering angle δf of the front wheel 3f. Thus, the function for determining x3 from the roll angle φb of the vehicle body 2 and the steering angle δf of the front wheel 3f is denoted as f3(φb, δf), and it is assumed that the following expression (111) holds.

$$x3=f3(\phi b, \delta f) \quad (111)$$

Although f3(φb, δf) may be determined experimentally, it may be expressed analytically by using a trigonometric function, from the geometric structure of the two-wheeled vehicle 1.

Further, in the case where φb is sufficiently small, sin(φb) can be approximated by φb. Because of this and other reasons, f3(φb, δf) can be approximated by the sum of a component attributable to φb and a component attributable to δf, as expressed by the following expression (112).

$$f3(\phi b, \delta f)=h3*\phi b+f33(\delta f) \quad (112)$$

Here, f33(δf) is a function which represents the component attributable to δf. When the divergence of the third mass point 125 from the steering axis Csf of the front wheel 3f is denoted as bsf (with a positive value representing upward and forward divergence from the steering axis Csf of the front wheel 3f) as shown in FIG. 13, f33(δf) is obtained as a sum of a component proportional to bsf*sin(δf) and a component proportional to the height a. It should be noted that φb on the right side of the expression (112) may be replaced with sin(φb).

Further, x1 is also determined uniquely from the roll angle φb of the vehicle body 2 and the steering angle δf of the front wheel 3f. Thus, the function for determining x1 from the roll angle φb of the vehicle body 2 and the steering angle δf of the front wheel 3f is denoted as f1(φb, δf), and it is assumed that the following expression (113) holds.

$$x1=f1(\phi b, \delta f) \quad (113)$$

Further, in the case where φb is sufficiently small, as in the case of f3(φb, δf), f1(φb, δf) can be approximated by the sum of a component attributable to φb and a component attributable to δf, as expressed by the following expression (114).

$$f1(\phi b, \delta f)=h'^*\phi b+f11(\delta f) \quad (114)$$

It should be noted that φb on the right side of the expression (114) may be replaced with sin(φb).

From the expressions (104), (108), and (111) to (114), the following expression (115) is obtained.

$$x4=h4*\phi b+(m1*h'/(m1*h'+m3*h3))*f11(\delta f)+(m3*h3/(m1*h'+m3*h3))*f33(\delta f) \quad (115)$$

Here, a function f4(δf) is defined by the following expression (116).

$$f4(\delta f)=(m1*h'/(m1*h'+m3*h3))*f11(\delta f)+(m3*h3/(m1*h'+m3*h3))*f33(\delta f) \quad (116)$$

At this time, the expression (115) can be rewritten into the following expression (117).

$$x4=h4*\phi b+f4(\delta f) \quad (117)$$

It should be noted that φb on the right side of the expression (117) may be replaced with sin(φb).

From the expressions (102), (110) to (114), and (117), the following expression (118) is obtained.

$$x5=(m1/m5)*f11(\delta f)+(m3/m5)*f33(\delta f)-(m4/m5)*f4(\delta f) \quad (118)$$

Therefore, x5 is expressed in the form shown by the following expression (119).

$$x5=f5(\delta f) \quad (119)$$

It should be noted that f5(δf) means the function (of δf) expressed by the right side of the expression (118).

As described above, the set of the first mass point 123 and the third mass point 125 in FIG. 14A can be equivalently transformed to the set of the fourth mass point 127 and the fifth mass point 128 in FIG. 14B. Accordingly, the system (shown in FIG. 14A) made up of the first mass point 123, the second mass point 124, and the third mass point 125 can be equivalently transformed to the system (shown in FIG. 14B) made up of the fourth mass point 127, the second mass point 124, and the fifth mass point 128.

Accordingly, in the case where the mass is set for the front-wheel steering two-wheeled vehicle 1 in the manner as shown in FIG. 13, the approximate dynamics model that approximately expresses the dynamics of the two-wheeled vehicle 1 in the aforesaid basic posture state and similar posture states (close to the basic posture state) can be equivalently transformed to the dynamics model of the system shown in FIG. 14B.

It should be noted that the position and the mass m2 of the second mass point 124 in FIG. 14B are identical to those of the second mass point 124 in FIG. 14A. The mass m2 of the second mass point 124 in FIGS. 14A and 14B is generally different from that in the case of the front-wheel steering two-wheeled vehicle 1 in which the mass has been set as shown in FIG. 1 (two-wheeled vehicle having no mass point for the front-wheel steering mobile section).

The set of the second mass point 124 and the fifth mass point 128 in FIG. 14B can further be equivalently transformed to a sixth mass point 129 having a mass m6, in accordance with the following expressions (120) and (121). The expression (120) shows the condition that the mass m6 of the sixth mass point 129 agrees with the sum of the masses m2 and m5 of the second mass point 124 and the fifth mass point 128, respectively. The expression (121) shows the condition that the position of the sixth mass point 129 coincides with the position of the center of gravity of the set of the second mass point 124 and the fifth mass point 128.

$$m6=m2+m5 \quad (120)$$

$$x6=(m2/m6)*x2+(m5/m6)*x5 \quad (121)$$

Accordingly, the dynamics model of the system shown in FIG. 14B can be equivalently transformed to the dynamics model of the system shown in FIG. 14C. The mass and position of the fourth mass point 127 in FIG. 14C are identical to those of the fourth mass point 127 in FIG. 14B.

On the other hand, x2 (which corresponds to the aforesaid q) is expressed by a function of δf, as in the aforesaid expression (15), and x5 is expressed by a function of δf, f5(δf), as in the aforesaid expression (119). Therefore, x6 is expressed as a function of δf, f(δf), as in the form in the following expression (122).

$$x6=f6(\delta f) \quad (122)$$

As with the mass point system (shown in FIG. 2B) corresponding to the two-wheeled vehicle 1 in FIG. 1 having no mass point set for the front-wheel steering mobile section, the mass point system in FIG. 14C corresponding to the two-wheeled vehicle 1 in FIG. 13 having the mass point 125 set for the front-wheel steering mobile section is made up of a mass point (fourth mass point 127) which moves in accordance with the inclination in the roll direction of the vehicle body 2 and the steering angle of the front wheel 3f, and a mass point (sixth mass point 129) which moves on the ground surface 110 in accordance with the steering angle of the front wheel 3f, independently of the inclination in the roll direction of the vehicle body 2.

In this case, it can be considered that the fourth mass point 127 corresponds to the first mass point (inverted pendulum mass point) 123 in FIG. 2B and the sixth mass point 129 corresponds to the second mass point 124 in FIG. 2B.

Therefore, the dynamic behavior of the two-wheeled vehicle 1 in FIG. 13, in which the mass point 125 has been set for the front-wheel steering mobile section, can be expressed by the dynamics of the same form as that of the dynamics model shown in FIG. 6, as in the case of the two-wheeled vehicle 1 in FIG. 1 having no mass point set for the front-wheel steering mobile section.

The dynamic behavior of a two-wheeled vehicle 1 having a plurality of mass points set for the front-wheel steering mobile section (for example, a two-wheeled vehicle 1, as illustrated in FIG. 15, having a mass point with a mass m7 and a mass point with a mass m8 set for the front-wheel steering mobile section) can also be equivalently transformed to the behavior expressed by the dynamics model shown in FIG. 6.

Specifically, first, the dynamic behavior of the system composed of one of the plurality of mass points of the front-wheel steering mobile section and the mass point and inertia moment (inertia) of the vehicle body 2 is equivalently transformed to the behavior of the dynamics model shown in FIG. 6. Next, the dynamic behavior of the system obtained by combining another one of the remaining mass points of the front-wheel steering mobile section with the above, equivalently transformed system is again equivalently transformed to the behavior of the dynamics model shown in FIG. 6.

Thereafter, the similar procedure is repeated until all the mass points of the front-wheel steering mobile section are combined into the system. According to the above-described procedure, the dynamic behavior of a two-wheeled vehicle 1 having a plurality of mass points set for the front-wheel steering mobile section can also be equivalently transformed to the dynamic behavior of the system made up of a mass point (inverted pendulum mass point) which moves in accordance with the inclination angle in the roll direction of the vehicle body 2 and the steering angle of the front wheel 3f, and a mass point which moves on the ground surface 110 in accordance with the steering angle of the front wheel 3f, independently of the inclination angle in the roll direction of the vehicle body 2.

Accordingly, the dynamic behavior of the two-wheeled vehicle 1 having a mass point set for the front-wheel steering mobile section can be expressed by the dynamics of the same form as that of the dynamics model shown in FIG. 6.

Furthermore, in the case of a two-wheeled vehicle 1 in which a mass point and an inertia moment about the mass point have been set for the front-wheel steering mobile section, the system having the mass point and the inertia moment can be equivalently transformed to a system made up of a plurality of mass points. For example, in a similar manner as in the case shown in FIG. 2A, two mass points each having half the mass of the mass point that has been set for the front-wheel steering mobile section (hereinafter, referred to as "original mass point") may be arranged at positions above and below the original mass point each at a distance of the radius of inertia therefrom. In this manner, the system having the original mass point and the inertia moment about the original mass point can be equivalently transformed to the system having a plurality of mass points set for the front-wheel steering mobile section.

Accordingly, the dynamic behavior of a two-wheeled vehicle 1 in which a mass point (original mass point) and an inertia moment about the mass point have been set for the front-wheel steering mobile section can also be equivalently transformed to the dynamic behavior of a system which is made up of a mass point (inverted pendulum mass point) which moves in accordance with the inclination angle in the roll direction of the vehicle body 2 and the steering angle of the front wheel 3f, and a mass point which moves on the ground surface 110 in accordance with the steering angle of the front wheel 3f, independently of the inclination angle in the roll direction of the vehicle body 2. Its dynamic behavior can be expressed by the dynamics of the same form as that of the dynamics model shown in FIG. 6.

The matters explained above can be summarized as follows. Even in the case where at least one of a mass point and an inertia moment is set for the steering mobile section (front-wheel steering mobile section) made up of the front wheel 3f and the front-wheel support mechanism 4, it is possible to equivalently transform the dynamic behavior of the two-wheeled vehicle 1 to the behavior of a system which is made up of a mass point that moves in accordance with the inclination angle in the roll direction of the vehicle body 2 and the steering angle of the front wheel 3f, and a mass point that moves on the ground surface 110 in accordance with the steering angle of the front wheel 3f, independently of the inclination angle in the roll direction of the vehicle body 2.

Accordingly, the dynamic behavior of the two-wheeled vehicle 1 having at least one of the mass point and the inertia moment set for the front-wheel steering mobile section can also be expressed by the dynamics of the same form as that of the dynamics model shown in FIG. 6.

That is, irrespective of whether at least one of the mass point and the inertia moment has been set for the front-wheel steering mobile section or neither of them has been set therefor, the dynamic behavior of the two-wheeled vehicle 1 can be equivalently transformed to the dynamic behavior of a system which is made up of a mass point (inverted pendulum mass point; hereinafter, this mass point may be generically referred to as "mass point A") that moves in accordance with the inclination angle in the roll direction of the vehicle body 2 and the steering angle of the front wheel 3f (steering control wheel), and a mass point (hereinafter, this mass point may be generically referred to as "mass point B") that moves on the ground surface 110 in accordance with the steering angle of the front wheel 3f (steering control wheel), independently of the inclination angle in the roll direction of the vehicle body 2.

To be more specific, the dynamic behavior of this system is expressed by the dynamic behavior of the system in which the aforesaid mass point A (inverted pendulum mass point) accelerates or decelerates in response to the gravitational moment which is generated about the origin due to the gravitational force acting on the mass point A, the gravitational moment which is generated about the origin due to the gravitational force acting on the aforesaid mass point B, and the road surface reaction force moment which is generated about the origin by the movement of the center of contact pressure, COP. That is, it is expressed by the dynamics of the same form as that of the dynamics model shown in FIG. 6.

For example, the dynamic behavior in the case where one mass point has been set for the front-wheel steering mobile section (in the case of the two-wheeled vehicle 1 shown in FIG. 13) can be expressed by a dynamics model in which the first mass point 123 (inverted pendulum mass point 123) having the mass m1 in FIG. 6 has been replaced with the fourth mass point 127 having the mass m4 shown in FIG. 14C (this corresponds to the above-described mass point A) and the second mass point 124 having the mass m2 in FIG. 6 has been replaced with the sixth mass point 129 having the mass m6 shown in FIG. 14C (this corresponds to the above-described mass point B).

In the case of the rear-wheel steering two-wheeled vehicle 201 having the structure shown in FIG. 11 as well, matters similar to those in the case of the front-wheel steering two-wheeled vehicle 1 hold. Therefore, irrespective of whether at least one of a mass point and an inertia moment has been set for the steering mobile section (hereinafter, referred to as "rear-wheel steering mobile section") made up of the rear wheel 203r and the rear-wheel support mechanism 205, or neither of them has been set therefor, the dynamic behavior of the two-wheeled vehicle 201 can be equivalently transformed to the dynamic behavior of the system which is made up of the mass point A (inverted pendulum mass point) that moves in accordance with the inclination angle in the roll direction of the vehicle body 202 and the steering angle of the rear wheel 203r (steering control wheel), and the mass point B that moves on the ground surface 110 in accordance with the steering angle of the rear wheel 203r (steering control wheel), independently of the inclination angle in the roll direction of the vehicle body 202.

The dynamic behavior of this system is expressed by the dynamic behavior of the system in which the aforesaid mass point A accelerates or decelerates in response to the gravitational moment which is generated about the origin due to the gravitational force acting on the mass point A, the gravitational moment which is generated about the origin due to the gravitational force acting on the aforesaid mass point B, and the road surface reaction force moment which is generated about the origin by the movement of the center of contact pressure, COP. That is, it is expressed by the dynamics of the same form as that of the dynamics model shown in FIG. 6.

In summary of the foregoing, in each of the case where neither the mass point nor the inertia moment has been set for the front-wheel (or rear-wheel) steering mobile section (hereinafter, this may be referred to as the "case of basic configuration") and the case where one or both of the mass point and the inertia moment have been set for the front-wheel (or rear-wheel) steering mobile section (hereinafter, this may be referred to as the "case of extended configuration"), the dynamic behavior of the two-wheeled vehicle 1 (or the two-wheeled vehicle 201) becomes the behavior of the same form as that of the dynamics model shown in FIG. 6 which corresponds to the case of basic configuration.

In the case of basic configuration, the inclination in the direction about the X axis (roll direction) of the line segment connecting the first mass point 123 and the second mass point 124 corresponds to the inclination in the direction about the X axis (roll direction) of the vehicle body 2.

In contrast, in the case where one or both of the mass point and inertia moment have been set for the front-wheel (or rear-wheel) steering mobile section, the inclination in the direction about the X axis (roll direction) of the line segment connecting the two mass points (the above-described mass points A and B) does not necessarily correspond to the inclination in the direction about the X axis (roll direction) of the vehicle body 2.

For the movement amount of the mass point A (inverted pendulum mass point), however, the relationship as in the form obtained by extending the aforesaid expression (117) holds. Specifically, the movement amount (for example, dimensional quantity of the position (in the Y-axis direction) or the angle (in the direction about the X axis)) of the mass point A can be obtained by a sum of: a value proportional to the inclination angle $\phi b$ in the direction about the X axis (roll direction) of the vehicle body 2 or its sine value $\sin(\phi b)$ (a value of a constant multiple of $\phi b$ or $\sin(\phi b)$), and a value of a prescribed nonlinear function related to one or both of the steering angles $\delta f$ and $\delta r$.

The above nonlinear function is a function related to the steering angle $\delta f$ or $\delta r$ (a function in the form of $f(\delta f)$ or $f(\delta r)$) when the steering control wheel is a front wheel alone or a rear wheel alone, respectively. When the front and rear wheels are both steerable, the nonlinear function is a function related to both the steering angles $\delta f$ and $\delta r$ (for example, a function in the form of $fa(\delta f, \delta r)$, or a function in the form of $fb(\delta f)+fc(\delta r)$).

That is, the movement amount of the above-described mass point A can be obtained by a prescribed function related to the inclination angle $\phi b$ in the direction about the X axis (roll direction) of the vehicle body 2 and one or both of the steering angles $\delta f$ and $\delta r$ (a function in the form of $f(\phi b, \delta f, \delta r)$, or $f(\phi b, \delta f)$, or $f(\phi b, \delta r)$).

Alternatively, the movement amount of the mass point A can be obtained by a function into which the inclination angle $\phi b$ in the direction about the X axis (roll direction) of the vehicle body 2, a prescribed function (in the form of $f(\delta f)$) related to the steering angle $\delta f$, and a prescribed function (in the form of $f(\delta r)$) related to the steering angle $\delta r$ are combined (for example, a function as a linear combination of $\phi b$, $f(\delta f)$, and $f(\delta r)$).

It should be noted that in the case where the steering control wheel is the front wheel or the rear wheel alone, the movement amount (in the Y-axis direction) of the mass point B on the ground surface 110 can be obtained by a function (in the form of $f(\delta f)$ or $f(\delta r)$) related to the steering angle $\delta f$ or $\delta r$, respectively. In the case where the front wheel and the rear wheel are both steerable, the movement amount (in the Y-axis direction) of the mass point B on the ground surface 110 can be obtained by a function (in the form of $f(\delta f, \delta r)$) related to both the steering angles $\delta f$ and $\delta r$.

Further, as explained above, in either the case of basic configuration or the case of extended configuration, the dynamic behavior of the two-wheeled vehicle 1 (or the two-wheeled vehicle 201) becomes the behavior of the same form as that of the dynamics model shown in FIG. 6 corresponding to the case of basic configuration. Therefore, a similar argument as that about the dynamics model shown in FIG. 6 can be developed about the control of the posture of the vehicle 2 (or 202).

That is, the dynamic matters similar to those in the case of basic configuration hold in the case of extended configuration as well. In the case of extended configuration, however, the expressions related to Msum, M2, Mp, a_sum, a_p, and a_s for the front-wheel steering two-wheeled vehicle 1 and Msum', M2', Mp', a_sum', a_p', and a_s' for the rear-wheel steering two-wheeled vehicle 201 become more complicated compared to the expressions in the case of basic configuration.

In an ordinary two-wheeled vehicle having a conventional structure, however, the differences between the values obtained by these expressions in the case of extended configuration and those in the case of basic configuration are small. More specifically, the values obtained by the expressions for a_sum, a_p, a_s, a_sum', a_p', and a_s' in the case of extended configuration tend to be slightly lower (downside) than those in the case of basic configuration.

Therefore, in the case of extended configuration, the conditions regarding the height a defined as explained above (the conditions for stably controlling the posture of the vehicle body 2 or 202) become slightly severer than in the case of basic configuration. That is, the conditions calculated regarding the height a in the case of extended configuration become slightly severer than those calculated in the case of basic configuration. Therefore, the conditions calculated regarding the height a in the case of basic configuration become the prerequisites for favorably controlling the posture of the vehicle body 2 (or 202) of the two-wheeled vehicle 1 (or 201).

Supplementally, in a two-wheeled vehicle having both the front-wheel steering mobile section and the rear-wheel steering mobile section (for example, the two-wheeled vehicle 201 having the structure shown in FIG. 11), in the case where at least one of a mass point and an inertia moment has been set for each of the front-wheel steering mobile section and the rear-wheel steering mobile section, the system having the mass point and the inertia moment for the entirety of the front-wheel steering mobile section, the rear-wheel steering mobile section, and the vehicle body may be equivalently transformed to a system made up of two mass points (mass points A and B), in a similar manner as that described above in conjunction with the case where a plurality of mass points have been set for the front-wheel steering mobile section or the case where a mass point and an inertia moment have been set for the front-wheel steering mobile section.

In this case, the movement amount (for example, dimensional quantity of the position (in the Y-axis direction) or the angle (in the direction about the X axis)) of the above-described mass point A can be obtained by a sum of: a value proportional to the inclination angle $\phi b$ in the direction about the X axis (roll direction) of the vehicle body or its sine value $\sin(\phi b)$ (a value of a constant multiple of $\phi b$ or $\sin(\phi b)$), and a value of a prescribed nonlinear function related to both of the steering angles $\delta f$ and $\delta r$.

That is, the movement amount of the mass point A can be obtained by the inclination angle $\phi b$ in the direction about the X axis (roll direction) of the vehicle body and a prescribed nonlinear function related to both of the steering angles $\delta f$ and $\delta r$. Further, in this case, the movement amount of the above-described mass point B can be obtained by a prescribed function related to the steering angles $\delta f$ and $\delta r$.

It should be noted that the movement amount of the mass point A can be obtained in the above-described manner even in the case where the front-wheel steering mobile section or the rear-wheel steering mobile section is not equipped with an actuator for steering. Further, in a two-wheeled vehicle having both the front-wheel steering mobile section and the rear-wheel steering mobile section, even in the case where the mass point and the inertia moment have not been set for one or both of the front-wheel steering mobile section and the rear-wheel steering mobile section, the movement amount of the mass point A can be obtained in the above-described manner.

The above has described the fundamental technical matters related to the present invention.

The present invention will be described below on the basis of the above.

A mobile vehicle according to the present invention is a mobile vehicle which has a vehicle body and a front wheel and a rear wheel arranged spaced apart from each other in a longitudinal direction of the vehicle body, one of the front wheel and the rear wheel being a steering control wheel which can be steered about a steering axis tilted backward, the mobile vehicle including:

a steering actuator which generates a steering force for steering the steering control wheel; and a control device which controls the steering actuator so as to stabilize a posture of the vehicle body in accordance with at least an observed value of an inclination angle in a roll direction of the vehicle body, wherein in a case where a state in which the front wheel and the rear wheel of the mobile vehicle are both stationary in an upright posture in contact with a ground surface and axle centerlines of the front wheel and the rear wheel extend in parallel with each other in a direction orthogonal to the longitudinal direction of the vehicle body is defined as a basic posture state, the height a, from the ground surface, of a point of intersection of the steering axis of the steering control wheel and a virtual straight line connecting a ground contact point of the steering control wheel and the center of axle of the steering control wheel in the basic posture state is set to satisfy the following first condition (a first aspect of the invention).

First Condition:

in a system made up of a mass point A, which moves in a horizontal direction above the ground surface, with which the mobile vehicle comes into contact, in accordance with the inclination angle in the roll direction of the vehicle body and the steering angle of the steering control wheel, and a mass point B, which moves horizontally on the ground surface, with which the mobile vehicle comes into contact, in accordance with the steering angle of the steering control wheel, independently of the inclination angle in the roll direction of the vehicle body, the system having a mass of the mass point A, a mass of the mass point B, a height of the mass point A from the ground surface, a relationship among an inclination angle in the roll direction of the vehicle body, a steering angle of the steering control wheel, and a displacement of the mass point A, and a relationship between a steering angle of the steering control wheel and a displacement of the mass point B which are set to have dynamic characteristics equivalent to those of dynamics of the mobile vehicle in the case where the steering control wheel of the mobile vehicle being stationary on a prescribed origin in the basic posture state is steered by a steering angle $\delta$, the system being also configured such that the mass point A accelerates or decelerates in response to a first gravitational moment, generated about the origin due to a gravitational force acting on the mass point A, a second gravitational moment, generated about the origin due to a gravitational force acting on the mass point B, and a road surface reaction force moment, acting about the origin due to a road surface reaction force in the vertical direction which acts on the center of contact pressure of the front wheel and the rear wheel of the mobile vehicle as a whole, in the case where a steering angle of the steering control wheel at the time when the steering control wheel is steered to cause a front end of the steering control wheel to turn left as the mobile vehicle in the basic posture state is seen from above is defined as a positive steering angle and in the case where a moment that causes the vehicle body to lean to the right is defined as a positive moment, the following holds: $Mp/\delta > -M2/\delta$, where M2 denotes the second gravitational moment generated by movement of the mass point B at the time when the steering control wheel of the mobile vehicle being stationary on the origin in the basic posture state is steered instantaneously by the steering angle δ, and Mp denotes the road surface reaction force moment generated about the origin by movement of the center of contact pressure at the time when the steering control wheel of the mobile vehicle being stationary on the origin in the basis posture state is steered instantaneously by the steering angle δ.

It should be noted that in the first aspect of the invention, "to stabilize a posture of the vehicle body" means to generate a moment (in the roll direction) which acts on the mobile vehicle to make the posture in the roll direction of the vehicle body converge to or approach a desired posture (for example, the posture in the aforesaid basic posture state).

The desired posture of the vehicle body may be a posture other than that in the basic posture state. For example, in the case where the mobile vehicle is provided with a steering handlebar for allowing a rider of the mobile vehicle to steer the steering control wheel, or in the case where the wheel different from the steering control wheel steerable by the aforesaid steering actuator is a steering control wheel not equipped with an actuator for steering, the desired posture may be the one determined in accordance with the force applied to the steering handlebar by the rider's manipulation or the manipulated variable of the steering handlebar, or in accordance with the steering angle of the steering control wheel not equipped with the actuator.

According to the first aspect of the invention, the aforesaid height a, which is determined by the arrangement of the steering axis of the steering control wheel (relative to the steering control wheel), is set to satisfy the aforesaid first condition.

Here, of the moments in the roll direction acting on the mobile vehicle in accordance with the steering of the steering control wheel in the basic posture state, the second gravitational moment M2 and the road surface reaction force moment Mp have dependency on the height a. Therefore, setting the height a as appropriate makes it possible to satisfy the first condition that Mp/δ>−M2/δ.

According to the first aspect of the invention, the height a is set to satisfy the first condition, as described above. Therefore, a sum moment (Mp+M2) of the second gravitational moment M2 and the road surface reaction force moment Mp, i.e. the moment corresponding to the aforesaid posture controlling manipulation moment Msum, becomes a moment in the positive direction in the case where the steering angle δ is a small positive steering angle, and it becomes a moment in the negative direction in the case where the steering angle δ is a small negative steering angle.

Further, the sum moment (Mp+M2) becomes a moment in the same direction as the road surface reaction force moment Mp, and this road surface reaction force moment Mp contributes to the control of the posture of the vehicle body.

This situation is similar to the situation in one of FIGS. 8D and 9A to 9D in the case where the mass points 123 and 124 in FIGS. 8A to 8D and 9A to 9D explained above are regarded as the aforesaid mass points A and B, respectively.

Accordingly, controlling the steering actuator by the control device so as to stabilize the posture of the vehicle body in accordance with at least the observed value of the inclination angle in the roll direction of the vehicle body ensures that when the posture of the vehicle body deviates from a desired posture (hereinafter, this may be referred to as "stable vehicle body posture"), the posture of the vehicle body can be stably restored to the desired, stable vehicle body posture by the steering of the steering control wheel.

Therefore, according to the first aspect of the invention, it is possible to enhance the stability of the posture of the vehicle body by steering of the front wheel or the rear wheel which is the steering control wheel.

Supplementally, in the system having the aforesaid mass points A and B, in the case where the steering control wheel of the mobile vehicle being stationary on the prescribed origin in the basic posture state is instantaneously steered by a small steering angle δ, the position of the mass point A will not have any direct term with respect to the steering angle of the steering control wheel. Therefore, the mass point A can be regarded as a fixed point.

That is, the displacement of the mass point A at the instant when the steering control wheel has been steered by a small steering angle δ is maintained at "0". Accordingly, the inclination angle in the roll direction of the vehicle body at this instant is obtained by substituting "0" for the displacement of the mass point A in the aforesaid relationship among the inclination angle in the roll direction of the vehicle body, the steering angle of the steering control wheel, and the displacement of the mass point A.

Further, the posture angle (a set of the angle in the roll direction and the angle in the yaw direction) of the steering control wheel is obtained on the basis of the inclination angle in the roll direction of the vehicle body and the small steering angle δ of the steering control wheel at that instant. Furthermore, on the basis of this posture angle (the set of the angle in the roll angle direction and the angle in the yaw direction) of the steering control wheel, the position (in the lateral direction of the vehicle body) of the center of contact pressure (COP) of the mobile vehicle is obtained.

Lastly, by multiplying the position of the center of contact pressure (COP) by the vertical load (road surface reaction force in the vertical direction) of the steering control wheel, it is possible to obtain the road surface reaction force moment Mp which acts about the prescribed origin due to the movement of the center of contact pressure, COP, at the time when the steering control wheel of the mobile vehicle being stationary on the prescribed origin in the basis posture state is instantaneously steered by a small steering angle δ.

In the first aspect of the invention, in order to set the height a to satisfy the aforesaid first condition, the height a may be set, for example, as follows.

In the first aspect of the invention, to satisfy the first condition, the height a is set, for example, to be smaller than a first prescribed value a_sum determined by the following expression (A) (a second aspect of the invention).

$$a\_sum = ((h+(I/m)/h)/(Rg+(I/m)/h)) \times Rs \quad (A)$$

where polarity of a: a>0 in the case where the point of intersection is above the ground surface, a<0 in the case where the point of intersection is below the ground surface;

I: inertia moment of the mobile vehicle;

m: mass of the mobile vehicle;

h: height of the center of gravity of the mobile vehicle from the ground surface in the basic posture state of the mobile vehicle;

$$Rg = (Lr/(Lf+Lr)) \times Rf + (Lf/(Lf+Lr)) \times Rr;$$

Lf: longitudinal distance between the center of gravity of the mobile vehicle and the center of axle of the front wheel in the basic posture state of the mobile vehicle;

Lr: longitudinal distance between the center of gravity of the mobile vehicle and the center of axle of the rear wheel in the basic posture state of the mobile vehicle;

Rf: radius of curvature of a transverse cross-sectional shape of the front wheel at a ground contact point of the front wheel in the basic posture state of the mobile vehicle;

Rr: radius of curvature of a transverse cross-sectional shape of the rear wheel at a ground contact point of the rear wheel in the basic posture state of the mobile vehicle; and Rs: one of the radii of curvature Rf and Rr that corresponds to the steering control wheel.

In the second aspect of the invention, in the case where the steering control wheel of the mobile vehicle is the front wheel, Rs in the expression (A) agrees with the radius of curvature Rf of the front wheel (i.e., Rs=Rf).

Therefore, in this case, the first prescribed value a_sum defined by the right side of the expression (A) agrees with a_sum in the aforesaid expression (28) related to the above-described front-wheel steering two-wheeled vehicle 1 shown in FIG. 1.

Further, in this case, the point of intersection in the second aspect of the invention corresponds to the intersection point Ef described above in conjunction with the front-wheel steering two-wheeled vehicle 1 in FIG. 1. Accordingly, the height a of the point of intersection in the second aspect of the invention corresponds to the height of the intersection point Ef.

In the case where the steering control wheel of the mobile vehicle in the second aspect of the invention is the rear wheel, Rs in the expression (A) agrees with the radius of curvature Rr of the rear wheel (i.e., Rs=Rr).

Therefore, in this case, the first prescribed value a_sum defined by the expression (A) agrees with a_sum' in the aforesaid expression (28)' related to the above-described rear-wheel steering two-wheeled vehicle 201 shown in FIG. 11.

Further, in this case, the point of intersection in the second aspect of the invention corresponds to the intersection point Er' described above in conjunction with the rear-wheel steering two-wheeled vehicle 201 in FIG. 11. Accordingly, the height a of the point of intersection in the second aspect of the invention corresponds to the height of the intersection point Er'.

Therefore, in the second aspect of the invention, the event that the height a of the point of intersection is smaller than a_sum determined by the above expression (A) corresponds to the event that the height a of the intersection point Ef is smaller than a_sum in the expression (28) in the front-wheel steering two-wheeled vehicle 1 in FIG. 1 in the case where the steering control wheel is the front wheel, and also corresponds to the event that the height a' of the intersection point Er' is smaller than a_sum' in the expression (28)' in the rear-wheel steering two-wheeled vehicle 201 in FIG. 11 in the case where the steering control wheel is the rear wheel.

Therefore, according to the second aspect of the invention, it is possible to set the height a of the point of intersection to satisfy the aforesaid first condition. Consequently, in the case where the posture of the vehicle body deviates from the above-described stable vehicle body posture, the posture of the vehicle body can be stably restored to the stable vehicle body posture by the steering of the steering control wheel.

In the first aspect of the invention, it is more preferable that the height a is set to further satisfy the following second condition (a third aspect of the invention).

Second Condition:

$Msum/\delta > -M2/\delta$, where Msum denotes a sum moment of the second gravitational moment M2 and the road surface reaction force moment Mp.

According to the third aspect of the invention, the absolute value of the second gravitational moment M2, which would likely cause an oscillation phenomenon in the control system, is kept at or below the absolute value of the above-described sum moment Msum (=Mp+M2), i.e. the moment Msum corresponding to the aforesaid posture controlling manipulation moment.

Accordingly, it is possible to enhance the stability of the posture control of the vehicle body, while restricting the oscillation phenomenon in the control system.

In the third aspect of the invention, for setting the height a so as to satisfy the above-described first and second conditions, the height a may be set, for example, as follows.

In the third aspect of the invention, to satisfy the first condition and the second condition, the height a is set, for example, to be not greater than a second prescribed value a_s determined by the following expression (B) (a fourth aspect of the invention).

$$a\_s = ((h+(I/m)/h)/(Rg+2\times(I/m)/h))\times Rs \quad (B)$$

It should be noted that the polarity of a and the meanings of I, m, h, Rg, and Rs are identical to those in the second aspect of the invention.

In the fourth aspect of the invention, the event that the height a of the point of intersection becomes not greater than a_s determined by the above expression (B) corresponds to the event that the height a of the intersection point Ef becomes not greater than a_s in the expression (40) in the front-wheel steering two-wheeled vehicle 1 in FIG. 1 in the case where the steering control wheel is the front wheel, and also corresponds to the event that the height a' of the intersection point Er' becomes not greater than a_s' in the expression (40)' in the rear-wheel steering two-wheeled vehicle 201 in FIG. 11 in the case where the steering control wheel is the rear wheel.

Therefore, according to the fourth aspect of the invention, it is possible to set the height a of the point of intersection to satisfy the aforesaid first and second conditions. Consequently, the stability of the posture control of the vehicle body can be enhanced appropriately, while restricting the oscillation phenomenon in the control system.

Further, the mobile vehicle of the present invention may be a mobile vehicle having a vehicle body and a front wheel and a rear wheel arranged spaced apart from each other in a longitudinal direction of the vehicle body, one of the front wheel and the rear wheel being a steering control wheel which can be steered about a steering axis tilted backward, the mobile vehicle including:

a steering actuator which generates a driving force for steering the steering control wheel; and a control device which controls the steering actuator so as to stabilize a posture of the vehicle body in accordance with at least an observed value of an inclination angle in a roll direction of the vehicle body, wherein in the case where a state in which the front wheel and the rear wheel of the mobile vehicle are both stationary in an upright posture in contact with a ground surface and axle centerlines of the front wheel and the rear wheel extend in parallel with each other in a direction orthogonal to the longitudinal direction of the vehicle body is defined as a basic posture state and in the case where a radius of curvature of a transverse cross-sectional shape of the steering control wheel at a ground contact point of the steering control wheel in the basic posture state of the mobile vehicle is denoted as Rs, the height a, from the ground surface, of a point of intersection of the steering axis of the steering control wheel and a virtual straight line connecting the ground contact point of the steering control wheel and the center of axle of the steering control wheel in the basic posture state is set to be not higher than the radius of curvature Rs (a fifth aspect of the invention).

That is, as explained above, it can be considered in the front-wheel steering two-wheeled vehicle 1 in FIG. 1 or the rear-wheel steering two-wheeled vehicle 201 in FIG. 11 that it is practically impossible that the center-of-gravity height h becomes equal to or lower than Rg which is defined by the aforesaid expression (25a).

In this case, when the height a of the point of intersection is set to be not higher than the aforesaid radius of curvature Rs, which is the radius of curvature of the transverse cross-sectional shape of the steering control wheel at the ground contact point of the steering control wheel in the basic posture state, then the height a of the point of intersection is eventually set to satisfy the first condition in the first aspect of the invention, as explained above.

Therefore, according to the fifth aspect of the invention, in the case where the posture of the vehicle body deviates from the stable vehicle body posture, the posture of the vehicle body can be stably restored to the stable vehicle body posture by the steering of the steering control wheel, as in the first aspect of the invention.

Consequently, according to the fifth aspect of the invention, it is possible to enhance the stability of the posture of the vehicle body by steering of the front wheel or the rear wheel which is the steering control wheel.

In the fifth aspect of the invention, it is more preferable that the height a is set to a level below the ground surface (a sixth aspect of the invention).

According to the sixth aspect of the invention, it is eventually possible to satisfy the second condition in the third aspect of the invention.

Additionally, the sensitivity of the restoring force (moment) of the posture of the vehicle body to the aforesaid stable vehicle body posture, which can be generated by the change in steering angle of the steering control wheel, can be enhanced.

Accordingly, it is suitably possible to enhance the stability of the control of the posture of the vehicle body, while suppressing an oscillation phenomenon in the control system.

It should be noted that in the first through sixth aspects of the invention, the processing of the steering control of the steering control wheel (control of the steering actuator) by the control device may not be the processing established on the premise of the aforesaid dynamics model having the mass points A and B.

The control device may adopt, by way of example, the following configuration. The control device includes, for example, an actuator operational target determining section which determines an operational target of the aforesaid steering actuator (desired steering angular acceleration etc.), in accordance with a deviation of an observed value of the inclination angle in the roll direction of the vehicle body, or a state quantity estimated from the observed value (state quantity related to the posture in the roll direction of the vehicle body, such as the motional state quantity of the aforesaid mass point A), from a desired value for stabilizing the posture of the vehicle body (desired value corresponding to the aforesaid stable vehicle body posture), so as to make the deviation approach zero, by a feedback control law. The control device is configured to control the steering actuator in accordance with the determined operational target.

Supplementally, in the present specification, the "observed value" of a given state quantity related to the mobile vehicle (such as the inclination angle in the roll direction of the vehicle body) means a detected value or an estimate of the actual value of the state quantity. In this case, the "detected value" means an actual value of the state quantity which is detected by an appropriate sensor. The "estimate" means a value which is estimated from a detected value of at least one state quantity having correlation with the state quantity, on the basis of the correlation, or it means a pseudo estimate which can be considered to coincide with, or almost coincide with, the actual value of the state quantity.

For the "pseudo estimate", for example in the case where it is expected that the actual value of the state quantity can adequately track a desired value of the state quantity, the desired value may be adopted as the pseudo estimate of the actual value of the state quantity.

BRIEF DESCRIPTION OF THE DRAWINGS

FIGS. 2A and 2B are diagrams each showing a mass point system model of the two-wheeled vehicle in FIG. 1;

DESCRIPTION OF THE PREFERRED EMBODIMENTS

First Embodiment

A first embodiment of the present invention will be described below with reference to FIGS. 16 to 32.

Figure 1:
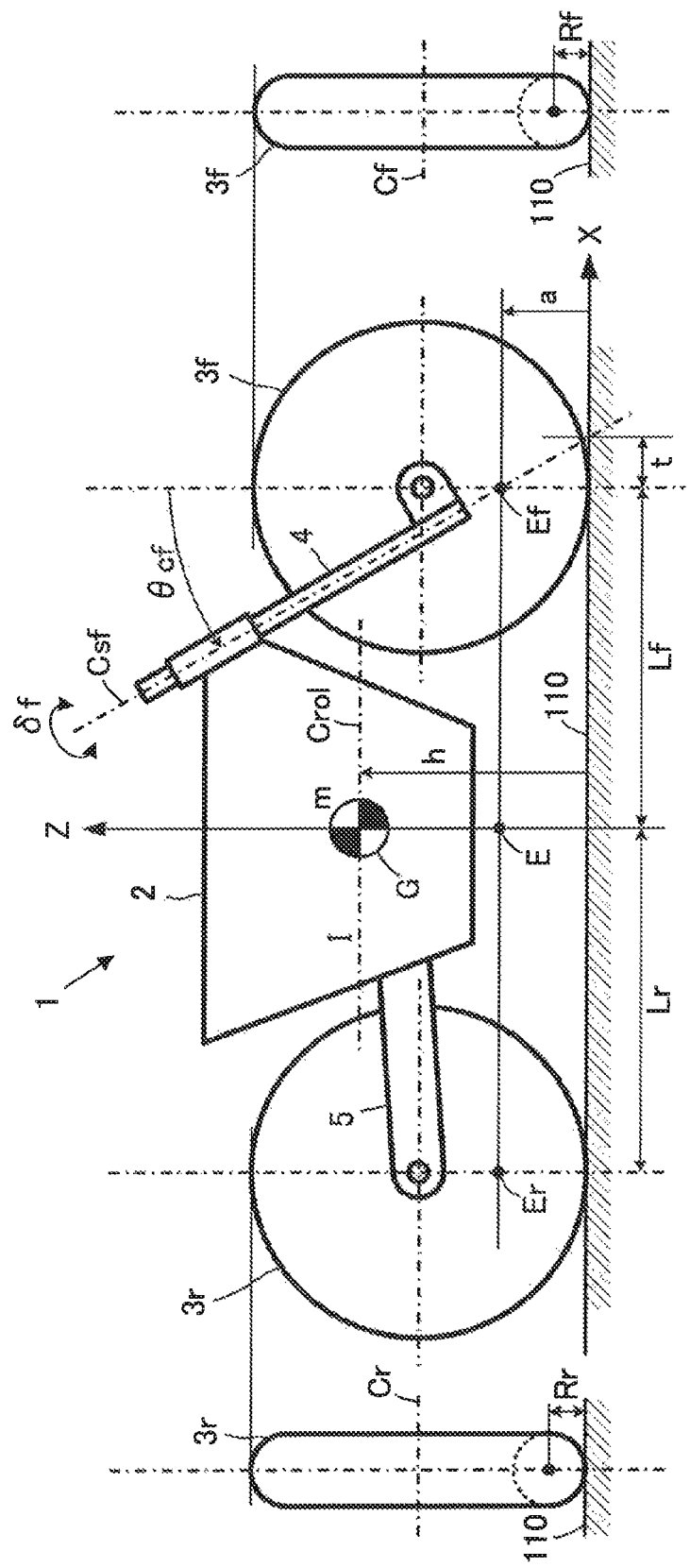
FIG. 1 is a diagram schematically showing a two-wheeled vehicle (front-wheel steering two-wheeled vehicle) for illustrating the fundamental technical matters related to the present invention.
Figure 3:
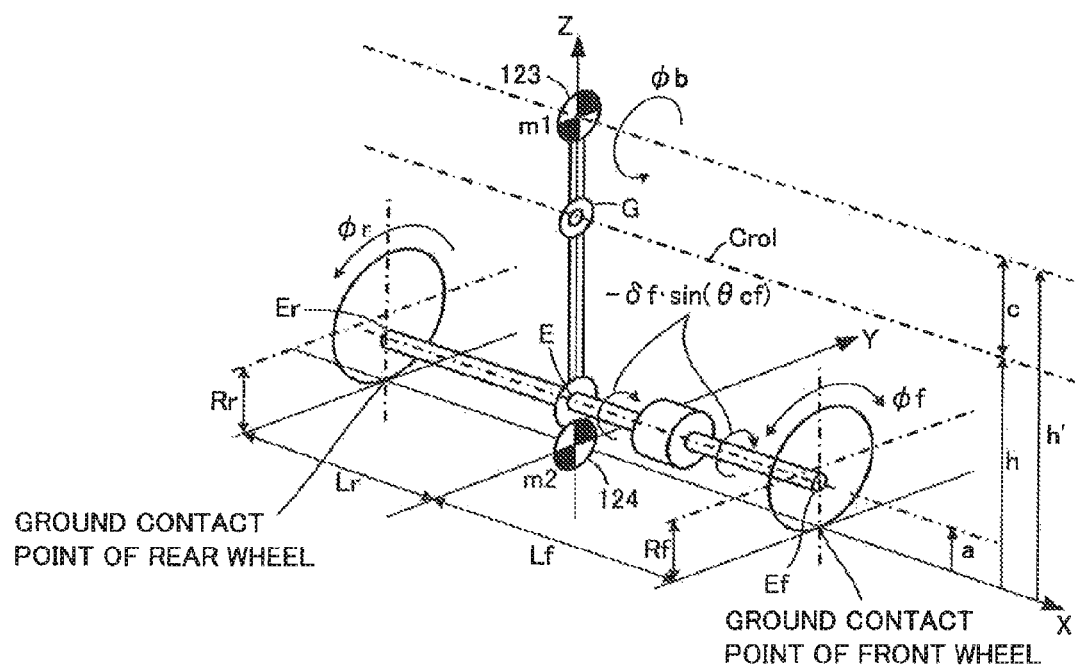
FIG. 3 is a diagram showing a model related to the behavior of the two-wheeled vehicle in FIG. 1.
Figure 4:
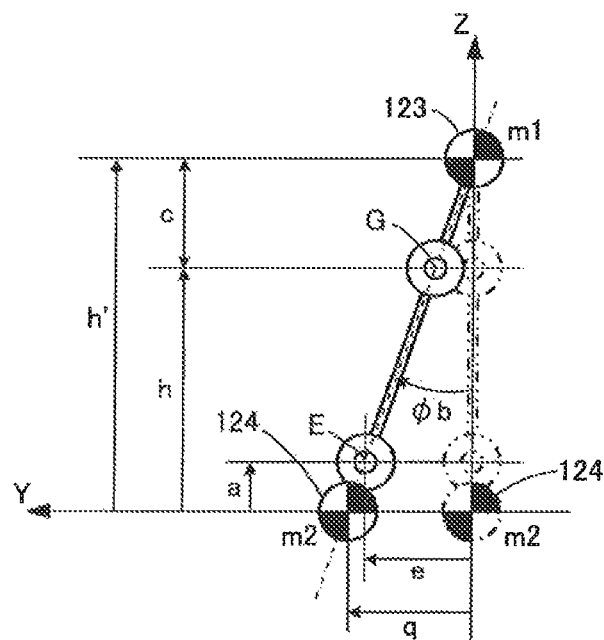
FIG. 4 is a diagram for illustrating the behavior of the model in FIG. 3.
Figure 5:
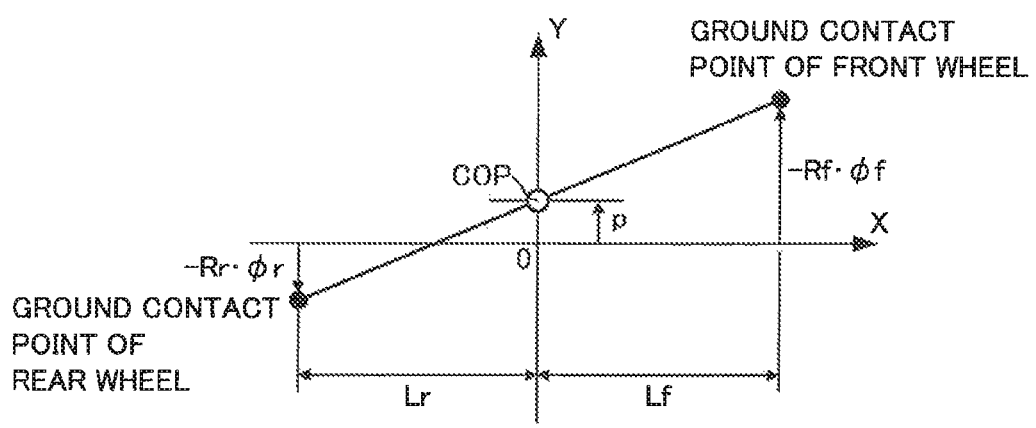
FIG. 5 is a graph for illustrating the behavior of the model in FIG. 3.
Figure 6:
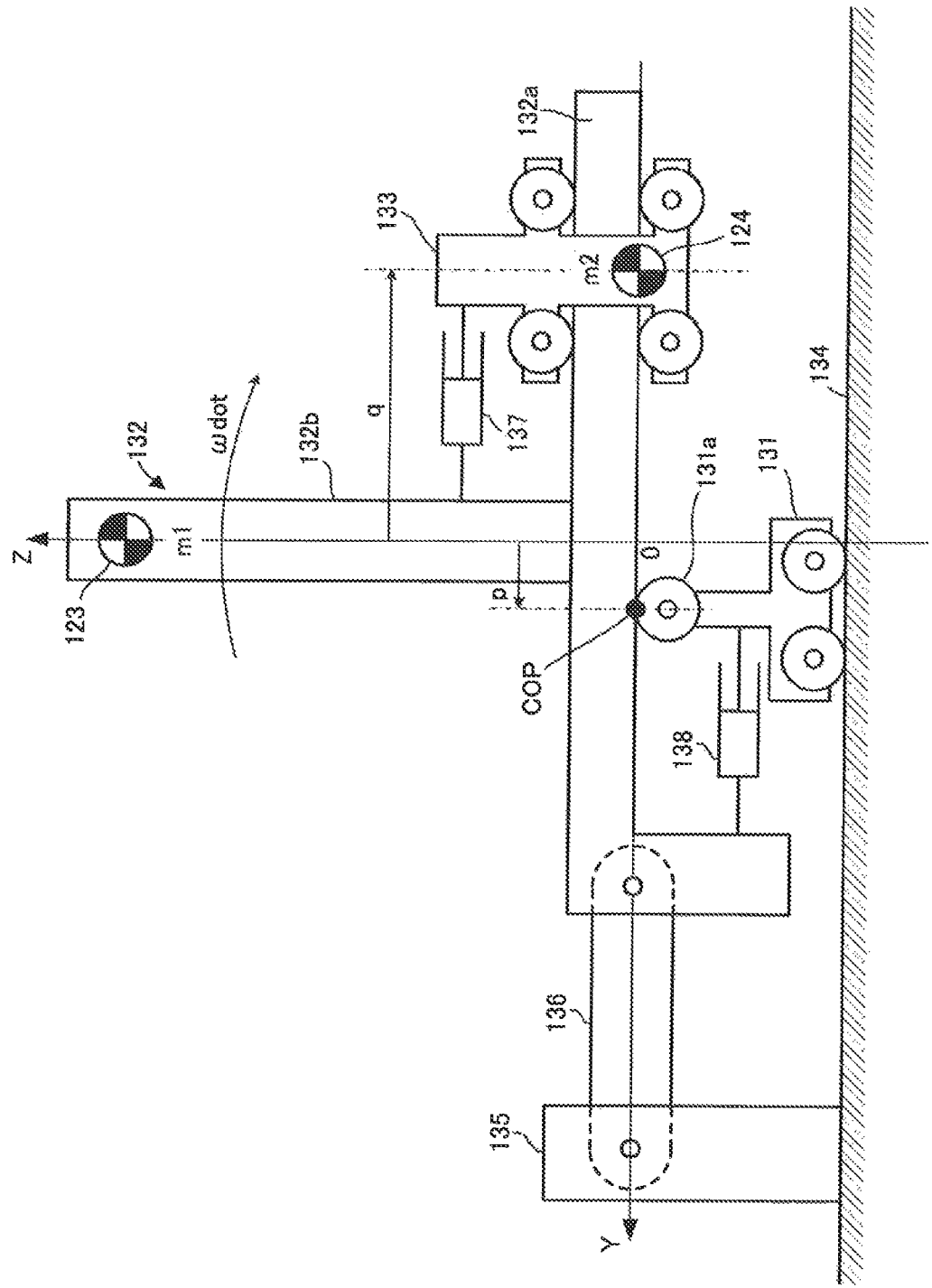
FIG. 6 is a diagram showing a model for illustrating a dynamic behavior of the two-wheeled vehicle in FIG. 1.
Figure 7:
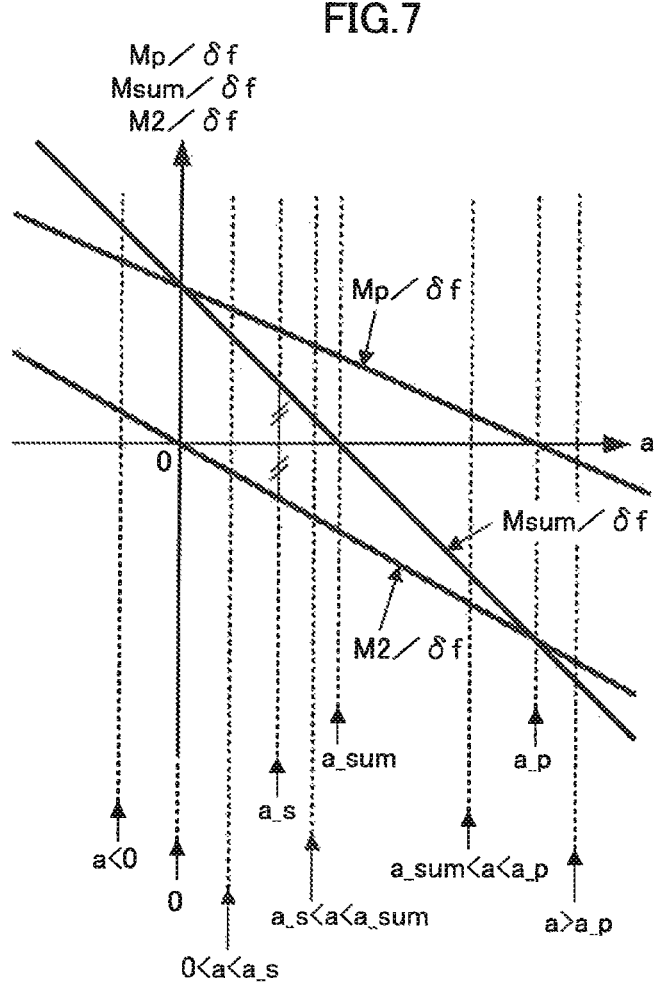
FIG. 7 is a graph showing the behavioral characteristics of the two-wheeled vehicle in FIG. 1.
Figure 8A:
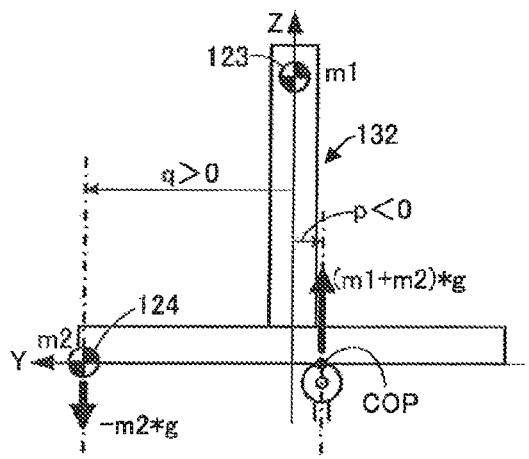
FIGS. 8A to 8D are diagrams for illustrating the behavioral characteristics of the two-wheeled vehicle in FIG. 1.
Figure 8B:
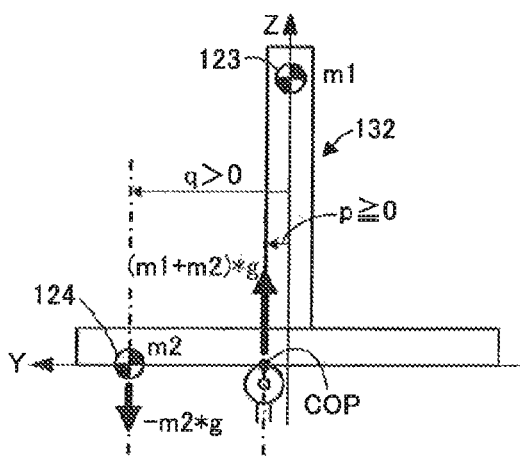
Figure 8C:
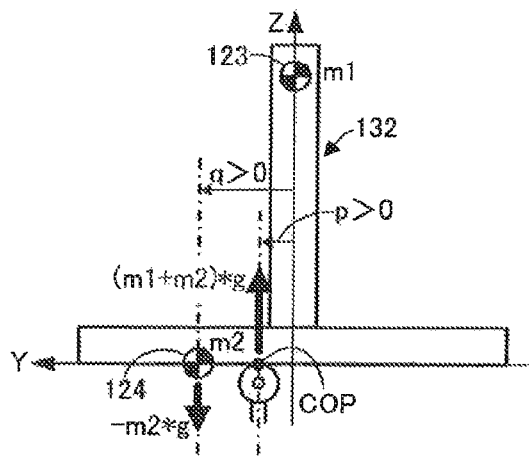
Figure 8D:
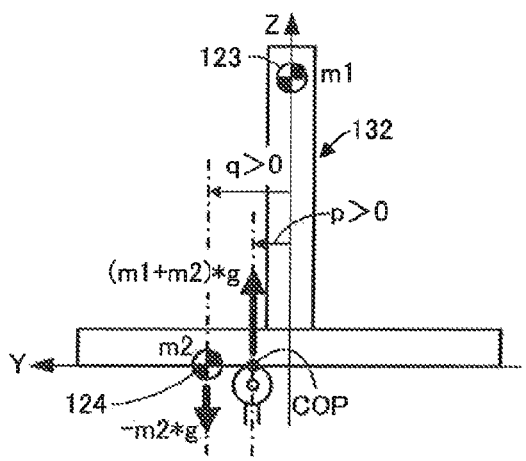
Figure 9A:
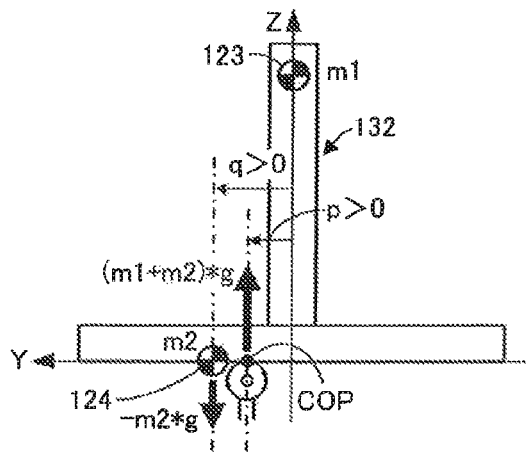
FIGS. 9A to 9D are diagrams for illustrating the behavioral characteristics of the two-wheeled vehicle in FIG. 1.
Figure 9B:
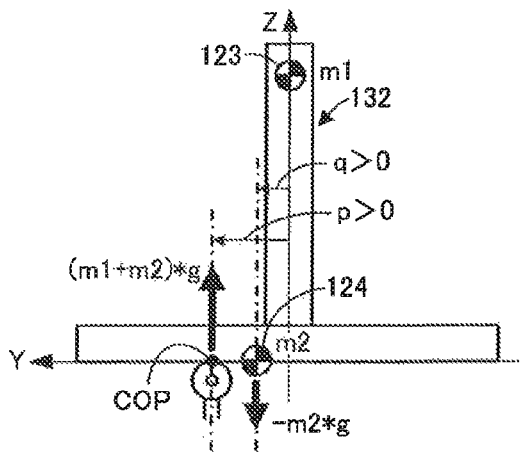
Figure 9C:
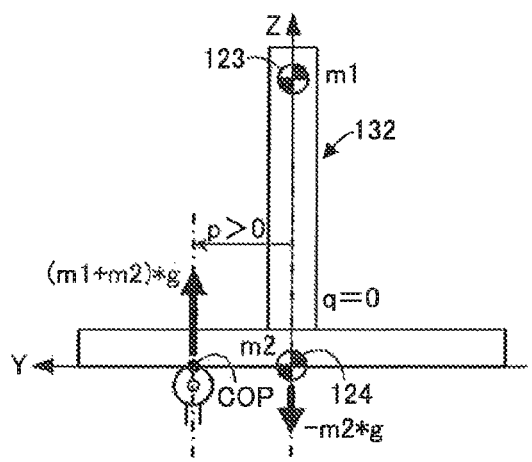
Figure 9D:
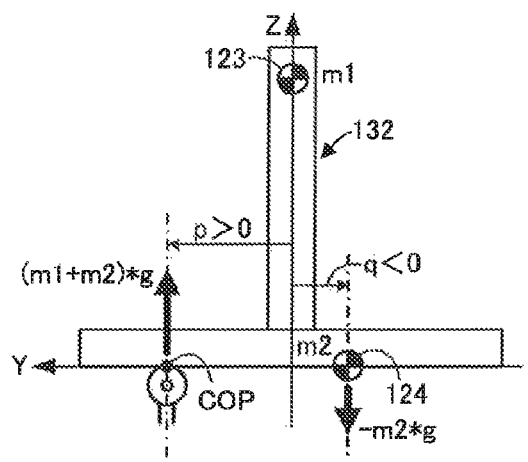
Figure 10:
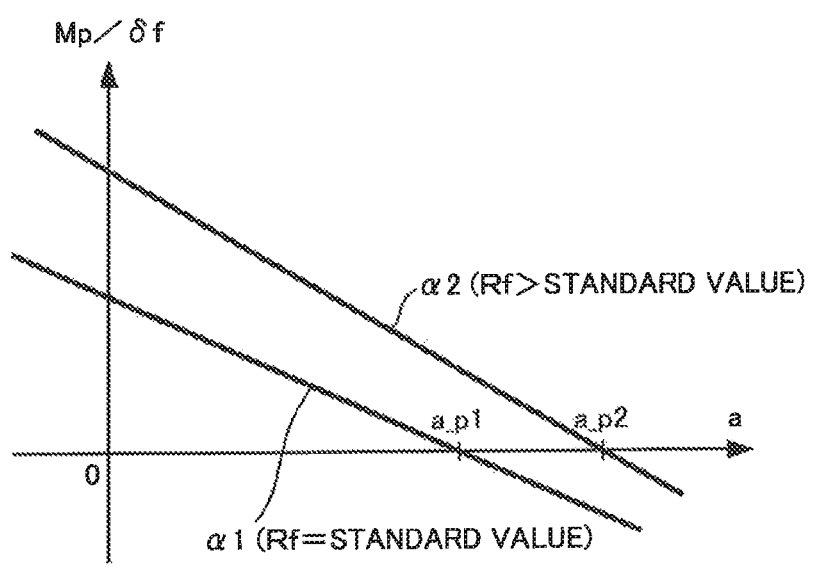
FIG. 10 is a graph showing the behavioral characteristics of the two-wheeled vehicle in FIG. 1.
Figure 16:
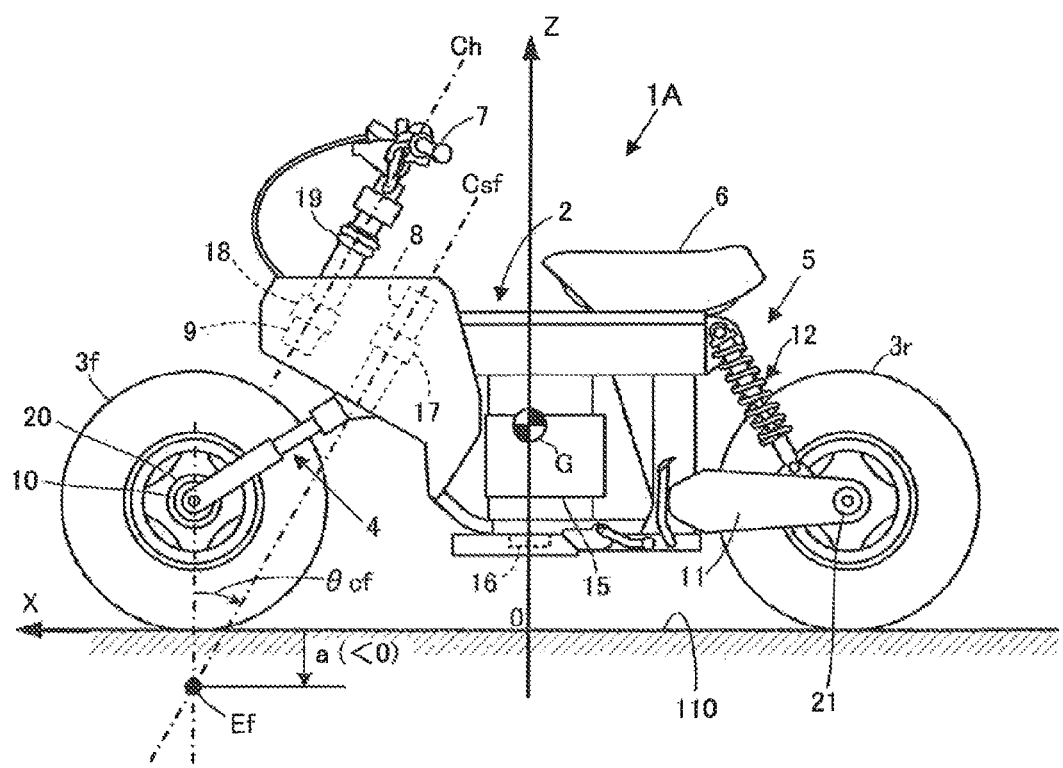
FIG. 16 is a side view of a mobile vehicle (two-wheeled vehicle) according to a first embodiment of the present invention.

Referring to FIG. 16, a mobile vehicle 1A according to the present embodiment is a two-wheeled vehicle embodying the front-wheel steering two-wheeled vehicle 1 shown in FIG. 1. In the description of the present embodiment, for convenience sake, the components of the mobile vehicle 1A having the same functions as those of the front-wheel steering two-wheeled vehicle 1 shown in FIG. 1 will be denoted by the same reference signs as those used in FIG. 1.

This mobile vehicle 1A (hereinafter, referred to as "two-wheeled vehicle 1A") has a vehicle body 2, and a front wheel 3f and a rear wheel 3r arranged spaced apart from each other in the longitudinal direction of the vehicle body 2.

On the upper surface of the vehicle body 2, a seat 6 is provided for a rider to sit astride.

At the front portion of the vehicle body 2, a front-wheel support mechanism 4 for axially supporting the front wheel 3f, a steering handlebar 7 for a rider who has sat on the seat 6 to hold, and actuators 8 and 9 are mounted. The actuator 8 generates a driving force for steering the front wheel 3f. The actuator 9 generates a driving force for moving the steering handlebar 7 in conjunction with the steering of the front wheel 3f.

The front-wheel support mechanism 4 is made up of a front fork which includes a suspension mechanism such as a damper, for example. The mechanical structure of the front-wheel support mechanism is similar to that of a conventional motorcycle, for example. At one end of this front-wheel support mechanism 4 (at its end on the front side of the vehicle body 2), the front wheel 3f is axially supported, via bearings or the like, such that it can rotate about the axle centerline Cf (rotational axis of the front wheel 3f) that extends in the direction orthogonal to the diameter direction of the front wheel 3f (in the direction perpendicular to the paper plane of FIG. 16).

In the present embodiment, an actuator 10 for rotatively driving the front wheel 3f about its axle centerline Cf is attached to the axle of the front wheel 3f. The actuator 10 serves as a power engine which generates a thrust force for the two-wheeled vehicle 1A. In the present embodiment, this actuator 10 (hereinafter, also referred to as "front-wheel driving actuator 10") is made up of an electric motor (with a speed reducer).

It should be noted that the actuator 10 may be made up of a hydraulic actuator, for example, instead of the electric motor. Alternatively, the actuator 10 may be made up of an internal combustion engine. Furthermore, the actuator 10 may be attached to the vehicle body 2 at a position apart from the axle of the front wheel 3f, and the actuator 10 and the axle of the front wheel 3f may be connected by an appropriate power transmission device.

The front-wheel support mechanism 4 is mounted to the front portion of the vehicle body 2 such that the mechanism can rotate about a steering axis Csf which is tilted backward. This configuration makes the front wheel 3f serve as a steering control wheel which can be rotated, or, steered about the steering axis Csf together with the front-wheel support mechanism 4. As the steering axis Csf is tilted backward, the front wheel 3f has a positive caster angle ° cf.

In this case, in the two-wheeled vehicle 1A of the present embodiment, the relative arrangement of the steering axis Csf and the front wheel 3f in the basic posture state of the vehicle is set, as shown in FIG. 16, such that an intersection point Ef of the steering axis Csf and a straight line connecting the center of the axle of the front wheel 3f and the ground contact point thereof is located below a ground surface 110 in the basic posture state. Accordingly, the height a of the intersection point Ef from the ground surface 110 takes a negative value.

It should be noted that the basic posture state of the two-wheeled vehicle 1A is, as with the basic posture state of the two-wheeled vehicle 1 in FIG. 1, the state where the front wheel 3f and the rear wheel 3r are both stationary in the upright posture in contact with the ground surface 110 and the axle centerlines (centers of the rotational axes) Cf and Cr of the front wheel 3f and the rear wheel 3r extend in parallel with each other in the direction orthogonal to the longitudinal direction of the vehicle body 2.

The aforesaid actuator 8 generates, as a driving force for performing the steering of the front wheel 3f, a rotative driving force to cause the front wheel 3f to rotate about the steering axis Csf. In the present embodiment, this actuator 8 is made up of an electric motor (with a speed reducer). The actuator 8 (hereinafter, also referred to as "front-wheel steering actuator 8") is connected to the front-wheel support mechanism 4 so as to apply the rotative driving force about the steering axis Csf to the front-wheel support mechanism 4.

Accordingly, as the rotative driving force is applied from the front-wheel steering actuator 8 to the front-wheel support mechanism 4, the front-wheel support mechanism 4 is rotatively driven about the steering axis Csf together with the front wheel 3f. As a result, the front wheel 3f is steered by the rotative driving force from the front-wheel steering actuator 8.

It should be noted that the actuator 8 is not limited to the electric motor; it may be made up, for example, of a hydraulic actuator.

The steering handlebar 7 is mounted to the front portion of the vehicle body 2 such that the steering handlebar 7 can rotate about a handlebar axis Ch which is parallel to the steering axis Csf of the front wheel 3f. Although not shown in detail in the figure, this steering handlebar 7 is equipped with an accelerator grip, brake lever, turn signal switch, and so on, as with the handlebar of a conventional motorcycle.

The aforesaid actuator 9 generates, as a driving force for moving the steering handlebar 7, a rotative driving force for causing the steering handlebar 7 to rotate about the handlebar axis Ch. In the present embodiment, this actuator 9 is made up of an electric motor (with a speed reducer). The actuator 9 (hereinafter, also referred to as "handlebar driving actuator 9") is connected to the steering handlebar 7 so as to apply the rotative driving force about the handlebar axis Ch to the steering handlebar 7.

In the two-wheeled vehicle 1A of the present embodiment, as shown in FIG. 16, the handlebar axis Ch of the steering handlebar 7 is offset from the steering axis Csf of the front wheel 3f. Alternatively, the handlebar axis Ch may be arranged concentrically with the steering axis Csf. Still alternatively, the handlebar axis Ch may be tilted with respect to the steering axis Csf.

Further, the actuator 9 may be made up of a hydraulic actuator, for example, instead of the electric motor.

At the rear portion of the vehicle body 2, a rear-wheel support mechanism 5 for axially supporting the rear wheel 3r in a rotatable manner is mounted. The rear-wheel support mechanism 5 includes a swing arm 11, and a suspension mechanism 12 made up of a coil spring, damper, and so on. These mechanical structures are similar to those in the rear-wheel support mechanism in a conventional motorcycle, for example.

At one end of the swing arm 11 (at its end on the rear side of the vehicle body 2), the rear wheel 3r is axially supported, via bearings or the like, such that it can rotate about the axle centerline Cr (center of the rotational axis of the rear wheel 3r) that extends in the direction orthogonal to the diameter direction of the rear wheel 3r (in the direction perpendicular to the paper plane of FIG. 16). It should be noted that the rear wheel 3r is a non-steering control wheel.

Figure 17:
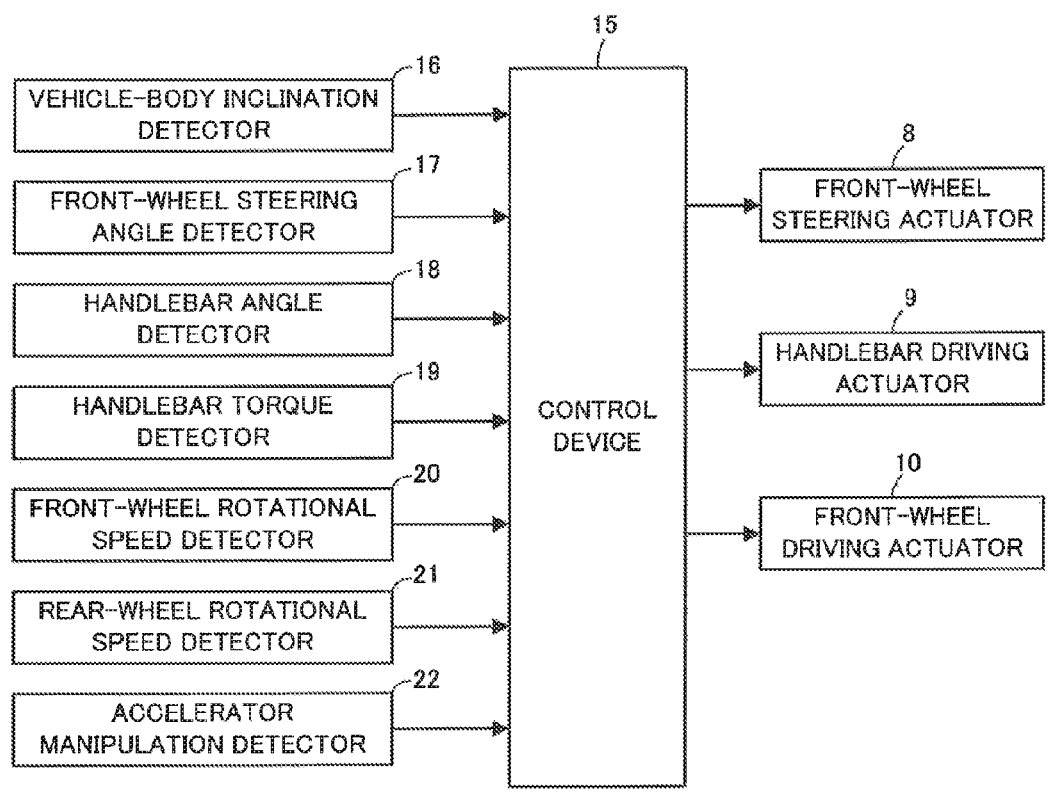
FIG. 17 is a block diagram showing the configuration related to the control of the mobile vehicle according to the first embodiment.

Besides the above-described mechanical configuration, the two-wheeled vehicle 1A includes, as shown in FIG. 17, a control device 15 which carries out control processing for controlling the operations of the aforesaid front-wheel steering actuator 8, handlebar driving actuator 9, and front-wheel driving actuator 10 (and, hence, controlling the posture of the vehicle body 2 and so on).

The two-wheeled vehicle 1A further includes, as sensors for detecting various kinds of state quantities necessary for the control processing in the control device 15, a vehicle-body inclination detector 16 for detecting an inclination angle $\phi b$ in the roll direction of the vehicle body 2, a front-wheel steering angle detector 17 for detecting a steering angle $\delta f$ (angle of rotation about the steering axis Csf) of the front wheel 3f, a handlebar angle detector 18 for detecting a handlebar angle $\delta h$ which is the rotational angle (angle of rotation about the handlebar axis Ch) of the steering handlebar 7, a handlebar torque detector 19 for detecting a handlebar torque Th which is the torque acting on the steering handlebar 7 about the handlebar axis Ch, a front-wheel rotational speed detector 20 for detecting a rotational speed (angular velocity) of the front wheel 3f, a rear-wheel rotational speed detector 21 for detecting a rotational speed (angular velocity) of the rear wheel 3r, and an accelerator manipulation detector 22 which outputs a detection signal corresponding to the accelerator manipulated variable which is the manipulated variable (rotational amount) of the accelerator grip of the steering handlebar 7.

It should be noted that the steering angle $\delta f$ of the front wheel 3f more specifically means the rotational angle of the front wheel 3f from the steering angle (neutral steering angle) in its non-steered state (the state in which the direction of the axle centerline Cf of the front wheel 3f corresponds to the direction orthogonal to the longitudinal direction of the vehicle body 2 (or, direction parallel to the Y axis)). Therefore, the steering angle δf of the front wheel 3f in the non-steered state is "0". The positive rotational direction of the steering angle δf of the front wheel 3f corresponds to the direction of rotation that makes the front end of the front wheel 3f turn left with respect to the vehicle body 2 (in other words, the direction in which the front wheel 3f turns counterclockwise about the steering axis Csf as the two-wheeled vehicle 1A is seen from above), as in the case of the two-wheeled vehicle 1 shown in FIG. 1.

Further, the handlebar angle δh of the steering handlebar 7 means the rotational angle of the steering handlebar 7 from its posture state corresponding to the non-steered state of the front wheel 3f. The positive rotational direction of the handlebar angle δh corresponds to the direction in which the steering handlebar 7 turns counterclockwise about the handlebar axis Ch as the two-wheeled vehicle 1A is seen from above.

The control device 15, which is an electronic circuit unit made up of a CPU, RAM, ROM, interface circuit and so on, is mounted on the vehicle body 2. This control device 15 is configured to receive outputs (detection signals) from the respective detectors 16 to 22 described above.

The control device 15 may include a plurality of CPUs or processors. Further, the control device 15 may be made up of a plurality of mutually communicable electronic circuit units.

The vehicle-body inclination detector 16, which is made up of an acceleration sensor and a gyro sensor (angular velocity sensor), for example, is mounted on the vehicle body 2. In this case, the control device 15 carries out arithmetic processing on the basis of the outputs of the acceleration sensor and the gyro sensor, to measure the inclination angle in the roll direction (more specifically, the inclination angle in the roll direction with respect to the vertical direction (direction of gravitational force)) of the vehicle body 2. For this measurement, the technique proposed by the present applicant in Japanese Patent No. 4181113, for example, may be adopted.

The front-wheel steering angle detector 17 is made up, for example, of a rotary encoder attached to the front-wheel steering actuator 8 (electric motor) on the aforesaid steering axis Csf.

The handlebar angle detector 18 is made up, for example, of a rotary encoder attached to the handlebar driving actuator 9 (electric motor) on the aforesaid handlebar axis Ch.

The handlebar torque detector 19 is made up, for example, of a force sensor interposed between the steering handlebar 7 and the handlebar driving actuator 9.

The front-wheel rotational speed detector 20 is made up, for example, of a rotary encoder attached to the axle of the front wheel 3f.

The rear-wheel rotational speed detector 21 is made up, for example, of a rotary encoder attached to the axle of the rear wheel 3r.

The accelerator manipulation detector 22 is made up, for example, of a rotary encoder or a potentiometer built in the steering handlebar 7.

The functions of the above-described control device 15 will be described further with reference to FIG. 18. The XYZ coordinate system used in the following description is, as in the case of the two-wheeled vehicle 1 in FIG. 1, a coordinate system in which, in the basic posture state of the two-wheeled vehicle 1A, the vertical direction (up-and-down direction) is defined as the Z-axis direction, the longitudinal direction of the vehicle body 2 as the X-axis direction, the lateral direction of the vehicle body 2 as the Y-axis direction, and a point on the ground surface 110 immediately beneath the overall center of gravity G of the two-wheeled vehicle 1A as the origin (see FIG. 16).

Further, in the following description, the suffix "_act" is added to the reference characters of a state quantity as a sign indicating an actual value or its observed value (detected value or estimate). For a desired value, the suffix "_cmd" is added.

Figure 18:
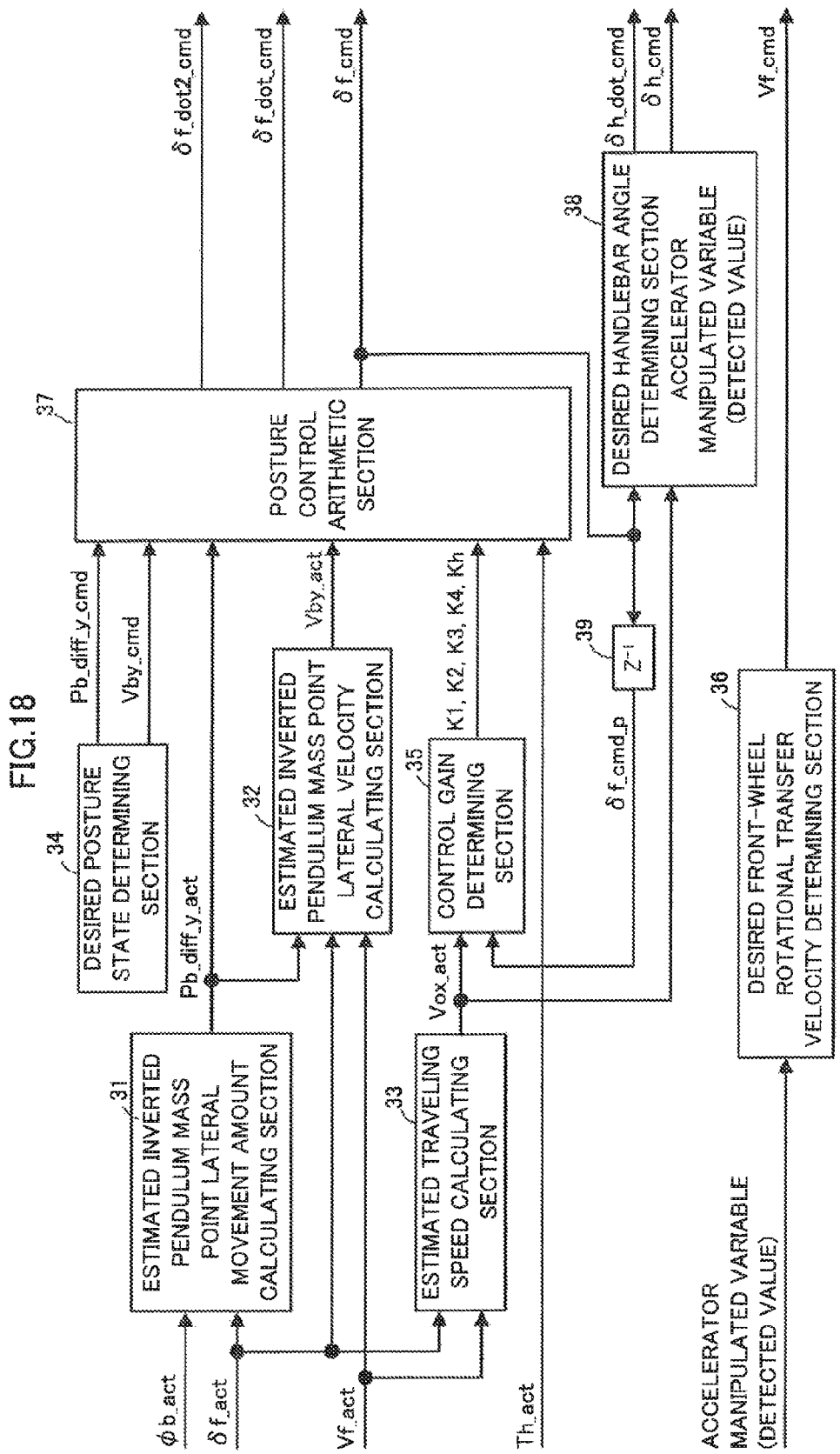
FIG. 18 is a block diagram showing the major functions of the control device shown in FIG. 17.

The control device 15 includes, as functions implemented when the CPU executes installed programs (functions implemented by software) or as functions implemented by hardware, as shown in FIG. 18: an estimated inverted pendulum mass point lateral movement amount calculating section 31 which calculates an estimate of an actual value $Pb\_diff\_y\_act$ (hereinafter, referred to as "estimated inverted pendulum mass point lateral movement amount $Pb\_diff\_y\_act$") of an inverted pendulum mass point lateral movement amount $Pb\_diff\_y$ representing a movement amount in the Y-axis direction (lateral direction of the vehicle body 2) of an inverted pendulum mass point 123 (=first mass point 123) of the two-wheeled vehicle 1A, an estimated inverted pendulum mass point lateral velocity calculating section 32 which calculates an estimate of an actual value $Vby\_act$ (hereinafter, referred to as "estimated inverted pendulum mass point lateral velocity $Vby\_act$") of an inverted pendulum mass point lateral velocity $Vby$ representing a translational velocity in the Y-axis direction (lateral direction of the vehicle body 2) of the inverted pendulum mass point 123, an estimated traveling speed calculating section 33 which calculates an estimate of the actual value $Vox\_act$ (hereinafter, referred to as "estimated traveling speed $Vox\_act$") of the traveling speed $Vox$ of the two-wheeled vehicle 1A, a desired posture state determining section 34 which determines a desired value $Pb\_diff\_y\_cmd$ (hereinafter, referred to as "desired inverted pendulum mass point lateral movement amount $Pb\_diff\_y\_cmd$") of the inverted pendulum mass point lateral movement amount $Pb\_diff\_y$ and a desired value $Vby\_cmd$ (hereinafter, referred to as "desired inverted pendulum mass point lateral velocity $Vby\_cmd$") of the inverted pendulum mass point lateral velocity $Vby$, a control gain determining section 35 which determines values of a plurality of gains K1, K2, K3, K4, and Kh for posture control of the vehicle body 2, and a desired front-wheel rotational transfer velocity determining section 36 which determines a desired value $Vf\_cmd$ (hereinafter, referred to as "desired front-wheel rotational transfer velocity $Vf\_cmd$") of the rotational transfer velocity $Vf$ of the front wheel 3f (translational velocity of the front wheel 3f as the front wheel 3f rolls on the ground surface 110).

The control device 15 further includes: a posture control arithmetic section 37 which carries out arithmetic processing for the posture control of the vehicle body 2 to thereby determine a desired value $\delta f\_cmd$ (hereinafter, referred to as "desired front-wheel steering angle $\delta f\_cmd$") of the steering angle $\delta f$ of the front wheel 3f, a desired value $\delta f\_dot\_cmd$ (hereinafter, referred to as "desired front-wheel steering angular velocity $\delta f\_dot\_cmd$") of the steering angular velocity $\delta f\_dot$ which is a temporal change rate of the steering angle $\delta f$, and a desired value $\delta f\_dot2\_cmd$ (hereinafter, referred to as "desired front-wheel steering angular acceleration $\delta f\_dot2\_cmd$") of the steering angular acceleration $\delta f\_dot2$ which is a temporal change rate of the steering angular velocity $\delta f\_dot$, and a desired handlebar angle determining section 38 which determines a desired value $\delta h\_cmd$ (hereinafter, referred to as "desired handlebar angle $\delta h\_cmd$") of the handlebar angle $\delta h$ of the steering handlebar 7, and a desired value $\delta h\_dot\_cmd$ (hereinafter, referred to as "desired handlebar angular velocity $\delta h\_dot\_cmd$") of the handlebar angular velocity δh_dot which is a temporal change rate of the handlebar angle δh.

The control device 15 carries out the processing in the above-described functional sections successively at prescribed control processing cycles. The control device 15 then controls the front-wheel steering actuator 8 in accordance with the desired front-wheel steering angle δf_cmd, the desired front-wheel steering angular velocity δf_dot_cmd, and the desired front-wheel steering angular acceleration δf_dot2_cmd determined by the posture control arithmetic section 37.

Further, the control device 15 controls the front-wheel driving actuator 10 in accordance with the desired front-wheel rotational transfer velocity Vf_cmd determined by the desired front-wheel rotational transfer velocity determining section 36.

Further, the control device 15 controls the handlebar driving actuator 9 in accordance with the desired handlebar angle δh_cmd and the desired handlebar angular velocity δh_dot_cmd determined by the desired handlebar angle determining section 38.

The control processing performed by the control device 15 will be described below in detail.

At each control processing cycle, the control device 15 first carries out the processing in the estimated inverted pendulum mass point lateral movement amount calculating section 31. It should be noted that the algorithm of the processing in the estimated inverted pendulum mass point lateral movement amount calculating section 31 in the present embodiment has been established assuming, by way of example, that the dynamic behavior of the two-wheeled vehicle 1A is expressed by the dynamic behavior that is obtained when the system in which a mass point and an inertia moment have been set only for the vehicle body 2 of the two-wheeled vehicle 1A, as in the two-wheeled vehicle 1 in FIG. 1, is equivalently transformed to the system, shown in FIG. 2B, which is made up of the aforesaid first mass point 123 (inverted pendulum mass point) and the second mass point 124.

As shown in FIG. 18, the estimated inverted pendulum mass point lateral movement amount calculating section 31 receives a detected value of the actual value φb_act (hereinafter, referred to as "detected roll angle φb_act") of the roll angle (inclination angle in the direction about the X axis direction)) φb of the vehicle body 2, and a detected value of the actual value δf_act (hereinafter, referred to as "detected front-wheel steering angle δf_act") of the steering angle δf of the front wheel 3f.

The detected roll angle φb_act is a detected value (observed value) indicated by an output from the vehicle-body inclination detector 16, and the detected front-wheel steering angle δf_act is a detected value (observed value) indicated by an output from the front-wheel steering angle detector 17.

Here, in the case where it is assumed that a mass point and an inertia moment are set only for the vehicle body 2 of the two-wheeled vehicle 1A and that the dynamic behavior of the two-wheeled vehicle 1A is expressed by the behavior of the mass point system made up of the first mass point 123 (inverted pendulum mass point) and the second mass point 124, the first mass point 123 and the second mass point 124 are on the plane of symmetry of the vehicle body 2 (plane of symmetry when the vehicle body 2 is considered to be bilaterally symmetrical), as described above. Therefore, the inclination in the roll direction of the line segment connecting the first mass point 123 and the second mass point 124 corresponds to the inclination in the roll direction of the vehicle body 2 of the two-wheeled vehicle 1A.

Accordingly, in the case where the inclination angle φb in the roll direction of the vehicle body 2 of the two-wheeled vehicle 1A is sufficiently small, the difference between the movement amount in the Y-axis direction of the first mass point 123 and the movement amount in the Y-axis direction of the second mass point 124 coincides with a value obtained by multiplying the inclination angle φb in the roll direction of the vehicle body 2 by the height h' of the first mass point 123.

Further, in the two-wheeled vehicle 1A of the present embodiment, the front wheel 3f alone is a steering control wheel. Therefore, the movement amount q in the Y-axis direction of the second mass point 124 is determined uniquely from the steering angle δf of the front wheel 3f, as explained above.

Accordingly, the movement amount in the Y-axis direction of the first mass point 123, which is the inverted pendulum mass point, is obtained as a sum of a component attributable to the inclination in the roll direction of the vehicle body 2 of the two-wheeled vehicle 1A and a component attributable to the steering angle δf of the front wheel 3f.

The estimated inverted pendulum mass point lateral movement amount calculating section 31 uses this relationship to calculate the estimated inverted pendulum mass point lateral movement amount Pb_diff_y_act on the basis of the detected roll angle φb_act and the detected front-wheel steering angle δf_act.

Figure 19:
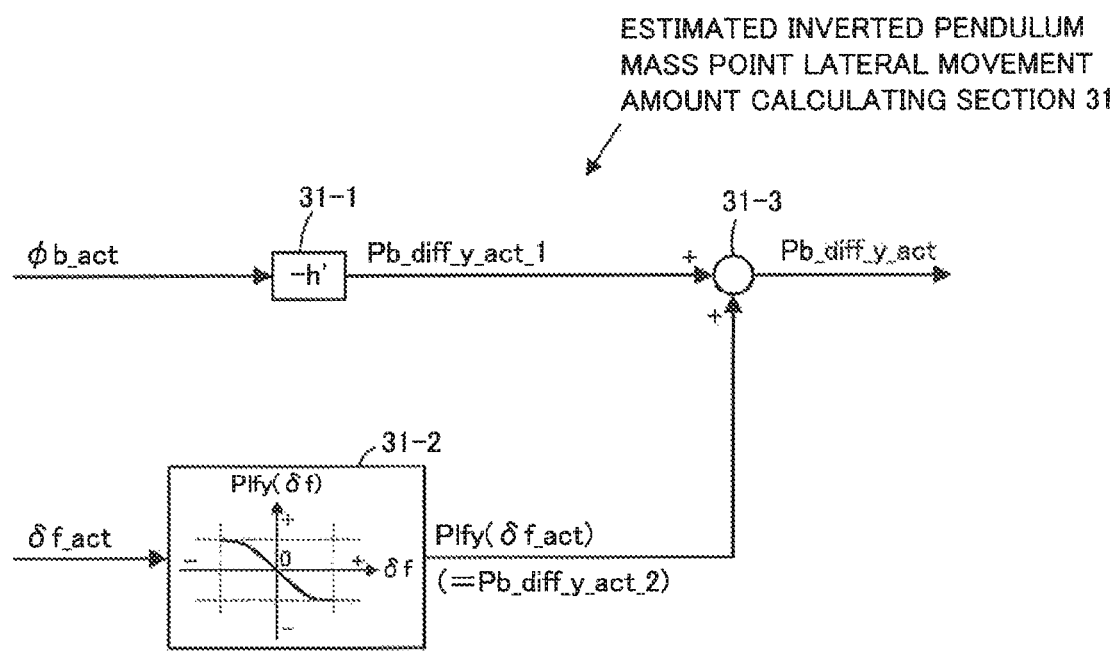
FIG. 19 is a block diagram showing the processing performed by the estimated inverted pendulum mass point lateral movement amount calculating section shown in FIG. 18.

More specifically, the estimated inverted pendulum mass point lateral movement amount calculating section 31 calculates the estimated inverted pendulum mass point lateral movement amount Pb_diff_y_act by the processing shown in the block diagram in FIG. 19.

This processing is configured to sum up a first estimated lateral movement amount component Pb_diff_y_act_1, which is an estimate of the actual movement amount in the Y-axis direction of the inverted pendulum mass point 123 caused by the inclination in the roll direction of the vehicle body 2, and a second estimated lateral movement amount component Pb_diff_y_act_2, which is an estimate of the actual movement amount in the Y-axis direction of the inverted pendulum mass point 123 caused by the steering of the front wheel 3f, to thereby calculate the estimated inverted pendulum mass point lateral movement amount Pb_diff_y_act.

In FIG. 19, a processing section 31-1 represents a processing section which obtains the first estimated lateral movement amount component Pb_diff_y_act_1, a processing section 31-2 represents a processing section which obtains the second estimated lateral movement amount component Pb_diff_y_act_2, and a processing section 31-3 represents a processing section which sums up the first estimated lateral movement amount component Pb_diff_y_act_1 and the second estimated lateral movement amount component Pb_diff_y_act_2.

The processing section 31-1 determines the first estimated lateral movement amount component Pb_diff_y_act_1 in accordance with the detected roll angle φb_act at the current time. More specifically, the processing section 31-1 multiplies the detected roll angle φb_act (angle value in [rad]) by the height h' (=c+h), multiplied by −1, of the inverted pendulum mass point 123, to calculate the first estimated lateral movement amount component Pb_diff_y_act_1 (=φb_act*(−h')).

Accordingly, the first estimated lateral movement amount component Pb_diff_y_act_1 is calculated, in accordance with the detected roll angle φb_act, as a value of a linear function with respect to the roll angle φb of the vehicle body 2 (a value of a constant multiple of φb). Further, Pb_diff_y_act_1 becomes zero in the state where φb_act=0 (where the vehicle body 2 is not leaned to the right or left), and therefore, it is the movement amount in the Y-axis direction with reference to the position of the inverted pendulum mass point 123 in that state.

It should be noted that sin(φb_act) is approximated by φb_act in the calculating processing in the processing section 31-1. Further, the value of h' (or c, h) has been preset in the two-wheeled vehicle 1A and is stored in a memory in the control device 15. For example, the value has been set to satisfy the relationship in the aforesaid expression (5b) (the relationship that c(=h'−h)=I/(m*h)), from the height h of the overall center of gravity G in the basic posture state of the two-wheeled vehicle 1A, the overall inertia I of the two-wheeled vehicle 1A (inertia moment about the axis passing through the overall center of gravity G and parallel to the X-axis direction), and the total mass m of the two-wheeled vehicle 1A.

The value of h', however, may be set to a value roughly approximating the value satisfying the relationship in the above expression (5b) such that optimal control characteristics can be obtained on the basis of various experiments, simulation, etc.

The processing section 31-2 in FIG. 19 determines the second estimated lateral movement amount component Pb_diff_y_act_2 in accordance with the detected front-wheel steering angle δf_act at the current time. More specifically, the processing section 31-2 obtains the second estimated lateral movement amount component Pb_diff_y_act_2 (=Plfy(δf_act)) from the detected front-wheel steering angle δf_act at the current time, by a preset conversion function Plfy(δf). That is, the processing section 31-2 obtains a value Plfy(δf_act) of the conversion function Plfy(δf) corresponding to δf_act, and determines the obtained value as the second estimated lateral movement amount component Pb_diff_y_act_2.

The above conversion function Plfy(δf) is defined, for example, by a mapping or an arithmetic expression. The conversion function Plfy(δf) is a nonlinear function which has been preset, as illustrated by the graph shown in the processing section 31-2 in FIG. 19, such that it monotonically changes (in the present embodiment, monotonically decreases) with increasing steering angle δf of the front wheel 3f, and such that the magnitude of the rate of change of Plfy(δf) with respect to the steering angle δf (the amount of change of Plfy(δf) per unit increase of δf) becomes relatively small in the region where the magnitude (absolute value) of the steering angle δf of the front wheel 3f is relatively large, compared to that in the region where the magnitude of the steering angle δf is small (region where δf is near zero).

Accordingly, the second estimated lateral movement amount component Pb_diff_y_act_2 is determined, in accordance with the detected front-wheel steering angle δf_act, as a value of a nonlinear function with respect to the steering angle δf of the front wheel 3f.

The estimated inverted pendulum mass point lateral movement amount calculating section 31 determines the estimated inverted pendulum mass point lateral movement amount Pb_diff_y_act by summing up, in the processing section 31-3, the first estimated lateral movement amount component Pb_diff_y_act_1 and the second estimated lateral movement amount component Pb_diff_y_act_2 calculated in the above-described manner.

Accordingly, the estimated inverted pendulum mass point lateral movement amount Pb_diff_y_act is determined by the following expression (51).

$$Pb\_diff\_y\_act = \qquad\qquad (51)$$
$$Pb\_diff\_y\_act\_1 + Pb\_diff\_y\_act\_2 = \phi b\_act * (-h') + Plfy(\delta f\_act)$$

In the above expression (51), the first term on the right side is a linear term with respect to the detected roll angle φb_act, and the second term on the right side is a nonlinear term with respect to the detected front-wheel steering angle δf_act.

It should be noted that the second term on the right side of the expression (51) can be ignored when the magnitude of the value Plfy(δf_act) of the aforesaid conversion function Plfy(δf) corresponding to the actual steering angle δf_act of the front wheel 3f is sufficiently small (when the magnitude of δf_act is small). In this case, the detected roll angle φb_act of the vehicle body 2 may be used instead of the estimated inverted pendulum mass point lateral movement amount Pb_diff_y_act.

With this configuration, the processing in the estimated inverted pendulum mass point lateral movement amount calculating section 31 becomes unnecessary, and the computational load of the control device 15 can be reduced.

Next, the control device 15 carries out the processing in the estimated inverted pendulum mass point lateral velocity calculating section 32.

As shown in FIG. 18, the estimated inverted pendulum mass point lateral velocity calculating section 32 receives the estimated inverted pendulum mass point lateral movement amount Pb_diff_y_act calculated in the estimated inverted pendulum mass point lateral movement amount calculating section 31, a detected front-wheel steering angle δf_act, and an estimate of the actual value Vf_act (hereinafter, referred to as "estimated front-wheel rotational transfer velocity Vf_act") of the rotational transfer velocity Vf of the front wheel 3f.

It should be noted that the estimated front-wheel rotational transfer velocity Vf_act is a velocity which is calculated by multiplying a detected value (observed value) of the rotational angular velocity of the front wheel 3f, indicated by an output from the aforesaid front-wheel rotational speed detector 20, by a predetermined effective rolling radius of the front wheel 3f.

Figure 20:
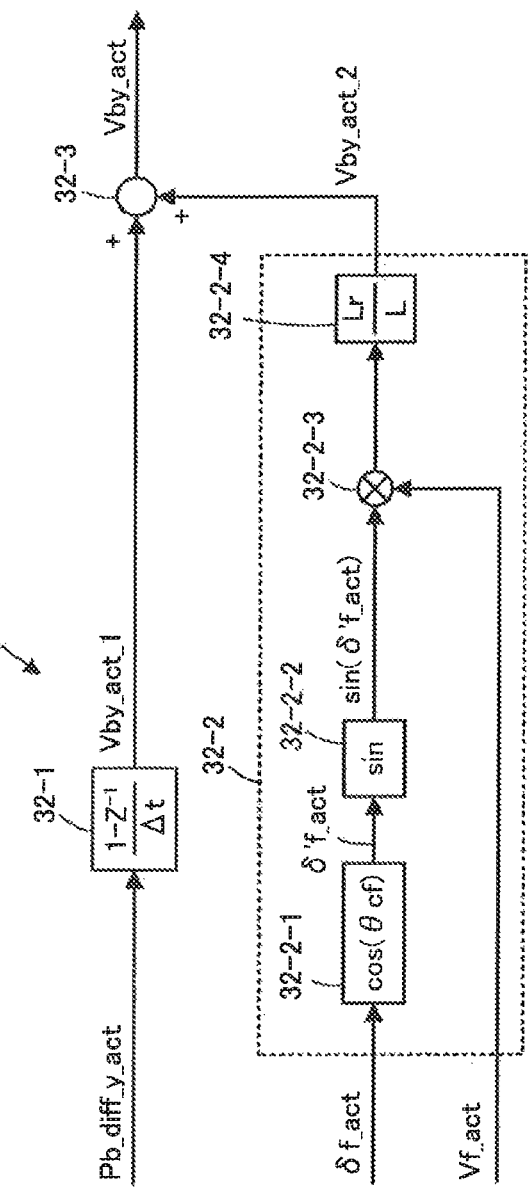
FIG. 20 is a block diagram showing the processing performed by the estimated inverted pendulum mass point lateral velocity calculating section shown in FIG. 18.

The estimated inverted pendulum mass point lateral velocity calculating section 32 carries out the processing shown in the block diagram in FIG. 20 to calculate an estimated inverted pendulum mass point lateral velocity Vby_act.

This processing is configured to sum up a first estimated lateral velocity component Vby_act_1, which is an estimate of the actual transfer velocity (relative to the origin) in the Y-axis direction of the inverted pendulum mass point 123 as seen from the origin of the XYZ coordinate system set in the above-described manner for the two-wheeled vehicle 1A, and a second estimated lateral velocity component Vby_act_2, which is an estimate of the actual transfer velocity in the Y-axis direction of the inverted pendulum mass point 123 (=transfer velocity of the origin of the XYZ coordinate system) caused by the translational movement of the two-wheeled vehicle 1A accompanying the rolling of the front wheel 3f while the front wheel 3f is being steered (when the actual steering angle of the front wheel 3f is not "0"), to thereby calculate the estimated inverted pendulum mass point lateral velocity Vby_act.

In FIG. 20, a processing section 32-1 represents a processing section which obtains the first estimated lateral velocity component Vby_act_1, a processing section 32-2 represents a processing section which obtains the second estimated lateral velocity component Vby_act_2, and a processing section 32-3 represents a processing section which sums up the first estimated lateral velocity component Vby_act_1 and the second estimated lateral velocity component Vby_act_2.

The processing section 32-1 calculates, as the first estimated lateral velocity component Vby_act_1, a temporal change rate Pb_diff_y_dot_act (amount of change per unit time) at the current time of the estimated inverted pendulum mass point lateral movement amount Pb_diff_y_act successively calculated by the estimated inverted pendulum mass point lateral movement amount calculating section 31. That is, the processing section 32-1 calculates a differential value Pb_diff_y_dot_act of Pb_diff_y_act as Vby_act_1.

Further, the processing section 32-2 multiplies, in a processing section 32-2-1, a detected front-wheel steering angle δf_act at the current time by a cosine value cos(θcf) of the caster angle θcf of the front wheel 3f, to thereby calculate an estimate of the actual value δ'f_act (hereinafter, referred to as "estimated front-wheel effective steering angle δ'f_act") of a front-wheel effective steering angle δ'f which corresponds to the rotational angle in the yaw direction of the front wheel 3f.

Supplementally, the front-wheel effective steering angle δ'f is an angle of the line of intersection of the ground surface 110 and the rotational plane of the front wheel 3f being steered (plane passing through the center of the axle of the front wheel 3f and orthogonal to the axle centerline Cf of the front wheel 3f) with respect to the longitudinal direction (X-axis direction) of the vehicle body 2.

In the case where the roll angle φb of the vehicle body 2 is relatively small, the estimated front-wheel effective steering angle δ'f_act can be calculated approximately by the following expression (52). The processing in the above-described processing section 32-2-1 is the process of approximately calculating δ'f_act by the expression (52).

$$\delta'f\_act = \cos(\theta cf) * \delta f\_act \tag{52}$$

To further improve the accuracy of δ'f_act, δ'f_act may be obtained by a mapping from δf_act. Alternatively, to still further improve the accuracy of δ'f_act, δ'f_act may be obtained by a mapping (two-dimensional mapping) or the like from δf_act and a detected roll angle φb_act.

The processing section 32-2 further calculates a sine value sin(δ'f_act) of the calculated, estimated front-wheel effective steering angle δ'f_act and multiplies the estimated front-wheel rotational transfer velocity Vf_act at the current time by the sine value, in a processing section 32-2-2 and a processing section 32-2-3, to thereby calculate a transfer velocity in the Y-axis direction (in other words, a component in the Y-axis direction of Vf_act) of the ground contact part of the front wheel 3f.

Further, the processing section 32-2 multiplies, in a processing section 32-2-4, the value as a result of calculation in the processing section 32-2-3 by Lr/L (where L=Lf+Lr), to obtain a second estimated lateral velocity component Vby_act_2 (=Vf_act*sin(δ'f_act)*(Lr/L)).

It should be noted that the above-described Lr and Lf in this processing have the same meanings as those in the two-wheeled vehicle 1 in FIG. 1. That is, Lr refers to a distance in the X-axis direction between the ground contact point of the rear wheel 3r and the overall center of gravity G in the basic posture state of the two-wheeled vehicle 1A, and Lf refers to a distance in the X-axis direction between the ground contact point of the front wheel 3f and the overall center of gravity G in the basic posture state of the two-wheeled vehicle 1A.

The values of Lr and Lf have been preset for the two-wheeled vehicle 1A and are stored in a memory in the control device 15.

The value of the caster angle θcf used in the processing in the processing section 32-2 has also been preset for the two-wheeled vehicle 1A, as with the values of Lf and Lr, and is stored in the memory in the control device 15.

The estimated inverted pendulum mass point lateral velocity calculating section 32 sums up, in the processing section 32-3, the first estimated lateral velocity component Vby_act_1 and the second estimated lateral velocity component Vby_act_2 calculated in the above-described manner, to calculate an estimated inverted pendulum mass point lateral velocity Vby_act.

Accordingly, the estimated inverted pendulum mass point lateral velocity Vby_act is calculated by the following expression (53).

$$\begin{aligned} Vby\_act &= Vby\_act\_1 + Vby\_act\_2 \\ &= Pb\_diff\_y\_dot\_act + Vf\_act * \sin(\delta'f\_act) * (Lr/L) \\ &= Pb\_diff\_y\_dot\_act + Vf\_act * \sin(\delta f\_act * \cos(\theta cf)) * (Lr/L) \end{aligned} \tag{53}$$

It should be noted that in the case where the magnitude of the value of the aforesaid conversion function Plfy(δf) corresponding to the actual steering angle δf_act of the front wheel 3f is sufficiently small (when the magnitude of δf_act is small), a differential value of the value of Pb_diff_y_act obtained by ignoring the second term on the right side of the expression (51) may be adopted as Pb_diff_y_dot_act for use in the expression (53). That is, in the expression (53), a value, multiplied by -h', of the differential value of the detected roll angle φb_act of the vehicle body 2 may be used instead of Pb_diff_y_dot_act. With this configuration, the computational load of the control device 15 can be reduced.

Next, the control device 15 carries out the processing in the estimated traveling speed calculating section 33.

As shown in FIG. 18, the estimated traveling speed calculating section 33 receives the aforesaid estimated front-wheel rotational transfer velocity Vf_act and the aforesaid detected front-wheel steering angle δf_act.

Figure 21:
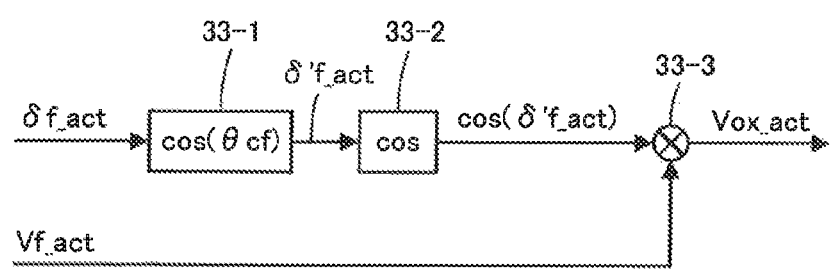
FIG. 21 is a block diagram showing the processing performed by the estimated traveling speed calculating section shown in FIG. 18.

The estimated traveling speed calculating section 33 carries out the processing shown in the block diagram in FIG. 21 to calculate an estimated traveling speed Vox_act.

In FIG. 21, a processing section 33-1 represents a processing section which multiplies a detected front-wheel steering angle δf_act at the current time by a cosine value of the caster angle θcf of the front wheel 3f (as in the aforesaid expression (52)) to obtain the estimated front-wheel effective steering angle δ'f_act, which has been described above in conjunction with the processing section 32-2 in the estimated inverted pendulum mass point lateral velocity calculating section 32, a processing section 33-2 represents a processing section which obtains a cosine value cos (δ'f_act) of the estimated front-wheel effective steering angle δ'f_act, and a processing section 33-3 represents a processing section which multiplies an estimated front-wheel rotational transfer velocity Vf_act at the current time by the above-described cosine value cos(δ'f_act) to thereby calculate an estimated traveling speed Vox_act.

Accordingly, the estimated traveling speed calculating section 33 is configured to calculate Vox_act by multiplying Vf_act by the cosine value cos(δ'f_act) of δ'f_act. That is, Vox_act is calculated by the following expression (54).

$$Vox\_act = Vf\_act * cos(\delta'f\_act) \quad (54)$$
$$= Vf\_act * cos(\delta f\_act * cos(\theta cf))$$

The estimated traveling speed Vox_act calculated in this manner corresponds to a component in the X-axis direction of the estimated front-wheel rotational transfer velocity Vf_act.

It should be noted that for the estimated front-wheel effective steering angle δ'f_act, the value calculated by the estimated inverted pendulum mass point lateral velocity calculating section 32 as it is may be used. In this case, it is unnecessary to supply the detected front-wheel steering angle δf_act to the estimated traveling speed calculating section 33, and the processing section 33-1 is also unnecessary.

Further, instead of the detected front-wheel steering angle δf_act and the estimated front-wheel rotational transfer velocity Vf_act at the current time, a value (last time's value) δf_cmd_p of the desired front-wheel steering angle δf_cmd, calculated by the posture control arithmetic section 37 (described later) in the last time's control processing cycle, and a value (last time's value) Vf_cmd_p of the desired front-wheel rotational transfer velocity Vf_cmd, calculated by the desired front-wheel rotational transfer velocity determining section 36 (described later) in the last time's control processing cycle, respectively, may be used. More specifically, δf_cmd_p and Vf_cmd_p may be used to perform computation similar to that in the right side of the above expression (54), and the resultant value (=Vf_cmd_p*cos(δf_cmd_p*cos(θcf))) may be obtained as a pseudo estimate (alternative observed value) as an alternative to the estimated traveling speed Vox_act.

Further, in obtaining the pseudo estimate (alternative observed value) as an alternative to the estimated traveling speed Vox_act, δf_cmd_p may be used instead of the detected front-wheel steering angle δf_act at the current time, and the estimated front-wheel rotational transfer velocity Vf_act may be used as it is. Conversely, Vf_cmd_p may be used instead of the estimated front-wheel rotational transfer velocity Vf_act at the current time, and the detected front-wheel steering angle δf_act may be used as it is.

Furthermore, a value of the actual rotational transfer velocity of the rear wheel 3r estimated on the basis of an output from the rear-wheel rotational speed detector 21 (specifically, a value obtained by multiplying the rotational angular velocity of the rear wheel 3r, indicated by the output from the rear-wheel rotational speed detector 21, by a predetermined effective rolling radius of the rear wheel 3r) may be obtained as the estimated traveling speed Vox_act.

Next, the control device 15 carries out the processing in the desired front-wheel rotational transfer velocity determining section 36.

As shown in FIG. 18, the desired front-wheel rotational transfer velocity determining section 36 receives a detected value of the actual value of the accelerator manipulated variable, which is indicated by an output from the aforesaid accelerator manipulation detector 22.

Figure 25:
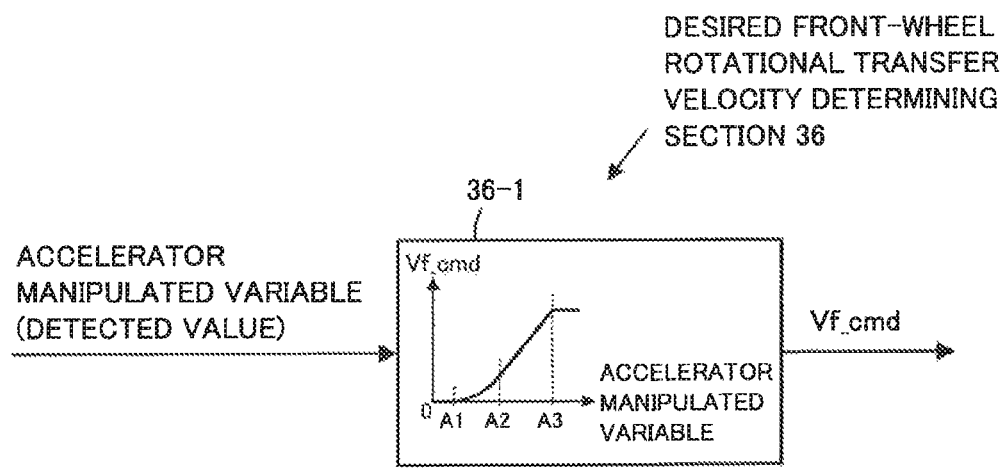
FIG. 25 is a block diagram showing the processing performed by the desired front-wheel rotational transfer velocity determining section shown in FIG. 18.

The desired front-wheel rotational transfer velocity determining section 36 determines a desired front-wheel rotational transfer velocity Vf_cmd by the processing shown in the block diagram in FIG. 25, i.e. the processing in a processing section 36-1.

The processing section 36-1 determines the desired front-wheel rotational transfer velocity Vf_cmd from a detected value of the accelerator manipulated variable at the current time, by a preset conversion function.

The conversion function is a function which is defined, for example, by a mapping or an arithmetic expression. This conversion function is basically set such that Vf_cmd determined by the conversion function increases monotonically as the accelerator manipulated variable increases.

The conversion function is set, for example, with the trend as illustrated by the graph in FIG. 25. In this case, the processing section 36-1 determines Vf_cmd to be zero when the detected value of the accelerator manipulated variable falls within the dead band range (range near zero) from zero to a prescribed first accelerator manipulated variable A1.

Further, when the detected value of the accelerator manipulated variable falls within the range from the first accelerator manipulated variable A1 to a prescribed second accelerator manipulated variable A2 (>A1), the processing section 36-1 determines Vf_cmd such that Vf_cmd increases monotonically as the accelerator manipulated variable increases and that the rate of increase of Vf_cmd (increase of Vf_cmd per unit increase of the accelerator manipulated variable) increases smoothly.

When the detected value of the accelerator manipulated variable falls within the range from the second accelerator manipulated variable A2 to a prescribed third accelerator manipulated variable A3 (>A2), the processing section 36-1 determines Vf_cmd such that Vf_cmd increases monotonically, at a constant rate of increase, as the accelerator manipulated variable increases.

Further, when the detected value of the accelerator manipulated variable exceeds the third accelerator manipulated variable A3, the processing section 36-1 determines Vf_cmd such that it remains at a constant value (at the value corresponding to A3).

Next, the control device 15 carries out the processing in the control gain determining section 35. As shown in FIG. 18, the control gain determining section 35 receives, via a delay element 39, a last time's desired front-wheel steering angle δf_cmd_p, which is a value (last time's value) of the desired front-wheel steering angle δf_cmd determined by the posture control arithmetic section 37 in the last time's control processing cycle of the control device 15. The control gain determining section 35 also receives an estimated traveling speed Vox_act calculated by the estimated traveling speed calculating section 33 in the current time's control processing cycle.

Figure 22:
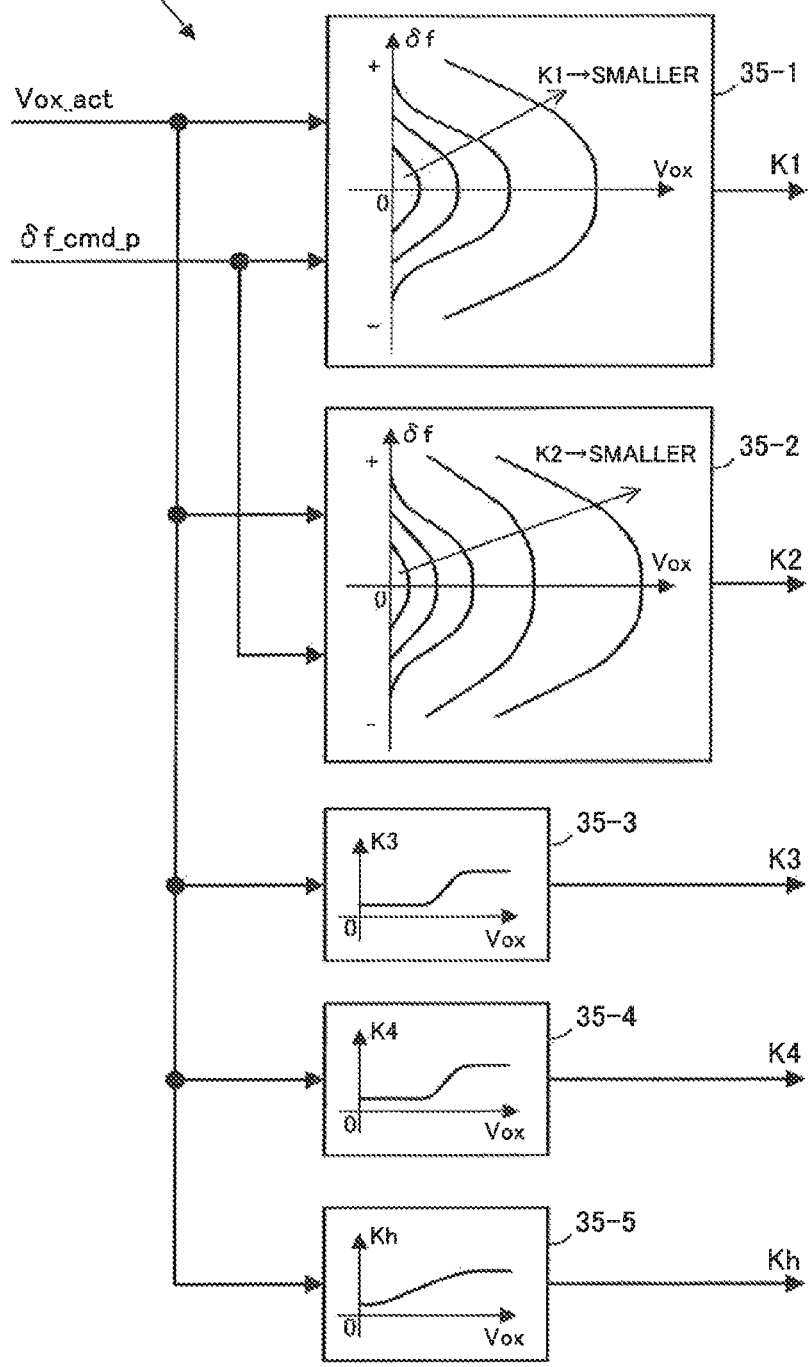
FIG. 22 is a block diagram showing a first example of the processing performed by the control gain determining section shown in FIG. 18.

The control gain determining section 35 carries out the processing shown in the block diagram in FIG. 22, for example, to determine values of a plurality of gains K1, K2, K3, K4, and Kh for the posture control of the vehicle body 2.

The values of the gains K1, K2, K3, K4, and Kh are each determined variably in accordance with δf_cmd_p and Vox_act, or in accordance with Vox_act, as will be described in detail later.

Next, the control device 15 carries out the processing in the desired posture state determining section 34. The desired posture state determining section 34 determines a desired inverted pendulum mass point lateral movement amount Pb_diff_y_cmd, which is a desired value of the inverted pendulum mass point lateral movement amount Pb_diff_y, and a desired inverted pendulum mass point lateral velocity Vby_cmd, which is a desired value of the inverted pendulum mass point lateral velocity Vby. In the present embodiment, the desired posture state determining section 34 sets both of Pb_diff_y_cmd and Vby_cmd to zero, by way of example.

Next, the control device 15 carries out the processing in the posture control arithmetic section 37. As shown in FIG. 18, the posture control arithmetic section 37 receives the desired inverted pendulum mass point lateral movement amount Pb_diff_y_cmd and the desired inverted pendulum mass point lateral velocity Vby_cmd determined in the desired posture state determining section 34, the estimated inverted pendulum mass point lateral movement amount Pb_diff_y_act calculated in the estimated inverted pendulum mass point lateral movement amount calculating section 31, the estimated inverted pendulum mass point lateral velocity Vby_act calculated in the estimated inverted pendulum mass point lateral velocity calculating section 32, the gains K1, K2, K3, K4, and Kh determined in the control gain determining section 35, and a detected value Th_act (hereinafter, referred to as "detected handlebar torque Th_act") of the actual value of the handlebar torque Th, indicated by an output from the aforesaid handlebar torque detector 19.

Figure 26:
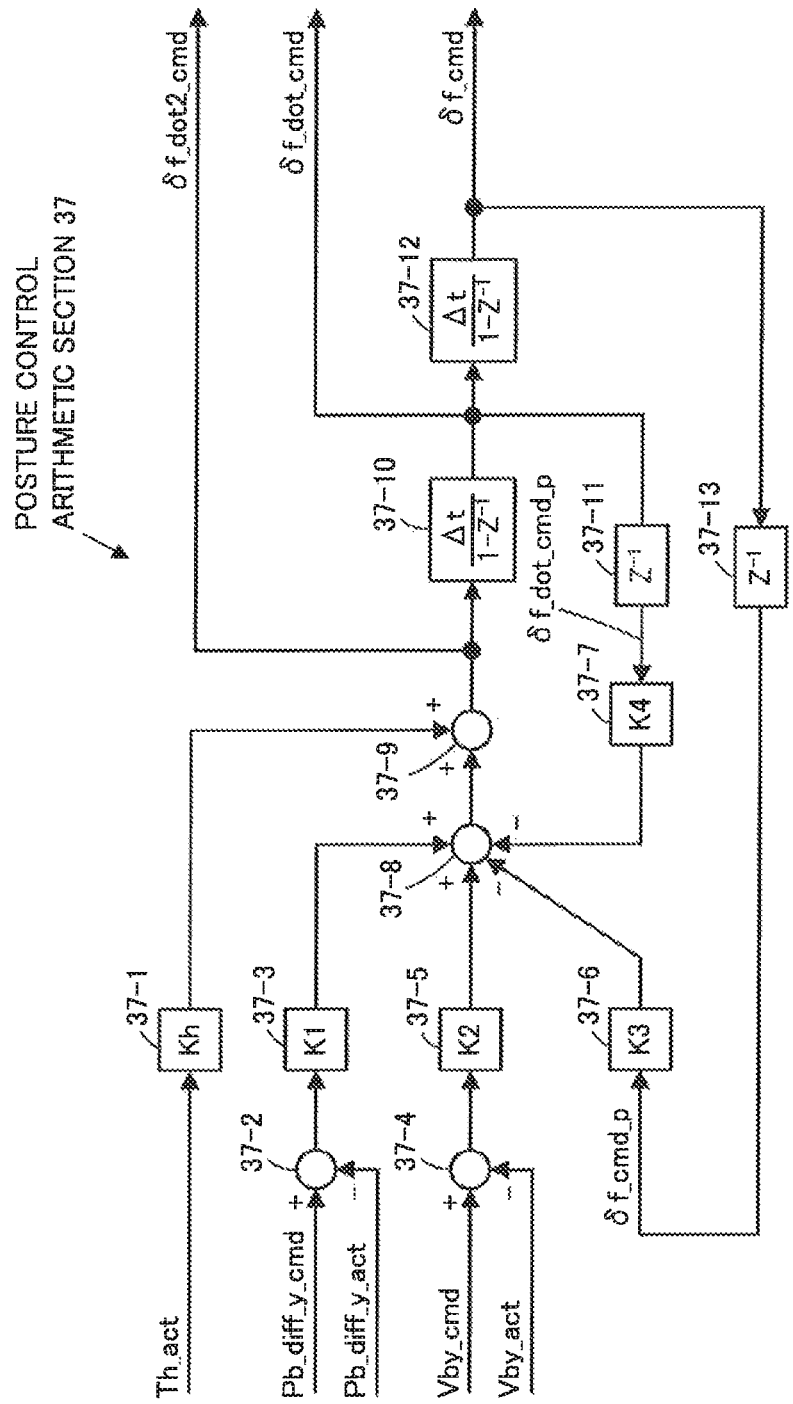
FIG. 26 is a block diagram showing a first example of the processing performed by the posture control arithmetic section shown in FIG. 18.

The posture control arithmetic section 37 uses the above-described input values to carry out the processing shown in the block diagram in FIG. 26, to thereby determine a desired front-wheel steering angle δf_cmd, a desired front-wheel steering angular velocity δf_dot_cmd, and a desired front-wheel steering angular acceleration δf_dot2_cmd.

In FIG. 26, a processing section 37-1 represents a processing section which multiplies Th_act by the gain Kh to convert Th_act into a required value of the angular acceleration of the steering angle of the front wheel 3f, a processing section 37-2 represents a processing section which obtains a deviation of Pb_diff_y_act from Pb_diff_y_cmd, a processing section 37-3 represents a processing section which multiplies the output of the processing section 37-2 by the gain K1, a processing section 37-4 represents a processing section which obtains a deviation of Vby_act from Vby_cmd, a processing section 37-5 represents a processing section which multiplies the output of the processing section 37-4 by the gain K2, a processing section 37-6 represents a processing section which multiplies δf_cmd_p by the gain K3, a processing section 37-7 represents a processing section which multiplies a last time's desired front-wheel steering angular velocity δf_dot_cmd_p, which is a value of the desired front-wheel steering angular velocity δf_dot_cmd determined by the posture control arithmetic section 37 in the last time's control processing cycle, by the gain K4, a processing section 37-8 represents a processing section which calculates a sum of the outputs from the processing sections 37-3 and 37-5 and the values, each multiplied by −1, of the outputs from the processing sections 37-6 and 37-7, and a processing section 37-9 represents a processing section which sums up the outputs from the processing sections 37-8 and 37-1 to thereby calculate a desired front-wheel steering angular acceleration δf_dot2_cmd.

Further, a processing section 37-10 represents a processing section which integrates the output of the processing section 37-9 to obtain a desired front-wheel steering angular velocity δf_dot_cmd, a processing section 37-11 represents a delay element which outputs the output from the processing section 37-10 in the last time's control processing cycle (i.e. last time's desired front-wheel steering angular velocity δf_dot_cmd_p) to the processing section 37-7, a processing section 37-12 represents a processing section which integrates the output of the processing section 37-10 to obtain a desired front-wheel steering angle δf_cmd, and a processing section 37-13 represents a delay element which outputs the output from the processing section 37-12 in the last time's control processing cycle (i.e. last time's desired front-wheel steering angle δf_cmd_p) to the processing section 37-6.

Accordingly, the posture control arithmetic section 37 calculates the desired front-wheel steering angular acceleration δf_dot2_cmd by the following expression (55).

$$\delta\text{f\_dot2\_cmd} = (K1*(\text{Pb\_diff\_y\_cmd} - \text{Pb\_diff\_y\_act}) + \\ K2*(\text{Vby\_cmd} - \text{Vby\_act}) - K3*\delta\text{f\_cmd\_p} - \\ K4*\delta\text{f\_dot\_cmd\_p}) + Kh*\text{Th\_act} \tag{55}$$

In the above expression (55), K1*(Pb_diff_y_cmd−Pb_diff_y_act) is a feedback manipulated variable having the function of making the deviation (Pb_diff_y_cmd−Pb_diff_y_act) approach "0", K2*(Vby_cmd−Vby_act) is a feedback manipulated variable having the function of making the deviation (Vby_cmd−Vby_act) approach "0", −K3*δf_cmd_p is a feedback manipulated variable having the function of making δf_cmd approach "0", and −K4*δf_dot_cmd_p is a feedback manipulated variable having the function of making δf_dot_cmd approach "0".

Further, Kh*Th_act is a feedforward manipulated variable corresponding to the actual handlebar torque (detected handlebar torque Th_act) applied to the steering handlebar 7 by the rider.

The posture control arithmetic section 37 integrates δf_dot2_cmd determined by the above expression (55) to determine a desired front-wheel steering angular velocity δf_dot_cmd. Further, the posture control arithmetic section 37 integrates this δf_dot_cmd to determine a desired front-wheel steering angle δf_cmd.

It should be noted that δf_cmd_p and δf_dot_cmd_p used in the computation of the expression (55) have the meanings as pseudo estimates (alternative observed values) of the actual steering angle and steering angular velocity, respectively, of the front wheel 3f at the current time. Therefore, instead of δf_cmd_p, a detected front-wheel steering angle δf_act at the current time may be used. Further, instead of δf_dot_cmd_p, a detected front-wheel steering angular velocity δf_dot_act (detected value of the actual steering angular velocity of the front wheel 3f) based on an output from the aforesaid front-wheel steering angle detector 17 may be used.

The above has described the processing in the posture control arithmetic section 37.

In accordance with the processing in the posture control arithmetic section 37, the desired front-wheel steering angular acceleration δf_dot2_cmd is basically determined, in the case where no handlebar torque Th is applied to the steering handlebar 7, such that any divergence of the actual inverted pendulum mass point lateral movement amount (estimated inverted pendulum mass point lateral movement amount Pb_diff_y_act) of the two-wheeled vehicle 1A from the desired inverted pendulum mass point lateral movement amount Pb_diff_y_cmd, or any divergence of the actual inverted pendulum mass point lateral velocity (estimated inverted pendulum mass point lateral velocity Vby_act) of the two-wheeled vehicle 1A from the desired inverted pendulum mass point lateral velocity Vby_cmd, is eliminated through manipulation of the steering angle δf of the front wheel 3f (and, hence, that the actual inverted pendulum mass point lateral movement amount or lateral velocity of the two-wheeled vehicle 1A is restored to the desired inverted pendulum mass point lateral movement amount Pb_diff_y_cmd or desired inverted pendulum mass point lateral velocity Vby_cmd).

Further, in the present embodiment, the desired inverted pendulum mass point lateral movement amount Pb_diff_y_cmd is "0". Therefore, in the state where the actual inverted pendulum mass point lateral movement amount of the two-wheeled vehicle 1A is held at a value which coincides, or almost coincides, with the desired inverted pendulum mass point lateral movement amount Pb_diff_y_cmd, the desired front-wheel steering angular acceleration δf_dot2_cmd is determined so as to keep the actual steering angle of the front wheel 3f at "0" or almost "0".

Furthermore, in the case where a handlebar torque Th is applied to the steering handlebar 7, a feedforward manipulated variable corresponding to the detected handlebar torque Th_act is added to the desired front-wheel steering angular acceleration δf_dot2_cmd.

It should be noted that, instead of adding the feedforward manipulated variable corresponding to the detected handlebar torque Th_act to δf_dot2_cmd as described above, it may be configured to add the feedforward manipulated variable corresponding to the detected handlebar torque Th_act (value obtained by multiplying Th_act by a gain) to the desired front-wheel steering angular velocity δf_dot_cmd or to the desired front-wheel steering angle δf_cmd.

Figure 27:
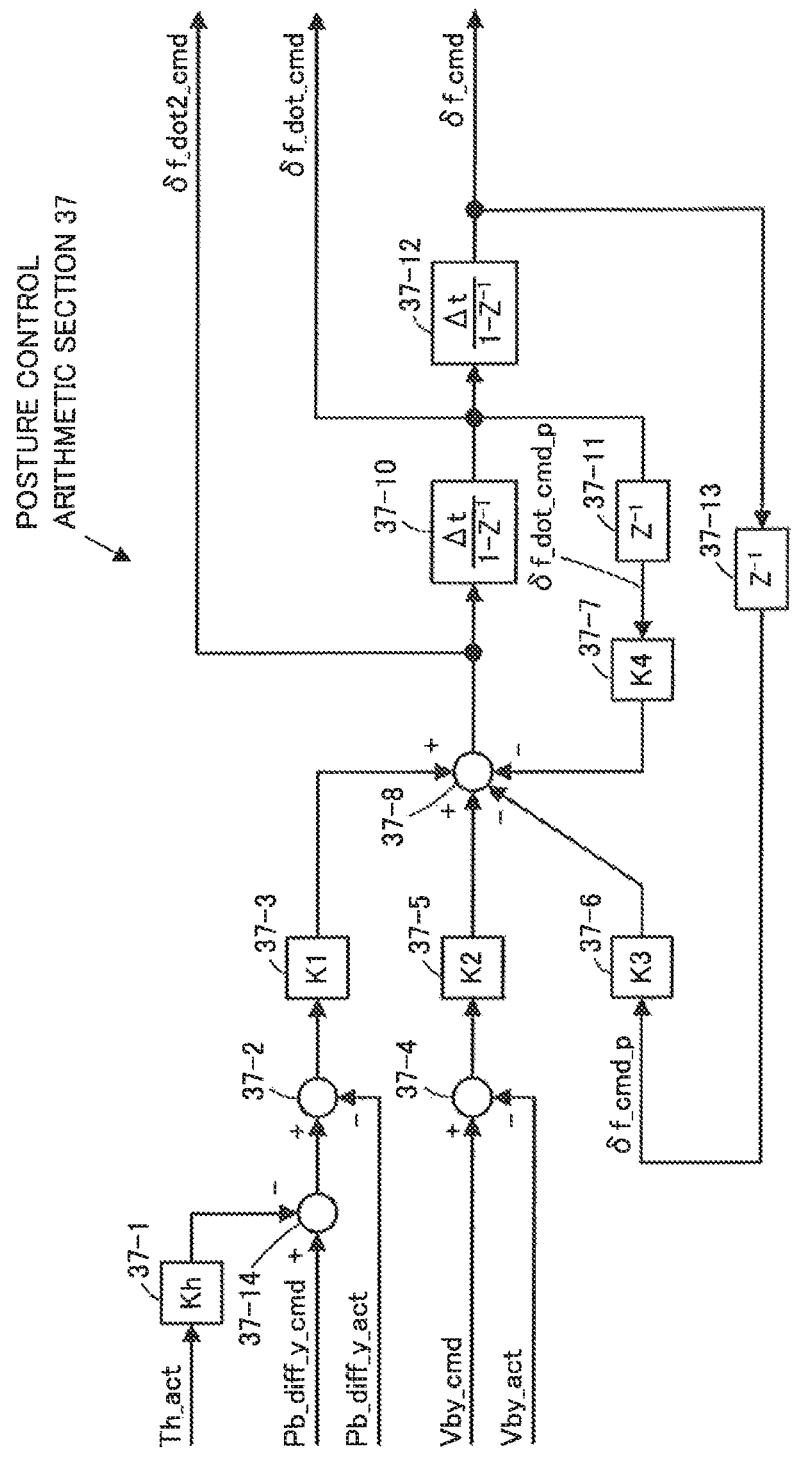
FIG. 27 is a block diagram showing a second example of the processing performed by the posture control arithmetic section shown in FIG. 18.

Alternatively, instead of adding the feedforward manipulated variable corresponding to the detected handlebar torque Th_act to δf_dot2_cmd, it may be configured to correct the desired inverted pendulum mass point lateral movement amount Pb_diff_y_cmd in accordance with Th_act and to use the corrected desired inverted pendulum mass point lateral movement amount instead of Pb_diff_y_cmd, as shown, for example, in the block diagram in FIG. 27.

In the processing in the posture control arithmetic section 37 shown in the block diagram in FIG. 27, a processing section 37-14 is provided instead of the processing section 37-9 shown in FIG. 26. The processing section 37-14 subtracts the output of the processing section 37-1 (=Kh*Th_act) from the desired inverted pendulum mass point lateral movement amount Pb_diff_y_cmd to correct Pb_diff_y_cmd. It should be noted that the value of the gain Kh by which Th_act is multiplied in this case is usually different from the value of the gain Kh used in the processing section 37-1 in the block diagram in FIG. 26.

The processing section 37-14 then supplies the corrected desired inverted pendulum mass point lateral movement amount (=Pb_diff_y_cmd−Kh*Th_act) to the processing section 37-2, instead of Pb_diff_y_cmd.

Further, in the processing in the block diagram in FIG. 27, the output from the processing section 37-8, as it is, is determined to be a desired front-wheel steering angular acceleration δf_dot2_cmd, and is supplied to the processing section 37-10.

In other respects, the processing shown in the block diagram in FIG. 27 is identical to that shown in FIG. 26.

Accordingly, in the processing in the posture control arithmetic section 37 shown in FIG. 27, the desired front-wheel steering angular acceleration δf_dot2_cmd is calculated by the following expression (56).

$$\delta f\_dot2\_cmd = \qquad (56)$$
$$K1*((Pb\_diff\_y\_cmd - Kh*Th\_act) - Pb\_diff\_y\_act) +$$
$$K2*(Vby\_cmd - Vby\_act) - K3*\delta f\_cmd\_p - K4*\delta f\_dot\_cmd\_p$$

When the value of the gain Kh used in the processing section 37-1 in the block diagram in FIG. 26 is divided by the gain K1 and the obtained value is multiplied by −1, and when the resultant value is used as the gain Kh in the processing section 37-1 in the block diagram in FIG. 27, then the block diagram in FIG. 27 becomes equivalent to the block diagram in FIG. 26.

In the block diagram in FIG. 26 or the block diagram in FIG. 27, a value obtained by multiplying the detected handlebar torque Th_act by a prescribed gain may be added to the output of the processing section 37-10.

Alternatively, in the block diagram in FIG. 26 or the block diagram in FIG. 27, a value obtained by multiplying the detected handlebar torque Th_act by a prescribed gain may be added to the output of the processing section 37-12.

Still alternatively, instead of the detected handlebar torque Th_act as it is, the detected handlebar torque Th_act which has been passed through a filter for adjusting frequency characteristics may be used. Adding the processes as described above can make the control system's response characteristics to the handlebar torque further suit the taste of the rider of the two-wheeled vehicle 1A.

Here, the gains K1 to K4 (feedback gains related to the respective feedback manipulated variables in the right side of the aforesaid expression (55)) and the gain Kh, which are used for calculating δf_dot2_cmd by the computation of the expression (55), are determined in the aforesaid control gain determining section 35. The processing in the control gain determining section 35 will now be described in detail.

The control gain determining section 35 determines the values of the gains K1 to K4 and Kh from the received estimated traveling speed Vox_act and last time's desired front-wheel steering angle δf_cmd_p, by the processing shown in the block diagram in FIG. 22.

In FIG. 22, a processing section 35-1 is a processing section which determines the gain K1 in accordance with Vox_act and δf_cmd_p, and a processing section 35-2 is a processing section which determines the gain K2 in accordance with Vox_act and δf_cmd_p.

In the present embodiment, the processing section 35-1 determines the gain K1 from Vox_act and δf_cmd_p, in accordance with a preset two-dimensional mapping (conversion function of two variables). Similarly, the processing section 35-2 determines the gain K2 from Vox_act and δf_cmd_p, in accordance with a preset two-dimensional mapping (conversion function of two variables).

In these two-dimensional mappings, the trend of the change in value of the gain K1 with respect to Vox_act and δf_cmd_p and the trend of the change in value of the gain K2 with respect to Vox_act and δf_cmd_p are set substantially similar to each other.

Specifically, as illustrated by the graphs shown in the processing sections 35-1 and 35-2 in FIG. 22, the two-dimensional mappings in the processing sections 35-1 and 35-2 are each set such that the magnitude of the gain K1, K2 determined by the two-dimensional mapping has the trend of monotonically decreasing with increasing Vox_act when δf_cmd_p is fixed to a given value.

Accordingly, the gains K1 and K2 as the feedback gains related to the feedback manipulated variables having the function of stabilizing the posture in the roll direction of the vehicle body 2 of the two-wheeled vehicle 1A (making the estimated inverted pendulum mass point lateral movement amount Pb_diff_y_act and the estimated inverted pendulum mass point lateral velocity Vby_act converge respectively to Pb_diff_y_cmd and Vby_cmd) are determined such that the magnitudes of the gains K1 and K2 each become smaller as the actual traveling speed (estimated traveling speed Vox_act) of the two-wheeled vehicle 1A becomes greater.

In other words, the gains K1 and K2 are determined such that the control function for stabilizing the posture in the roll direction of the vehicle body 2 by performing the steering control of the front wheel 3$f$ so as to make Pb_diff_y_act and Vby_act converge to Pb_diff_y_cmd and Vby_cmd, respectively, is reduced when the actual traveling speed (estimated traveling speed Vox_act) of the two-wheeled vehicle 1A is in a high-speed range, as compared to when it is in a low-speed range.

Accordingly, in the case where the actual traveling speed (estimated traveling speed Vox_act) of the two-wheeled vehicle 1A is relatively high, i.e. in the state where the posture in the roll direction of the vehicle body 2 is unlikely to become unstable, a rider of the two-wheeled vehicle 1A can readily change the posture in the roll direction (roll angle φb) of the vehicle body 2 by shifting the weight of the rider's body and so on, as in the case of a conventional two-wheeled vehicle (which is not provided with the function of controlling the posture in the roll direction of the vehicle body).

It should be noted that the two-dimensional mappings for determining the gains K1 and K2 may each be set such that the value of K1, K2 is determined to be "0" or almost "0" when the estimated traveling speed Vox_act reaches a certain level of speed.

With this configuration, the function of controlling the posture in the roll direction of the vehicle body 2 becomes substantially OFF when the actual traveling speed (estimated traveling speed Vox_act) of the two-wheeled vehicle 1A is relatively high. This can make the behavioral characteristics of the two-wheeled vehicle 1A approach the characteristics comparable to those of a conventional two-wheeled vehicle in the case where the actual traveling speed of the two-wheeled vehicle 1A is high.

Further, the two-dimensional mappings in the processing sections 35-1 and 35-2 are each set such that the gain K1, K2 determined by the mapping has the trend of monotonically decreasing with increasing magnitude (absolute value) of δf_cmd_p when Vox_act is fixed to a given value.

Accordingly, the gains K1 and K2 as the gains related to the feedback manipulated variables having the function of stabilizing the posture in the roll direction of the vehicle body 2 of the two-wheeled vehicle 1A are determined such that the magnitudes of the gains K1 and K2 each become smaller as the magnitude of δf_cmd_p, corresponding to the actual steering angle of the front wheel 3$f$, becomes larger.

The magnitudes of the gains K1 and K2 are changed as described above, for the following reason. In the case where the magnitude of the actual steering angle of the front wheel 3$f$ is large, compared to the case where it is small, the radius of curvature of the ground contact part of the steering control wheel (front wheel 3$f$) as seen in a cross section including the ground contact point of the steering control wheel (front wheel 3$f$) and having a normal in the X-axis direction (longitudinal direction of the vehicle body 2) becomes larger, as explained above.

Therefore, in the case where the magnitude of the actual steering angle of the front wheel 3$f$ is large, compared to the case where it is small, the change in movement amount of the ground contact point of the front wheel 3$f$ according to the change in the steering becomes larger. Because of this, if the magnitudes of the gains K1 and K2 are set independently of the actual steering angle, oscillation is likely to occur in the control of the posture in the roll direction of the vehicle body 2 of the two-wheeled vehicle 1A.

When it is configured such that the magnitudes of the gains K1 and K2 are changed in accordance with the magnitude of δf_cmd_p, as described above, the above-described oscillation can be prevented even in the case where the magnitude (absolute value) of the actual steering angle of the front wheel 3$f$ is large.

In the block diagram in FIG. 22, processing sections 35-3 and 35-4 represent processing sections which determine the gains K3 and K4, respectively, in accordance with Vox_act.

In the present embodiment, the processing sections 35-3 and 35-4 determine the gains K3 and K4, respectively, from Vox_act, in accordance with conversion functions defined by preset mappings (or arithmetic expressions).

These conversion functions are set, as illustrated by the graphs shown in the processing sections 35-3 and 35-4 in FIG. 22, such that basically the gains K3 and K4 each increase monotonically, between a prescribed upper limit and a prescribed lower limit, as Vox_act increases.

In this case, in the conversion functions in the processing sections 35-3 and 35-4, in the region where Vox_act takes a value near "0", K3 and K4 are each maintained at the lower limit. In the region where Vox_act takes a sufficiently large value, K3 and K4 are each maintained at the upper limit.

As the gains K3 and K4 are determined in the above-described manner, the gains K3 and K4 as the feedback gains related to the feedback manipulated variables having the function of making the steering angle δf of the front wheel 3$f$ approach zero are determined such that the magnitudes of the gains K3 and K4 become relatively large in the case where the actual traveling speed (estimated traveling speed Vox_act) of the two-wheeled vehicle 1A is relatively high (in a high-speed range), compared to the case where the actual traveling speed of the two-wheeled vehicle 1A is relatively low (in a low-speed range (including "0")).

Here, in an ordinary two-wheeled vehicle, when it is traveling at a relatively high speed, the steering control wheel is usually held in a non-steered state or nearly non-steered state. Therefore, setting the gains K3 and K4 in the above-described manner can allow the steering characteristics of the front wheel 3$f$ of the two-wheeled vehicle 1A when the actual traveling speed of the two-wheeled vehicle 1A is relatively high to approach the characteristics of the ordinary two-wheeled vehicle.

Further, in FIG. 22, a processing section 35-5 represents a processing section which determines the gain Kh in accordance with Vox_act.

In the present embodiment, the processing section 35-5 determines the gain Kh from Vox_act, in accordance with a conversion function defined by a preset mapping (or arithmetic expression), as with the gains K3 and K4.

This conversion function is set, as illustrated by the graph shown in the processing section 35-5 in FIG. 22, such that basically the magnitude of the gain Kh becomes relatively large when Vox_act is large as compared to when Vox_act is small.

In this case, the conversion function in the processing section 35-5 is set such that the gain Kh increases monotonically, between a prescribed upper limit and a prescribed lower limit, as Vox_act increases. Further, the conversion function is set such that the Kh determined thereby has saturation characteristics with respect to Vox_act. That is, Kh is determined by the conversion function such that the magnitude of the rate of change of the value of Kh with respect to Vox_act (increase of Kh per unit increase of Vox_act) becomes smaller in a low-speed range in which Vox_act takes a value near "0" (including "0") and a high-speed range in which Vox_act takes a sufficiently large value, than in a mid-speed range between the low-speed range and the high-speed range.

Determining the gain Kh in accordance with Vox_act in this manner ensures that the magnitude of the gain Kh relative to the gain K1 becomes large when the actual traveling speed of the two-wheeled vehicle 1A is relatively high.

Accordingly, when a rider applies a torque about the handlebar axis Ch to the steering handlebar 7 in an attempt to move the steering handlebar 7, the desired front-wheel steering angular acceleration δf_dot2_cmd is determined so as to bring the detected handlebar torque Th_act to zero. This leads to improved tracking of the steering of the front wheel 3f to the rider's moving the steering handlebar 7.

As a result, during high-speed traveling of the two-wheeled vehicle 1A, the rider can steer the front wheel 3f by manipulating the steering handlebar 7, similarly as in a conventional two-wheeled vehicle.

The above has described the details of the processing in the control gain determining section 35 according to the present embodiment.

In the processing in the aforesaid processing sections 35-1 and 35-2, the gains K1 and K2 were determined in accordance with Vox_act and δf_cmd_p by using two-dimensional mappings. The gains K1 and K2, however, may be determined in another manner without using the two-dimensional mappings.

Figure 23:
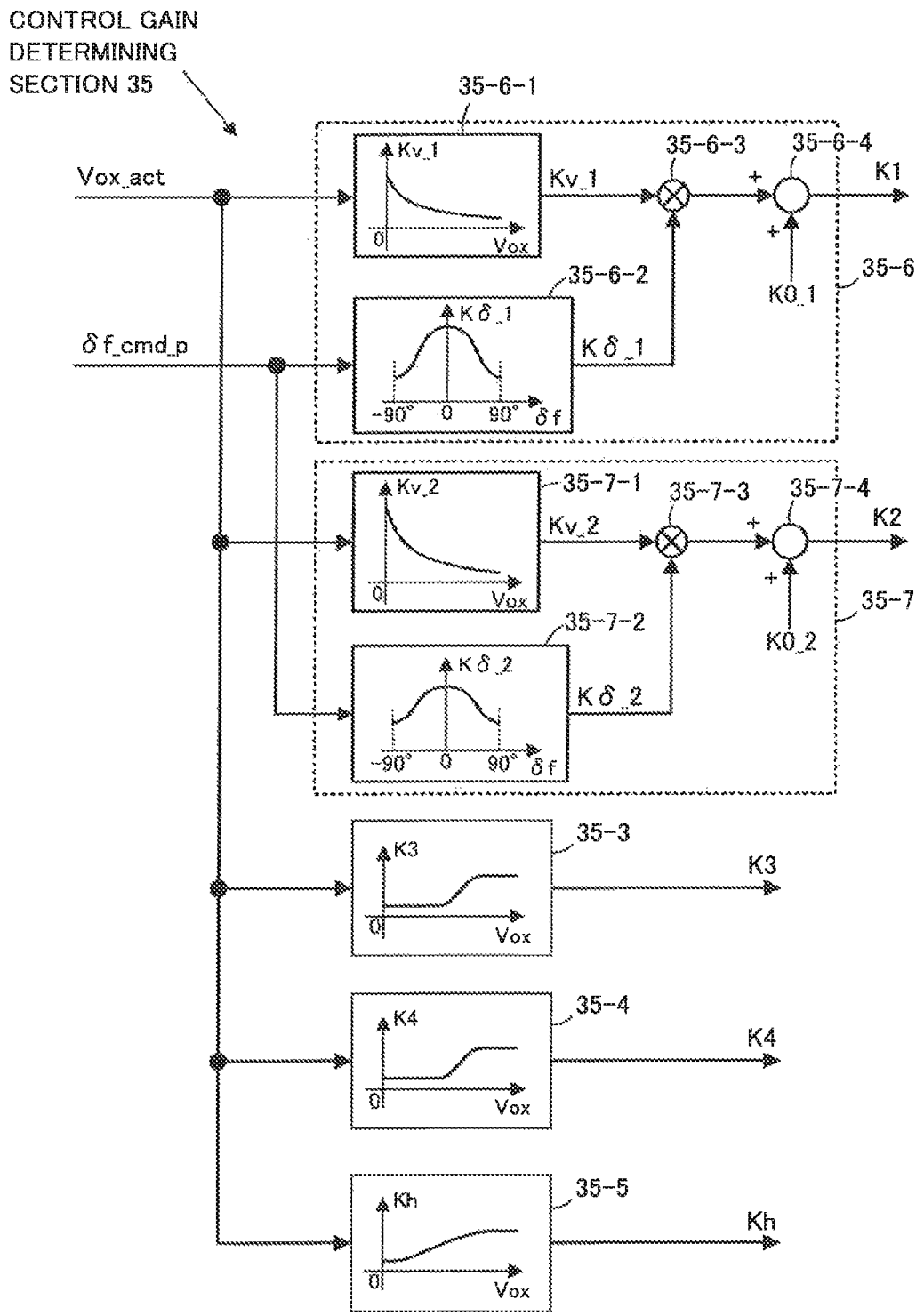
FIG. 23 is a block diagram showing a second example of the processing performed by the control gain determining section shown in FIG. 18.
Figure 24:
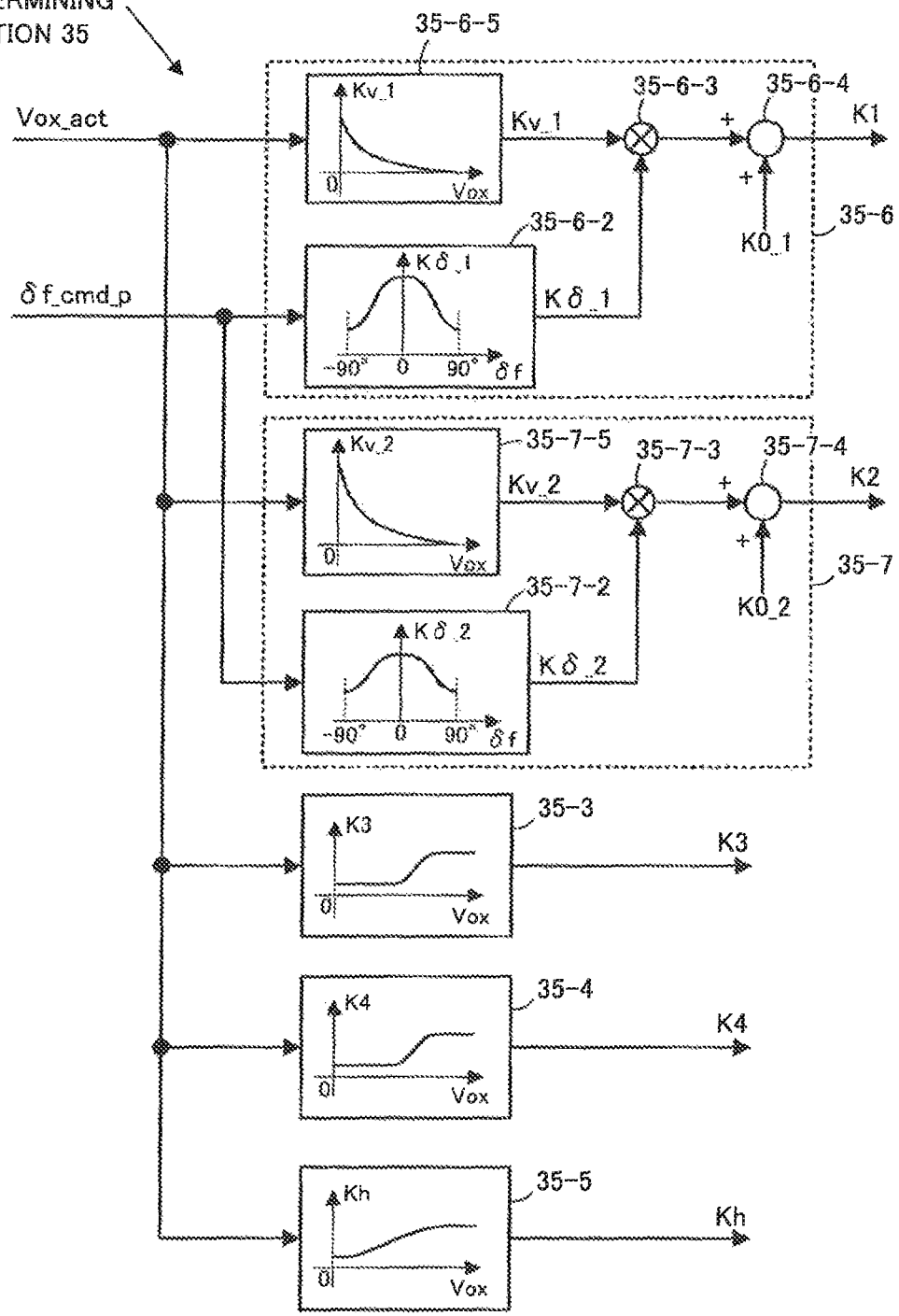
FIG. 24 is a block diagram showing a third example of the processing performed by the control gain determining section shown in FIG. 18.

For example, the gains K1 and K2 may be determined by the processing in processing sections 35-6 and 35-7 in the block diagram in FIG. 23 or 24. It should be noted that, except for the processing in the processing sections 35-6 and 35-7, the processing in the block diagram in each of FIGS. 23 and 24 is identical to the processing in the block diagram in FIG. 22.

The processing section 35-6 in FIG. 23 includes a processing section 35-6-1 which determines a first adjustment parameter Kv_1 for adjusting the value of the gain K1, from Vox_act, by a preset conversion function, a processing section 35-6-2 which determines a second adjustment parameter Kδ_1 for adjusting the value of the gain K1, from δf_cmd_p, by a preset conversion function, a processing section 35-6-3 which determines a composite adjustment parameter (=Kv_1*Kδ_1) by multiplying the adjustment parameters Kv_1 and Kδ_1, and a processing section 35-6-4 which adds this composite adjustment parameter to a prescribed reference value (lower limit) K0_1 of the gain K1, to thereby determine the gain K1 (=Kv_1*Kδ_1+K0_1).

The processing section 35-7 includes a processing section 35-7-1 which determines a first adjustment parameter Kv_2 for adjusting the value of the gain K2, from Vox_act, by a preset conversion function, a processing section 35-7-2 which determines a second adjustment parameter Kδ_2 for adjusting the value of the gain K2, from δf_cmd_p, by a preset conversion function, a processing section 35-7-3 which determines a composite adjustment parameter (=Kv_2*Kδ_2) by multiplying the adjustment parameters Kv_2 and Kδ_2, and a processing section 35-7-4 which adds this composite adjustment parameter to a prescribed reference value (lower limit) K0_2 of the gain K2, to thereby determine the gain K2 (=Kv_2*Kδ_2+K0_2).

In this case, the conversion functions of the respective processing sections 35-6-1, 35-7-1, 35-6-2, and 35-7-2 are each defined, for example, by a mapping (one-dimensional mapping) or an arithmetic expression.

The conversion functions of the processing sections 35-6-1 and 35-7-1 are set, as illustrated by the graphs shown in the processing sections 35-6-1 and 35-7-1 in FIG. 23, such that Kv_1 and Kv_2 determined by the respective conversion functions each decrease monotonically (to approach zero) from a prescribed upper limit (>0) as Vox_act becomes larger.

Accordingly, in a low-speed range where Vox_act is relative low, Kv_1 and Kv_2 are each set to an effective positive value (having a magnitude above a certain level).

Further, the conversion functions of the processing sections 35-6-2 and 35-7-2 are set, as illustrated by the graphs shown in the processing sections 35-6-2 and 35-7-2 in FIG. 23, such that Kδ_1 and Kδ_2 determined by the respective conversion functions each decrease monotonically as the magnitude (absolute value) of δf_cmd_p increases.

More specifically, Kδ_1 and Kδ_2 are determined such that they each take a prescribed upper limit (>0) when the magnitude of δf_cmd_p is "0", and that Kδ_1 and Kδ_2 each decrease down to a prescribed lower limit (>0) as the magnitude of δf_cmd_p increases from "0".

Therefore, the processing sections 35-6 and 35-7 shown in FIG. 23 can determine the gains K1 and K2, respectively, such that the trends of the changes of K1 and K2 with respect to Vox_act and δf_cmd_p become similar to the trends of the changes of K1 and K2 determined by the processing sections 35-1 and 35-2, respectively, in FIG. 22.

The processing sections 35-6 and 35-7 in FIG. 24 are different from those in FIG. 23 only in part of the processing.

Specifically, the processing section 35-6 in FIG. 24 adopts a processing section 35-6-5 as a processing section for determining the first adjustment parameter Kv_1 for adjusting the value of the gain K1 in accordance with Vox_act, instead of the processing section 35-6-1 shown in FIG. 23. Except for the processing section 35-6-5, the configuration of the processing section 35-6 in FIG. 24 is identical to that in FIG. 23.

Similarly, the processing section 35-7 in FIG. 24 adopts a processing section 35-7-5, instead of the processing section 35-7-1 shown in FIG. 23, as a processing section for determining the first adjustment parameter Kv_2 for adjusting the value of the gain K2 in accordance with Vox_act. Except for the processing section 35-7-5, the configuration of the processing section 35-7 in FIG. 24 is identical to that in FIG. 23.

The processing sections 35-6-5 and 35-7-5 use, for determining Kv_1 and Kv_2, respectively, conversion functions (mappings or arithmetic expressions) which are different from those used in FIG. 23.

Specifically, the conversion functions in the processing sections 35-6-5 and 35-7-5 are set, as illustrated by the graphs shown in the processing sections 35-6-5 and 35-7-5 in FIG. 24, such that Kv_1 and Kv_2 determined by the respective conversion functions each monotonically decrease with increasing Vox_act and, additionally, such that Kv_1 and Kv_2 are each set to zero (or almost zero) in a high-speed range where Vox_act becomes high.

It should be noted that the reference value (lower limit) K0_1 of the gain K1 in the processing section 35-6 in FIG. 24 and the reference value (lower limit) K0_2 of the gain K2 in the processing section 35-7 in FIG. 24 are each set to zero or a value near zero.

Therefore, the processing sections 35-6 and 35-7 shown in FIG. 24 can determine the gains K1 and K2, respectively, such that the trends of the changes of K1 and K2 with respect to Vox_act and δf_cmd_p become similar to the trends of the changes of K1 and K2 determined by the processing sections 35-1 and 35-2, respectively, in FIG. 22.

In addition, in a high-speed range where the actual traveling speed of the two-wheeled vehicle 1A is high, both of the gains K1 and K2 are set to zero or almost zero. This can make the behavioral characteristics of the two-wheeled vehicle 1A still further approach the characteristics comparable to those of a conventional two-wheeled vehicle in the case where the actual traveling speed of the two-wheeled vehicle 1A is high.

It should be noted that for the conversion functions for determining the gains K1 and K2, conversion functions in other forms may be adopted, as long as they can determine the gains with the above-described trends with respect to Vox_act and δf_cmd_p. Similarly, for the conversion functions for determining the gains K3, K4, and Kh, conversion functions in other forms may be adopted, as long as they can determine the gains with the above-described trends with respect to Vox_act.

Supplementally, the last time's desired front-wheel steering angle δf_cmd_p has the meaning as a pseudo estimate (alternative observed value) of the actual steering angle of the front wheel 3f at the current time.

Accordingly, for determining the respective gains K1, K2, K3, K4, and Kh, the aforesaid detected front-wheel steering angle δf_act may be used instead of δf_cmd_p.

Further, in the case where the response of the front-wheel driving actuator 10 is sufficiently quick, the value of the traveling speed (=Vf_cmd_p*cos(δf_cmd_p*cos(θcf)), hereinafter referred to as "last time's desired traveling speed Vox_cmd_p") calculated by the computation similar to that in the aforesaid expression (54) from the above-described last time's desired front-wheel steering angle δf_cmd_p and a last time's desired front-wheel rotational transfer velocity Vf_cmd_p (desired front-wheel rotational transfer velocity Vf_cmd determined by the desired front-wheel rotational transfer velocity determining section 36 in the last time's control processing cycle) has the meaning as a pseudo estimate (alternative observed value) of the actual traveling speed of the two-wheeled vehicle 1A at the current time.

Accordingly, for determining the respective gains K1, K2, K3, K4, and Kh, the above-described last time's desired traveling speed Vox_cmd_p may be used instead of Vox_act.

After the control device 15 has determined the desired front-wheel steering angle δf_cmd in the posture control arithmetic section 37 as described above, the control device 15 carries out the processing in the desired handlebar angle determining section 38.

The desired handlebar angle determining section 38 receives, as shown in FIG. 18, the estimated traveling speed Vox_act calculated in the estimated traveling speed calculating section 33 and the desired front-wheel steering angle δf_cmd determined in the posture control arithmetic section 37.

Figure 28:
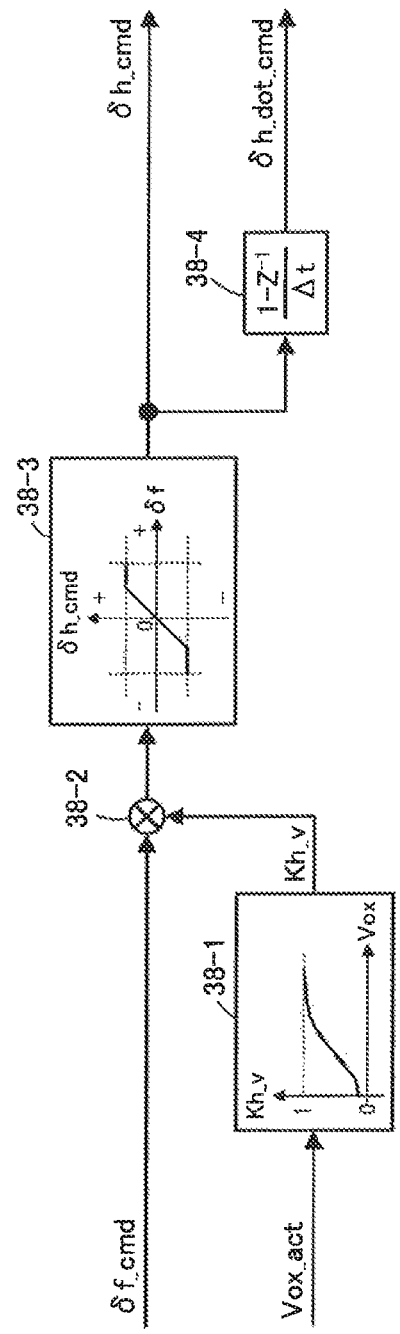
FIG. 28 is a block diagram showing a first example of the processing performed by the desired handlebar angle determining section shown in FIG. 18.

The desired handlebar angle determining section 38 uses these input values to carry out the processing shown in the block diagram in FIG. 28, to thereby determine a desired handlebar angle δh_cmd and a desired handlebar angular velocity δh_dot_cmd.

In FIG. 28, a processing section 38-1 is a processing section which determines a correction factor Kh_v for correcting δf_cmd, in accordance with the estimated traveling speed Vox_act, a processing section 38-2 is a processing section which corrects δf_cmd by multiplying δf_cmd by the output (correction factor Kh_v) from the processing section 38-1, a processing section 38-3 is a processing section which determines a desired handlebar angle δh_cmd from the output (=Kh_v*δf_cmd) from the processing section 38-2, and a processing section 38-4 is a processing section which calculates a temporal change rate (amount of change per unit time) of the output (δh_cmd) from the processing section 38-3, as a desired handlebar angular velocity δh_dot_cmd.

Accordingly, the desired handlebar angle determining section 38 determines a desired handlebar angle δh_cmd in accordance with the corrected value (=Kh_v*δf_cmd, this corrected value will be hereinafter referred to as "corrected desired front-wheel steering angle δf_cmd_c") obtained by correcting δf_cmd in accordance with Vox_act. Further, the desired handlebar angle determining section 38 differentiates this δh_cmd to determine a desired handlebar angular velocity δh_dot_cmd.

In this case, the correction factor Kh_v takes a positive value of 1 or less. The correction factor Kh_v is determined from the estimated traveling speed Vox_act, by a preset conversion function. The conversion function is defined, for example, by a mapping or an arithmetic expression. The conversion function is set to show the trend as illustrated by the graph shown in the processing section 38-1 in FIG. 28.

Here, when the two-wheeled vehicle 1A is stationary or traveling at a very low speed, the posture restoring force in the roll direction of the vehicle body 2 per unit steering angle of the front wheel 3f is weak and, therefore, the front wheel 3f needs to be steered relatively largely for stabilizing the posture.

In such a case, if it is set such that the steering angle δf of the front wheel 3f coincides with the handlebar angle δh as in a conventional two-wheeled vehicle in which the steering handlebar is directly connected to the steering shaft of the front wheel, the large steering of the front wheel 3f will cause the steering handlebar 7 to rotate largely, giving a sense of discomfort to the rider of the two-wheeled vehicle 1A. The steering handlebar 7 may also interfere with a part of the vehicle body 2 close to the steering handlebar 7.

In order to solve the above problems, in the present embodiment, the conversion function in the processing section 38-1 has been set, as illustrated by the graph in the figure, such that the correction factor Kh_v becomes smaller as Vox_act becomes smaller (as the actual traveling speed of the two-wheeled vehicle 1A becomes lower).

This correction factor Kh_v basically has the function of changing the ratio of the amount of change of the handlebar angle δh to the unit amount of change of the steering angle δf of the front wheel 3f, i.e. a so-called steering gear ratio, in accordance with Vox_act. Therefore, it is set such that the above-described ratio becomes smaller as Vox_act becomes smaller.

More specifically, the conversion function in the processing section 38-1 is set such that the above-described ratio (correction factor Kh_v) becomes "1" or almost "1" when Vox_act becomes a prescribed speed or higher and that the ratio becomes less than "1" when Vox_act becomes lower than the prescribed speed.

As a result, when the two-wheeled vehicle 1A is stationary or traveling at a very low speed, even if the steering angle of the front wheel 3f becomes large for the purpose of stabilizing the posture of the vehicle body 2, the handlebar angle δh is restricted to a small angle. This can reduce the sense of discomfort of the rider of the two-wheeled vehicle 1A and also prevent the interference between the steering handlebar 7 and the vehicle body 2.

Furthermore, in the present embodiment, when the processing section 38-3 determines a desired handlebar angle δh_cmd from the corrected desired front-wheel steering angle δf_cmd_c which is δf_cmd corrected with the correction factor Kh_v, it determines δh_cmd in accordance with a conversion function which has been preset to cause δh_cmd to have saturation characteristics with respect to δf_cmd_c. The saturation characteristics means the characteristics that the magnitude of the rate of change of δh_cmd with respect to δf_cmd_c (amount of change of δh_cmd per unit amount of change of δf_cmd_c) becomes smaller when the magnitude of δh_cmd_c is large, as compared to when the magnitude of δh_cmd_c is small.

The conversion function in the processing section 38-3 having such saturation characteristics is defined, for example, by a mapping or an arithmetic expression. The conversion function is set, for example, as illustrated by the graph shown in the processing section 38-3 in FIG. 28.

In this example, δh_cmd is determined such that, when the magnitude (absolute value) of δf_cmd_c is not greater than a prescribed value, δh_cmd changes monotonically up to an upper limit on the positive side or down to a lower limit on the negative side in response to the change of δf_cmd_c (or δf_cmd) to the positive side or the negative side, respectively. In this situation, δh_cmd is determined, for example, to coincide with, or almost coincide with, δf_cmd_c.

When the magnitude (absolute value) of δf_cmd_c exceeds the prescribed value, δh_cmd is maintained constantly at the upper limit on the positive side or the lower limit on the negative side.

Determining δh_cmd so as to have saturation characteristics with respect to δf_cmd_c in the above-described manner can prevent the actual handlebar angle (detected handlebar angle δh_act) from becoming excessively large.

Figure 29:
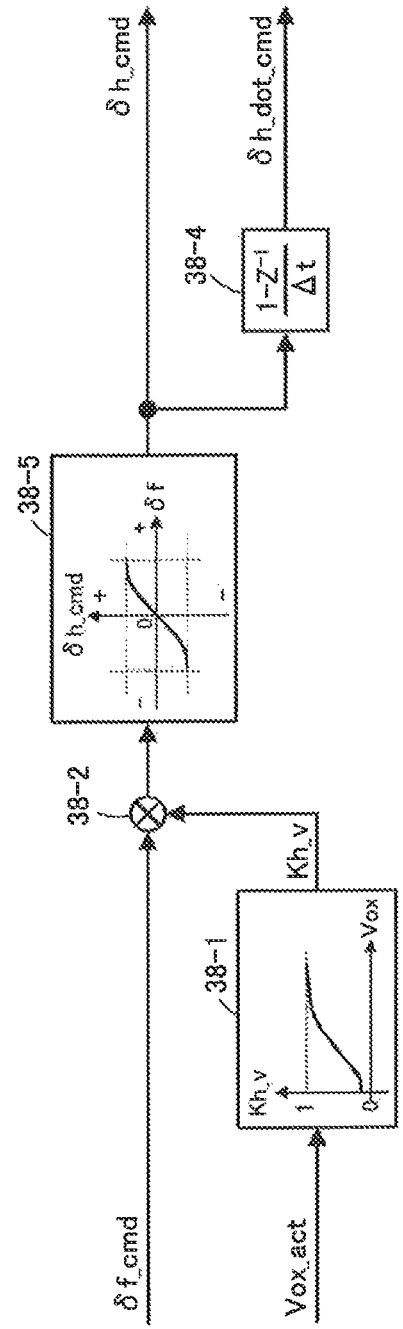
FIG. 29 is a block diagram showing a second example of the processing performed by the desired handlebar angle determining section shown in FIG. 18.

It should be noted that the processing of determining δh_cmd from δf_cmd_c may be carried out by using, for example, a conversion function (having saturation characteristics) as illustrated by the graph shown in a processing section 38-5 in the block diagram in FIG. 29. This conversion function, defined by a mapping or an arithmetic expression, is set such that the magnitude of the rate of change of δh_cmd with respect to δf_cmd_c becomes continuously smaller as the magnitude of δf_cmd_c becomes larger. The minimum value of the magnitude of the above-described rate of change may be greater than zero.

When the conversion function in the processing section 38-5 is set in the above-described manner, the rate of change of δh_cmd with respect to δf_cmd (amount of change of δh_cmd per unit increase of δf_cmd) can be made to change continuously. Consequently, the angular acceleration of the actual handlebar angle can be made to change continuously. This can restrict an abrupt change in rotational angular velocity (angular velocity about the handlebar axis Ch) of the steering handlebar 7. As a result, the sense of discomfort of the rider during the manipulation of the steering handlebar 7 can further be reduced. The load of the handlebar driving actuator 9 can be reduced as well.

It should be noted that δh_cmd may be determined from δf_cmd and Vox_act by a two-dimensional mapping. Further, as Vox_act for determining δh_cmd, the value of the actual rotational transfer velocity of the rear wheel 3r, estimated on the basis of an output from the rear-wheel rotational speed detector 21, may be used. Alternatively, the aforesaid last time's desired traveling speed Vox_cmd_p, calculated by the computation similar to that in the right side of the aforesaid expression (54) from the last time's desired front-wheel steering angle δf_cmd_p and the last time's desired front-wheel rotational transfer velocity Vf_cmd_p, may be used instead of Vox_act.

Controls of the aforesaid front-wheel steering actuator 8, handlebar driving actuator 9, and front-wheel driving actuator 10 will now be described.

Figure 30:
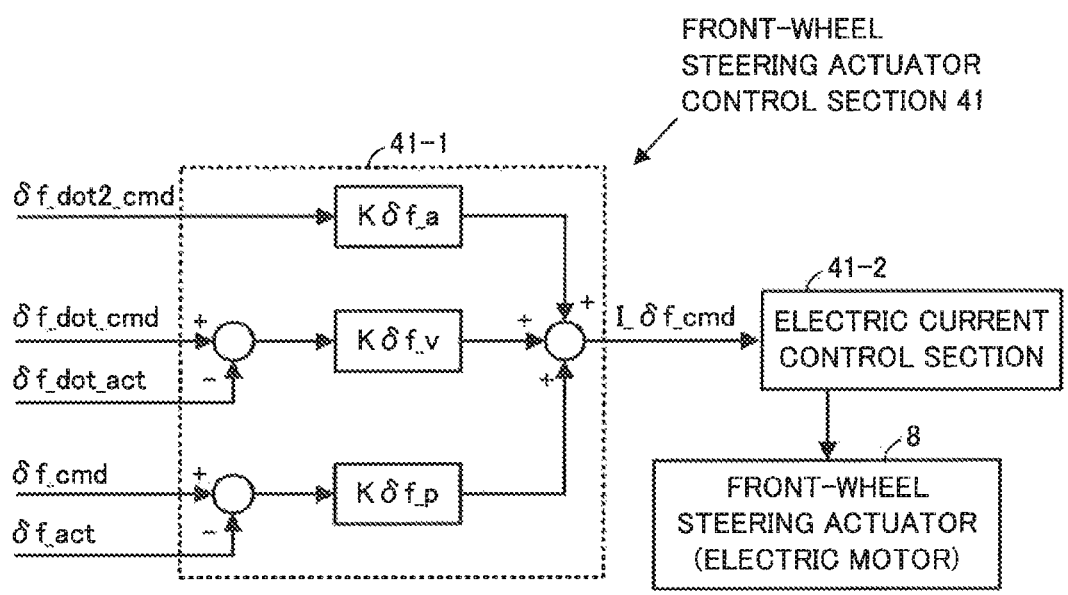
FIG. 30 is a block diagram showing the processing performed by a front-wheel steering actuator control section included in the control device shown in FIG. 17.
Figure 31:
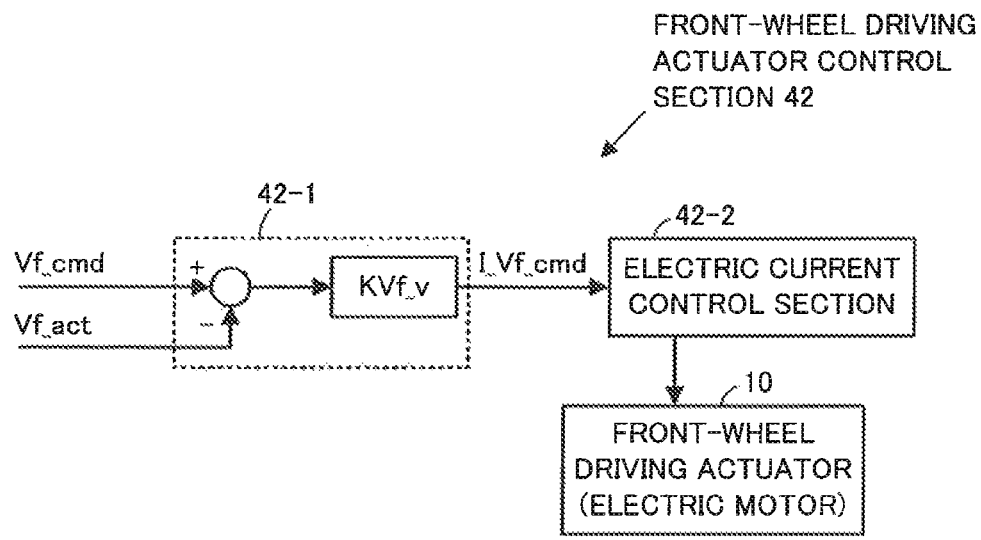
FIG. 31 is a block diagram showing the processing performed by a front-wheel driving actuator control section included in the control device shown in FIG. 17.
Figure 32:
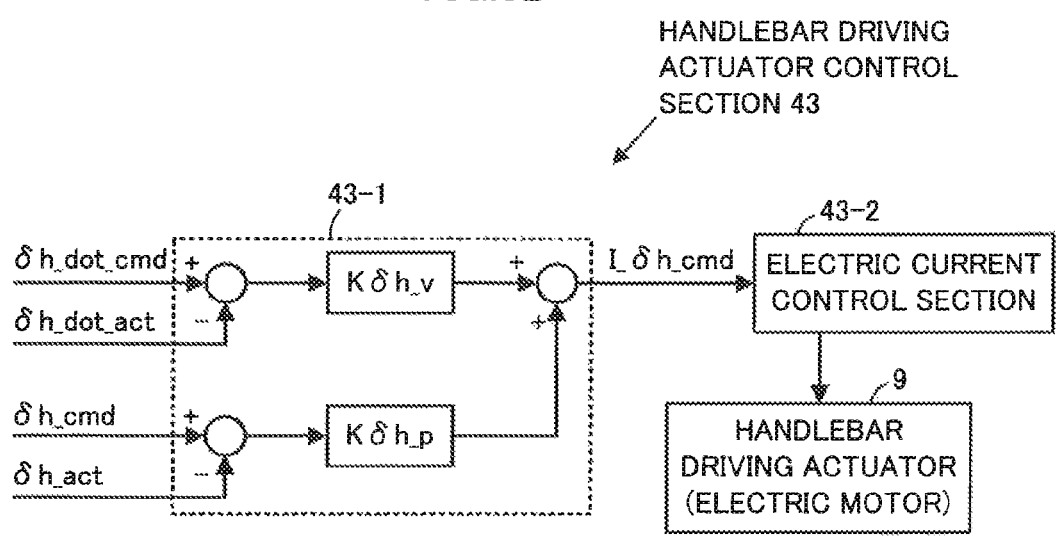
FIG. 32 is a block diagram showing the processing performed by a handlebar driving actuator control section included in the control device shown in FIG. 17.

The control device 15 further includes, as functions other than the functions shown in FIG. 18, a front-wheel steering actuator control section 41 shown in FIG. 30, a front-wheel driving actuator control section 42 shown in FIG. 31, and a handlebar driving actuator control section 43 shown in FIG. 32.

The front-wheel steering actuator control section 41 carries out drive control of the front-wheel steering actuator 8, by the control processing shown in the block diagram in FIG. 30, for example, to cause the actual steering angle (detected front-wheel steering angle δf_act) of the front wheel 3f to track a desired front-wheel steering angle δf_cmd.

In this example, the front-wheel steering actuator control section 41 receives a desired front-wheel steering angle δf_cmd, a desired front-wheel steering angular velocity δf_dot_cmd, and a desired front-wheel steering angular acceleration δf_dot2_cmd determined in the above-described manner in the posture control arithmetic section 37, a detected front-wheel steering angle δf_act, and a detected front-wheel steering angular velocity δf_dot_act which is a detected value of the actual steering angular velocity of the front wheel 3f.

It should be noted that the detected front-wheel steering angular velocity δf_dot_act is a value of the steering angular velocity which is recognized on the basis of an output from the front-wheel steering angle detector 17, or a value obtained by calculating a temporal change rate of the detected front-wheel steering angle δf_act.

The front-wheel steering actuator control section 41 determines, from the above-described input values, an electric current command value I_δf_cmd which is a desired value of the electric current passed through the front-wheel steering actuator 8 (electric motor), by the processing in an electric current command value determining section 41-1.

The electric current command value determining section 41-1 determines the electric current command value I_δf_cmd by summing up a feedback manipulated variable component obtained by multiplying a deviation of δf_act from δf_cmd by a gain Kδf_p of a prescribed value, a feedback manipulated variable component obtained by multiplying a deviation of δf_dot_act from δf_dot_cmd by a gain Kδf_v of a prescribed value, and a feedforward manipulated variable component obtained by multiplying δf_dot2_cmd by a gain Kδf_a of a prescribed value, as shown by the following expression (57).

$$I\_\delta f\_cmd = K\delta f\_p * (\delta f\_cmd - \delta f\_act) + \\ K\delta f\_v * (\delta f\_dot\_cmd - \delta f\_dot\_act) + K\delta f\_a * \delta f\_dot2\_cmd \quad (57)$$

The front-wheel steering actuator control section 41 then controls the actual electric current passed through the front-wheel steering actuator 8 (electric motor) to match the electric current command value I_δf_cmd, by an electric current control section 41-2 which is made up of a motor driver or the like.

In this manner, the control is performed such that the actual steering angle of the front wheel 3f tracks the desired front-wheel steering angle δf_cmd. In this case, the electric current command value I_δf_cmd includes the third term on the right side of the above expression (57), i.e. the feedforward manipulated variable component, ensuring improved tracking in the above-described control.

It should be noted that the technique of controlling the front-wheel steering actuator 8 to cause the actual steering angle of the front wheel 3f to track the desired front-wheel steering angle δf_cmd is not limited to the above-described technique; other techniques may be used as well. For example, various kinds of known servo control techniques related to electric motors (feedback control techniques for causing the actual angle of rotation of the rotor of the electric motor to track a desired value) may be adopted.

The front-wheel driving actuator control section 42 carries out drive control of the front-wheel driving actuator 10, by the control processing shown in the block diagram in FIG. 31, for example, to cause the actual rotational transfer velocity of the front wheel 3f to track a desired front-wheel rotational transfer velocity Vf_cmd (or to cause the actual rotational angular velocity of the front wheel 3f to track a desired rotational angular velocity corresponding to Vf_cmd).

In this example, the front-wheel driving actuator control section 42 receives a desired front-wheel rotational transfer velocity Vf_cmd determined in the above-described manner in the desired front-wheel rotational transfer velocity determining section 36, and an estimated front-wheel rotational transfer velocity Vf_act.

The front-wheel driving actuator control section 42 determines, from the above-described input values, an electric current command value I_Vf_cmd which is a desired value of the electric current passed through the front-wheel driving actuator 10 (electric motor), by the processing in an electric current command value determining section 42-1.

The electric current command value determining section 42-1 determines a feedback manipulated variable component obtained by multiplying a deviation of Vf_act from Vf_cmd by a gain KVf_v of a prescribed value, as the electric current command value I_Vf_cmd, as shown by the following expression (58).

$$I\_Vf\_cmd = KVf\_v * (Vf\_cmd - Vf\_act) \quad (58)$$

It should be noted that, instead of using the above expression (58), I_Vf_cmd may be determined by, for example, multiplying a deviation of the detected value of the actual rotational angular velocity of the front wheel 3f, which is indicated by an output from the front-wheel rotational speed detector 20, from a value obtained by dividing Vf_cmd by the effective rolling radius of the front wheel 3f (i.e. a desired value of the rotational angular velocity of the front wheel 3f) by a gain of a prescribed value.

The front-wheel driving actuator control section 42 then controls the actual electric current passed through the front-wheel driving actuator 10 (electric motor) to match the electric current command value I_Vf_cmd, by an electric current control section 42-2 which is made up of a motor driver or the like.

In this manner, the control is performed such that the actual rotational transfer velocity of the front wheel 3f tracks the desired front-wheel rotational transfer velocity Vf_cmd (or such that the actual rotational angular velocity tracks the desired value of the rotational angular velocity corresponding to Vf_cmd).

It should be noted that the technique of controlling the front-wheel driving actuator 10 to cause the actual rotational transfer velocity of the front wheel 3f to track the desired front-wheel rotational transfer velocity Vf_cmd is not limited to the above-described technique; other techniques may be used as well. For example, various kinds of known speed control techniques related to electric motors (feedback control techniques for causing the actual rotational angular velocity of the rotor of the electric motor to track a desired value) may be adopted.

The handlebar driving actuator control section 43 carries out drive control of the handlebar driving actuator 9, by the control processing shown in the block diagram in FIG. 32, for example, to cause the actual rotational angle (handlebar angle) of the steering handlebar 7 to track a desired handlebar angle δh_cmd.

In this example, the handlebar driving actuator control section 43 receives a desired handlebar angle δh_cmd and a desired handlebar angular velocity δh_dot_cmd determined in the above-described manner in the desired handlebar angle determining section 38, a detected handlebar angle δh_act which is a detected value of the actual rotational angle of the steering handlebar 7, and a detected handlebar angular velocity δh_dot_act which is a detected value of the actual rotational angular velocity of the steering handlebar 7.

It should be noted that the detected handlebar angle δh_act and the detected handlebar angular velocity δh_dot_act are a value of the handlebar angle which is recognized on the basis of an output from the handlebar angle detector 18 and a value indicating a temporal change rate thereof, respectively.

The handlebar driving actuator control section 43 determines, from the above-described input values, an electric current command value I_δh_cmd which is a desired value of the electric current passed through the handlebar driving actuator 9 (electric motor), by the processing in an electric current command value determining section 43-1.

The electric current command value determining section 43-1 determines the electric current command value I_δh_cmd by summing up a feedback manipulated variable component obtained by multiplying a deviation of δh_act from δh_cmd by a gain Kδh_p of a prescribed value and a feedback manipulated variable component obtained by multiplying a deviation of δh_dot_act from δh_dot_cmd by a gain Kδh_v of a prescribed value, as shown by the following expression (59).

$$I\_\delta h\_cmd = K\delta h\_p * (\delta h\_cmd - \delta h\_act) + K\delta h\_v * (\delta h\_dot\_cmd - \delta h\_dot\_act) \quad (59)$$

The handlebar driving actuator control section 43 then controls the actual electric current passed through the handlebar driving actuator 9 (electric motor) to match the electric current command value I_δh_cmd, by an electric current control section 43-2 which is made up of a motor driver or the like.

In this manner, the control is performed such that the actual handlebar angle of the steering handlebar 7 tracks the desired handlebar angle δh_cmd.

It should be noted that the technique of controlling the handlebar driving actuator 9 to cause the actual handlebar angle of the steering handlebar 7 to track the desired handlebar angle δh_cmd is not limited to the above-described technique; various kinds of known servo control techniques, for example, may be adopted.

The above has described the details of the control processing in the control device 15 according the present embodiment.

Here, the correspondence between the present embodiment and the present invention will be described. In the present embodiment, the front wheel 3$f$ corresponds to the steering control wheel in the present invention, and the front-wheel steering actuator 8 (electric motor) corresponds to the steering actuator in the present invention.

Further, the inverted pendulum mass point 123 (first mass point 123) and the second mass point 124 in the two-wheeled vehicle 1A correspond respectively to the mass points A and B in the present invention. The dynamic behavior of the system having the inverted pendulum mass point 123 (first mass point 123) and the second mass point 124 is specifically expressed by the aforesaid expressions (19) to (27).

Further, in the present embodiment, for stabilizing the posture of the vehicle body 2, the front-wheel steering actuator 8 (electric motor) is controlled such that the inverted pendulum mass point lateral movement amount and the inverted pendulum mass point lateral velocity, constituting the motional state quantity of the inverted pendulum mass point 123, each approach (or converge to) zero, which is the desired value (Pb_diff_y_cmd, Vby_cmd), and also that the steering angle and the steering angular velocity, constituting the motional state quantity of the steering angle of the steering control wheel (front wheel 3$f$), each approach (or converge to) zero, which is the desired value.

Specifically, in the processing in the posture control arithmetic section 37, the desired front-wheel steering angular acceleration δf_dot2_cmd as an operational target of the front-wheel steering actuator 8 (steering actuator) is determined, by a feedback control law, so as to cause a deviation of each of the estimated inverted pendulum mass point lateral movement amount Pb_diff_y_act, the estimated inverted pendulum mass point lateral velocity Vby_act, the last time's desired front-wheel steering angle δf_cmd_p, representing a pseudo estimate of the steering angle δf, and the last time's desired front-wheel steering angular velocity δf_dot_cmd_p, representing a pseudo estimate of the steering angular velocity δf_dot, from the corresponding desired value to converge to zero.

Further, the driving force of the front-wheel steering actuator 8 is controlled by the aforesaid front-wheel steering actuator control section 41 such that the actual steering angle of the front wheel 3$f$ tracks a desired front-wheel steering angle δf_cmd which has been determined by performing integration twice on the above-described δf_dot2_cmd.

In this manner, the front-wheel steering actuator 8 is controlled so as to stabilize the motional state quantity of the inverted pendulum mass point 123 and the motional state quantity of the steering angle of the steering control wheel (front wheel 3$f$) and, hence, to stabilize the posture (in the roll direction) of the vehicle body 2.

In the present embodiment, the arrangement (relative to the front wheel 3$f$) of the steering axis Csf of the front wheel 3$f$ which is a steering control wheel is set such that, in the basic posture state of the two-wheeled vehicle 1A, the intersection point Ef of the steering axis Csf and a virtual straight line connecting the center of the axle of the front wheel 3$f$ and the ground contact point thereof is located below the ground surface 110 (that is, such that the height a of the intersection point Ef from the ground surface 110 satisfies: a<0).

Therefore, the condition that a<a_sum (and, hence, the aforesaid "first condition" in the present invention) is naturally satisfied for a_sum defined by the aforesaid expression (28). Further, the condition that a≤a_s (and, hence, the "second condition" in the present invention) is also naturally satisfied for a_s defined by the aforesaid expression (40). Still further, the condition that a≤Rf is also naturally satisfied for the radius of curvature, Rf, of the transverse cross-sectional shape of the steering control wheel (front wheel 3$f$) in the basic posture state of the two-wheeled vehicle 1A.

According to the present embodiment described above, it is set such that, in the basic posture state of the two-wheeled vehicle 1A, the height a of the intersection point Ef of the steering axis Csf of the front wheel 3$f$ which is a steering control wheel and a virtual straight line connecting the center of the axle of the front wheel 3$f$ and the ground contact point thereof satisfies: a<0 (and, hence, a<a_aum, a≤a_s, a≤Rf), as described above. As a result, the height a is set to satisfy the aforesaid "first condition" and "second condition".

Therefore, in the case where the actual inverted pendulum mass point lateral movement amount (estimated inverted pendulum mass point lateral movement amount Pb_diff_y_act) of the two-wheeled vehicle 1A deviates from the desired inverted pendulum mass point lateral movement amount Pb_diff_y_cmd (in other words, in the case where the actual posture of the vehicle body 2 deviates from the desired posture satisfying Pb_diff_y_act=0), the steering of the front wheel 3$f$ by the driving force of the front-wheel steering actuator 8 can cause a moment (in the roll direction) capable of making the actual inverted pendulum mass point lateral movement amount of the two-wheeled vehicle 1A smoothly restored to the desired inverted pendulum mass point lateral movement amount Pb_diff_y_cmd to act on the vehicle body 2, without the need for the rider to intentionally move the steering handlebar 7. That is, it is possible to cause the moment in the roll direction for stabilizing the posture of the vehicle body 2 to act on the vehicle body 2.

According to this moment, the actual roll angle of the vehicle body 2 is changed, so that the actual inverted pendulum mass point lateral movement amount is restored to the desired inverted pendulum mass point lateral movement amount Pb_diff_y_cmd. It should be noted that the actual inverted pendulum mass point lateral movement amount being restored to the desired inverted pendulum mass point lateral movement amount Pb_diff_y_cmd more specifically means that the actual roll angle of the vehicle body 2 and the actual steering angle of the front wheel 3$f$ are controlled so as to cause the estimated inverted pendulum mass point lateral movement amount Pb_diff_y_act, calculated by the aforesaid expression (51) from the actual roll angle of the vehicle body 2 and the actual steering angle of the front wheel 3$f$, to match the desired inverted pendulum mass point lateral movement amount Pb_diff_y_cmd.

At this time, the sensitivity of the above-described moment generated in accordance with the change in steering angle of the front wheel 3$f$ is relatively high. Therefore, the actual inverted pendulum mass point lateral movement amount of the two-wheeled vehicle 1A can be restored to the desired inverted pendulum mass point lateral movement amount Pb_diff_y_cmd, without causing an excessive change in steering angle of the front wheel 3$f$.

Further, through calculation of the desired front-wheel steering angular acceleration δf_dot2_cmd by the aforesaid expression (55), the desired front-wheel steering angular acceleration δf_dot2_cmd (operational target of the front-wheel steering actuator 8) is determined to make a deviation (Pb_diff_y_cmd−Pb_diff_y_act) of the estimated inverted pendulum mass point lateral movement amount Pb_diff_y_act, representing an observed value of the current actual inverted pendulum mass point lateral movement amount, from the desired inverted pendulum mass point lateral movement amount Pb_diff_y_cmd of the two-wheeled vehicle 1A, a deviation (Vby_cmd−Vby_act) of the estimated inverted pendulum mass point lateral velocity Vby_act, representing an observed value of the current actual inverted pendulum mass point lateral velocity, from the desired inverted pendulum mass point lateral velocity Vby_cmd of the two-wheeled vehicle 1A, the last time's desired front-wheel steering angle δf_cmd_p, representing a pseudo estimate of the current actual steering angle (from the neutral steering angle) of the front wheel 3f, and the last time's desired front-wheel steering angular velocity δf_dot_cmd_p, representing a pseudo estimate of the angular velocity of the current actual steering angle of the front wheel 3f, each approach "0" in the state where the rider is not attempting to move the steering handlebar 7.

Therefore, the steering angle of the front wheel 3f is controlled so as to cause the actual inverted pendulum mass point lateral movement amount and inverted pendulum mass point lateral velocity to converge to the respective desired values (zero in the present embodiment), while preventing the actual steering angle of the front wheel 3f from diverging from the neutral steering angle (while causing the actual steering angle to ultimately converge to the neutral steering angle).

Accordingly, the posture of the vehicle body 2 can be stabilized smoothly, particularly when the two-wheeled vehicle 1A is stopped or traveling at a low speed. Further, the two-wheeled vehicle 1A can be started smoothly with the vehicle body 2 in a stable posture.

In the case where a rider applies a rotative force (about the handlebar axis Ch) to the steering handlebar 7 in an attempt to move the steering handlebar 7, the steering angle of the front wheel 3f can be controlled with an angular acceleration corresponding to the magnitude of the rotative force applied to the steering handlebar 7, by the feedforward manipulated variable Th_act*Kh.

Further, the gains K1 and K2, which are the feedback gains related to the posture control in the roll direction of the vehicle body 2, are variably determined, as described above, in accordance with the estimated traveling speed Vox_act, which is an observed value of the current actual traveling speed (transfer velocity in the X-axis direction) of the two-wheeled vehicle 1A, and the last time's desired front-wheel steering angle δf_cmd_p, which is a pseudo estimate of the current actual steering angle of the front wheel 3f. Further, the gains K3 and K4, which are the feedback gains related to the control of the steering angle of the front wheel 3f, are variably determined, as described above, in accordance with the estimated traveling speed Vox_act.

Accordingly, when the two-wheeled vehicle 1A is stopped or traveling at a low speed, it is possible to perform the steering of the front wheel 3f to cause the actual inverted pendulum mass point lateral movement amount of the two-wheeled vehicle 1A to quickly approach the desired inverted pendulum mass point lateral movement amount Pb_diff_y_cmd.

In the state where the two-wheeled vehicle 1A is traveling at a high speed, the steering angle of the front wheel 3f can readily be maintained at the neutral steering angle. Further, even if the vehicle body 2 is leaned, the steering control of the front wheel 3f for causing the actual inverted pendulum mass point lateral movement amount of the two-wheeled vehicle 1A to approach the desired inverted pendulum mass point lateral movement amount Pb_diff_y_cmd is not performed, or such steering control is restricted. Consequently, a rider can readily turn the two-wheeled vehicle 1A by banking the vehicle body 2 by shifting the weight of the rider's body, as with a conventional two-wheeled vehicle.

Second Embodiment

A second embodiment of the present invention will be described below with reference to FIGS. 33 to 45.

Figure 11:
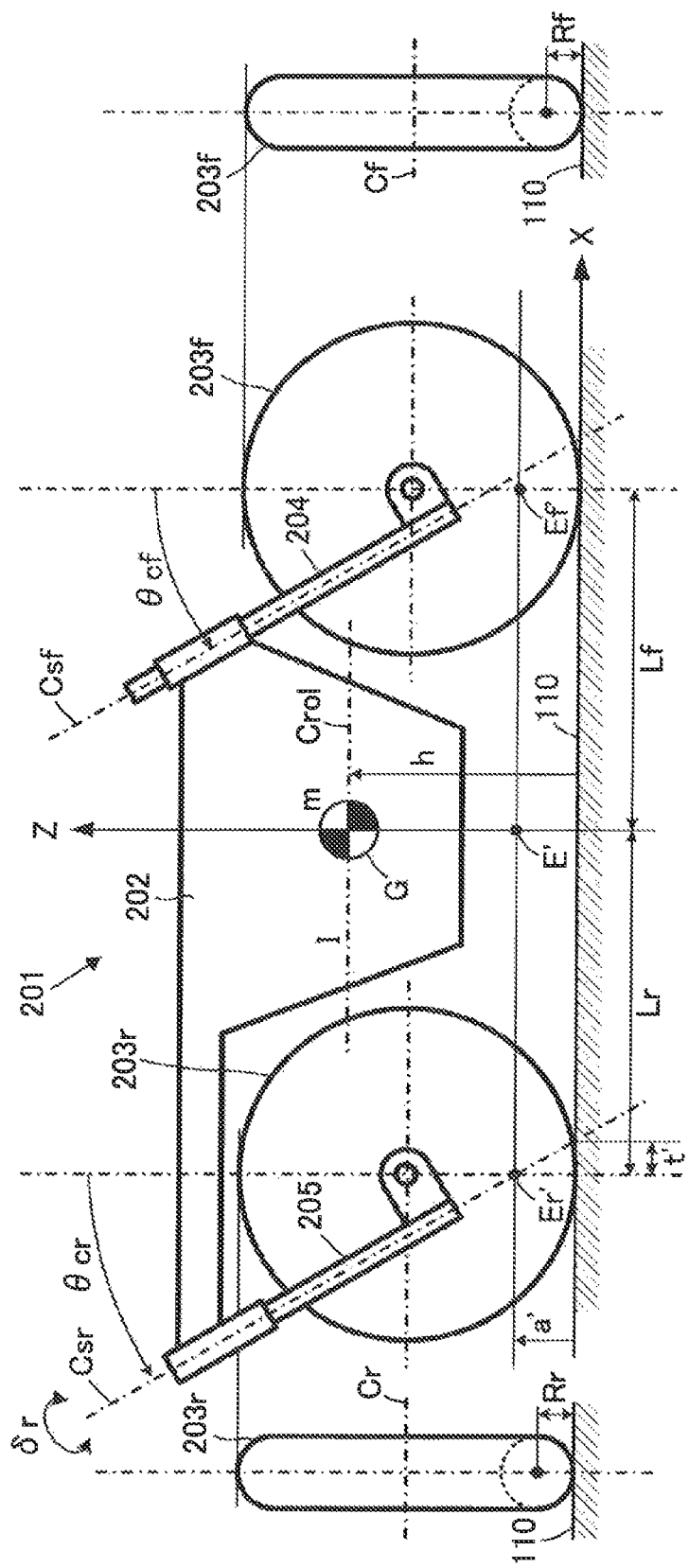
FIG. 11 is a diagram schematically showing another two-wheeled vehicle (rear-wheel steering two-wheeled vehicle) for illustrating the fundamental technical matters related to the present invention.
Figure 12:
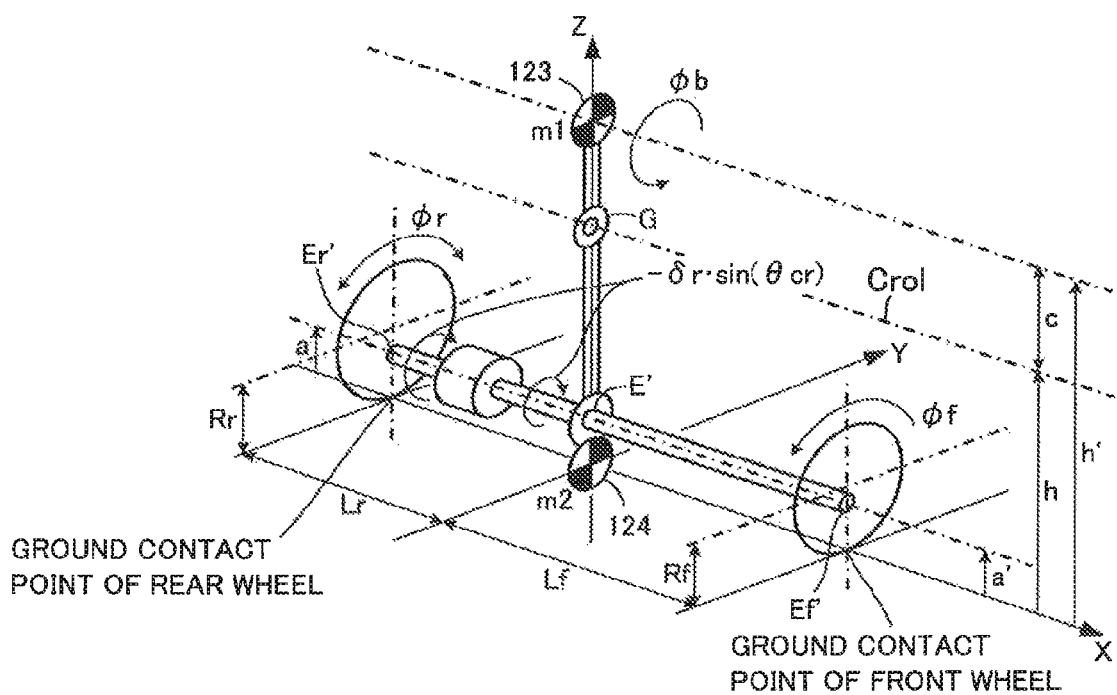
FIG. 12 is a diagram showing a model related to the behavior of the two-wheeled vehicle in FIG. 11.
Figure 33:
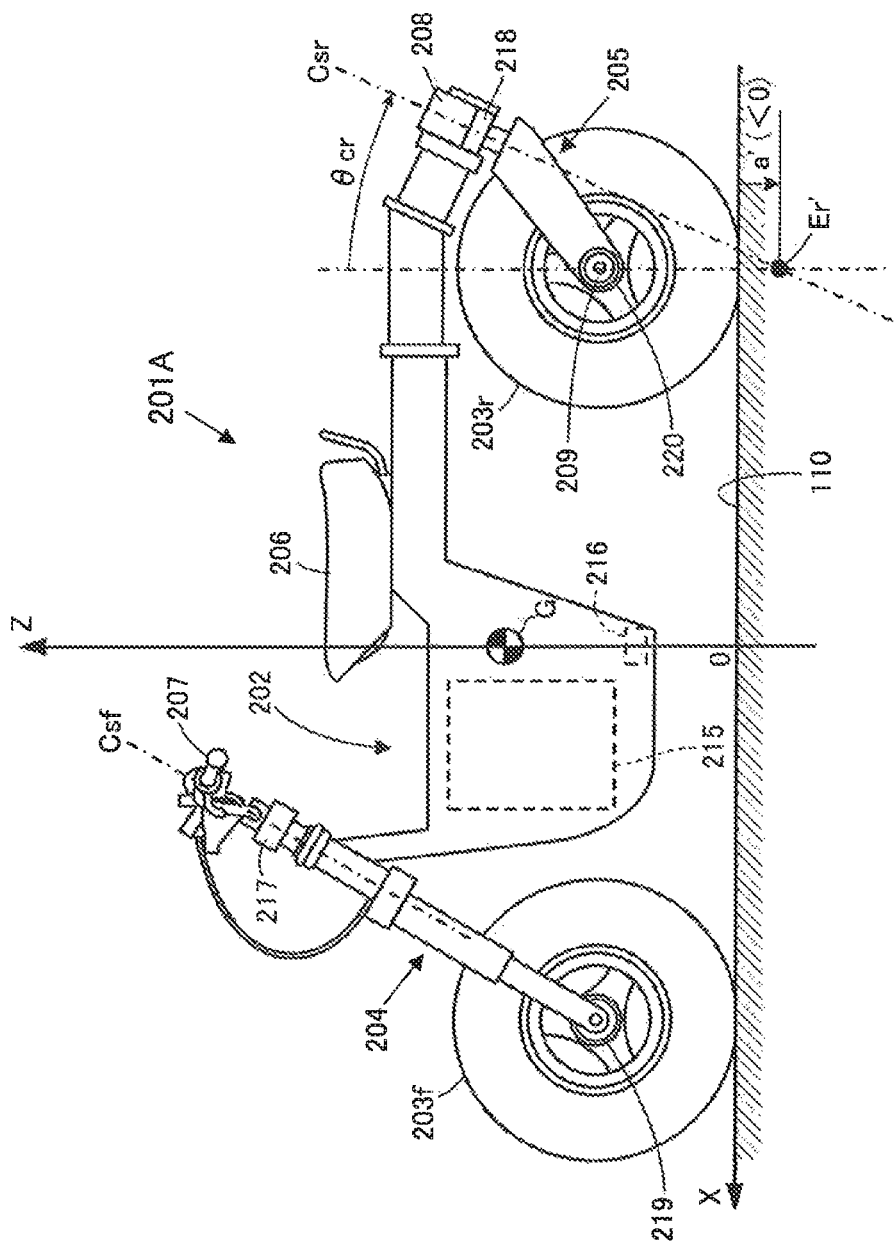
FIG. 33 is a side view of a mobile vehicle (two-wheeled vehicle) according to a second embodiment of the present invention.

Referring to FIG. 33, a mobile vehicle 201A according to the present embodiment is a two-wheeled vehicle embodying the rear-wheel steering two-wheeled vehicle 201 shown in FIG. 11. In the description of the present embodiment, for convenience sake, the components of the mobile vehicle 201A having the same functions as those of the rear-wheel steering two-wheeled vehicle 201 shown in FIG. 11 will be denoted by the same reference signs as those used in FIG. 11.

This mobile vehicle 201A (hereinafter, referred to as "two-wheeled vehicle 201A") has a vehicle body 202, and a front wheel 203f and a rear wheel 203r arranged spaced apart from each other in the longitudinal direction of the vehicle body 202.

On the upper surface of the vehicle body 202, a seat 206 is provided for a rider to sit astride.

At the front portion of the vehicle body 202, a front-wheel support mechanism 204 for axially supporting the front wheel 203f, and a steering handlebar 207 for a rider who has sat on the seat 206 to hold are mounted.

The front-wheel support mechanism 204 is made up of a front fork which includes a suspension mechanism such as a damper, for example. The mechanical structure of the front-wheel support mechanism is similar to that of a conventional motorcycle, for example. At one end of this front-wheel support mechanism 204 (at its end on the front side of the vehicle body 202), the front wheel 203f is axially supported, via bearings or the like, such that it can rotate about the axle centerline Cf (rotational axis of the front wheel 203f) that extends in the direction orthogonal to the diameter direction of the front wheel 203f (in the direction perpendicular to the paper plane of FIG. 33).

The front-wheel support mechanism 204 is mounted to the front portion of the vehicle body 202 such that the mechanism can rotate about a steering axis Csf which is tilted backward. This configuration makes the front wheel 203f serve as a steering control wheel which can be rotated, or, steered about the steering axis Csf together with the front-wheel support mechanism 204.

The steering handlebar 207 is mounted to the front portion of the vehicle body 202 so as to be able to rotate about the steering axis Csf of the front wheel 203f in an integrated manner with the front-wheel support mechanism 204. Although not shown in detail in the figure, this steering handlebar 207 is equipped with an accelerator grip, brake lever, turn signal switch, and so on, as with the handlebar of a conventional motorcycle.

The rear portion of the vehicle body 202 is extended to over the rear wheel 203r. At the rear end portion of the vehicle body 202, a rear-wheel support mechanism 205 for axially supporting the rear wheel 203r in a rotatable manner and an actuator 208 for generating a driving force for steering the rear wheel 203r are mounted.

The rear-wheel support mechanism 205 is made up of a suspension mechanism including a damper and a swing arm.

The rear-wheel support mechanism 205 is arranged to extend downward from the rear end portion of the vehicle body 202.

At the lower end of the rear-wheel support mechanism 205, the rear wheel 203r is axially supported, via bearings or the like, such that it can rotate about the axle centerline Cr (rotational axis of the rear wheel 203r) that extends in the direction orthogonal to the diameter direction of the rear wheel 203r (in the direction perpendicular to the paper plane of FIG. 33).

In the present embodiment, an actuator 209 for rotatively driving the rear wheel 203r about its axle centerline Cr is attached to the axle of the rear wheel 203r. The actuator 209 serves as a power engine which generates a thrust force for the two-wheeled vehicle 201A. In the present embodiment, this actuator 209 (hereinafter, also referred to as "rear-wheel driving actuator 209") is made up of an electric motor (with a speed reducer).

It should be noted that the actuator 209 may be made up of a hydraulic actuator, for example, instead of the electric motor. Alternatively, the actuator 209 may be made up of an internal combustion engine. Furthermore, the actuator 209 may be attached to the vehicle body 202 at a position apart from the axle of the rear wheel 203r, and the actuator 209 and the axle of the rear wheel 203r may be connected by an appropriate power transmission device.

The rear-wheel support mechanism 205 is mounted to the vehicle body 202 such that the mechanism can rotate about a steering axis Csr which is tilted backward. This configuration makes the rear wheel 203r serve as a steering control wheel which can be rotated, or, steered about the steering axis Csr together with the rear-wheel support mechanism 205. As the steering axis Csr is tilted backward, the rear wheel 203r has a positive caster angle θcr.

In this case, in the two-wheeled vehicle 201A of the present embodiment, the relative arrangement of the steering axis Csr and the rear wheel 203r in the basic posture state of the vehicle is set, as shown in FIG. 33, such that an intersection point Er' of the steering axis Csr and a straight line connecting the center of the axle of the rear wheel 203r and the ground contact point thereof is located below the ground surface 110 in the basic posture state. Accordingly, a height a' of the intersection point Er' from the ground surface 110 takes a negative value.

It should be noted that the basic posture state of the two-wheeled vehicle 201A is, as with the basic posture state of the two-wheeled vehicle 201 in FIG. 11, the state where the front wheel 203f and the rear wheel 203r are both stationary in the upright posture in contact with the ground surface 110 and the axle centerlines (centers of the rotational axes) Cf and Cr of the front wheel 203f and the rear wheel 203r extend in parallel with each other in the direction orthogonal to the longitudinal direction of the vehicle body 202.

The aforesaid actuator 208 generates, as a driving force for performing the steering of the rear wheel 203r, a rotative driving force to cause the rear wheel 203r to rotate about the steering axis Csr. In the present embodiment, this actuator 208 is made up of an electric motor (with a speed reducer). The actuator 208 (hereinafter, also referred to as "rear-wheel steering actuator 208") is connected to the rear-wheel support mechanism 205 so as to apply the rotative driving force about the steering axis Csr to the rear-wheel support mechanism 205.

Accordingly, as the rotative driving force is applied from the rear-wheel steering actuator 208 to the rear-wheel support mechanism 205, the rear-wheel support mechanism 205 is rotatively driven about the steering axis Csr together with the rear wheel 203r. As a result, the rear wheel 203r is steered by the rotative driving force from the rear-wheel steering actuator 208.

It should be noted that the actuator 208 is not limited to the electric motor; it may be made up, for example, of a hydraulic actuator.

Figure 34:
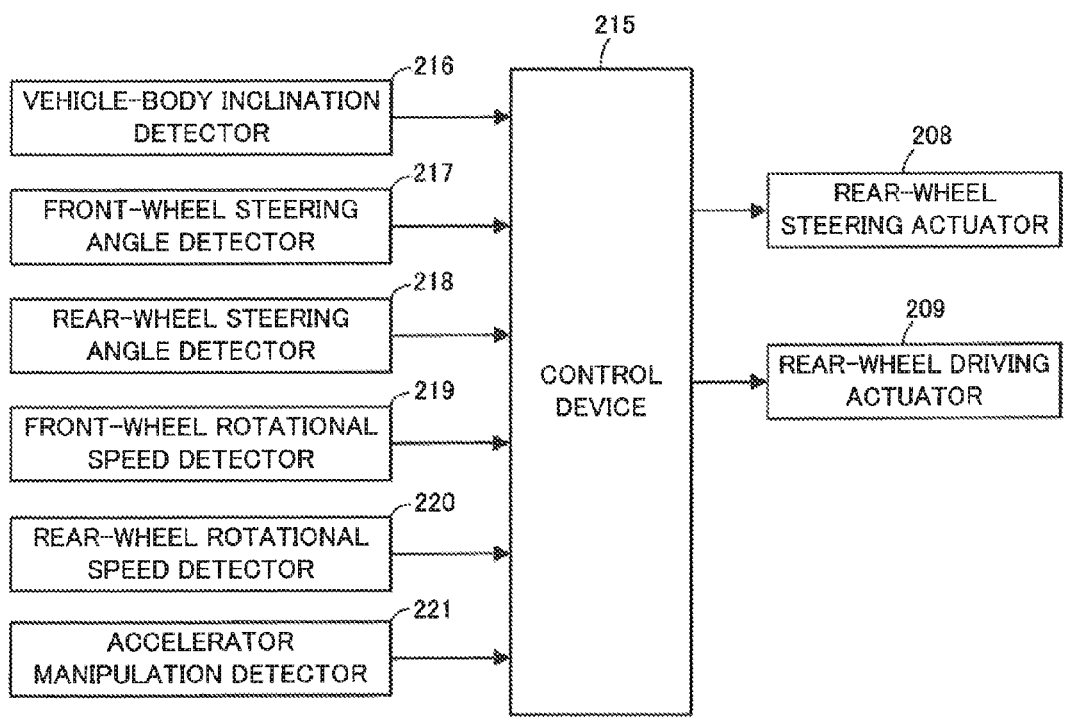
FIG. 34 is a block diagram showing the configuration related to the control of the mobile vehicle according to the second embodiment.

Besides the above-described mechanical configuration, the two-wheeled vehicle 201A includes, as shown in FIG. 34, a control device 215 which carries out control processing for controlling the operations of the rear-wheel steering actuator 208 and the rear-wheel driving actuator 209 (and, hence, controlling the posture of the vehicle body 202 and so on).

The two-wheeled vehicle 201A further includes, as sensors for detecting various kinds of state quantities necessary for the control processing in the control device 215, a vehicle-body inclination detector 216 for detecting an inclination angle φb in the roll direction of the vehicle body 202, a front-wheel steering angle detector 217 for detecting a steering angle δf (angle of rotation about the steering axis Csf) of the front wheel 203f, a rear-wheel steering angle detector 218 for detecting a steering angle δr (angle of rotation about the steering axis Csr) of the rear wheel 203r, a front-wheel rotational speed detector 219 for detecting a rotational speed (angular velocity) of the front wheel 203f, a rear-wheel rotational speed detector 220 for detecting a rotational speed (angular velocity) of the rear wheel 203r, and an accelerator manipulation detector 221 which outputs a detection signal corresponding to the manipulated variable (rotational amount) of the accelerator grip of the steering handlebar 207.

It should be noted that the steering angle δr of the rear wheel 203r more specifically means the rotational angle of the rear wheel 203r from the steering angle (neutral steering angle) in its non-steered state (the state in which the direction of the axle centerline Cr of the rear wheel 203r corresponds to the direction orthogonal to the longitudinal direction of the vehicle body 202 (or, direction parallel to the Y axis)). Therefore, the steering angle δr of the rear wheel 203r in the non-steered state is "0". The same applies to the steering angle δf of the front wheel 203f.

The positive rotational direction of the steering angle δr of the rear wheel 203r corresponds to the direction of rotation that makes the front end of the rear wheel 203r turn left with respect to the vehicle body 202 (in other words, the direction in which the rear wheel 203r turns counterclockwise about the steering axis Csr as the two-wheeled vehicle 201A is seen from above), as in the case of the two-wheeled vehicle 201 shown in FIG. 11. The same applies to the steering angle δf of the front wheel 203f.

The control device 215, which is an electronic circuit unit made up of a CPU, RAM, ROM, interface circuit and so on, is mounted on the vehicle body 202. This control device 215 is configured to receive outputs (detection signals) from the respective detectors 216 to 221 described above.

The control device 215 may include a plurality of CPUs or processors. Further, the control device 215 may be made up of a plurality of mutually communicable electronic circuit units.

The vehicle-body inclination detector 216, which is made up of an acceleration sensor and a gyro sensor (angular velocity sensor), for example, is mounted on the vehicle body 202. In this case, the control device 215 carries out arithmetic processing on the basis of the outputs of the acceleration sensor and the gyro sensor to measure the inclination angle in the roll direction (more specifically, the inclination angle in the roll direction with respect to the vertical direction (direction of gravitational force)) of the vehicle body 202. For this measurement, the technique proposed by the present applicant in Japanese Patent No. 4181113, for example, may be adopted.

The front-wheel steering angle detector 217 is made up, for example, of a rotary encoder attached to the rotary shaft of the front-wheel support mechanism 204 (or the steering handlebar 207) on the aforesaid steering axis Csf.

The rear-wheel steering angle detector 218 is made up, for example, of a rotary encoder attached to the rear-wheel steering actuator 208 on the aforesaid steering axis Csr.

The front-wheel rotational speed detector 219 is made up, for example, of a rotary encoder attached to the axle of the front wheel 203f.

The rear-wheel rotational speed detector 220 is made up, for example, of a rotary encoder attached to the axle of the rear wheel 203r.

The accelerator manipulation detector 221 is made up, for example, of a rotary encoder or a potentiometer built in the steering handlebar 207.

The functions of the above-described control device 215 will be described further with reference to FIG. 35. The XYZ coordinate system used in the following description is, as in the case of the two-wheeled vehicle 201 in FIG. 11, a coordinate system in which, in the basic posture state of the two-wheeled vehicle 201A, the vertical direction (up-and-down direction) is defined as the Z-axis direction, the longitudinal direction of the vehicle body 202 as the X-axis direction, the lateral direction of the vehicle body 202 as the Y-axis direction, and a point on the ground surface 110 immediately beneath the overall center of gravity G of the two-wheeled vehicle 201A as the origin (see FIG. 33).

Figure 35:
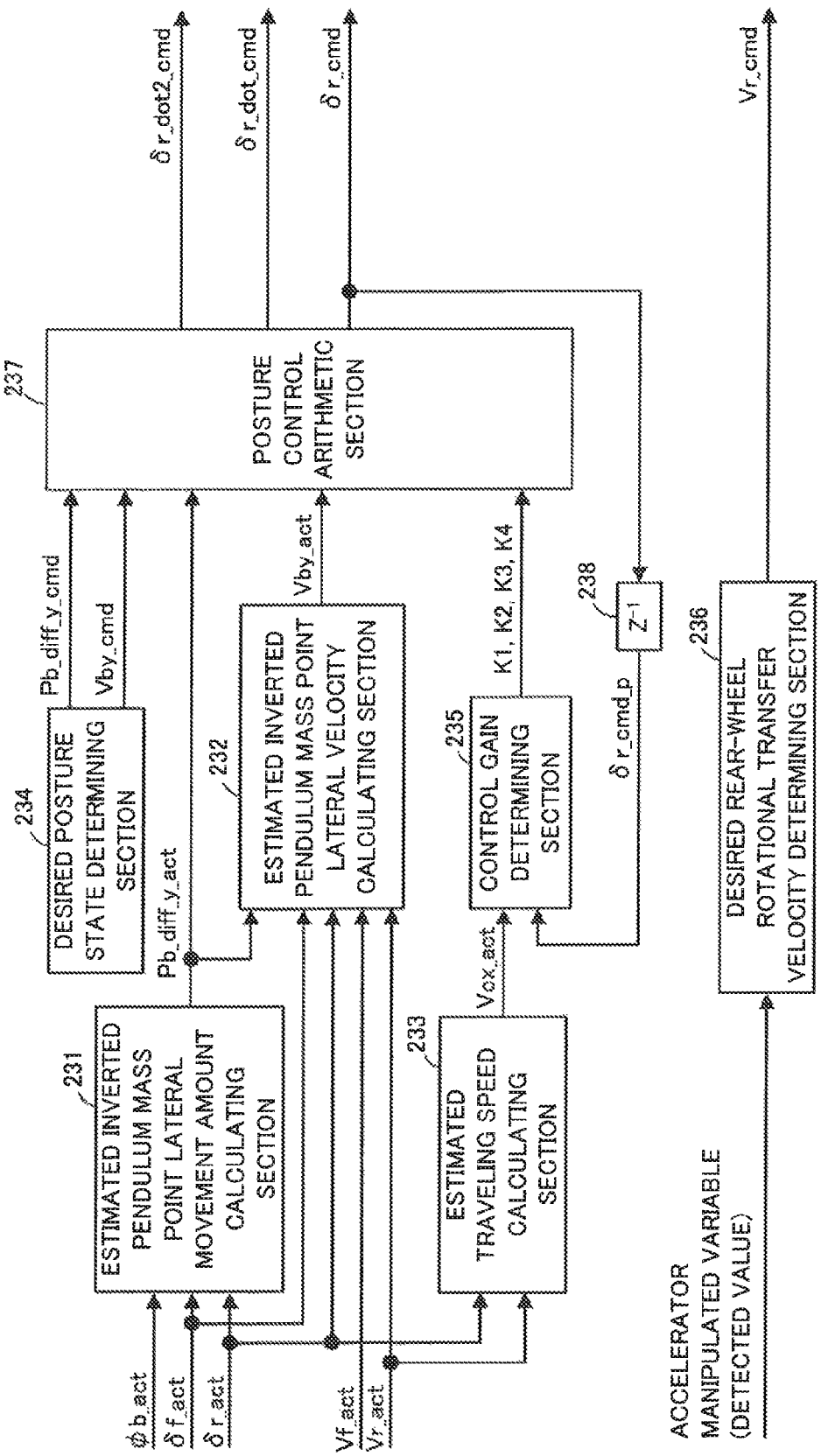
FIG. 35 is a block diagram showing the major functions of the control device shown in FIG. 34.

The control device 215 includes, as functions implemented when the CPU executes installed programs (functions implemented by software) or as functions implemented by hardware, as shown in FIG. 35: an estimated inverted pendulum mass point lateral movement amount calculating section 231 which calculates an estimate of an actual value Pb_diff_y_act (hereinafter, referred to as "estimated inverted pendulum mass point lateral movement amount Pb_diff_y_act") of an inverted pendulum mass point lateral movement amount Pb_diff_y representing a movement amount in the Y-axis direction (lateral direction of the vehicle body 202) of an inverted pendulum mass point 123 (=first mass point 123) of the two-wheeled vehicle 201A, an estimated inverted pendulum mass point lateral velocity calculating section 232 which calculates an estimate of an actual value Vby_act (hereinafter, referred to as "estimated inverted pendulum mass point lateral velocity Vby_act") of an inverted pendulum mass point lateral velocity Vby representing a translational velocity in the Y-axis direction (lateral direction of the vehicle body 202) of the inverted pendulum mass point 123, an estimated traveling speed calculating section 233 which calculates an estimate of the actual value Vox_act (hereinafter, referred to as "estimated traveling speed Vox_act") of the traveling speed Vox of the two-wheeled vehicle 201A, a desired posture state determining section 234 which determines a desired value Pb_diff_y_cmd (hereinafter, referred to as "desired inverted pendulum mass point lateral movement amount Pb_diff_y_cmd") of the inverted pendulum mass point lateral movement amount Pb_diff_y and a desired value Vby_cmd (hereinafter, referred to as "desired inverted pendulum mass point lateral velocity Vby_cmd") of the inverted pendulum mass point lateral velocity Vby, a control gain determining section 235 which determines values of a plurality of gains K1, K2, K3, and K4 for posture control of the vehicle body 202, and a desired rear-wheel rotational transfer velocity determining section 236 which determines a desired value Vr_cmd (hereinafter, referred to as "desired rear-wheel rotational transfer velocity Vr_cmd") of the rotational transfer velocity Vr of the rear wheel 203r (translational velocity of the rear wheel 203r as the rear wheel 203r rolls on the ground surface 110).

The control device 215 further includes a posture control arithmetic section 237 which carries out arithmetic processing for the posture control of the vehicle body 202 to thereby determine a desired value δr_cmd (hereinafter, referred to as "desired rear-wheel steering angle δr_cmd") of the steering angle δr of the rear wheel 203r, a desired value δr_dot_cmd (hereinafter, referred to as "desired rear-wheel steering angular velocity δr_dot_cmd") of the steering angular velocity δr_dot which is a temporal change rate of the steering angle δr, and a desired value δr_dot2_cmd (hereinafter, referred to as "desired rear-wheel steering angular acceleration δr_dot2_cmd") of the steering angular acceleration δr_dot2 which is a temporal change rate of the steering angular velocity δr_dot.

The control device 215 carries out the processing in the above-described functional sections successively at prescribed control processing cycles. The control device 215 then controls the rear-wheel steering actuator 208 in accordance with the desired rear-wheel steering angle δr_cmd, the desired rear-wheel steering angular velocity δr_dot_cmd, and the desired rear-wheel steering angular acceleration δr_dot2_cmd determined by the posture control arithmetic section 237.

Further, the control device 215 controls the rear-wheel driving actuator 209 in accordance with the desired rear-wheel rotational transfer velocity Vr_cmd determined by the desired rear-wheel rotational transfer velocity determining section 236.

The control processing performed by the control device 215 will be described below in detail.

At each control processing cycle, the control device 215 first carries out the processing in the estimated inverted pendulum mass point lateral movement amount calculating section 231. It should be noted that the algorithm of the processing in the estimated inverted pendulum mass point lateral movement amount calculating section 231 in the present embodiment has been established assuming, by way of example, that the dynamic behavior of the two-wheeled vehicle 201A is expressed by the dynamic behavior that is obtained when the system in which a mass point and an inertia moment have been set only for the vehicle body 202 of the two-wheeled vehicle 201A, as in the two-wheeled vehicle 201 in FIG. 11, is equivalently transformed to the system, shown in FIG. 2B, which is made up of the aforesaid first mass point 123 (inverted pendulum mass point) and the second mass point 124.

As shown in FIG. 35, the estimated inverted pendulum mass point lateral movement amount calculating section 231 receives a detected value of the actual value φb_act (hereinafter, referred to as "detected roll angle φb_act") of the roll angle (inclination angle in the direction about the X axis (roll direction)) φb of the vehicle body 202, a detected value of the actual value δf_act (hereinafter, referred to as "detected front-wheel steering angle δf_act") of the steering angle δf of the front wheel 203f, and a detected value of the actual value δr_act (hereinafter, referred to as "detected rear-wheel steering angle δr_act") of the steering angle δr of the rear wheel 203r.

The detected roll angle φb_act is a detected value (observed value) indicated by an output from the vehicle-body inclination detector 216, the detected front-wheel steering angle δf_act is a detected value (observed value) indicated by an output from the front-wheel steering angle detector 217, and the detected rear-wheel steering angle δr_act is a detected value (observed value) indicated by an output from the rear-wheel steering angle detector 218.

Here, in the case where it is assumed that a mass point and an inertia moment are set only for the vehicle body 202 of the two-wheeled vehicle 201A and that the dynamic behavior of the two-wheeled vehicle 201A is expressed by the behavior of the mass point system made up of the first mass point 123 (inverted pendulum mass point) and the second mass point 124, the first mass point 123 and the second mass point 124 are on the plane of symmetry of the vehicle body 202 (plane of symmetry when the vehicle body 202 is considered to be bilaterally symmetrical), as explained above. Therefore, the inclination in the roll direction of the line segment connecting the first mass point 123 and the second mass point 124 corresponds to the inclination in the roll direction of the vehicle body 202 of the two-wheeled vehicle 201A.

Accordingly, in the case where the inclination angle φb in the roll direction of the vehicle body 202 of the two-wheeled vehicle 201A is sufficiently small, the difference between the movement amount in the Y-axis direction of the first mass point 123 and the movement amount in the Y-axis direction of the second mass point 124 coincides with a value obtained by multiplying the inclination angle φb in the roll direction of the vehicle body 202 of the two-wheeled vehicle 201A by the height h' of the first mass point 123.

Further, in the two-wheeled vehicle 201A of the present embodiment, the front wheel 203f and the rear wheel 203r are both steering control wheels. Therefore, the movement amount q in the Y-axis direction of the second mass point 124 is determined uniquely from the steering angle δf of the front wheel 3f and the steering angle δr of the rear wheel 203r.

Accordingly, the movement amount in the Y-axis direction of the first mass point 123, which is the inverted pendulum mass point, is obtained as a sum of a component attributable to the inclination in the roll direction of the vehicle body 202 of the two-wheeled vehicle 201A, a component attributable to the steering angle δf of the front wheel 203f, and a component attributable to the steering angle δr of the rear wheel 203r.

The estimated inverted pendulum mass point lateral movement amount calculating section 231 uses this relationship to calculate the estimated inverted pendulum mass point lateral movement amount Pb_diff_y_act on the basis of the detected roll angle φb_act, the detected front-wheel steering angle δf_act, and the detected rear-wheel steering angle δr_act.

Figure 36:
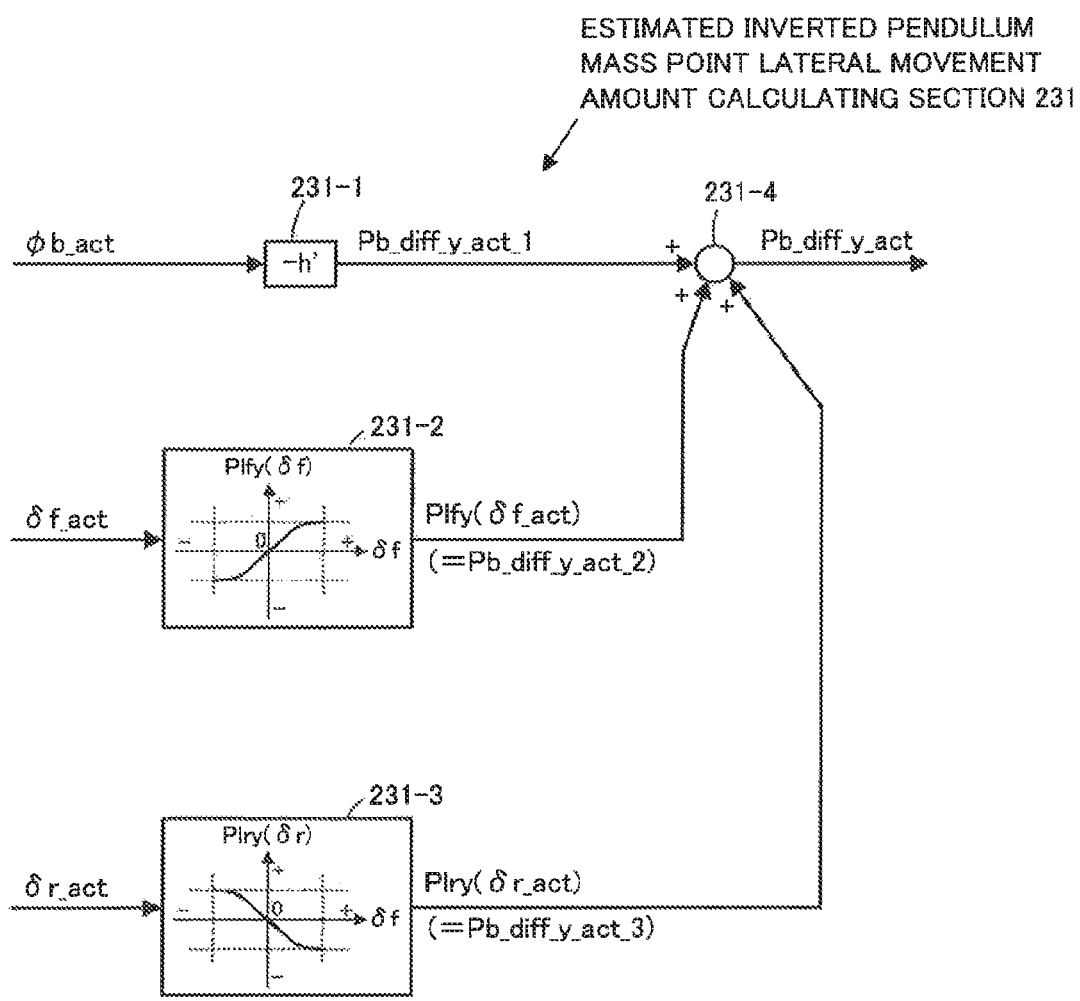
FIG. 36 is a block diagram showing the processing performed by the estimated inverted pendulum mass point lateral movement amount calculating section shown in FIG. 35.

More specifically, the estimated inverted pendulum mass point lateral movement amount calculating section 231 calculates the estimated inverted pendulum mass point lateral movement amount Pb_diff_y_act by the processing shown in the block diagram in FIG. 36.

This processing is configured to sum up a first estimated lateral movement amount component Pb_diff_y_act_1, which is an estimate of the actual movement amount in the Y-axis direction of the inverted pendulum mass point 123 caused by the inclination in the roll direction of the vehicle body 202, a second estimated lateral movement amount component Pb_diff_y_act_2, which is an estimate of the actual movement amount in the Y-axis direction of the inverted pendulum mass point 123 caused by the steering of the front wheel 203f, and a third estimated lateral movement amount component Pb_diff_y_act_3, which is an estimate of the actual movement amount in the Y-axis direction of the inverted pendulum mass point 123 caused by the steering of the rear wheel 203r, to thereby calculate the estimated inverted pendulum mass point lateral movement amount Pb_diff_y_act.

In FIG. 36, a processing section 231-1 represents a processing section which obtains the first estimated lateral movement amount component Pb_diff_y_act_1, a processing section 231-2 represents a processing section which obtains the second estimated lateral movement amount component Pb_diff_y_act_2, a processing section 231-3 represents a processing section which obtains the third estimated lateral movement amount component Pb_diff_y_act_3, and a processing section 231-4 represents a processing section which sums up the first estimated lateral movement amount component Pb_diff_y_act_1, the second estimated lateral movement amount component Pb_diff_y_act_2, and the third estimated lateral movement amount component Pb_diff_y_act_3.

The processing section 231-1 determines the first estimated lateral movement amount component Pb_diff_y_act_1 in accordance with the detected roll angle φb_act at the current time. More specifically, the processing section 231-1 multiplies the detected roll angle φb_act (angle value in [rad]) by the height h' (=c+h), multiplied by −1, of the inverted pendulum mass point 123, to calculate the first estimated lateral movement amount component Pb_diff_y_act_1 (=φb_act*(−h')).

Accordingly, the first estimated lateral movement amount component Pb_diff_y_act_1 is calculated, in accordance with the detected roll angle φb_act, as a value of a linear function with respect to the roll angle φb of the vehicle body 202 (a value of a constant multiple of φb). Further, Pb_diff_y_act_1 becomes zero in the state where φb_act=0 (where the vehicle body 202 is not leaned to the right or left), and therefore, it is the movement amount in the Y-axis direction with reference to the position of the inverted pendulum mass point 123 in that state.

It should be noted that sin(φb_act) is approximated by φb_act in the calculating processing in the processing section 231-1. Further, the value of h' (or c, h) has been preset in the two-wheeled vehicle 201A and is stored in a memory in the control device 215. For example, the value has been set to satisfy the relationship in the aforesaid expression (5b) (the relationship that c(=h'−h)=I/(m*h)), from the height h of the overall center of gravity G in the basic posture state of the two-wheeled vehicle 201A, the overall inertia I of the two-wheeled vehicle 201A (inertia moment about the axis passing through the overall center of gravity G and parallel to the X-axis direction), and the total mass m of the two-wheeled vehicle 201A.

The value of h', however, may be set to a value roughly approximating the value satisfying the relationship in the above expression (5b) such that optimal control characteristics can be obtained on the basis of various experiments, simulation, etc.

The processing section 231-2 in FIG. 36 determines the second estimated lateral movement amount component Pb_diff_y_act_2 in accordance with the detected front-wheel steering angle δf_act at the current time. More specifically, the processing section 231-2 obtains the second estimated lateral movement amount component Pb_diff_y_act_2 (=Plfy(δf_act)) from the detected front-wheel steering angle δf_act at the current time, by a preset conversion function Plfy(δf). That is, the processing section 231-2 obtains a value Plfy(δf_act) of the conversion function Plfy(δf) corresponding to δf_act, and determines the obtained value as the second estimated lateral movement amount component Pb_diff_y_act_2.

The above conversion function Plfy(δf) is defined, for example, by a mapping or an arithmetic expression. The conversion function Plfy(δf) is a nonlinear function which has been preset, as illustrated by the graph shown in the processing section 231-2 in FIG. 36, such that Plfy(δf) monotonically changes (in the present embodiment, monotonically increases) with increasing steering angle δf of the front wheel 203f, and such that the magnitude of the rate of change of Plfy(δf) with respect to the steering angle δf (the amount of change of Plfy(δf) per unit increase of δf) becomes relatively small in the region where the magnitude (absolute value) of the steering angle δf of the front wheel 203f is relatively large, compared to that in the region where the magnitude of the steering angle δf is small (region where δf is near zero).

Accordingly, the second estimated lateral movement amount component Pb_diff_y_act_2 is determined, in accordance with the detected front-wheel steering angle δf_act, as a value of a nonlinear function with respect to the steering angle δf of the front wheel 203f.

The processing section 231-3 in FIG. 36 determines the third estimated lateral movement amount component Pb_diff_y_act_3 in accordance with the detected rear-wheel steering angle δr_act at the current time. More specifically, the processing section 231-3 obtains the third estimated lateral movement amount component Pb_diff_y_act_3 (=Plry(δr_act)) from the detected rear-wheel steering angle δr_act at the current time, by a preset conversion function Plry(δr). That is, the processing section 231-3 obtains a value Plry(δr_act) of the conversion function Plry(δr) that corresponds to δr_act, and determines the obtained value as the third estimated lateral movement amount component Pb_diff_y_act_3.

The conversion function Plry(δr) is defined, for example, by a mapping or an arithmetic expression. The conversion function Plry(δr) is a nonlinear function which has been preset, as illustrated by the graph shown in the processing section 231-3 in FIG. 36, such that Plry(δr) monotonically changes (in the present embodiment, monotonically decreases) with increasing steering angle δr of the rear wheel 203r, and such that the magnitude of the rate of change of Plry(δr) with respect to the steering angle δr (the amount of change of Plry(δr) per unit increase of δr) becomes relatively small in the region where the magnitude (absolute value) of the steering angle δr of the rear wheel 203r is relatively large, compared to that in the region where the magnitude of the steering angle δr is small (region where δr is near zero).

Accordingly, the third estimated lateral movement amount component Pb_diff_y_act_3 is determined, in accordance with the detected rear-wheel steering angle δr_act, as a value of a nonlinear function with respect to the steering angle δr of the rear wheel 203r.

The estimated inverted pendulum mass point lateral movement amount calculating section 231 determines the estimated inverted pendulum mass point lateral movement amount Pb_diff_y_act by summing up, in the processing section 231-4, the first estimated lateral movement amount component Pb_diff_y_act_1, the second estimated lateral movement amount component Pb_diff_y_act_2, and the third estimated lateral movement amount component Pb_diff_y_act_3 calculated in the above-described manner.

Accordingly, the estimated inverted pendulum mass point lateral movement amount Pb_diff_y_act is determined by the following expression (71).

$$Pb\_diff\_y\_act = \qquad (71)$$
$$Pb\_diff\_y\_act\_1 + Pb\_diff\_y\_act\_2 + Pb\_diff\_y\_act\_3 =$$
$$\phi b\_act * (-h') + Plfy(\delta f\_act) + Plry(\delta r\_act)$$

In the above expression (71), the first term on the right side is a linear term with respect to the detected roll angle φb_act, the second term on the right side is a nonlinear term with respect to the detected front-wheel steering angle δf_act, and the third term on the right side is a nonlinear term with respect to the detected rear-wheel steering angle δr_act.

It should be noted that the second term on the right side of the expression (71) can be ignored when the magnitude of the value Plfy(δf_act) of the aforesaid conversion function Plfy(δf) corresponding to the actual steering angle δf_act of the front wheel 203f is sufficiently small (when the magnitude of δf_act is small).

Similarly, the third term on the right side of the expression (71) can be ignored when the magnitude of the value Plry(δr_act) of the aforesaid conversion function Plry(δr) corresponding to the actual steering angle δr_act of the rear wheel 203r is sufficiently small (when the magnitude of δr_act is small).

Further, in the case where the magnitudes of both of Plfy(δf_act) and Plry(δr_act) are sufficiently small, the detected roll angle φb_act of the vehicle body 202 may be used instead of the estimated inverted pendulum mass point lateral movement amount Pb_diff_y_act. With this configuration, the processing in the estimated inverted pendulum mass point lateral movement amount calculating section 231 becomes unnecessary, so that the computational load of the control device 215 can be reduced.

Next, the control device 215 carries out the processing in the estimated inverted pendulum mass point lateral velocity calculating section 232.

As shown in FIG. 35, the estimated inverted pendulum mass point lateral velocity calculating section 232 receives the estimated inverted pendulum mass point lateral movement amount Pb_diff_y_act calculated in the estimated inverted pendulum mass point lateral movement amount calculating section 231, a detected front-wheel steering angle δf_act, an estimate of the actual value Vf_act (hereinafter, referred to as "estimated front-wheel rotational transfer velocity Vf_act") of the rotational transfer velocity Vf of the front wheel 203f, a detected rear-wheel steering angle δr_act, and an estimate of the actual value Vr_act (hereinafter, referred to as "estimated rear-wheel rotational transfer velocity Vr_act") of the rotational transfer velocity Vr of the rear wheel 203r.

It should be noted that the estimated front-wheel rotational transfer velocity Vf_act is a velocity which is calculated by multiplying a detected value (observed value) of the rotational angular velocity of the front wheel 203f, indicated by an output from the aforesaid front-wheel rotational speed detector 219, by a predetermined effective rolling radius of the front wheel 203f. Similarly, the estimated rear-wheel rotational transfer velocity Vr_act is a velocity which is calculated by multiplying a detected value (observed value) of the rotational angular velocity of the rear wheel 203r, indicated by an output from the aforesaid rear-wheel rotational speed detector 220, by a predetermined effective rolling radius of the rear wheel 203r.

Figure 37:
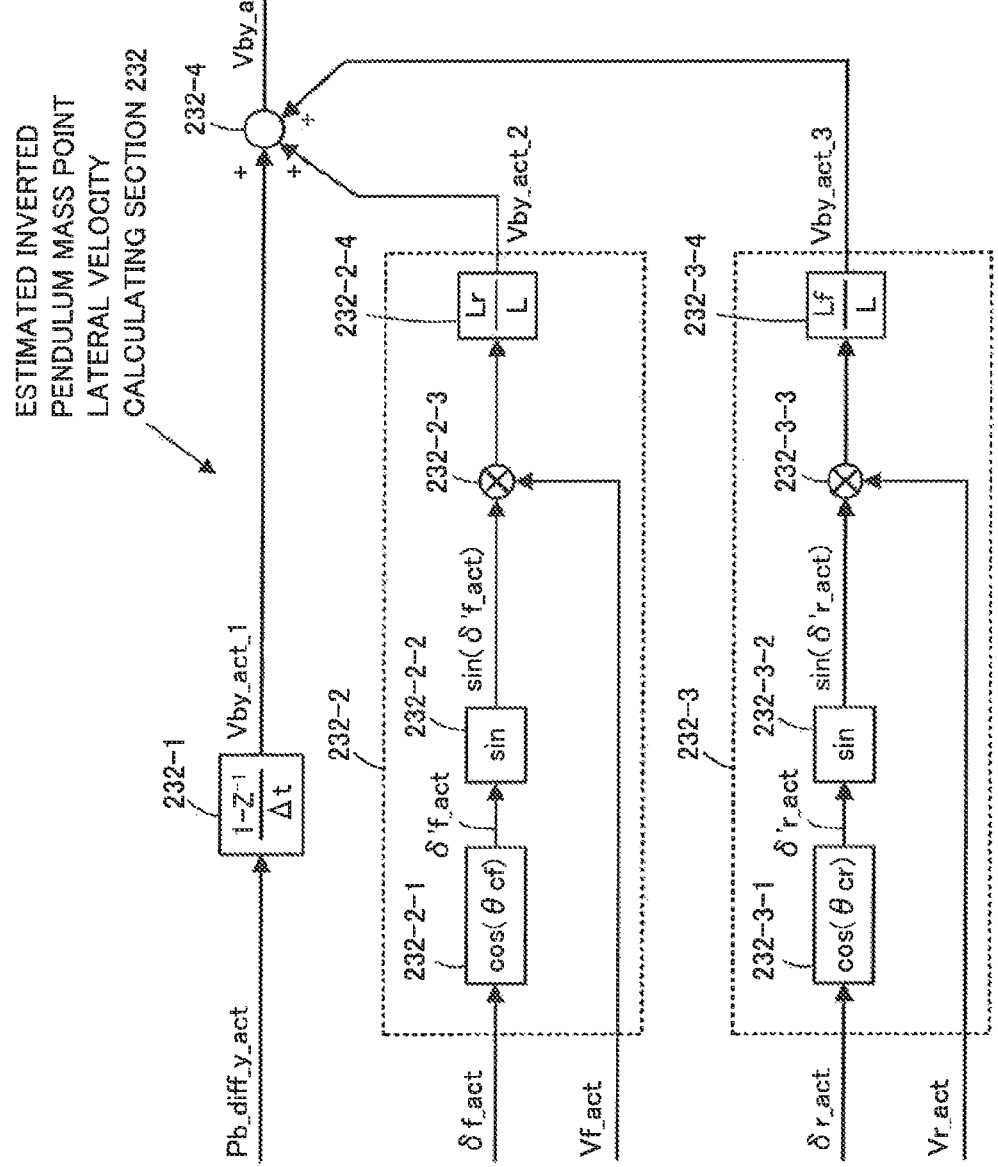
FIG. 37 is a block diagram showing the processing performed by the estimated inverted pendulum mass point lateral velocity calculating section shown in FIG. 35.

The estimated inverted pendulum mass point lateral velocity calculating section 232 carries out the processing shown in the block diagram in FIG. 37 to calculate an estimated inverted pendulum mass point lateral velocity Vby_act.

This processing is configured to sum up a first estimated lateral velocity component Vby_act_1, which is an estimate of the actual transfer velocity (relative to the origin) in the Y-axis direction of the inverted pendulum mass point 123 as seen from the origin of the XYZ coordinate system set in the above-described manner for the two-wheeled vehicle 201A, a second estimated lateral velocity component Vby_act_2, which is an estimate of the actual transfer velocity in the Y-axis direction of the inverted pendulum mass point 123 (=transfer velocity of the origin of the XYZ coordinate system) caused by the translational movement of the two-wheeled vehicle 201A accompanying the rolling of the front wheel 203f while the front wheel 203f is being steered (when the actual steering angle of the front wheel 203f is not "0"), and a third estimated lateral velocity component Vby_act_3, which is an estimate of the actual transfer velocity in the Y-axis direction of the inverted pendulum mass point 123 (=transfer velocity of the origin of the XYZ coordinate system) caused by the translational movement of the two-wheeled vehicle 201A accompanying the rolling of the rear wheel 203r while the rear wheel 203r is being steered (when the actual steering angle of the rear wheel 203r is not "0"), to thereby calculate the estimated inverted pendulum mass point lateral velocity Vby_act.

In FIG. 37, a processing section 232-1 represents a processing section which obtains the first estimated lateral velocity component Vby_act_1, a processing section 232-2 represents a processing section which obtains the second estimated lateral velocity component Vby_act_2, a processing section 232-3 represents a processing section which obtains the third estimated lateral velocity component Vby_act_3, and a processing section 232-4 represents a processing section which sums up the first estimated lateral velocity component Vby_act_1, the second estimated lateral velocity component Vby_act_2, and the third estimated lateral velocity component Vby_act_3.

The processing section 232-1 calculates, as the first estimated lateral velocity component Vby_act_1, a temporal change rate Pb_diff_y_dot_act (amount of change per unit time) at the current time of the estimated inverted pendulum mass point lateral movement amount Pb_diff_y_act successively calculated by the estimated inverted pendulum mass point lateral movement amount calculating section 231. That is, the processing section 232-1 calculates a differential value Pb_diff_y_dot_act of Pb_diff_y_act, as Vby_act_1.

Further, the processing section 232-2 multiplies, in a processing section 232-2-1, a detected front-wheel steering angle δf_act at the current time by a cosine value cos(θcf) of the caster angle θcf of the front wheel 203f, to thereby calculate an estimate of the actual value δ'f_act (hereinafter, referred to as "estimated front-wheel effective steering angle δ'f_act") of a front-wheel effective steering angle δ'f which corresponds to the rotational angle in the yaw direction of the front wheel 203f.

Supplementally, the front-wheel effective steering angle δ'f is an angle of the line of intersection of the ground surface 110 and the rotational plane of the front wheel 203f being steered (plane passing through the center of the axle of the front wheel 203f and orthogonal to the axle centerline Cf thereof) with respect to the longitudinal direction (X-axis direction) of the vehicle body 202.

In the case where the roll angle φb of the vehicle body 202 is relatively small, the estimated front-wheel effective steering angle δ'f_act can be calculated approximately by the following expression (72a). The processing in the above-described processing section 232-2-1 is the process of approximately calculating δ'f_act by the expression (72a).

$$\delta'f\_act = \cos(\theta cf) * \delta f\_act \tag{72a}$$

To further improve the accuracy of δ'f_act, δ'f_act may be obtained by a mapping from δf_act. Alternatively, to still further improve the accuracy of δ'f_act, δ'f_act may be obtained by a mapping (two-dimensional mapping) or the like from δf_act and a detected roll angle φb_act.

The processing section 232-2 further calculates a sine value sin(δ'f_act) of the above-described estimated front-wheel effective steering angle δ'f_act and multiplies the estimated front-wheel rotational transfer velocity Vf_act at the current time by the sine value, in a processing section 232-2-2 and a processing section 232-2-3, to thereby calculate a transfer velocity in the Y-axis direction (in other words, a component in the Y-axis direction of Vf_act) of the ground contact part of the front wheel 203f.

Further, the processing section 232-2 multiplies, in a processing section 232-2-4, the value as a result of calculation in the processing section 232-2-3 by Lr/L (where L=Lf+Lr), to thereby obtain a second estimated lateral velocity component Vby_act_2 (=Vf_act*sin(δ'f_act)*(Lr/L)).

It should be noted that the above-described Lr and Lf in this processing have the same meanings as those in the two-wheeled vehicle 201 in FIG. 11. That is, Lr refers to a distance in the X-axis direction between the ground contact point of the rear wheel 203r and the overall center of gravity G in the basic posture state of the two-wheeled vehicle 201A, and Lf refers to a distance in the X-axis direction between the ground contact point of the rear wheel 203f and the overall center of gravity G in the basic posture state of the two-wheeled vehicle 201A.

The values of Lr and Lf and the caster angle θcf have been preset for the two-wheeled vehicle 201A, and are stored in a memory in the control device 215.

Further, the processing section 232-3 multiplies, in a processing section 232-3-1, a detected rear-wheel steering angle δr_act at the current time by a cosine value cos(θcr) of the caster angle θcr of the rear wheel 203r, to thereby calculate an estimate of the actual value δ'r_act (hereinafter, referred to as "estimated rear-wheel effective steering angle δ'r_act") of a rear-wheel effective steering angle δ'r which corresponds to the rotational angle in the yaw direction of the rear wheel 203r.

Supplementally, the rear-wheel effective steering angle δ'r is an angle of the line of intersection of the ground surface 110 and the rotational plane of the rear wheel 203r being steered (plane passing through the center of the axle of the rear wheel 203r and orthogonal to the axle centerline Cr thereof) with respect to the longitudinal direction (X-axis direction) of the vehicle body 202.

In the case where the roll angle φb of the vehicle body 202 is relatively small, the estimated rear-wheel effective steering angle δ'r_act can be calculated approximately by the following expression (72b). The processing in the above-described processing section 232-3-1 is the process of approximately calculating δ'r_act by the expression (72b).

$$\delta'r\_act = \cos(\theta cr) * \delta r\_act \tag{72b}$$

To further improve the accuracy of δ'r_act, δ'r_act may be obtained by a mapping from δr_act. Alternatively, to still further improve the accuracy of δ'r_act, δ'r_act may be obtained by a mapping (two-dimensional mapping) or the like from δr_act and a detected roll angle φb_act.

The processing section 232-3 further calculates a sine value sin(δ'r_act) of the above-described estimated rear-wheel effective steering angle δ'r_act and multiplies the estimated rear-wheel rotational transfer velocity Vr_act at the current time by the sine value, in a processing section 232-3-2 and a processing section 232-3-3, to thereby calculate a transfer velocity in the Y-axis direction (in other words, a component in the Y-axis direction of Vr_act) of the ground contact part of the rear wheel 203r.

Further, the processing section 232-3 multiplies, in a processing section 232-3-4, the value as a result of calculation in the processing section 232-3-3 by Lf/L (where L=Lf+Lr), to thereby obtain a third estimated lateral velocity component Vby_act_3 (=Vr_act*sin(δ'r_act)*(Lf/L)).

The value of the caster angle θcr used in the processing in the processing section 232-3 has also been preset for the two-wheeled vehicle 201A, as with the values of Lf, Lr, and θcf, and is stored in the memory in the control device 215.

The estimated inverted pendulum mass point lateral velocity calculating section 232 sums up, in the processing section 232-4, the first estimated lateral velocity component Vby_act_1, the second estimated lateral velocity component Vby_act_2, and the third estimated lateral velocity component Vby_act_3 calculated in the above-described manner, to calculate an estimated inverted pendulum mass point lateral velocity Vby_act.

Accordingly, the estimated inverted pendulum mass point lateral velocity Vby_act is calculated by the following expression (73).

$$Vby\_act = Vby\_act\_1 + Vby\_act\_2 + Vby\_act\_3 \quad (73)$$
$$= Pb\_diff\_y\_dot\_act + Vf\_act*\sin(\delta'f\_act)*(Lr/L)$$
$$+ Vr\_act*\sin(\delta'r\_act)*(Lf/L)$$
$$= Pb\_diff\_y\_dot\_act + Vf\_act*\sin(\delta f\_act*\cos(\theta cf))*(Lr/L)$$
$$+ Vr\_act*\sin(\delta r\_act*\cos(\theta cr))*(Lf/L)$$

It should be noted that in the case where the magnitudes of the value of the aforesaid conversion function Plfy(δf) corresponding to the actual steering angle δf_act of the front wheel 203f and the value of the aforesaid conversion function Plry(δr) corresponding to the actual steering angle δr_act of the front wheel 203r are sufficiently small (when the magnitudes of δf_act and δr_act are small), a differential value of the value of Pb_diff_y_act obtained by ignoring the second term and the third term on the right side of the expression (71) may be adopted as Pb_diff_y_dot_act for use in the expression (73). That is, in the expression (73), a value, multiplied by −h', of the differential value of the detected roll angle φb_act of the vehicle body 202, or a value, multiplied by −h', of the detected value of the roll angular velocity (temporal change rate of the roll angle) of the vehicle body 202, may be used instead of Pb_diff_y_dot_act. With this configuration, the computational load of the control device 215 can be reduced.

Next, the control device 215 carries out the processing in the estimated traveling speed calculating section 233.

As shown in FIG. 35, the estimated traveling speed calculating section 233 receives the aforesaid estimated rear-wheel rotational transfer velocity Vr_act and the aforesaid detected rear-wheel steering angle δr_act.

Figure 38:
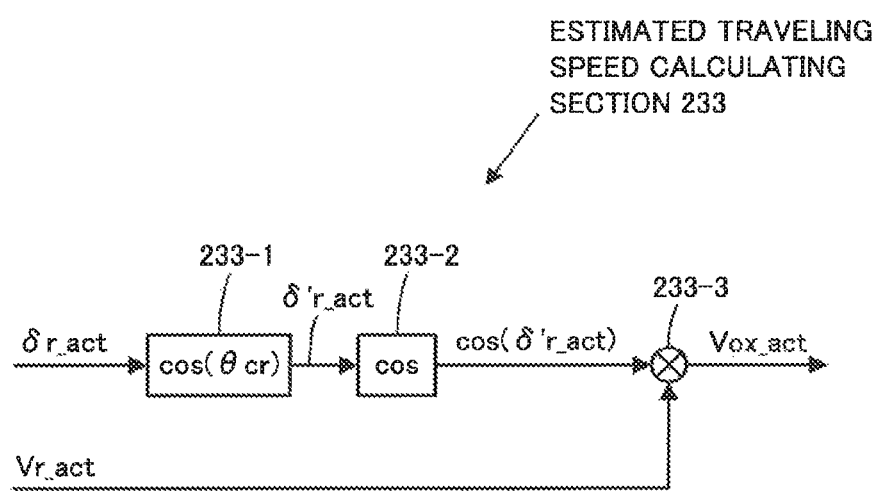
FIG. 38 is a block diagram showing the processing performed by the estimated traveling speed calculating section shown in FIG. 35.

The estimated traveling speed calculating section 233 carries out the processing shown in the block diagram in FIG. 38 to calculate an estimated traveling speed Vox_act.

In FIG. 38, a processing section 233-1 represents a processing section which multiplies a detected rear-wheel steering angle δr_act at the current time by a cosine value of the caster angle θcr of the rear wheel 203r (as in the aforesaid expression (72b)) to obtain the estimated rear-wheel effective steering angle δ'r_act, which has been described above in conjunction with the processing section 232-2 in the estimated inverted pendulum mass point lateral velocity calculating section 232, a processing section 233-2 represents a processing section which obtains a cosine value cos(δ'r_act) of the estimated rear-wheel effective steering angle δ'r_act, and a processing section 233-3 represents a processing section which multiplies an estimated rear-wheel rotational transfer velocity Vr_act at the current time by the above-described cosine value cos(δ'r_act) to thereby calculate an estimated traveling speed Vox_act.

Accordingly, the estimated traveling speed calculating section 233 is configured to calculate Vox_act by multiplying Vr_act by the cosine value cos(δ'r_act) of δ'r_act. That is, Vox_act is calculated by the following expression (74b).

$$Vox\_act = Vr\_act*\cos(\delta'r\_act) \quad (74b)$$
$$= Vr\_act*\cos(\delta'r\_act*\cos(\theta cr))$$

The estimated traveling speed Vox_act calculated in this manner corresponds to a component in the X-axis direction of the estimated rear-wheel rotational transfer velocity Vr_act.

It should be noted that the estimated traveling speed Vox_act may be calculated by multiplying the estimated front-wheel rotational transfer velocity Vf_act by a cosine value cos(δ'f_act) of the estimated front-wheel effective steering angle δ'f_act calculated by the aforesaid expression (72a). That is, Vox_act may be calculated by the following expression (74a).

$$Vox\_act = Vf\_act*\cos(\delta'f\_act) \quad (74a)$$
$$= Vf\_act*\cos(\delta'f\_act*\cos(\theta cf))$$

Further, in the processing of calculating Vox_act, for the estimated rear-wheel effective steering angle δ'r_act (or the estimated front-wheel effective steering angle δ'f_act), the value calculated by the estimated inverted pendulum mass point lateral velocity calculating section 232 as it is may be used. In this case, it is unnecessary to supply the detected rear-wheel steering angle δr_act (or the estimated front-wheel effective steering angle δ'f_act) to the estimated traveling speed calculating section 233, and the processing section 233-1 is also unnecessary.

Further, instead of the detected rear-wheel steering angle δr_act and the estimated rear-wheel rotational transfer velocity Vr_act at the current time, a value (last time's value) δr_cmd_p of the desired rear-wheel steering angle δr_cmd, calculated by the posture control arithmetic section 237 (described later) in the last time's control processing cycle, and a value (last time's value) Vr_cmd_p of the desired rear-wheel rotational transfer velocity Vr_cmd, calculated by the desired rear-wheel rotational transfer velocity determining section 236 (described later) in the last time's control processing cycle, respectively, may be used. More specifically, δr_cmd_p and Vr_cmd_p may be used to perform computation similar to that in the right side of the above expression (74b), and the resultant value (=Vr_cmd_p*cos(δr_cmd_p*cos(θcr))) may be obtained as a pseudo estimate (alternative observed value) as an alternative to the estimated traveling speed Vox_act.

Further, in obtaining the pseudo estimate (alternative observed value) as an alternative to the estimated traveling speed Vox_act, δr_cmd_p may be used instead of the detected rear-wheel steering angle δr_act at the current time, and the estimated rear-wheel rotational transfer velocity Vr_act may be used as it is. Conversely, Vr_cmd_p may be used instead of the estimated rear-wheel rotational transfer velocity Vr_act at the current time, and the detected rear-wheel steering angle δr_act may be used as it is.

Next, the control device 215 carries out the processing in the desired rear-wheel rotational transfer velocity determining section 236.

As shown in FIG. 35, the desired rear-wheel rotational transfer velocity determining section 236 receives a detected value of the actual value of the accelerator manipulated variable, which is indicated by an output from the aforesaid accelerator manipulation detector 221.

Figure 42:
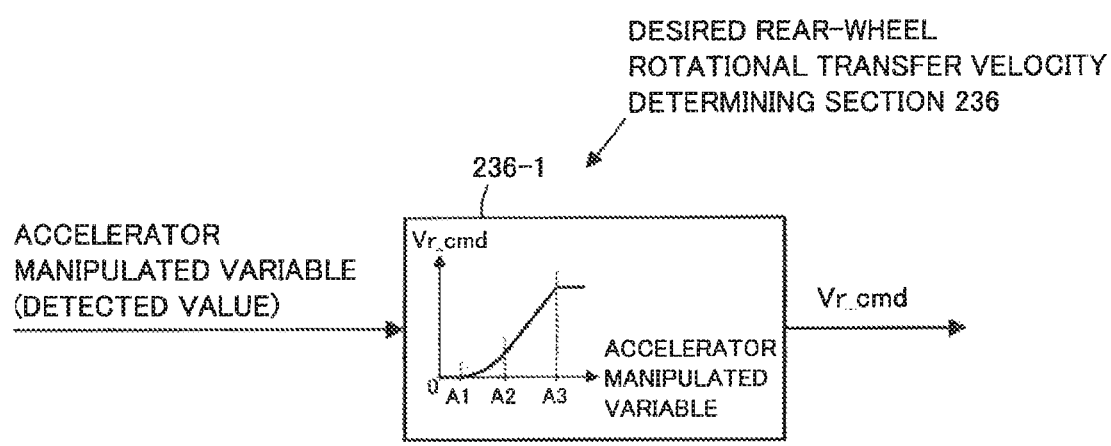
FIG. 42 is a block diagram showing the processing performed by the desired rear-wheel rotational transfer velocity determining section shown in FIG. 35.

The desired rear-wheel rotational transfer velocity determining section 236 determines a desired rear-wheel rotational transfer velocity Vr_cmd by the processing shown in the block diagram in FIG. 42, i.e. the processing in a processing section 236-1.

The processing section 236-1 determines the desired rear-wheel rotational transfer velocity Vr_cmd from a detected value of the accelerator manipulated variable at the current time, by a preset conversion function.

The conversion function is a function which is defined, for example, by a mapping or an arithmetic expression. This conversion function is basically set such that Vr_cmd determined by the conversion function increases monotonically as the accelerator manipulated variable increases.

The conversion function is set, for example, with the trend as illustrated by the graph in FIG. 42. In this case, the processing section 236-1 determines Vr_cmd to be zero when the detected value of the accelerator manipulated variable falls within the dead band range (range near zero) from zero to a prescribed first accelerator manipulated variable A1.

Further, when the detected value of the accelerator manipulated variable falls within the range from the first accelerator manipulated variable A1 to a prescribed second accelerator manipulated variable A2 (>A1), the processing section 236-1 determines Vr_cmd such that Vr_cmd increases monotonically as the accelerator manipulated variable increases and that the rate of increase of Vr_cmd (increase of Vr_cmd per unit increase of the accelerator manipulated variable) increases smoothly.

When the detected value of the accelerator manipulated variable falls within the range from the second accelerator manipulated variable A2 to a prescribed third accelerator manipulated variable A3 (>A2), the processing section 236-1 determines Vr_cmd such that Vr_cmd increases monotonically, at a constant rate of increase, as the accelerator manipulated variable increases.

Further, when the detected value of the accelerator manipulated variable exceeds the third accelerator manipulated variable A3, the processing section 236-1 determines Vr_cmd such that it remains at a constant value (at the value corresponding to A3).

Next, the control device 215 carries out the processing in the control gain determining section 235. As shown in FIG. 35, the control gain determining section 235 receives, via a delay element 238, a last time's desired rear-wheel steering angle δr_cmd_p, which is a value (last time's value) of the desired rear-wheel steering angle δr_cmd determined by the posture control arithmetic section 237 in the last time's control processing cycle of the control device 215. The control gain determining section 235 also receives an estimated traveling speed Vox_act calculated by the estimated traveling speed calculating section 233 in the current time's control processing cycle.

Figure 39:
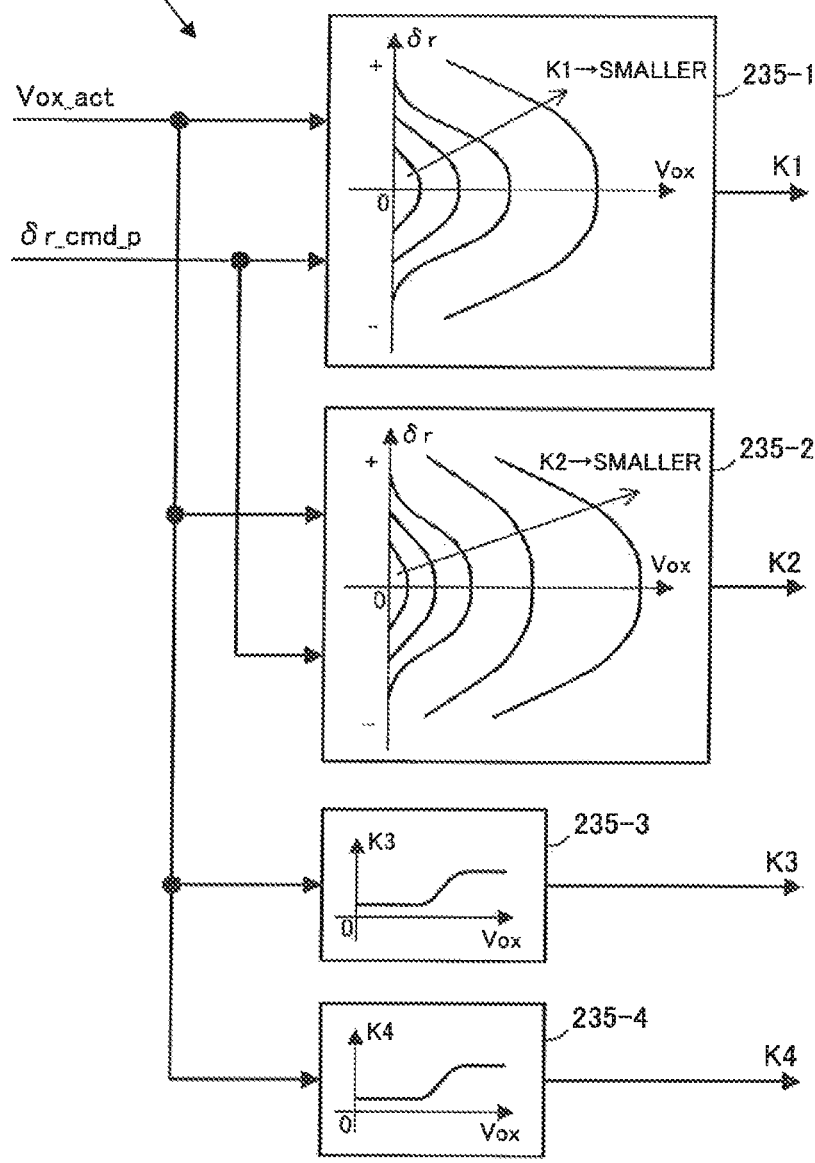
FIG. 39 is a block diagram showing a first example of the processing performed by the control gain determining section shown in FIG. 35.

The control gain determining section 235 carries out the processing shown in the block diagram in FIG. 39, for example, to determine values of a plurality of gains K1, K2, K3, and K4 for the posture control of the vehicle body 202.

The values of the gains K1, K2, K3, and K4 are each determined variably in accordance with δr_cmd_p and Vox_act, or in accordance with Vox_act, as will be described in detail later.

Next, the control device 215 carries out the processing in the desired posture state determining section 234. The desired posture state determining section 234 determines a desired inverted pendulum mass point lateral movement amount Pb_diff_y_cmd, which is a desired value of the inverted pendulum mass point lateral movement amount Pb_diff_y, and a desired inverted pendulum mass point lateral velocity Vby_cmd, which is a desired value of the inverted pendulum mass point lateral velocity Vby. In the present embodiment, the desired posture state determining section 234 sets both of Pb_diff_y_cmd and Vby_cmd to zero, by way of example.

Next, the control device 215 carries out the processing in the posture control arithmetic section 237. As shown in FIG. 35, the posture control arithmetic section 237 receives the desired inverted pendulum mass point lateral movement amount Pb_diff_y_cmd and the desired inverted pendulum mass point lateral velocity Vby_cmd determined in the desired posture state determining section 234, the estimated inverted pendulum mass point lateral movement amount Pb_diff_y_act calculated in the estimated inverted pendulum mass point lateral movement amount calculating section 231, the estimated inverted pendulum mass point lateral velocity Vby_act calculated in the estimated inverted pendulum mass point lateral velocity calculating section 232, and the gains K1, K2, K3, and K4 determined in the control gain determining section 235.

Figure 43:
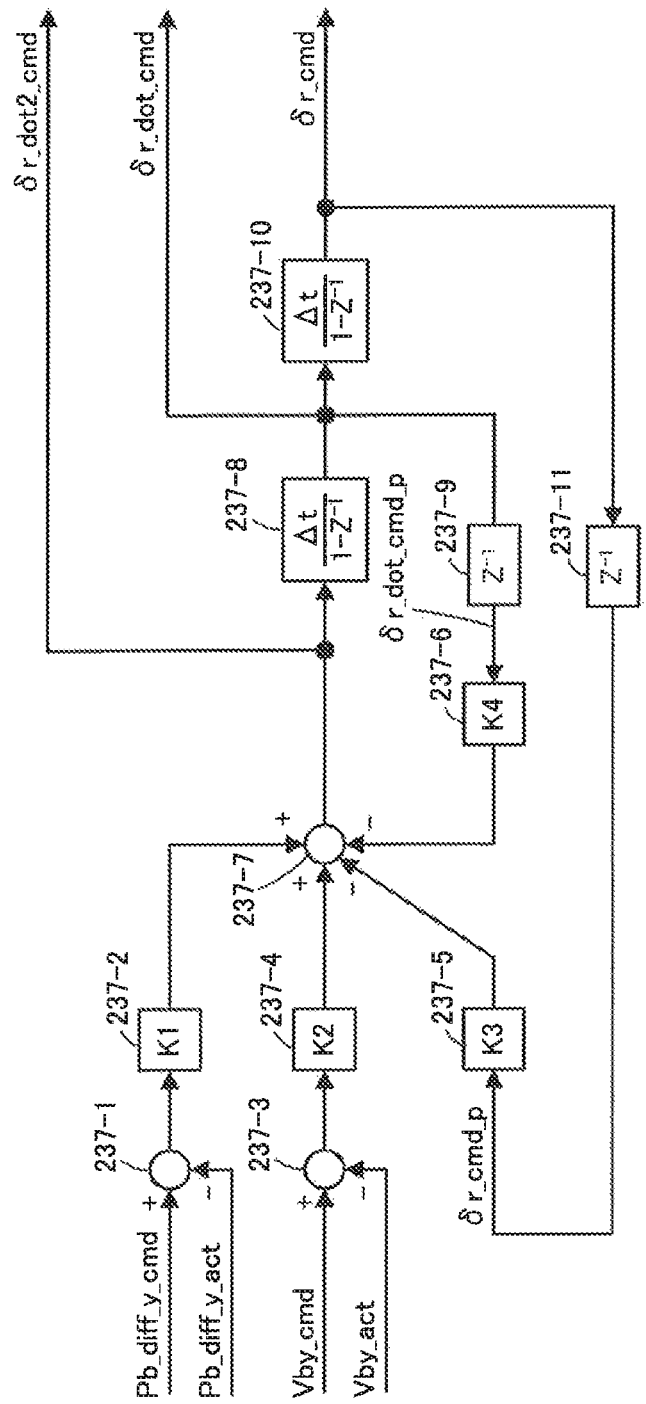
FIG. 43 is a block diagram showing an example of the processing performed by the posture control arithmetic section shown in FIG. 35.

The posture control arithmetic section 237 uses the above-described input values to carry out the processing shown in the block diagram in FIG. 43, to thereby determine a desired rear-wheel steering angle δr_cmd, a desired rear-wheel steering angular velocity δr_dot_cmd, and a desired rear-wheel steering angular acceleration δr_dot2_cmd.

In FIG. 43, a processing section 237-1 represents a processing section which obtains a deviation of Pb_diff_y_act from Pb_diff_y_cmd, a processing section 237-2 represents a processing section which multiplies the output of the processing section 237-1 by the gain K1, a processing section 237-3 represents a processing section which obtains a deviation of Vby_act from Vby_cmd, a processing section 237-4 represents a processing section which multiplies the output of the processing section 237-3 by the gain K2, a processing section 237-5 represents a processing section which multiplies δr_cmd_p by the gain K3, a processing section 237-6 represents a processing section which multiplies a last time's desired rear-wheel steering angular velocity δr_dot_cmd_p, which is a value of the desired rear-wheel steering angular velocity δr_dot_cmd determined by the posture control arithmetic section 237 in the last time's control processing cycle, by the gain K4, and a processing section 237-7 represents a processing section which sums up the outputs from the processing sections 237-2 and 237-4 and the values, each multiplied by −1, of the outputs from the processing sections 237-5 and 237-6, to thereby calculate a desired rear-wheel steering angular acceleration δr_dot2_cmd.

Further, a processing section 237-8 represents a processing section which integrates the output of the processing section 237-7 to obtain a desired rear-wheel steering angular velocity δr_dot_cmd, a processing section 237-9 represents a delay element which outputs the output from the processing section 237-8 in the last time's control processing cycle (i.e. last time's desired rear-wheel steering angular velocity δr_dot_cmd_p) to the processing section 237-6, a processing section 237-10 represents a processing section which integrates the output of the processing section 237-8 to obtain a desired rear-wheel steering angle δr_cmd, and a processing section 237-11 represents a delay element which outputs the output from the processing section 237-10 in the last time's control processing cycle (i.e. last time's desired rear-wheel steering angle δr_cmd_p) to the processing section 237-5.

Accordingly, the posture control arithmetic section 237 calculates the desired rear-wheel steering angular acceleration δr_dot2_cmd by the following expression (75).

$$\delta r\_dot2\_cmd = K1*(Pb\_diff\_y\_cmd - Pb\_diff\_y\_act) \quad (75)$$
$$+ K2*(Vby\_cmd - Vby\_act)$$
$$+ K3*\delta r\_cmd\_p - K4*\delta r\_dot\_cmd\_p$$

In the above expression (75), K1*(Pb_diff_y_cmd−Pb_diff_y_act) is a feedback manipulated variable having the function of making the deviation (Pb_diff_y_cmd−Pb_diff_y_act) approach "0", K2*(Vby_cmd−Vby_act) is a feedback manipulated variable having the function of making the deviation (Vby_cmd−Vby_act) approach "0", −K3*δr_cmd_p is a feedback manipulated variable having the function of making δr_cmd approach "0", and −K4*δr_dot_cmd_p is a feedback manipulated variable having the function of making δr_dot_cmd approach "0".

The posture control arithmetic section 237 integrates δr_dot2_cmd determined by the above expression (75) to determine a desired rear-wheel steering angular velocity δr_dot_cmd. Further, the posture control arithmetic section 237 integrates this δr_dot_cmd to determine a desired rear-wheel steering angle δr_cmd.

It should be noted that δr_cmd_p and δr_dot_cmd_p used in the computation of the expression (75) have the meanings as pseudo estimates (alternative observed values) of the actual steering angle and steering angular velocity, respectively, of the rear wheel 203r at the current time. Therefore, instead of δr_cmd_p, a detected rear-wheel steering angle δr_act at the current time may be used. Further, instead of δr_dot_cmd_p, a detected rear-wheel steering angular velocity δr_dot_act (detected value of the actual steering angular velocity of the rear wheel 203r) based on an output from the aforesaid rear-wheel steering angle detector 218 may be used.

The above has described the processing in the posture control arithmetic section 237.

In accordance with the processing in the posture control arithmetic section 237, the desired rear-wheel steering angular acceleration δr_dot2_cmd is basically determined such that any divergence of the actual inverted pendulum mass point lateral movement amount (estimated inverted pendulum mass point lateral movement amount Pb_diff_y_act) of the two-wheeled vehicle 201A from the desired inverted pendulum mass point lateral movement amount Pb_diff_y_cmd, or any divergence of the actual inverted pendulum mass point lateral velocity (estimated inverted pendulum mass point lateral velocity Vby_act) of the two-wheeled vehicle 201A from the desired inverted pendulum mass point lateral velocity Vby_cmd, is eliminated through manipulation of the steering angle δr of the rear wheel 203r (and, hence, that the actual inverted pendulum mass point lateral movement amount or lateral velocity of the two-wheeled vehicle 201A is restored to the desired inverted pendulum mass point lateral movement amount Pb_diff_y_cmd or desired inverted pendulum mass point lateral velocity Vby_cmd).

Further, in the present embodiment, the desired inverted pendulum mass point lateral movement amount Pb_diff_y_cmd is "0". Therefore, in the state where the actual inverted pendulum mass point lateral movement amount of the two-wheeled vehicle 201A is held at a value which coincides, or almost coincides, with the desired inverted pendulum mass point lateral movement amount Pb_diff_y_cmd, the desired rear-wheel steering angular acceleration δr_dot2_cmd is determined so as to keep the actual steering angle of the rear wheel 203r at "0" or almost "0".

Here, the gains K1 to K4 (feedback gains related to the respective feedback manipulated variables in the right side of the aforesaid expression (75)) used for calculating δr_dot2_cmd by the computation of the expression (75) are determined in the aforesaid control gain determining section 235. The processing in the control gain determining section 235 will now be described in detail.

The control gain determining section 235 determines the values of the gains K1 to K4 from the received estimated traveling speed Vox_act and last time's desired rear-wheel steering angle δr_cmd_p, by the processing shown in the block diagram in FIG. 39.

In FIG. 39, a processing section 235-1 is a processing section which determines the gain K1 in accordance with Vox_act and δr_cmd_p, and a processing section 235-2 is a processing section which determines the gain K2 in accordance with Vox_act and δr_cmd_p.

In the present embodiment, the processing section 235-1 determines the gain K1 from Vox_act and δr_cmd_p, in accordance with a preset two-dimensional mapping (conversion function of two variables). Similarly, the processing section 235-2 determines the gain K2 from Vox_act and δr_cmd_p, in accordance with a preset two-dimensional mapping (conversion function of two variables).

In these two-dimensional mappings, the trend of the change in value of the gain K1 with respect to Vox_act and δr_cmd_p and the trend of the change in value of the gain K2 with respect to Vox_act and δr_cmd_p are set substantially similar to each other.

Specifically, as illustrated by the graphs shown in the processing sections 235-1 and 235-2 in FIG. 39, the two-dimensional mappings in the processing sections 235-1 and 235-2 are each set such that the magnitude of the gain K1, K2 determined by the two-dimensional mapping has the trend of monotonically decreasing with increasing Vox_act when δr_cmd_p is fixed to a given value.

Accordingly, the gains K1 and K2 as the feedback gains related to the feedback manipulated variables having the function of stabilizing the posture in the roll direction of the vehicle body 202 of the two-wheeled vehicle 201A (making the estimated inverted pendulum mass point lateral movement amount Pb_diff_y_act and the estimated inverted pendulum mass point lateral velocity Vby_act converge respectively to Pb_diff_y_cmd and Vby_cmd) are determined such that the magnitudes of the gains K1 and K2 each become smaller as the actual traveling speed (estimated traveling speed Vox_act) of the two-wheeled vehicle 201A becomes greater.

In other words, the gains K1 and K2 are determined such that the control function for stabilizing the posture in the roll direction of the vehicle body 202 by performing the steering control of the rear wheel 203r so as to make Pb_diff_y_act and Vby_act converge to Pb_diff_y_cmd and Vby_cmd, respectively, is reduced when the actual traveling speed (estimated traveling speed Vox_act) of the two-wheeled vehicle 201A is in a high-speed range, as compared to when it is in a low-speed range.

Accordingly, in the case where the actual traveling speed (estimated traveling speed Vox_act) of the two-wheeled vehicle 201A is relatively high, i.e. in the state where the posture in the roll direction of the vehicle body 202 is unlikely to become unstable, a rider of the two-wheeled vehicle 201A can readily change the posture in the roll direction (roll angle φb) of the vehicle body 202 by shifting the weight of the rider's body and so on, as in the case of a conventional two-wheeled vehicle (which is not provided with the function of controlling the posture in the roll direction of the vehicle body).

It should be noted that the two-dimensional mappings for determining the gains K1 and K2 may each be set such that the value of K1, K2 is determined to be "0" or almost "0" when the estimated traveling speed Vox_act reaches a certain level of speed.

With this configuration, the function of controlling the posture in the roll direction of the vehicle body 202 becomes substantially OFF when the actual traveling speed (estimated traveling speed Vox_act) of the two-wheeled vehicle 201A is relatively high. This can make the behavioral characteristics of the two-wheeled vehicle 201A approach the characteristics comparable to those of a conventional two-wheeled vehicle in the case where the actual traveling speed of the two-wheeled vehicle 201A is high.

Further, the two-dimensional mappings in the processing sections 235-1 and 235-2 are each set such that the gain K1, K2 determined by the mapping has the trend of monotonically decreasing with increasing magnitude (absolute value) of δr_cmd_p when Vox_act is fixed to a given value.

Accordingly, the gains K1 and K2 as the gains related to the feedback manipulated variables having the function of stabilizing the posture in the roll direction of the vehicle body 202 of the two-wheeled vehicle 201A are determined such that the magnitudes of the gains K1 and K2 each become smaller as the magnitude of δr_cmd_p, corresponding to the actual steering angle of the rear wheel 203r, becomes larger.

The magnitudes of the gains K1 and K2 are changed as described above, for the following reason. In the case where the magnitude of the actual steering angle of the rear wheel 203r is large, compared to the case where it is small, the radius of curvature of the ground contact part of the steering control wheel (rear wheel 203r) as seen in a cross section including the ground contact point of the steering control wheel (rear wheel 203r) and having a normal in the X-axis direction (longitudinal direction of the vehicle body 202) becomes larger, as explained above.

Therefore, in the case where the magnitude of the actual steering angle of the rear wheel 203r is large, compared to the case where it is small, the change in movement amount of the ground contact point of the rear wheel 203r according to the change in the steering becomes larger. Because of this, if the magnitudes of the gains K1 and K2 are set independently of the actual steering angle, oscillation is likely to occur in the control of the posture in the roll direction of the vehicle body 202 of the two-wheeled vehicle 201A.

When it is configured such that the magnitudes of the gains K1 and K2 are changed in accordance with the magnitude of δr_cmd_p, as described above, the above-described oscillation can be prevented even in the case where the magnitude (absolute value) of the actual steering angle of the rear wheel 203r is large.

In the block diagram in FIG. 39, processing sections 235-3 and 235-4 represent processing sections which determine the gains K3 and K4, respectively, in accordance with Vox_act.

In the present embodiment, the processing sections 235-3 and 235-4 determine the gains K3 and K4, respectively, from Vox_act, in accordance with conversion functions defined by preset mappings (or arithmetic expressions).

These conversion functions are set, as illustrated by the graphs shown in the processing sections 235-3 and 235-4 in FIG. 39, such that basically the gains K3 and K4 each increase monotonically, between a prescribed upper limit and a prescribed lower limit, as Vox_act increases.

In this case, in the conversion functions in the processing sections 235-3 and 235-4, in the region where Vox_act takes a value near "0", K3 and K4 are each maintained at the lower limit. In the region where Vox_act takes a sufficiently large value, K3 and K4 are each maintained at the upper limit.

As the gains K3 and K4 are determined in the above-described manner, the gains K3 and K4 as the feedback gains related to the feedback manipulated variables having the function of making the steering angle δr of the rear wheel 203r approach zero are determined such that the magnitudes of the gains K3 and K4 become relatively large in the case where the actual traveling speed (estimated traveling speed Vox_act) of the two-wheeled vehicle 201A is relatively high (in a high-speed range), compared to the case where the actual traveling speed of the two-wheeled vehicle 201A is relatively low (in a low-speed range (including "0")).

Here, in an ordinary two-wheeled vehicle, when it is traveling at a relatively high speed, the steering control wheel is usually held in a non-steered state or nearly non-steered state. Therefore, setting the gains K3 and K4 in the above-described manner can allow the steering characteristics of the rear wheel 203r of the two-wheeled vehicle 201A when the actual traveling speed of the two-wheeled vehicle 201A is relatively high to approach the characteristics of the ordinary two-wheeled vehicle.

The above has described the details of the processing in the control gain determining section 235 according to the present embodiment.

In the processing in the aforesaid processing sections 235-1 and 235-2, the gains K1 and K2 were determined in accordance with Vox_act and δr_cmd_p by using two-dimensional mappings. The gains K1 and K2, however, may be determined in another manner not using the two-dimensional mappings.

Figure 40:
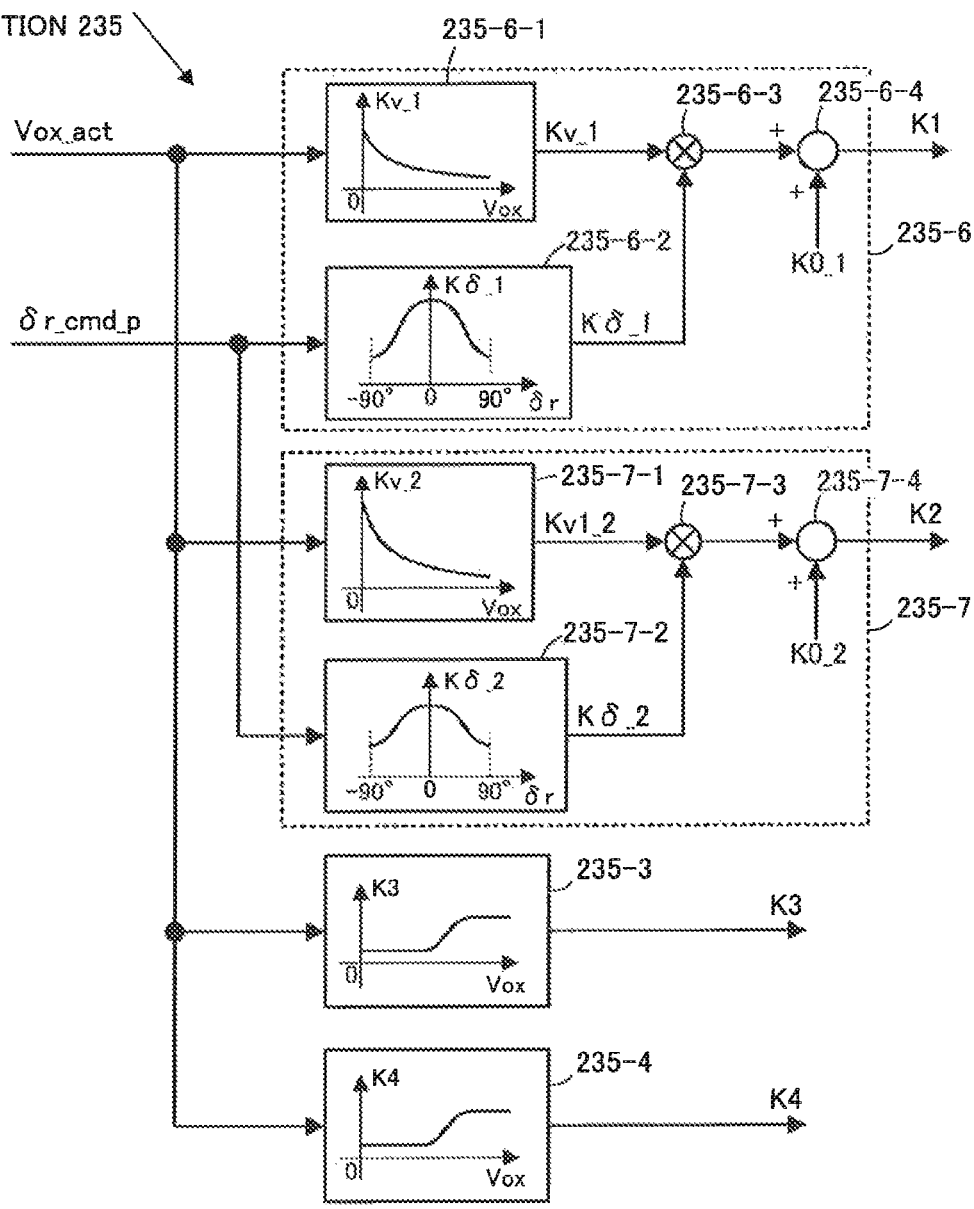
FIG. 40 is a block diagram showing a second example of the processing performed by the control gain determining section shown in FIG. 35.
Figure 41:
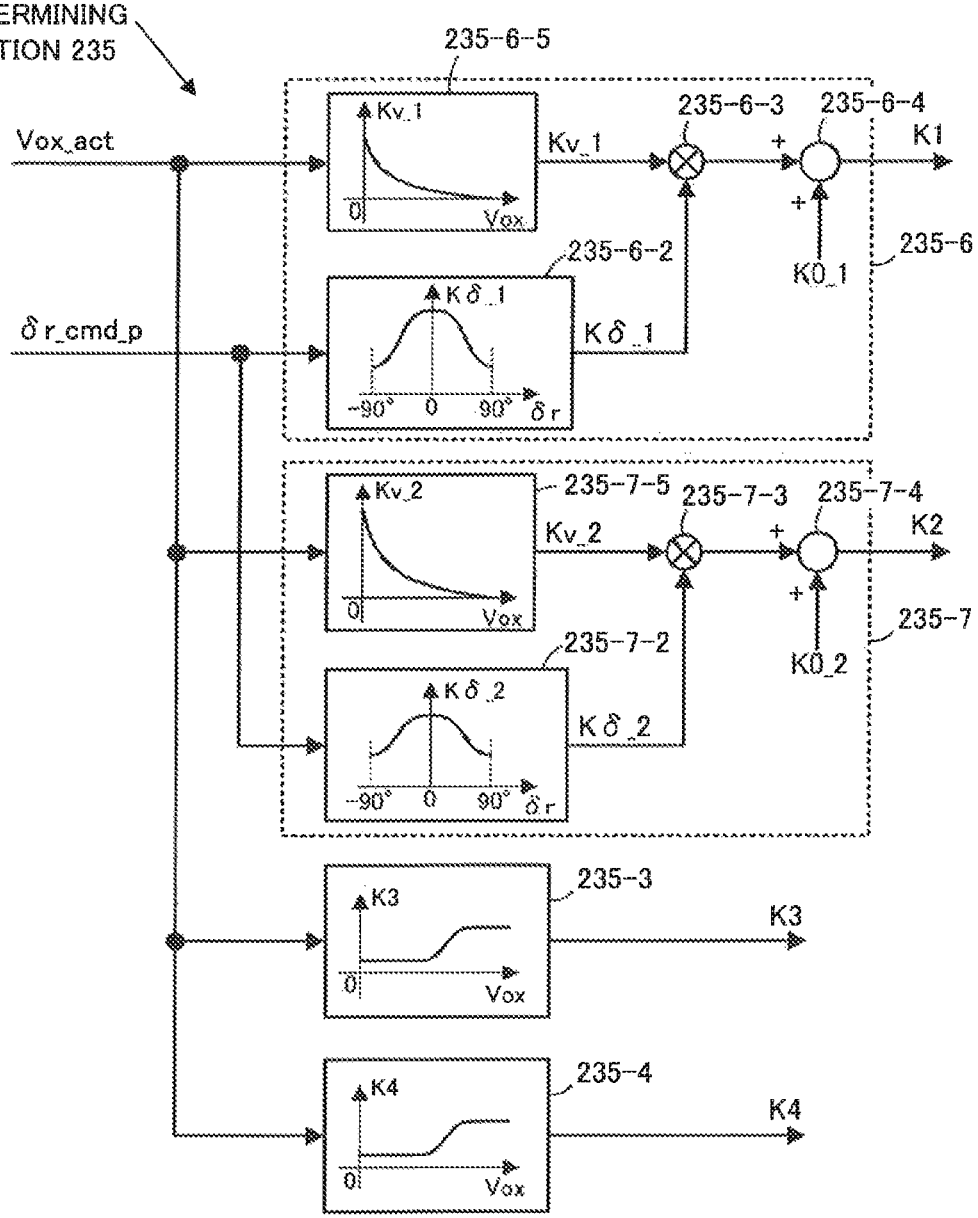
FIG. 41 is a block diagram showing a third example of the processing performed by the control gain determining section shown in FIG. 35.

For example, the gains K1 and K2 may be determined by the processing in processing sections 235-6 and 235-7 in the block diagram in FIG. 40 or 41. It should be noted that, except for the processing in the processing sections 235-6 and 235-7, the processing in the block diagram in each of FIGS. 40 and 41 is identical to the processing in the block diagram in FIG. 39.

The processing section 235-6 in FIG. 40 includes a processing section 235-6-1 which determines a first adjustment parameter Kv_1 for adjusting the value of the gain K1, from Vox_act, by a preset conversion function, a processing section 235-6-2 which determines a second adjustment parameter Kδ_1 for adjusting the value of the gain K1, from δr_cmd_p, by a preset conversion function, a processing section 235-6-3 which determines a composite adjustment parameter (=Kv_1*Kδ_1) by multiplying the adjustment parameters Kv_1 and Kδ_1, and a processing section 235-6-4 which adds this composite adjustment parameter to a prescribed reference value (lower limit) K0_1 of the gain K1, to thereby determine the gain K1 (=Kv_1*Kδ_1+K0_1).

The processing section 235-7 includes a processing section 235-7-1 which determines a first adjustment parameter Kv_2 for adjusting the value of the gain K2, from Vox_act, by a preset conversion function, a processing section 235-7-2 which determines a second adjustment parameter Kδ_2 for adjusting the value of the gain K2, from δr_cmd_p, by a preset conversion function, a processing section 235-7-3 which determines a composite adjustment parameter (=Kv_2*Kδ_2) by multiplying the adjustment parameters Kv_2 and Kδ_2, and a processing section 235-7-4 which adds this composite adjustment parameter to a prescribed reference value (lower limit) K0_2 of the gain K2, to thereby determine the gain K2 (=Kv_2*Kδ_2+K0_2).

In this case, the conversion functions of the respective processing sections 235-6-1, 235-7-1, 235-6-2, and 235-7-2 are each defined, for example, by a mapping (one-dimensional mapping) or an arithmetic expression.

The conversion functions of the processing sections 235-6-1 and 235-7-1 are set, as illustrated by the graphs shown in the processing sections 235-6-1 and 235-7-1 in FIG. 40, such that Kv_1 and Kv_2 determined by the respective conversion functions each decrease monotonically (to approach zero) from a prescribed upper limit (>0) as Vox_act becomes larger.

Accordingly, in a low-speed range where Vox_act is relative small, Kv_1 and Kv_2 are each set to an effective positive value (having a magnitude above a certain level).

Further, the conversion functions of the processing sections 235-6-2 and 235-7-2 are set, as illustrated by the graphs shown in the processing sections 235-6-2 and 235-7-2 in FIG. 40, such that Kδ_1 and Kδ_2 determined by the respective conversion functions each decrease monotonically as the magnitude (absolute value) of δr_cmd_p increases.

More specifically, Kδ_1 and Kδ_2 are determined such that they each attain a prescribed upper limit (>0) when the magnitude of δr_cmd_p is "0", and that Kδ_1 and Kδ_2 each decrease down to a prescribed lower limit (>0) as the magnitude of δr_cmd_p increases from "0".

Therefore, the processing sections 235-6 and 235-7 shown in FIG. 40 can determine the gains K1 and K2, respectively, such that the trends of the changes of K1 and K2 with respect to Vox_act and δr_cmd_p become similar to the trends of the changes of K1 and K2 determined by the processing sections 235-1 and 235-2, respectively, in FIG. 39.

The processing sections 235-6 and 235-7 in FIG. 41 are different from those in FIG. 40 only in part of the processing.

Specifically, the processing section 235-6 in FIG. 41 adopts a processing section 235-6-5 as a processing section for determining the first adjustment parameter Kv_1 for adjusting the value of the gain K1 in accordance with Vox_act, instead of the processing section 235-6-1 shown in FIG. 40. Except for the processing section 235-6-5, the configuration of the processing section 235-6 in FIG. 41 is identical to that in FIG. 40.

Similarly, the processing section 235-7 in FIG. 41 adopts a processing section 235-7-5, instead of the processing section 235-7-1 shown in FIG. 40, as a processing section for determining the first adjustment parameter Kv_2 for adjusting the value of the gain K2 in accordance with Vox_act. Except for the processing section 235-7-5, the configuration of the processing section 235-7 in FIG. 41 is identical to that in FIG. 40.

The processing sections 235-6-5 and 235-7-5 use conversion functions (mappings or arithmetic expressions) for determining Kv_1 and Kv_2, respectively, which are different from those used in FIG. 40.

Specifically, the conversion functions in the processing sections 235-6-5 and 235-7-5 are set, as illustrated by the graphs shown in the processing sections 235-6-5 and 235-7-5 in FIG. 41, such that Kv_1 and Kv_2 determined by the respective conversion functions each monotonically decrease with increasing Vox_act and, additionally, such that Kv_1 and Kv_2 are each set to zero (or almost zero) in a high-speed range where Vox_act becomes high.

It should be noted that the reference value (lower limit) K0_1 of the gain K1 in the processing section 235-6 in FIG. 41 and the reference value (lower limit) K0_2 of the gain K2 in the processing section 235-7 in FIG. 41 are each set to zero or a value near zero.

Therefore, the processing sections 235-6 and 235-7 shown in FIG. 41 can determine the gains K1 and K2, respectively, such that the trends of the changes of K1 and K2 with respect to Vox_act and δr_cmd_p become similar to the trends of the changes of K1 and K2 determined by the processing sections 235-1 and 235-2, respectively, in FIG. 39.

In addition, in a high-speed range where the actual traveling speed of the two-wheeled vehicle 201A is high, both of the gains K1 and K2 are set to zero or almost zero. This can make the behavioral characteristics of the two-wheeled vehicle 201A still further approach the characteristics comparable to those of a conventional two-wheeled vehicle in the case where the actual traveling speed of the two-wheeled vehicle 201A is high.

It should be noted that for the conversion functions for determining the gains K1 and K2, conversion functions in other forms may be adopted, as long as they can determine the gains with the above-described trends with respect to Vox_act and δr_cmd_p. Similarly, for the conversion functions for determining the gains K3 and K4, conversion functions in other forms may be adopted, as long as they can determine the gains with the above-described trends with respect to Vox_act.

Supplementally, the last time's desired rear-wheel steering angle δr_cmd_p has the meaning as a pseudo estimate (alternative observed value) of the actual steering angle of the rear wheel 203r at the current time.

Accordingly, for determining the respective gains K1, K2, K3, and K4, the aforesaid detected rear-wheel steering angle δr_act may be used instead of δr_cmd_p.

Further, in the case where the response of the rear-wheel driving actuator 209 is sufficiently quick, the value of the traveling speed (=Vr_cmd_p*cos(δr_cmd_p*cos(θcr)), hereinafter referred to as "last time's desired traveling speed Vox_cmd_p") calculated by the computation similar to that in the aforesaid expression (74b) from the above-described last time's desired rear-wheel steering angle δ_cmd_p and a last time's desired rear-wheel rotational transfer velocity Vr_cmd_p (desired rear-wheel rotational transfer velocity Vr_cmd determined by the desired rear-wheel rotational transfer velocity determining section 236 in the last time's control processing cycle) has the meaning as a pseudo estimate (alternative observed value) of the actual traveling speed of the two-wheeled vehicle 201A at the current time.

Accordingly, for determining the respective gains K1, K2, K3, and K4, the above-described last time's desired traveling speed Vox_cmd_p may be used instead of Vox_act.

Controls of the aforesaid rear-wheel steering actuator 208 and rear-wheel driving actuator 209 will now be described.

Figure 44:
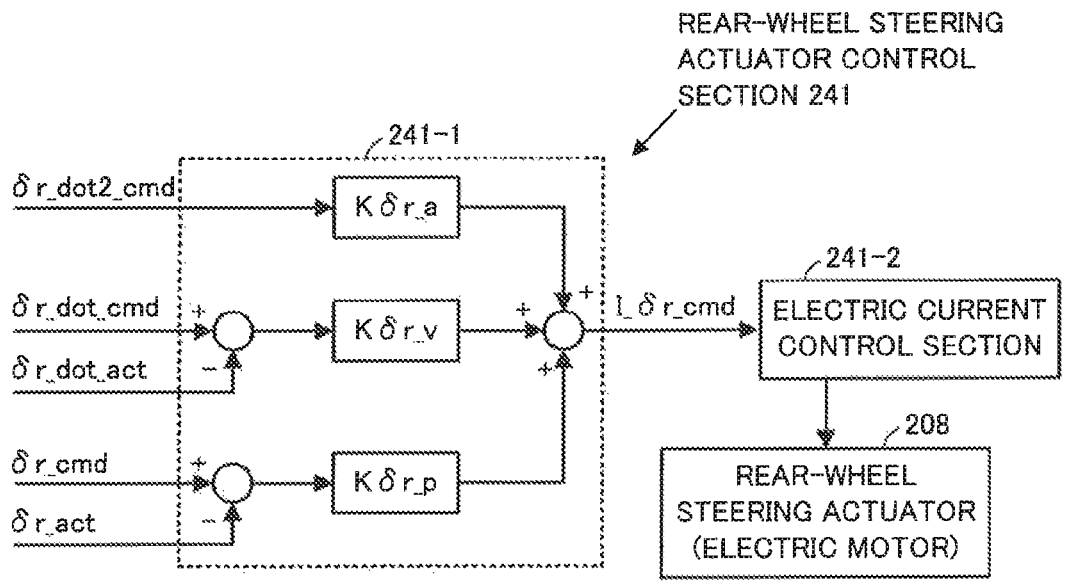
FIG. 44 is a block diagram showing the processing performed by a rear-wheel steering actuator control section included in the control device shown in FIG. 34.
Figure 45:
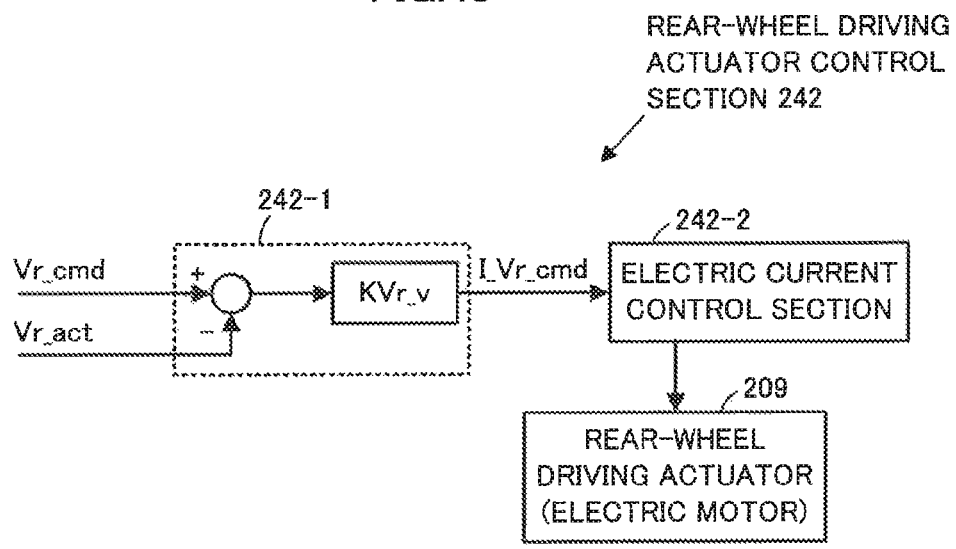
FIG. 45 is a block diagram showing the processing performed by a rear-wheel driving actuator control section included in the control device shown in FIG. 34.

The control device 215 further includes, as functions other than the functions shown in FIG. 35, a rear-wheel steering actuator control section 241 shown in FIG. 44 and a rear-wheel driving actuator control section 242 shown in FIG. 45.

The rear-wheel steering actuator control section 241 carries out drive control of the rear-wheel steering actuator 208, by the control processing shown in the block diagram in FIG. 44, for example, to cause the actual steering angle (detected rear-wheel steering angle δr_act) of the rear wheel 203r to track a desired rear-wheel steering angle δr_cmd.

In this example, the rear-wheel steering actuator control section 241 receives a desired rear-wheel steering angle δr_cmd, a desired rear-wheel steering angular velocity δr_dot_cmd, and a desired rear-wheel steering angular acceleration δr_dot2_cmd determined in the above-described manner in the posture control arithmetic section 237, a detected rear-wheel steering angle δr_act, and a detected rear-wheel steering angular velocity δr_dot_act which is a detected value of the actual steering angular velocity of the rear wheel 203r.

It should be noted that the detected rear-wheel steering angular velocity δr_dot_act is a value of the steering angular velocity which is recognized on the basis of an output from the rear-wheel steering angle detector 218, or a value obtained by calculating a temporal change rate of the detected rear-wheel steering angle δr_act.

The rear-wheel steering actuator control section 241 performs the processing in an electric current command value determining section 241-1 to determine, from the above-described input values, an electric current command value I_δr_cmd which is a desired value of the electric current passed through the rear-wheel steering actuator 208 (electric motor).

The electric current command value determining section 241-1 determines the electric current command value I_δr_cmd by summing up a feedback manipulated variable component obtained by multiplying a deviation of δr_act from δr_cmd by a gain Kδr_p of a prescribed value, a feedback manipulated variable component obtained by multiplying a deviation of δr_dot_act from δr_dot_cmd by a gain Kδr_v of a prescribed value, and a feedforward manipulated variable component obtained by multiplying δr_dot2_cmd by a gain Kδr_a of a prescribed value, as shown by the following expression (77).

$$I\_\delta r\_cmd = K\delta r\_p*(\delta r\_cmd - \delta r\_act) \qquad (77)$$
$$+ K\delta r\_v*(\delta r\_dot\_cmd - \delta r\_dot\_act)$$
$$+ K\delta r\_a*\delta r\_dot2\_cmd$$

The rear-wheel steering actuator control section 241 then controls the actual electric current passed through the rear-wheel steering actuator 208 (electric motor) to match the electric current command value I_δr_cmd, by an electric current control section 241-2 which is made up of a motor driver or the like.

In this manner, the control is performed such that the actual steering angle of the rear wheel 203r tracks the desired rear-wheel steering angle δr_cmd. In this case, the electric current command value I_δr_cmd includes the third term on the right side of the above expression (77), i.e. the feedforward manipulated variable component, ensuring improved tracking in the above-described control.

It should be noted that the technique of controlling the rear-wheel steering actuator 208 to cause the actual steering angle of the rear wheel 203r to track the desired rear-wheel steering angle δr_cmd is not limited to the above-described technique; other techniques may be used as well. For example, various kinds of known servo control techniques related to electric motors (feedback control techniques for causing the actual angle of rotation of the rotor of the electric motor to track a desired value) may be adopted.

The rear-wheel driving actuator control section 242 carries out drive control of the rear-wheel driving actuator 209, by the control processing shown in the block diagram in FIG. 45, for example, to cause the actual rotational transfer velocity of the rear wheel 203r to track a desired rear-wheel rotational transfer velocity Vr_cmd (or to cause the actual rotational angular velocity of the rear wheel 203r to track a desired rotational angular velocity corresponding to Vr_cmd).

In this example, the rear-wheel driving actuator control section 242 receives a desired rear-wheel rotational transfer velocity Vr_cmd determined in the above-described manner in the desired rear-wheel rotational transfer velocity determining section 236, and an estimated rear-wheel rotational transfer velocity Vr_act.

The rear-wheel driving actuator control section 242 performs the processing in an electric current command value determining section 242-1 to determine, from the above-described input values, an electric current command value I_Vr_cmd which is a desired value of the electric current passed through the rear-wheel driving actuator 209 (electric motor).

The electric current command value determining section 242-1 determines a feedback manipulated variable component obtained by multiplying a deviation of Vr_act from Vr_cmd by a gain KVr_v of a prescribed value, as the electric current command value I_Vr_cmd, as shown by the following expression (78).

$$I\_Vr\_cmd = KVr\_v*(Vr\_cmd - Vr\_act) \qquad (78)$$

It should be noted that, instead of using the above expression (78), I_Vr_cmd may be determined by, for example, multiplying a deviation of the detected value of the actual rotational angular velocity of the rear wheel 203r, which is indicated by an output from the rear-wheel rotational speed detector 220, from a value obtained by dividing Vr_cmd by the effective rolling radius of the rear wheel 203r (i.e. a desired value of the rotational angular velocity of the rear wheel 203r) by a gain of a prescribed value.

The rear-wheel driving actuator control section 242 then controls the actual electric current passed through the rear-wheel driving actuator 209 (electric motor) to match the electric current command value I_Vr_cmd, by an electric current control section 242-2 which is made up of a motor driver or the like.

In this manner, the control is performed such that the actual rotational transfer velocity of the rear wheel 203r tracks the desired rear-wheel rotational transfer velocity Vr_cmd (or such that the actual rotational angular velocity tracks the desired value of the rotational angular velocity corresponding to Vr_cmd).

It should be noted that the technique of controlling the rear-wheel driving actuator 209 to cause the actual rotational transfer velocity of the rear wheel 203r to track the desired rear-wheel rotational transfer velocity Vr_cmd is not limited to the above-described technique; other techniques may be used as well. For example, various kinds of known speed control techniques related to electric motors (feedback control techniques for causing the actual rotational angular velocity of the rotor of the electric motor to track a desired value) may be adopted.

The above has described the details of the control processing in the control device 215 according the present embodiment.

Here, the correspondence between the present embodiment and the present invention will be described. In the present embodiment, the rear wheel 203r corresponds to the steering control wheel in the present invention, and the rear-wheel steering actuator 208 (electric motor) corresponds to the steering actuator in the present invention.

Further, the inverted pendulum mass point 123 (first mass point 123) and the second mass point 124 in the two-wheeled vehicle 201A correspond respectively to the mass points A and B in the present invention. The dynamic behavior of the system having the inverted pendulum mass point 123 (first mass point 123) and the second mass point 124 is specifically expressed by the aforesaid expressions (19) to (27).

Further, the dynamics model of a mass point system having the inverted pendulum mass point 123 (first mass point 123) and the second mass point 124 in the two-wheeled vehicle 201A corresponds to the dynamics model in the present invention. The dynamics model is specifically expressed by the aforesaid expressions (19) to (27).

Further, in the present embodiment, for stabilizing the posture of the vehicle body 202, the rear-wheel steering actuator 208 (electric motor) is controlled such that the inverted pendulum mass point lateral movement amount and the inverted pendulum mass point lateral velocity, constituting the motional state quantity of the inverted pendulum mass point 123, each approach (or converge to) zero, which is the desired value (Pb_diff_y_cmd, Vby_cmd), and that the steering angle and the steering angular velocity, constituting the motional state quantity of the steering angle of the steering control wheel (rear wheel 203r), each approach (or converge to) zero, which is the desired value.

Specifically, in the processing in the posture control arithmetic section 237, the desired rear-wheel steering angular acceleration δr_dot2_cmd as an operational target of the rear-wheel steering actuator 208 (steering actuator) is determined, by a feedback control law, so as to cause a deviation of each of the estimated inverted pendulum mass point lateral movement amount Pb_diff_y_act, the estimated inverted pendulum mass point lateral velocity Vby_act, the last time's desired rear-wheel steering angle δr_cmd_p, representing a pseudo estimate of the steering angle δr, and the last time's desired rear-wheel steering angular velocity δr_dot_cmd_p, representing a pseudo estimate of the steering angular velocity δr_dot, from the corresponding desired value to converge to zero.

Further, the driving force of the rear-wheel steering actuator 208 is controlled by the aforesaid rear-wheel steering actuator control section 241 such that the actual steering angle of the rear wheel 203r tracks a desired rear-wheel steering angle δr_cmd which has been determined by performing integration twice on the above-described δr_dot2_cmd.

In this manner, the rear-wheel steering actuator 208 is controlled so as to stabilize the motional state quantity of the inverted pendulum mass point 123 and the motional state quantity of the steering angle of the steering control wheel (rear wheel 203r) and, hence, to stabilize the posture (in the roll direction) of the vehicle body 202.

In the present embodiment, the arrangement (relative to the rear wheel 203r) of the steering axis Csr of the rear wheel 203r which is a steering control wheel is set such that, in the basic posture state of the two-wheeled vehicle 201A, the intersection point Er' of the steering axis Csr and a virtual straight line connecting the center of the axle of the rear wheel 203r and the ground contact point thereof is located below the ground surface 110 (that is, such that the height a' of the intersection point Er' from the ground surface 110 satisfies: a'<0).

Therefore, the condition that a'<a_sum' (and, hence, the aforesaid "first condition" in the present invention) is naturally satisfied for a_sum' defined by the aforesaid expression (28)'. Further, the condition that a'≤a_s' (and, hence, the "second condition" in the present invention) is also naturally satisfied for a_s' defined by the aforesaid expression (40)'. Still further, the condition that a'Rr is also naturally satisfied for the radius of curvature Rr of the transverse cross-sectional shape of the steering control wheel (rear wheel 203r) in the basic posture state of the two-wheeled vehicle 201A.

According to the present embodiment described above, it is set such that, in the basic posture state of the two-wheeled vehicle 201A, the height a' of the intersection point Er' of the steering axis Csr of the rear wheel 203r which is a steering control wheel and a virtual straight line connecting the center of the axle of the rear wheel 203r and the ground contact point thereof satisfies: a'<0 (and, hence, a'<a_aum', a'≤a_s'), as described above. As a result, the height a' is set to satisfy the aforesaid "first condition" and "second condition".

Therefore, in the case where the actual inverted pendulum mass point lateral movement amount (estimated inverted pendulum mass point lateral movement amount Pb_diff_y_act) of the two-wheeled vehicle 201A deviates from the desired inverted pendulum mass point lateral movement amount Pb_diff_y_cmd (in other words, in the case where the actual posture of the vehicle body 202 deviates from the desired posture satisfying Pb_diff_y_act=0), the steering of the rear wheel 203r by the driving force of the rear-wheel steering actuator 208 can cause a moment (in the roll direction) capable of making the actual inverted pendulum mass point lateral movement amount of the two-wheeled vehicle 201A smoothly restored to the desired inverted pendulum mass point lateral movement amount Pb_diff_y_cmd to act on the vehicle body 202, without the need for the rider to intentionally move the steering handlebar 207. That is, it is possible to cause the moment in the roll direction for stabilizing the posture of the vehicle body 202 to act on the vehicle body 202.

According to this moment, the actual roll angle of the vehicle body 202 is changed, so that the actual inverted pendulum mass point lateral movement amount is restored to the desired inverted pendulum mass point lateral movement amount Pb_diff_y_cmd. It should be noted that the actual inverted pendulum mass point lateral movement amount being restored to the desired inverted pendulum mass point lateral movement amount Pb_diff_y_cmd more specifically means that the actual roll angle of the vehicle body 202 and the actual steering angle of the rear wheel 203r are controlled so as to cause the estimated inverted pendulum mass point lateral movement amount Pb_diff_y_act, calculated by the aforesaid expression (71) from the actual roll angle of the vehicle body 202, the actual steering angle of the front wheel 203$f$, and the actual steering angle of the rear wheel 203$r$, to match the desired inverted pendulum mass point lateral movement amount Pb_diff_y_cmd.

At this time, the sensitivity of the above-described moment generated in accordance with the change in steering angle of the rear wheel 203$r$ is relatively high. Therefore, the actual inverted pendulum mass point lateral movement amount of the two-wheeled vehicle 201A can be restored to the desired inverted pendulum mass point lateral movement amount Pb_diff_y_cmd, without causing an excessive change in steering angle of the rear wheel 203$r$.

Further, through calculation of the desired rear-wheel steering angular acceleration δr_dot2_cmd by the aforesaid expression (75), the desired rear-wheel steering angular acceleration δr_dot2_cmd (operational target of the rear-wheel steering actuator 208) is determined to make a deviation (Pb_diff_y_cmd−Pb_diff_y_act) of the estimated inverted pendulum mass point lateral movement amount Pb_diff_y_act, representing an observed value of the current actual inverted pendulum mass point lateral movement amount, from the desired inverted pendulum mass point lateral movement amount Pb_diff_y_cmd of the two-wheeled vehicle 201A, a deviation (Vby_cmd−Vby_act) of the estimated inverted pendulum mass point lateral velocity Vby_act, representing an observed value of the current actual inverted pendulum mass point lateral velocity, from the desired inverted pendulum mass point lateral velocity Vby_cmd of the two-wheeled vehicle 201A, the last time's desired rear-wheel steering angle δr_cmd_p, representing a pseudo estimate of the current actual steering angle (from the neutral steering angle) of the rear wheel 203$r$, and the last time's desired rear-wheel steering angular velocity δr_dot_cmd_p, representing a pseudo estimate of the angular velocity of the current actual steering angle of the rear wheel 203$r$, each approach "0".

Therefore, the steering angle of the rear wheel 203$r$ is controlled so as to cause the actual inverted pendulum mass point lateral movement amount and inverted pendulum mass point lateral velocity to converge to the respective desired values (zero in the present embodiment), while preventing the actual steering angle of the rear wheel 203$r$ from diverging from the neutral steering angle (while causing the actual steering angle to ultimately converge to the neutral steering angle).

Accordingly, the posture of the vehicle body 202 can be stabilized smoothly, particularly when the two-wheeled vehicle 201A is stopped or traveling at a low speed. Further, the two-wheeled vehicle 201A can be started smoothly with the vehicle body 202 in a stable posture.

Further, the gains K1 and K2, which are the feedback gains related to the posture control in the roll direction of the vehicle body 202, are variably determined, as described above, in accordance with the estimated traveling speed Vox_act, which is an observed value of the current actual traveling speed (transfer velocity in the X-axis direction) of the two-wheeled vehicle 201A, and the last time's desired rear-wheel steering angle δr_cmd_p, which is a pseudo estimate of the current actual steering angle of the rear wheel 203$r$. Further, the gains K3 and K4, which are the feedback gains related to the control of the steering angle of the rear wheel 203$r$, are variably determined, as described above, in accordance with the estimated traveling speed Vox_act.

Accordingly, when the two-wheeled vehicle 201A is stopped or traveling at a low speed, it is possible to perform the steering of the rear wheel 203$r$ to cause the actual inverted pendulum mass point lateral movement amount of the two-wheeled vehicle 201A to quickly approach the desired inverted pendulum mass point lateral movement amount Pb_diff_y_cmd.

In the state where the two-wheeled vehicle 201A is traveling at a high speed, the steering angle of the rear wheel 203$r$ can readily be maintained at the neutral steering angle. Further, even if the vehicle body 202 is leaned, the steering control of the rear wheel 203$r$ for causing the actual inverted pendulum mass point lateral movement amount of the two-wheeled vehicle 201A to approach the desired inverted pendulum mass point lateral movement amount Pb_diff_y_cmd is not performed, or such steering control is restricted. Consequently, a rider can readily turn the two-wheeled vehicle 201A by banking the vehicle body 202 by shifting the weight of the rider's body, as with a conventional two-wheeled vehicle.

MODIFICATIONS

Several modifications each related to the aforesaid first or second embodiment will be described below.

In the first embodiment, the rear wheel 3$r$ is a non-steering control wheel. Alternatively, the rear wheel 3$r$ may be configured to be passively steered by, for example, the reaction force from the ground surface 110. In this case, it may be configured such that the estimated inverted pendulum mass point lateral movement amount Pb_diff_y_act and the estimated inverted pendulum mass point lateral velocity Vby_act are each determined to include, not only the component according to the steering angle δf of the front wheel 3$f$, but also the component according to the steering angle δr of the rear wheel 3$r$, by the processing similar to that in the corresponding one of the estimated inverted pendulum mass point lateral movement amount calculating section 231 and the estimated inverted pendulum mass point lateral velocity calculating section 232 in the second embodiment.

Further, in each of the aforesaid embodiments, as the motional state quantity of the inverted pendulum mass point 123, which is a constituent element of the controlled state quantities, the inverted pendulum mass point lateral movement amount Pb_diff_y and the inverted pendulum mass point lateral velocity Vby were used. Alternatively, the steering actuator (front-wheel steering actuator 8 or rear-wheel steering actuator 208) may be controlled, using only one of the above as the controlled state quantity related to the inverted pendulum mass point 123, to cause the one state quantity to approach a desired value.

Furthermore, in each of the aforesaid embodiments, as the motional state quantity of the steering angle of the steering control wheel, which is another constituent element of the controlled state quantities, a value of the steering angle (δf or δr) and its angular velocity (δf_dot or δr_dot) were used. Alternatively, the steering actuator (front-wheel steering actuator 8 or rear-wheel steering actuator 208) may be controlled, using only one of the above as the controlled state quantity related to the steering angle of the steering control wheel, to cause the one state quantity to approach a desired value.

The desired value of the motional state quantity of the inverted pendulum mass point 123 (inverted pendulum mass point lateral movement amount Pb_diff_y, inverted pendulum mass point lateral velocity Vby) may be set to a value other than zero, as long as the value can stabilize the inverted pendulum mass point 123 and, hence, can stabilize the posture of the vehicle body 2 or 202 (preventing the posture in the roll direction of the vehicle body 2 or 202 from becoming unstable).

Further, the desired value of the motional state quantity of the steering angle (steering angle δf or δr, steering angular velocity δf_dot or δr_dot) of the steering control wheel may be set to zero. It should be noted that the desired value of the motional state quantity of the steering angle of the steering control wheel may be set to a value other than zero, as long as the value can stabilize the inverted pendulum mass point 123 and, hence, can stabilize the posture of the vehicle body 2 or 202 (preventing the posture in the roll direction of the vehicle body 2 or 202 from becoming unstable).

The desired value of the motional state quantity of the inverted pendulum mass point 123 (inverted pendulum mass point lateral movement amount Pb_diff_y, inverted pendulum mass point lateral velocity Vby), or the desired value of the motional state quantity of the steering angle (steering angle δf or δr, steering angular velocity δf_dot or δr_dot) of the steering control wheel, may be set to a value that is determined in accordance with, for example, the force applied to the steering handlebar 7 (or 207) by the rider, or the manipulated variable of the steering handlebar 7 (or 207).

Further, in each of the aforesaid embodiments, in the processing in the estimated inverted pendulum mass point lateral movement amount calculating section 31 or 231, the second estimated lateral movement amount component Pb_diff_y_act2 may be calculated as a linear component with respect to the steering angle of the front wheel 3f in the case where the magnitude of the actual steering angle of the front wheel 3f is sufficiently small. Similarly, in the processing in the estimated inverted pendulum mass point lateral velocity calculating section 32 or 232, the second estimated lateral velocity component Vby_act2 may be calculated as a linear component with respect to the steering angle of the front wheel 3f in the case where the magnitude of the actual steering angle of the front wheel 3f is sufficiently small.

Further, in the second embodiment, in the processing in the estimated inverted pendulum mass point lateral movement amount calculating section 231, the third estimated lateral movement amount component Pb_diff_y_act3 may be calculated as a linear component with respect to the steering angle of the rear wheel 203r in the case where the magnitude of the actual steering angle of the rear wheel 203r is sufficiently small. Similarly, in the processing in the estimated inverted pendulum mass point lateral velocity calculating section 232, the third estimated lateral velocity component Vby_act3 may be calculated as a linear component with respect to the steering angle of the rear wheel 203r in the case where the magnitude of the actual steering angle of the rear wheel 203r is sufficiently small.

In each of the aforesaid embodiments, instead of controlling the inverted pendulum mass point lateral movement amount Pb_diff_y and the inverted pendulum mass point lateral velocity Vby, desired values may be set for the roll angle φb and its angular velocity of the vehicle body 2 or 202, and the steering actuator (front-wheel steering actuator 8 or rear-wheel steering actuator 208) may be controlled so as to cause the actual roll angle (detected roll angle φb_act) and its angula velocity of the vehicle body 2 or 202 to approach the desired values, to thereby stabilize the posture of the vehicle body 2 or 202.

For example, in the aforesaid expression (55) or (75), instead of the deviations (Pb_diff_y_cmd−Pb_diff_y_act) and (Vby_cmd−Vby_act), a deviation of the detected roll angle φb_act from the desired value of the roll angle of the vehicle body 2 or 202 and a deviation of the detected value or estimate of the angular velocity (temporal change rate of the detected roll angle φb_act or the like) from the desired value of the angular velocity of the roll angle, respectively, may be used to determine the steering angular acceleration (δf_dot2_cmd or δr_dot2_cmd) as an operational target of the steering actuator (front-wheel steering actuator 8 or rear-wheel steering actuator 208).

Further, in this case, in determining the desired value of the roll angle φb, the centrifugal force during turning of the two-wheeled vehicle 1A or 201A may be taken into account. That is, the desired value of the roll angle φb may be determined such that a moment generated about the origin of the XYZ coordinate system in the direction about the X axis (roll direction) due to the gravitational force acting on the overall center of gravity G of the two-wheeled vehicle 1A or 201A and a moment generated about the origin of the XYZ coordinate system in the direction about the X axis (roll direction) due to the centrifugal force acting on the overall center of gravity G are balanced (so that the sum of the moments becomes "0").

In this case, the desired value of the roll angle φb (hereinafter, referred to as "desired roll angle φb_cmd") can be determined, for example, in the following manner. Hereinafter, the roll angle φb in the state where the moments generated about the origin of the XYZ coordinate system due to the gravitational force and the centrifugal force acting on the overall center of gravity G are balanced with each other will be called a "balanced roll angle φb_lean".

This balanced roll angle φb_lean is obtained approximately by the following expression (81).

$$\phi b\_\text{lean} = -Vox\_\text{act} * \omega z\_\text{act}/g \quad (81)$$

Here, ωz_act represents a turning angular velocity about the vertical axis (yaw rate) of the vehicle body 2 or 202. For this value, for example, a detected value of the yaw rate, which is indicated by an output from the aforesaid vehicle-body inclination detector 16 or 216 including the angular velocity sensor, may be used.

Alternatively, it may be obtained from, for example, an actual value of the aforesaid front-wheel effective steering angle δ'f (estimated front-wheel effective steering angle δ'f_act), an actual value of the rear-wheel effective steering angle δ'r (estimated rear-wheel effective steering angle δ'r_act), and an actual value of the traveling speed Vox (estimated traveling speed Vox_act) of the two-wheeled vehicle 1A or 201A, by the following expression (82).

$$\omega z\_\text{act} = Vox\_\text{act} * ((Lr/L) * \tan(\delta'f\_\text{act}) - (Lf/L) * \tan(\delta'r\_\text{act})) \quad (82)$$

In the case where the rear wheel 3r is a non-steering control wheel, as in the aforesaid first embodiment, the computation of the expression (82) can be performed by setting: δ'r_act=0.

The balanced roll angle φb_lean calculated in the above-described manner may be determined as a desired value of the desired roll angle φb_cmd. Alternatively, a value obtained by multiplying φb_lean by a positive constant of 1 or less may be determined as the desired roll angle φb_cmd.

The desired roll angle φb_cmd may be "0" when the two-wheeled vehicle 1A or 201A is stopped before it starts moving, or when the traveling speed Vox of the vehicle is sufficiently low.

Further, the desired value of the angular velocity of the roll angle φb may be set to zero. It should be noted that the desired value of the angular velocity of the roll angle φb may be set to a value other than zero, as long as the value can stabilize the posture of the vehicle body 2 or 202 (preventing the posture in the roll direction of the vehicle body 2 or 202 from becoming unstable).

For example, the desired value of the angular velocity of the roll angle φb may be determined in accordance with the force applied to the steering handlebar 7 (or 207) by the rider or the manipulated variable of the steering handlebar 7 (or 207).

In each of the aforesaid embodiments, in the processing in the posture control arithmetic section 37 or 237, the desired front-wheel steering angular acceleration δf_dot2_cmd or desired rear-wheel steering angular acceleration δr_dot2_cmd was determined as an operational target of the steering actuator (front-wheel steering actuator 8 or rear-wheel steering actuator 208).

In the processing in the posture control arithmetic section 37 in the first embodiment, however, a desired value of the torque about the steering axis Csf of the steering control wheel (front wheel 3f) may be determined in place of, or in addition to, the desired front-wheel steering angular acceleration δf_dot2_cmd. Then, in the aforesaid front-wheel steering actuator control section 41, the driving force (torque) of the front-wheel steering actuator 8 may be controlled to cause the actual torque about the steering axis Csf to match the desired value.

Similarly, in the processing in the posture control arithmetic section 237 in the second embodiment, a desired value of the torque about the steering axis Csr of the steering control wheel (rear wheel 203r) may be determined in place of, or in addition to, the desired rear-wheel steering angular acceleration δr_dot2_cmd. Then, in the aforesaid rear-wheel steering actuator control section 241, the driving force (torque) of the rear-wheel steering actuator 208 may be controlled to cause the actual torque about the steering axis Csr to match the desired value.

Further, in the first embodiment, the arrangement of the steering axis Csf of the front wheel 3f was set such that the height a of the aforesaid intersection point Ef takes a negative value (such that the intersection point Ef is below the ground surface 110). Alternatively, the arrangement of the steering axis Csf of the front wheel 3f may be set such that, in the state where the intersection point Ef is above the ground surface 110, $a < a\_sum$ or $a \leq a\_s$ holds for a_sum defined by the aforesaid expression (28) or for a_s defined by the aforesaid expression (40).

Similarly, in the second embodiment, the arrangement of the steering axis Csr of the rear wheel 203r may be set such that, in the state where the intersection point Er' is above the ground surface 110, for the height a' of the intersection point Er', $a' < a\_sum'$ or $a' \leq a\_s'$ holds for a_sum' defined by the aforesaid expression (28)' or for a_s' defined by the aforesaid expression (40)'.

Supplementally, the total mass m, the overall inertia I, and the height h of the overall center of gravity G of the two-wheeled vehicle 1A or 201A will vary to some extent when there is an object mounted on the two-wheeled vehicle 1A or 201A.

In this case, in the two-wheeled vehicle 1A of the first embodiment, a minimum value for a_sum defined by the aforesaid expression (28) or a minimum value for a_s defined by the aforesaid expression (40) may be obtained in advance within the range of variation estimated for each of m, I, and h.

Then, the arrangement position of the steering axis Csf of the front wheel 3f may be set such that the height a of the intersection point Ef becomes smaller than the minimum value of a_sum or not greater than the minimum value of a_s.

Similarly, in the two-wheeled vehicle 201A of the second embodiment, a minimum value for a_sum' defined by the aforesaid expression (28)' or a minimum value for a_s' defined by the aforesaid expression (40)' may be obtained in advance within the range of variation estimated for each of m, I, and h.

Then, the arrangement position of the steering axis Csr of the rear wheel 203r may be set such that the height a' of the intersection point Er' becomes smaller than the minimum value of a_sum' or not greater than the minimum value of a_s'.

It should be noted that the minimum value of a_sum or a_s in the two-wheeled vehicle 1A, or the minimum value of a_sum' or a_s' in the two-wheeled vehicle 201A, may be obtained under the condition that no person or article has been mounted on the two-wheeled vehicle 1A or 201A.

Figure 13:
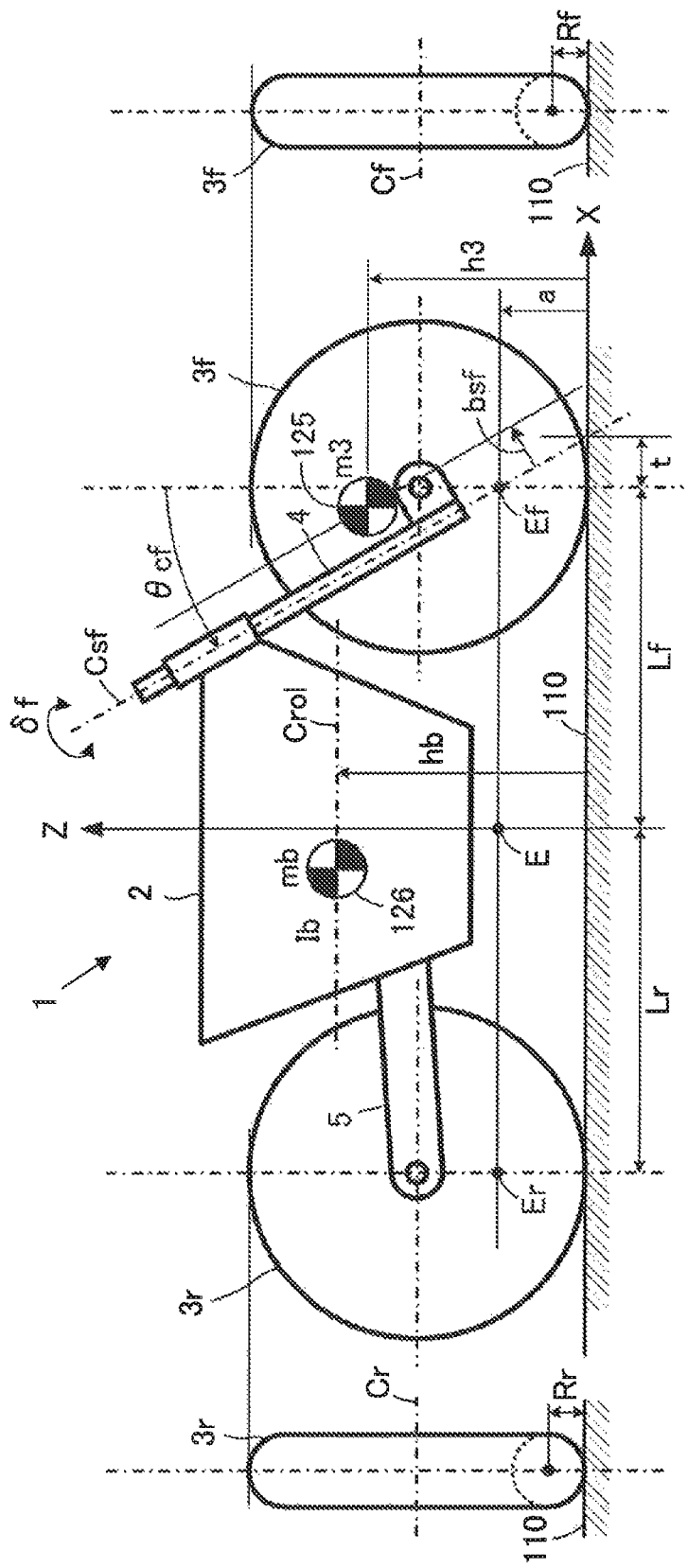
FIG. 13 is a diagram schematically showing a two-wheeled vehicle (front-wheel steering two-wheeled vehicle) for illustrating additional technical matters related to the present invention.
Figure 14A:
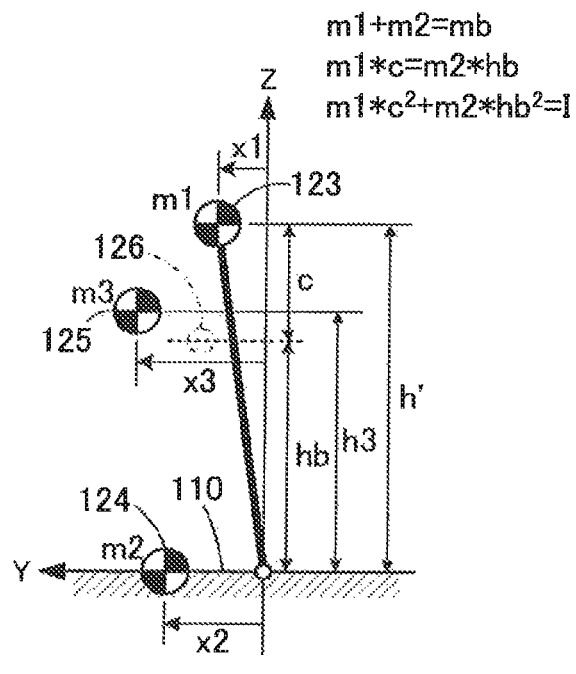
FIGS. 14A to 14C are diagrams each showing a mass point system model of the two-wheeled vehicle in FIG. 13.
Figure 14B:
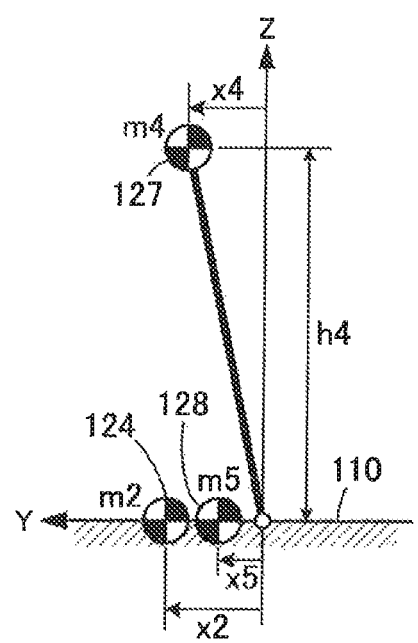
Figure 14C:
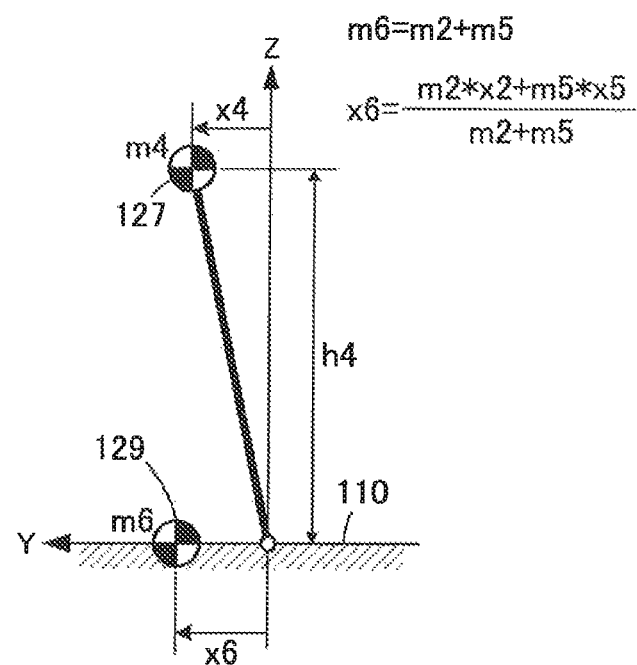
Figure 15:
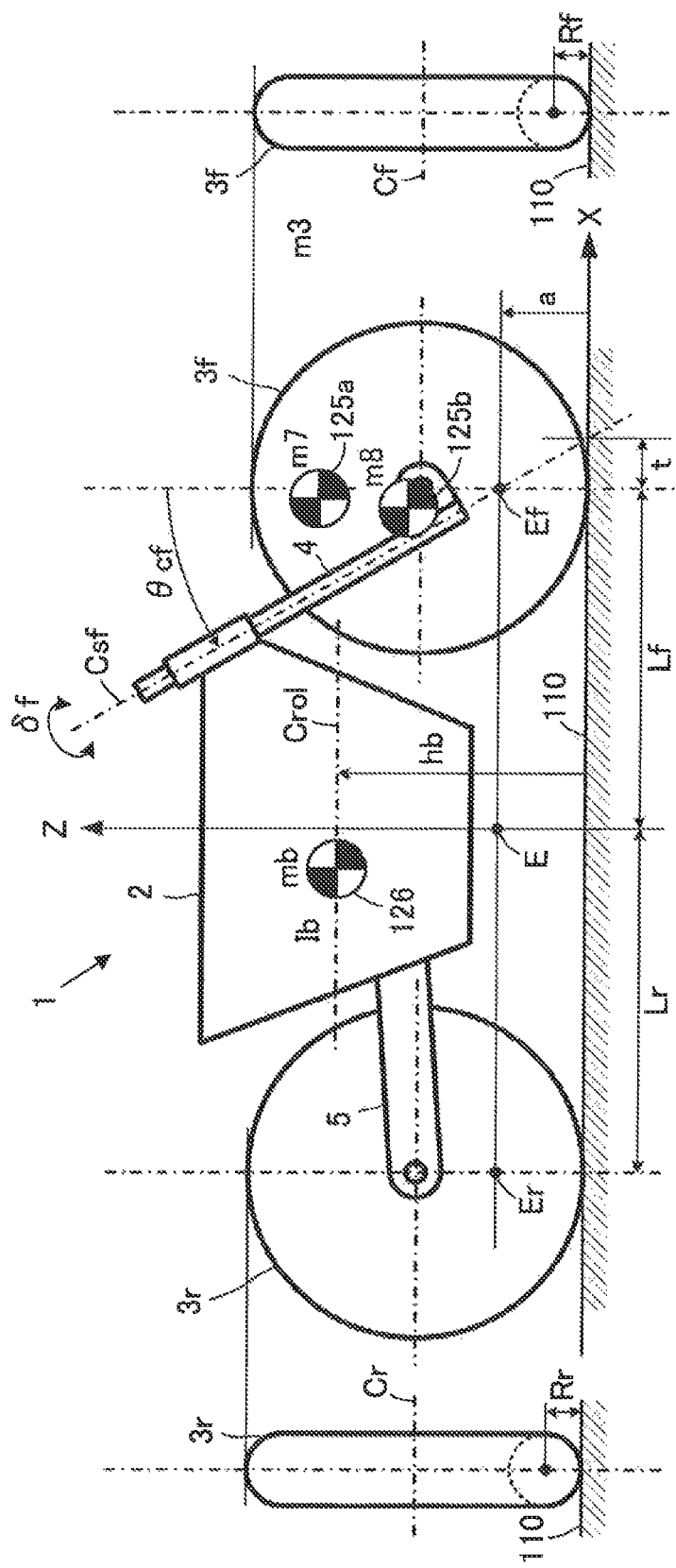
FIG. 15 is a diagram schematically showing a two-wheeled vehicle (front-wheel steering two-wheeled vehicle) for illustrating additional technical matters related to the present invention.

Further, in each of the aforesaid embodiments, the description was made by giving, as an example, the case where the mass and the inertia moment were set only for the vehicle body 2 or 202. The mass or the inertia moment, however, may also be set for the steering control wheel, as explained previously with reference to FIGS. 13 and 14. In such a case as well, the equivalent transformation explained above may be performed to attain a system made up of the inverted pendulum mass point (mass point A) and the ground surface mass point (mass point B), so that the posture of the vehicle body 2 or 202 can be controlled as in each of the aforesaid embodiments.

Further, similarly to a case where a variable related to the position of a mass point may be converted to a variable related to the angle of the line segment connecting the mass point and the origin, any one of the variables and constants used in the embodiments may be replaced with another variable or constant that has a one-to-one relationship therewith. Any variables or constants for which such replacement is possible can be regarded as equivalent to each other.

Furthermore, for any of the techniques, means, and algorithms shown in the embodiments, one that has been equivalently transformed to produce the same result can be regarded as the same.

What is claimed is:

1. A mobile vehicle having a vehicle body and a front wheel and a rear wheel arranged spaced apart from each other in a longitudinal direction of the vehicle body,
   one of the front wheel and the rear wheel being a steering control wheel which can be steered about a steering axis tilted backward,
   the mobile vehicle comprising:
   a steering actuator which generates a steering force for steering the steering control wheel; and
   a control device which controls the steering actuator so as to stabilize a posture of the vehicle body in accordance with at least an observed value of an inclination angle in a roll direction of the vehicle body, wherein
   in a case where a state in which the front wheel and the rear wheel of the mobile vehicle are both stationary in an upright posture in contact with a ground surface and axle centerlines of the front wheel and the rear wheel extend in parallel with each other in a direction orthogonal to the longitudinal direction of the vehicle body is defined as a basic posture state,
   the height a, from the ground surface, of a point of intersection of the steering axis of the steering control wheel and a virtual straight line connecting a ground contact point of the steering control wheel and the center of axle of the steering control wheel in the basic posture state is set to satisfy the following first condition:

First Condition:

in a system made up of a mass point A, which moves in a horizontal direction above the ground surface, with which the mobile vehicle comes into contact, in accordance with the inclination angle in the roll direction of the vehicle body and a steering angle of the steering control wheel, and a mass point B, which moves horizontally on the ground surface, with which the mobile vehicle comes into contact, in accordance with the steering angle of the steering control wheel, independently of the inclination angle in the roll direction of the vehicle body, the system having a mass of the mass point A, a mass of the mass point B, a height of the mass point A from the ground surface, a relationship among an inclination angle in the roll direction of the vehicle body, a steering angle of the steering control wheel, and a displacement of the mass point A, and a relationship between a steering angle of the steering control wheel and a displacement of the mass point B which are set to have dynamic characteristics equivalent to those of dynamics of the mobile vehicle in the case where the steering control wheel of the mobile vehicle being stationary on a prescribed origin in the basic posture state is steered by a steering angle $\delta$, wherein a sum of masses of the mass point A and the mass point B is equal to an overall mass of the mobile vehicle, a height of the center of gravity of the mass point A and the mass point B is equal to an overall height of the center of gravity of the mobile vehicle, and an inertia moment about the center of gravity of the mass point A and the mass point B is equal to an overall inertia moment about the overall center of gravity of the mobile vehicle, the system being also configured such that the mass point A accelerates or decelerates in response to a first gravitational moment, generated about the origin due to a gravitational force acting on the mass point A, a second gravitational moment, generated about the origin due to a gravitational force acting on the mass point B, and a road surface reaction force moment, acting about the origin due to a road surface reaction force in the vertical direction which acts on a center of contact pressure as a point of application, on the ground surface, of a resultant force of a road surface reaction force in the vertical direction which acts on the front wheel from the ground surface and of a road surface reaction force in the vertical direction which acts on the rear wheel from the ground surface, in the case where a steering angle of the steering control wheel at a time when the steering control wheel is steered to cause a front end of the steering control wheel to turn left as the mobile vehicle in the basic posture state is seen from above is defined as a positive steering angle and in the case where a moment that causes the vehicle body to lean to the right is defined as a positive moment, the following holds:

$$Mp/\delta > -M2/\delta$$

where M2 denotes the second gravitational moment generated by movement of the mass point B at a time when the steering control wheel of the mobile vehicle being stationary on the origin in the basic posture state is steered instantaneously by the steering angle $\delta$, and Mp denotes the road surface reaction force moment generated about the origin by movement of the center of contact pressure at the time when the steering control wheel of the mobile vehicle being stationary on the origin in the basic posture state is steered instantaneously by the steering angle $\delta$.

2. The mobile vehicle according to claim 1, wherein, to satisfy the first condition, the height a is set to be smaller than a first prescribed value a_sum determined by the following expression (A):

$$a\_sum = ((h+(I/m)/h)/(Rg+(I/m)/h)) \times Rs \quad (A)$$

where polarity of a: a>0 in a case where the point of intersection is above the ground surface, a<0 in a case where the point of intersection is below the ground surface;

I: inertia moment of the mobile vehicle;

m: mass of the mobile vehicle;

h: height of the center of gravity of the mobile vehicle from the ground surface in the basic posture state of the mobile vehicle;

$$Rg(Lr/(Lf+Lr)) \times Rf + (Lf/(Lf+Lr)) \times Rr;$$

Lf: longitudinal distance between the center of gravity of the mobile vehicle and the center of axle of the front wheel in the basic posture state of the mobile vehicle;

Lr: longitudinal distance between the center of gravity of the mobile vehicle and the center of axle of the rear wheel in the basic posture state of the mobile vehicle;

Rf: radius of curvature of a transverse cross-section of the front wheel at a ground contact point of the front wheel in the basic posture state of the mobile vehicle;

Rr: radius of curvature of a transverse cross-section of the rear wheel at a ground contact point of the rear wheel in the basic posture state of the mobile vehicle; and Rs: one of the radii of curvature Rf and Rr that corresponds to the steering control wheel.

3. The mobile vehicle according to claim 1, wherein the height a is set to further satisfy the following second condition:

Second Condition:

$$M\text{sum}/\delta > -M2/\delta$$

where Msum denotes a sum moment of the second gravitational moment M2 and the road surface reaction force moment Mp.

4. The mobile vehicle according to claim 3, wherein, to satisfy the first condition and the second condition, the height a is set to be not greater than a second prescribed value a_s determined by the following expression (B):

$$a\_s = ((h+(I/m)/h)/(Rg+2\times(I/m)/h)) \times Rs \quad (B)$$

where polarity of a: a>0 in a case where the point of intersection is above the ground surface, a<0 in a case where the point of intersection is below the ground surface;

I: inertia moment of the mobile vehicle;

m: mass of the mobile vehicle;

h: height of the center of gravity of the mobile vehicle from the ground surface in the basic posture state of the mobile vehicle;

$$Rg(Lr/(Lf+Lr)) \times Rf + (Lf/(Lf+Lr)) \times Rr;$$

Lf: longitudinal distance between the center of gravity of the mobile vehicle and the center of axle of the front wheel in the basic posture state of the mobile vehicle;

Lr: longitudinal distance between the center of gravity of the mobile vehicle and the center of axle of the rear wheel in the basic posture state of the mobile vehicle;

Rf: radius of curvature of a transverse cross-section of the front wheel at a ground contact point of the front wheel in the basic posture state of the mobile vehicle;
Rr: radius of curvature of a transverse cross-section of the rear wheel at a ground contact point of the rear wheel in the basic posture state of the mobile vehicle; and
Rs: one of the radii of curvature Rf and Rr that corresponds to the steering control wheel.

* * * * *